US012041378B2

(12) United States Patent
Feliciano

(10) Patent No.: US 12,041,378 B2
(45) Date of Patent: Jul. 16, 2024

(54) COMBINED SECURITY AND VIDEO CAMERA CONTROL SYSTEM

(71) Applicant: BCD International, inc., Buffalo Grove, IL (US)

(72) Inventor: Alberto Feliciano, Buffalo Grove, IL (US)

(73) Assignee: BCD INTERNATIONAL, INC., Buffalo Grove, IL (US)

( * ) Notice: Subject to any disclaimer, the term of this patent is extended or adjusted under 35 U.S.C. 154(b) by 235 days.

(21) Appl. No.: 17/478,446

(22) Filed: Sep. 17, 2021

(65) Prior Publication Data

US 2023/0086809 A1 Mar. 23, 2023

(51) Int. Cl.

| | |
|---|---|
| ***H04N 5/272*** | (2006.01) |
| ***G06F 9/445*** | (2018.01) |
| ***H04N 7/18*** | (2006.01) |
| ***H04N 23/617*** | (2023.01) |
| ***H04N 23/661*** | (2023.01) |

(52) U.S. Cl.

CPC ......... *H04N 5/272* (2013.01); *G06F 9/44526* (2013.01); *H04N 7/183* (2013.01); *H04N 23/617* (2023.01); *H04N 23/661* (2023.01)

(58) Field of Classification Search

USPC .......................................................... 348/143

See application file for complete search history.

(56) References Cited

U.S. PATENT DOCUMENTS

| | | | | |
|---|---|---|---|---|
| 9,141,150 B1 * | 9/2015 | Trundle | G06F 3/017 | |
| 10,019,654 B1 * | 7/2018 | Pisoni | G06V 10/82 | |
| 10,262,356 B2 * | 4/2019 | Davis | G06F 16/532 | |
| 11,380,434 B2 * | 7/2022 | Izadpanah | G06F 8/38 | |
| 11,523,485 B1 * | 12/2022 | Fu | H04N 7/181 | |
| 11,678,011 B1 * | 6/2023 | Fu | H04N 21/8549 | 348/143 |
| 11,720,716 B2 * | 8/2023 | Auh | G06F 21/78 | 713/167 |
| 2006/0174245 A1 * | 8/2006 | Hansen | H04L 43/0811 | 718/100 |
| 2007/0083527 A1 * | 4/2007 | Wadler | H04L 67/02 | |
| 2008/0218590 A1 * | 9/2008 | Park | G11B 27/105 | 348/E7.086 |
| 2011/0083181 A1 * | 4/2011 | Nazarov | H04L 63/14 | 726/23 |
| 2012/0093477 A1 * | 4/2012 | M | G08B 13/19671 | 386/E5.028 |
| 2012/0323690 A1 * | 12/2012 | Michael | G01C 21/3605 | 705/14.58 |

(Continued)

*Primary Examiner* — Nigar Chowdhury

(74) *Attorney, Agent, or Firm* — Clark Hill PLC; James R. Foley

(57) ABSTRACT

A solution which targets perimeter infrastructure. The solution comprises a plugin which integrates a dedicated security video camera management system with a comprehensive security system management system. A foundation is thereby provided which utilizes many advantages that are found in the security system management system, such as the creation of entities, Event-to Actions, and role fail-over. Use of the plugin results in an overall system where operators of the security system can imbed their own images and branding on the video streams. Users can effectively brand their edge devices without having to interface with the devices directly.

18 Claims, 361 Drawing Sheets

(56) References Cited

U.S. PATENT DOCUMENTS

2012/0323767 A1* 12/2012 Michael ................ G06Q 40/00 705/39
2012/0323770 A1* 12/2012 Michael ................ G08G 1/054 705/39
2012/0323772 A1* 12/2012 Michael ................ G06Q 40/00 705/39
2013/0039634 A1* 2/2013 M .................... G08B 13/19682 386/230
2013/0170696 A1* 7/2013 Zhu ........................ G06V 10/75 382/103
2013/0293718 A1* 11/2013 M .................... G08B 13/19669 340/541
2015/0310297 A1* 10/2015 Li .......................... G06V 20/54 382/199
2016/0026827 A1* 1/2016 Ko ...................... G06F 21/6209 713/193
2016/0034704 A1* 2/2016 Shim ...................... H04N 23/80 726/26
2016/0086462 A1* 3/2016 Meganathan .......... G11B 27/34 348/155
2016/0088326 A1* 3/2016 Solomon .............. H04N 21/254 725/12
2016/0132890 A1* 5/2016 Banerjee ............ G06Q 20/4014 705/44
2016/0156823 A1* 6/2016 Yoshida ................. H04N 23/58 348/143
2016/0357762 A1* 12/2016 Aghdasi .............. G06F 16/7867
2017/0278289 A1* 9/2017 Marino ................... G06T 7/536
2017/0308902 A1* 10/2017 Quiroga ............... G06Q 20/351
2018/0158220 A1* 6/2018 Van Eeuwijk .......... G06T 11/60
2018/0211050 A1* 7/2018 Kumar ................... H04N 7/183
2018/0268223 A1* 9/2018 Janakiraman .......... G11B 27/10
2018/0278419 A1* 9/2018 Higgins .............. H04L 63/0428
2018/0278835 A1* 9/2018 Meganathan ........ H04N 23/611
2018/0285398 A1* 10/2018 Nishiyama ......... G05B 19/0428
2018/0285856 A1* 10/2018 Choi ......................... G06F 8/61
2018/0330112 A1* 11/2018 Racz .................... H04N 21/441
2018/0337907 A1* 11/2018 Bhansali ............... H04L 9/3231
2019/0102873 A1* 4/2019 Wang ..................... G06V 10/40
2019/0238405 A1* 8/2019 Karivaradaswamy .. G06F 13/10
2019/0246165 A1* 8/2019 Brouwer ........... H04N 21/4728
2019/0261045 A1* 8/2019 Altuev ................... G06V 20/52
2019/0311201 A1* 10/2019 Selinger ............... G08B 25/006
2019/0332871 A1* 10/2019 Sudarsan ......... G08B 13/19686
2020/0029086 A1* 1/2020 Zou ...................... H04N 19/436
2020/0183709 A1* 6/2020 Weisshaupt ........... H04L 41/046
2020/0225904 A1* 7/2020 Cooper ..................... G06F 3/16
2020/0413001 A1* 12/2020 Takahashi ................ H04N 5/77
2021/0042527 A1* 2/2021 Ton-That .............. G06F 18/214
2021/0158507 A1* 5/2021 Dagley ................. G06F 3/0481
2021/0159441 A1* 5/2021 Kwon ................... G06F 1/1616
2021/0344633 A1* 11/2021 Bar-on .................. G06F 3/0482
2021/0406836 A1* 12/2021 Bar-on .................. G06F 40/205
2022/0173934 A1* 6/2022 Decenzo .............. G05D 1/0094
2022/0230457 A1* 7/2022 Buscemi .............. G06V 20/586
2022/0254178 A1* 8/2022 Chen ....................... G06T 7/248
2022/0342649 A1* 10/2022 Cao ....................... G06F 9/5077
2022/0351433 A1* 11/2022 King ...................... G06V 10/82
2022/0414264 A1* 12/2022 Ananthanarayanan ...................... H04L 67/12
2022/0417302 A1* 12/2022 Saxena ............... H04L 65/1045
2023/0122119 A1* 4/2023 Wu ....................... B60W 30/09 701/301

* cited by examiner

Start

User opens client app

Overlay update received ?

Make Vapix request to all cameras in configured area

Render overlay

End

Overview

Start

Get Plugin ID

Get configured Genetec Areas

Initialize

Await user interaction

Filter file types

Is file .PNG or .BMP?

Display file type error to user

Is file .BMP?

Is 24-bit .BMP?

Convert to 24 -bit .BMP

Get image height and width

Use Vapix helper to convert image to string for serialization

Display Custom Image

Use Vapix helper to convert image string to image for rendering.

Get selected overlay configuration

Render Image

Is data being loaded

Save Overlay configuration

Save Overlay configuration

Persist data via serialization

Delete Overlay Configuration

Delete Image from Configured UI

Persist data via serialization

Reset UI

Overview

Convert image to Base64 string

Is image parameter null

End

Create converter

Create byte array using converter

Return byte array as a string

Convert Base64 string to image

Use .Net converter to convert string

Return byte array

Update Overlay

Remove Any Overlay

Is this a delete request?

Restart Camera

Does Overlay need to be enabled?

Make Vapix calls depending on API version

Enable Overlay

Save and Convert Overlay

If Successful

Set Overlay

Return error Response

Translate Position

Upload File to Camera

Upload File to New Camera

If Successful

Return Error Response

Add Dynamic Image

Restart Camera

Remove Any Overlay

Old

Dynamic

Delete Overlay

Determine API version

If Successful

New Delete Overlay

Get Dynamic Overlays

Return Response

Remove Dynamic Overlay

Upload File to Camera

Create web request

Send Upload request to Vapix server

Save and Convert Overlay

Create web request

Send Save and convert request to Vapix server

Set Overlay

Create web request

Send Set Overlay request to Vapix server

Delete Overlay

Send Delete Overlay request to Vapix server

Restart Camera

Create web request

Send Restart request to Vapix server

Create web request

Translate Overlay on New Camera

Send New Translate request to Vapix server

Set Overlay to New Camera

Send New Set request to Vapix server

Set Overlay to New Camera

Create web request

Send New Set request to Vapix server

Check Processor chip

Create web request

Send request to Vapix server

Enable Image Overlay

Create web request

Send Enable request to Vapix server

Add Dynamic Image

Send Add Dynamic request to Vapix server

Remove Dynamic Image

Create web request

Send Remove Dynamic Request to Vapix server

Set Dynamic Image

Create web request

Send Set Dynamic request to Vapix server

Get Dynamic Images

Create web request

Send Get Dynamic Images request to Vapix server

Check Firmware Version

If firmware is less than 7

Return Old

If Firmware is newer than version 8

Return Dynamic

If Firmware is newer than 7.10

Return New

Return Old

Use Dynamic Overlays

Is Processor of Type "Artpec-7"

Return yes

Return no

Enable Overlay

Is Processor of Type "Artpec"

Return yes

Return no

Is Amberella chip

Is chip of type Amberella?

Return yes

Return no

Make request to vapix

Is Camera Valid

Is Camera manufacturer "Axis" and is the Camera online?

Return no

Return yes

Determine API version

Amberella chip

Is Amberella chip

Return New

Use Dynamic Overlays

Is Dynamic?

Return Dynamic

Check Firmware version

Return result

Start

Server Module Loads

Plugin starts

Listen for Client Requests

Received Request?

Send to Vapix API

Create Vapix Managers

Create Genetec Request handlers

Create all handlers

Remove all handlers

Get plugin Role

Get plugin configuration

Iterate through overlay configurations

Is overlay "dirty"

Another Overlay ?

Serialize plugin configuration

Return response

Update Cameras

Update Cameras

Another Camera?

Return response

Async Add Handler

Get Video Unit

Is Vapix Helper Camera Valid

Return

Check for chip

Chip check needed?

Get API Version

Return result

Overview (cont'd)

Overview (cont'd)

Overview (cont'd)

Overview (cont'd)

Overview (cont'd)

Overview (cont'd)

Overview (cont'd)

Overview (cont'd)

Overview (cont'd)

Overview (cont'd)

Overview (cont'd)

Overview (cont'd)

Overview (cont'd)
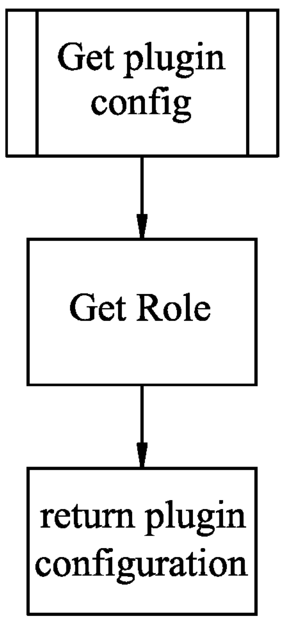
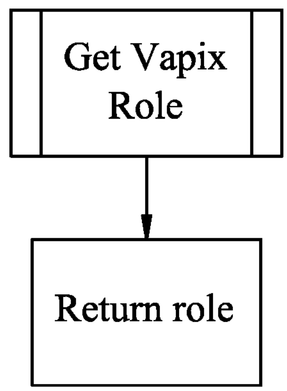
FIG. 200Q-2
FIG. 200Q-1

Overview (cont'd)

Overview (cont'd)

Overview (cont'd)

Overview (cont'd)

Overview (cont'd)

Overview (cont'd)

Overview (cont'd)

Start

Stand by

Initialize

Initialize

Subscribe to Entity Invalidated event

Get configured Area

Does Area exist?

Return

Get Configured Overlay

Does Overlay Exist?

Return

Get list of cameras

Does Overlay have image configured?

DeleteOVerlayOverride

Is there a Camera to process?

Async Add

Return

Do we need to check the chip?

Is the camera valid

Check Processor Chip

Return

Determine API version

Restart Camera

Get list of cameras

Is there a camera to process

Async Delete

Return

Get Video unit

Do we need to check the chip?

Check Processor Chip

Remove Any Overlay

Is the camera valid

Return

Remove Overlay

Does Area exist?

Return

Get Configured Overlay

Does Overlay Exist?

Return

Get list of cameras

Delete Overlay Override

REPLACEMENT SHEET

306/361

ID already in collection

Get list of Cameras

Get Area

Return

Add ID and camera list to collection

Add Update Collection

Get Configured Overlay

Get Plugin Role

Get overlay Configuration

Return overlay configuration

Get Alternate IP

Is custom field empty?

Return custom field

Return IP address return plugin configuration

Engine Entities Added

Is there another entity?

return

Get list of entities

Is there another entity?

return

Is Entity an Area?

Is Entity Overlay configured?

Cameras Added

Cameras Removed

AddOverlay

Is there another entity?

return

Is Entity an Area?

Is Area in Collection?

Get plugin Role

ReSerialize Overlay configurations

Is the Entity an Area?

COMBINED SECURITY AND VIDEO CAMERA CONTROL SYSTEM

BACKGROUND

The present invention generally relates to security systems and video camera control systems, and more specifically relates to a novel and inventive system which effectively combines security and security video camera management.

Currently, companies and organizations use one set of products and services for video camera management such as Axis Vapix, and a totally different set of products and services to manage security systems (i.e., access control, etc.), such as the Genetec Security Center. Using two different systems complicates matters.

Security video management systems do not provide the creation of entities, Event-to Actions, and role fail-over.

The availability and ability to interface with security infrastructure is a powerful addition to an organizations tool set. The BCD Vapix plugin targets perimeter infrastructure by integrating the Axis Vapix platform with Genetec's Security Center software.

The BCD Vapix plugin is a full Genetec plugin that integrates with the core Security Center platform. Built on the Genetec SDK platform, the BCD Vapix plugin builds a foundation to utilize many advantages that are found in Security Center such as the creation of native interfaces, entity management, and role failover.

All organizations have the need to monitor, maintain, and react to their critical perimeter infrastructure. Edge device interaction is vital to success in all market verticals. However, security system management systems do not allow users to brand their edge devices without having to interface with the devices directly. Conventional security system management systems do not allow security system managers the ability to imbed their own images and branding on video streams using the video camera management system. As such, images are not applied at the area level, and speed and productivity is not maximized.

SUMMARY

One object of an embodiment of the present invention is to provide a combined security system and security camera management system.

Another object of an embodiment of the present invention is to provide a user interface that allows users to brand their edge devices without having to interface with the devices directly.

Another object of an embodiment of the present invention is to provide a security system that interfaces with a video camera management system and allows users to imbed their own images and branding on video streams using the video camera management system.

Another object of an embodiment of the present invention is to allow users to apply security camera images at the area level.

Briefly, an embodiment of the present invention provides a solution which targets perimeter infrastructure by integrating a dedicated security video camera management system with a comprehensive security system management system. As such, a foundation is provided which utilizes many advantages that are found in the security system management system, such as the creation of native interfaces, entity management, and role failover. Security system operators can imbed their own images and branding on the video streams, and users can brand their edge devices without having to interface with the devices directly.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIGS. 39A-1, 39A-2, 39B, 39C, 39D, 39E, 39F-1, 39F-2, 39F-3, 39G-1, 39G-2, 39G-3, 39H-1, 39H-2, 39I-1, 39I-2, 39I-3, 39J-1, 39J-2, 39J-3, 39K-1, 39K-2, 39L-1, 39L-2, 39M, 39N, 39O, 40-139 and 140 through 160, collectively, illustrate helpers of the security camera management system;

FIGS. 200A through 200P, FIG. 200Q-1, FIG. 200Q-2, FIGS. 200R through 200Z and FIGS. 201 through 312, collectively, illustrate the security video management system manager.

DESCRIPTION

Figure 1:
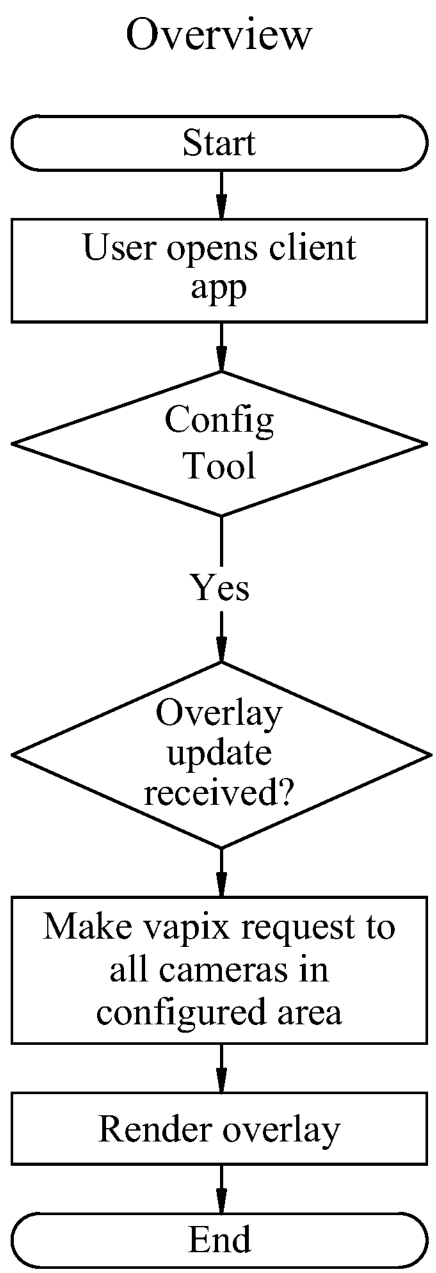
FIGS. 1-8, collectively, illustrate an overview of the client.
Figure 2:
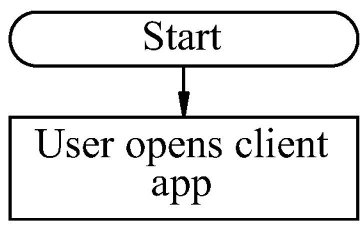
Figure 3:
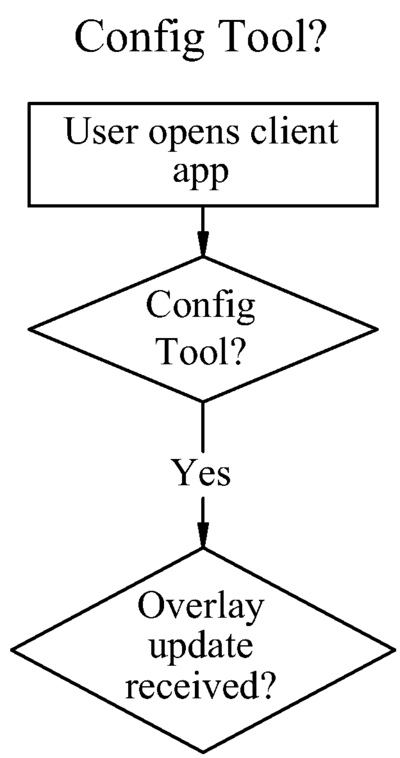
Figure 4:
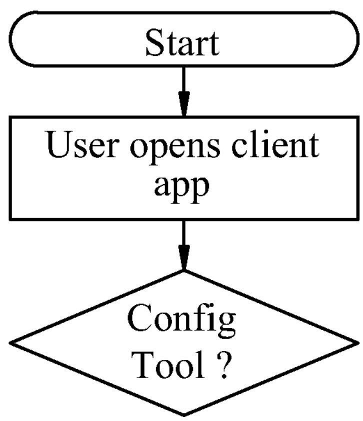
Figure 5:
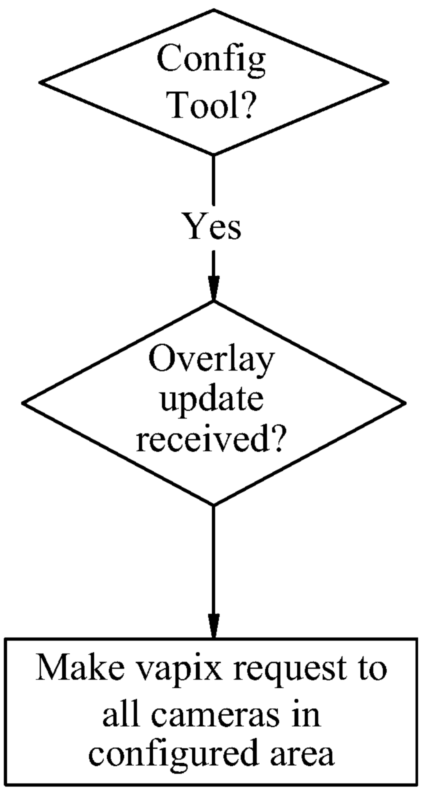
Figure 6:
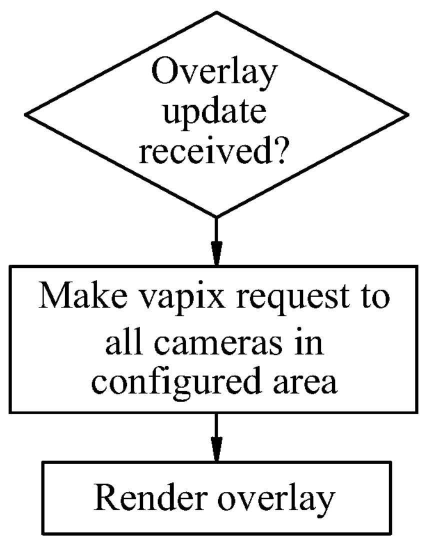
Figure 7:
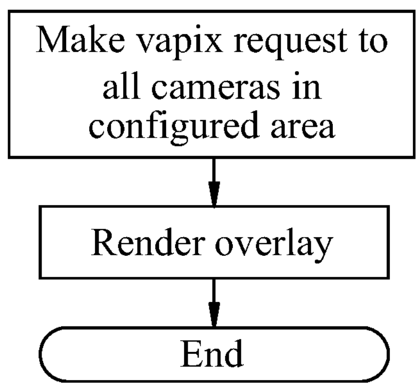
Figure 8:
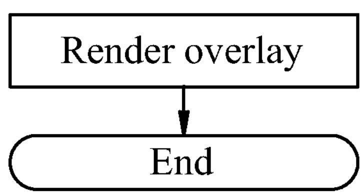
Figure 9A:
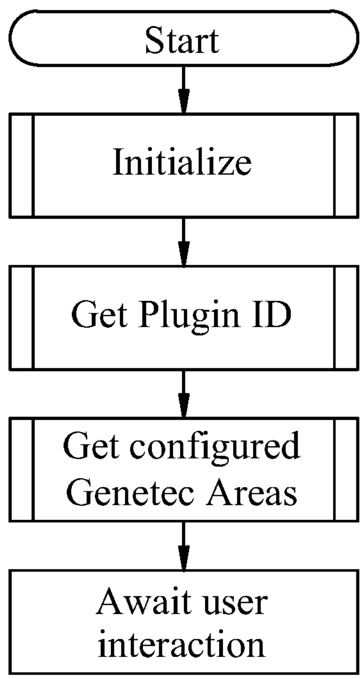
FIGS. 9A through 9E and FIGS. 10 through 38, collectively, illustrate the overlay configuration of the client.
Figure 9B:
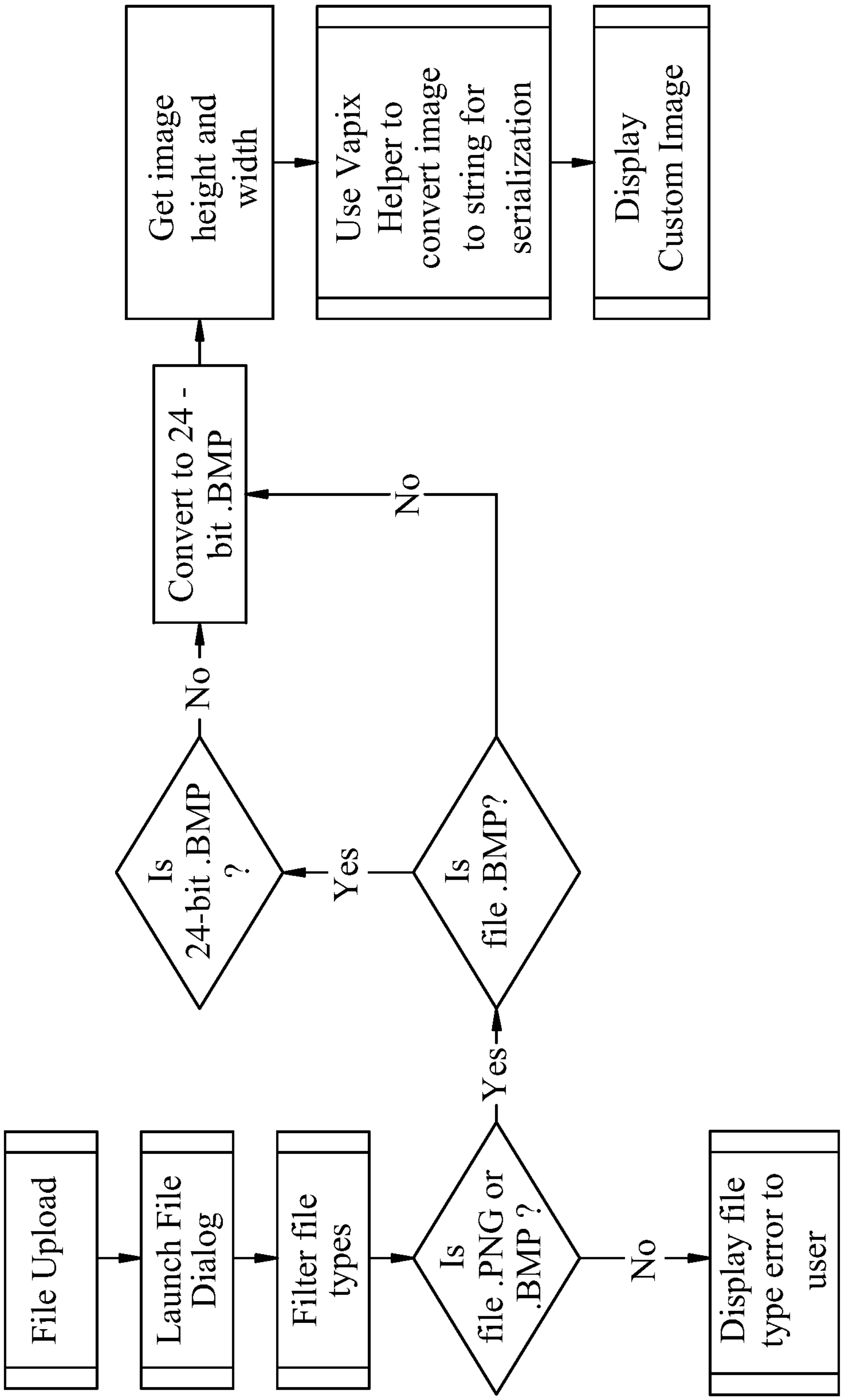
Figure 9C:
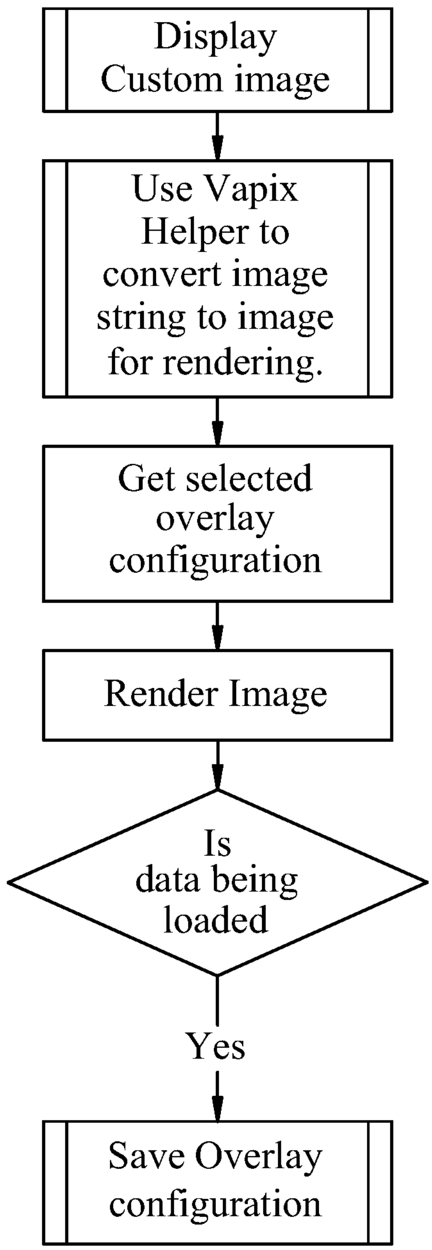
Figure 9D:
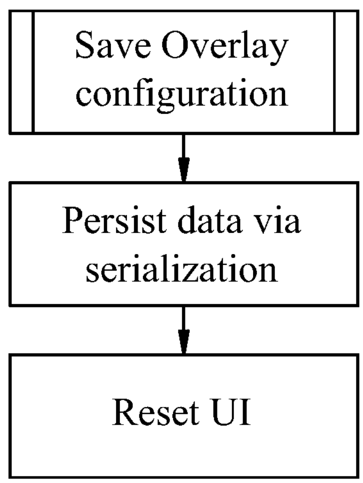
Figure 9E:
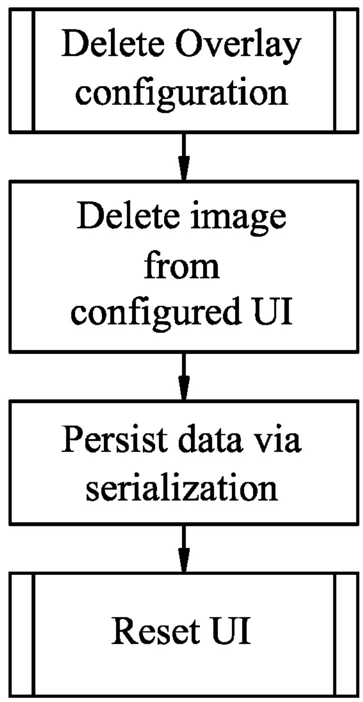
Figure 10:
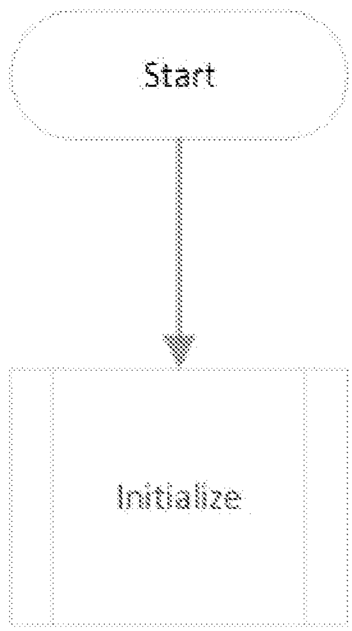
Figure 11:
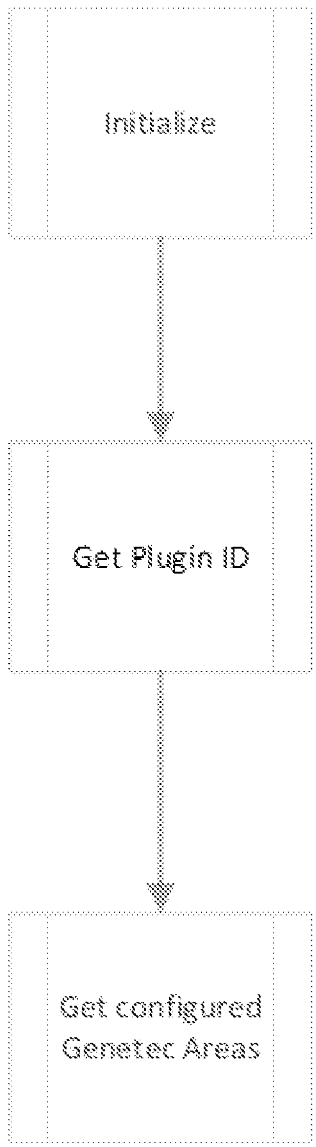
Figure 12:
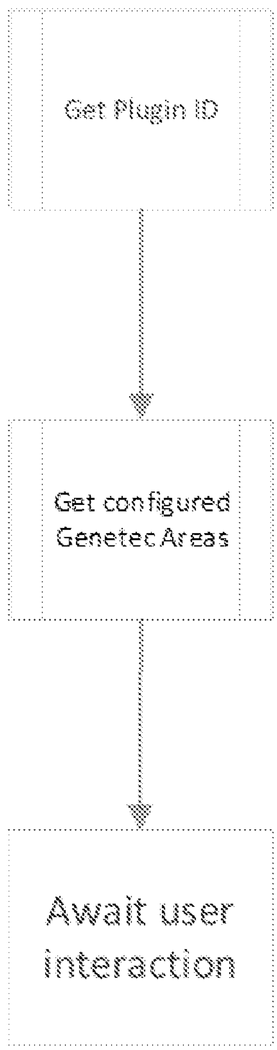
Figure 13:
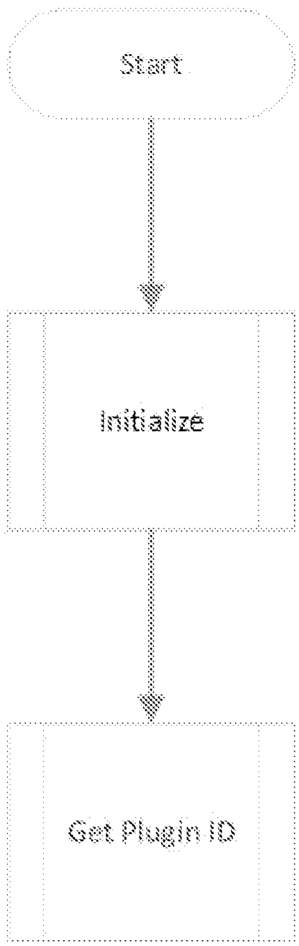
Figure 14:
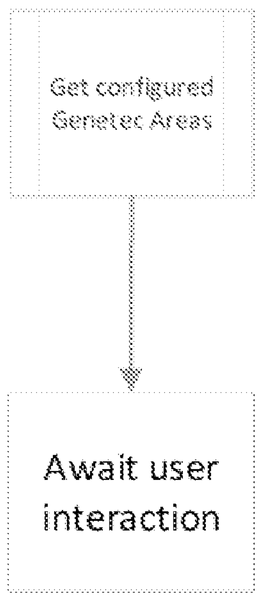
Figure 15:
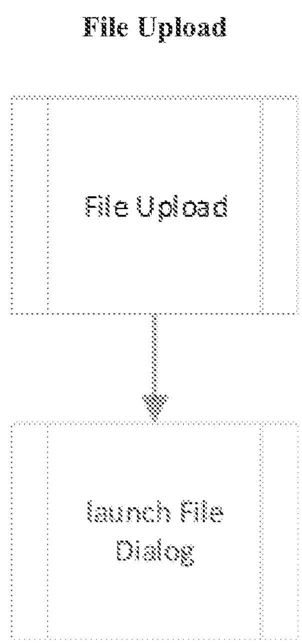
Figure 16:
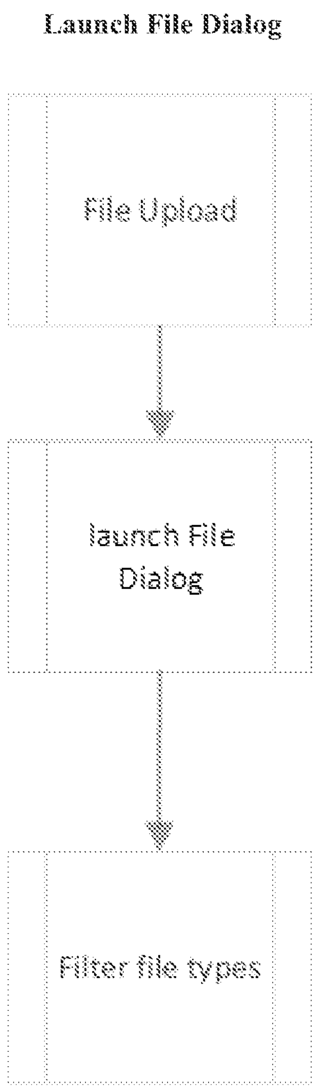
Figure 17:
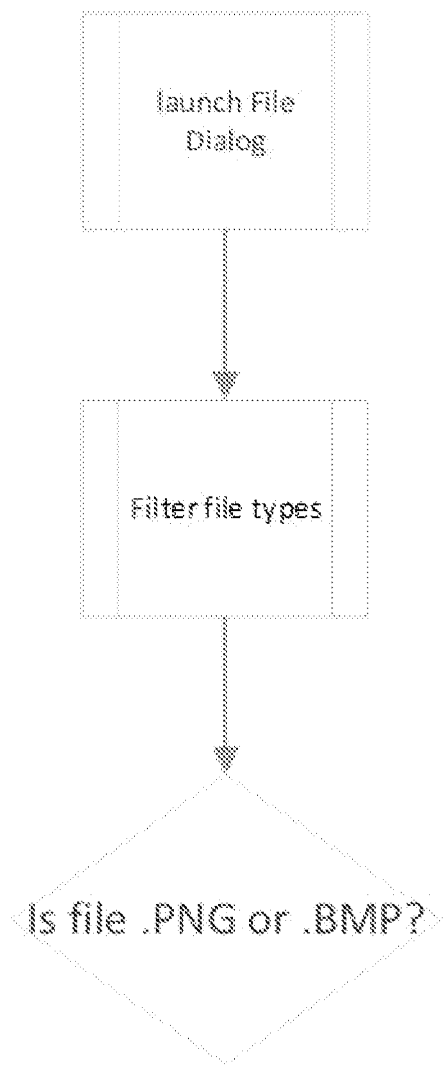
Figure 18:
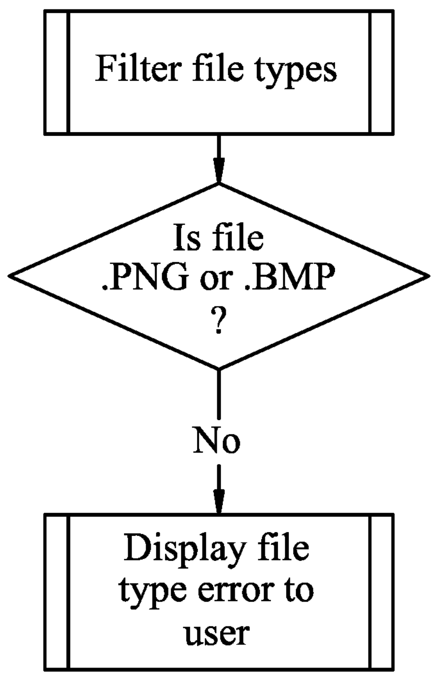
Figure 19:
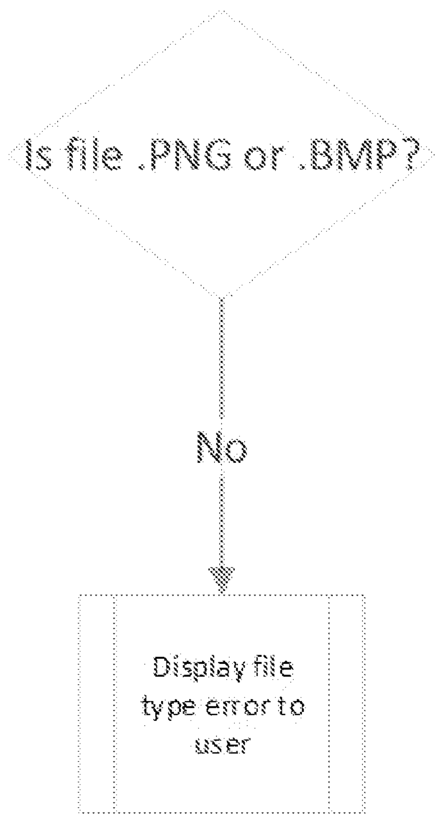
Figure 20:
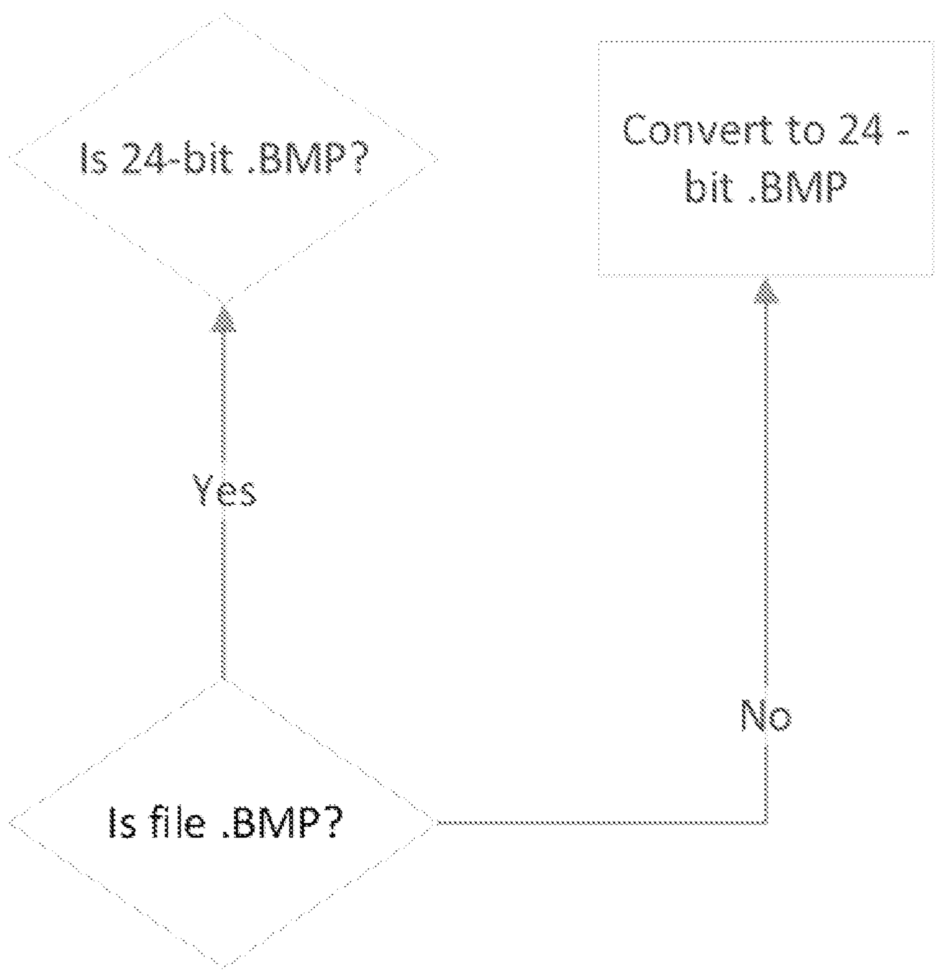
Figure 21:
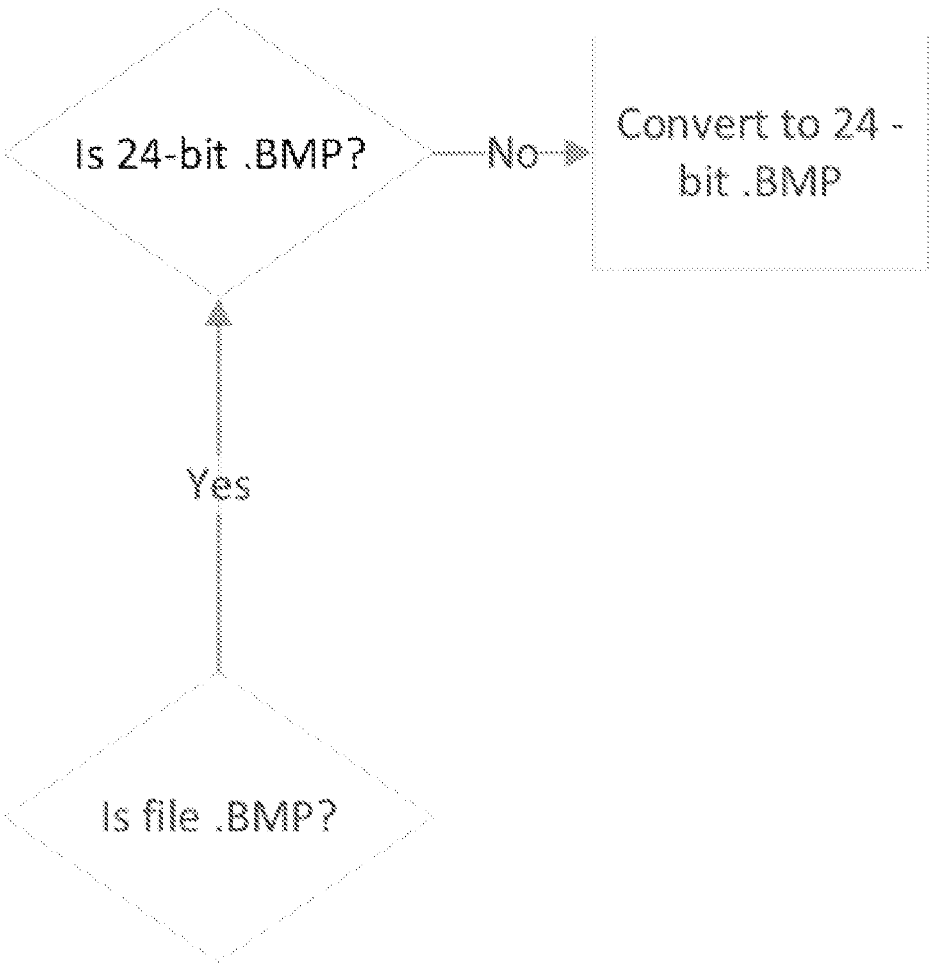
Figure 22:
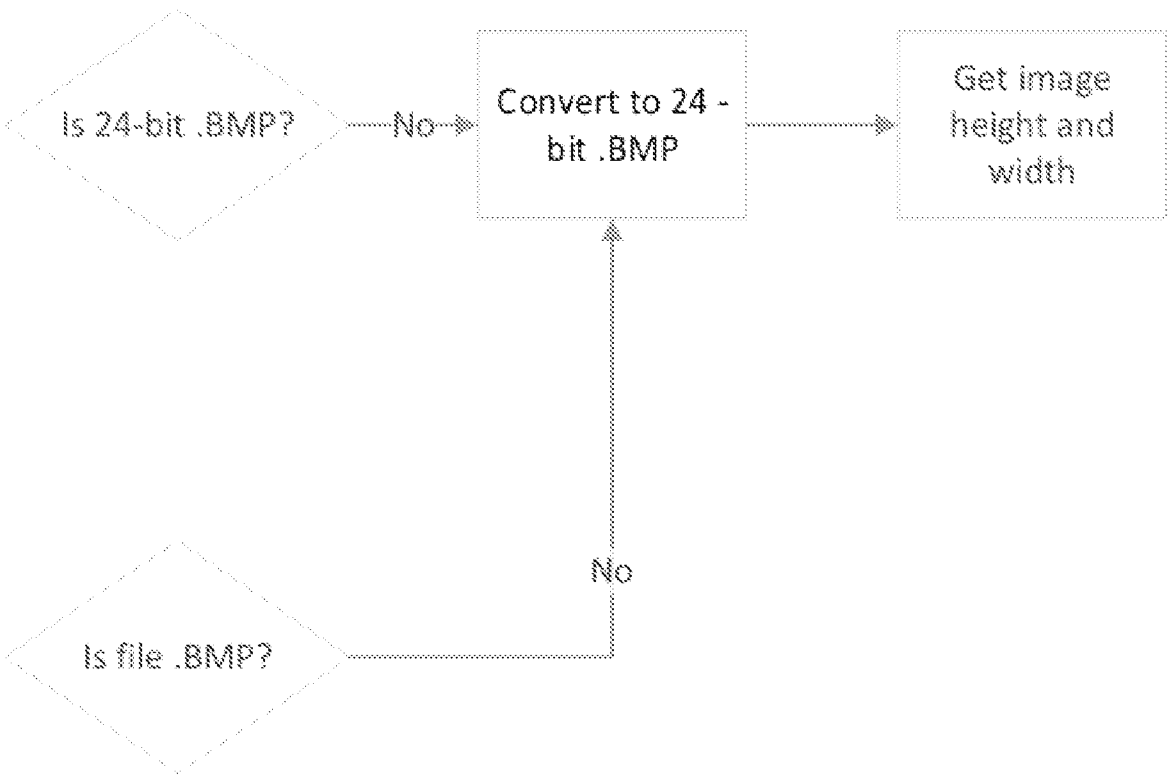
Figure 23:
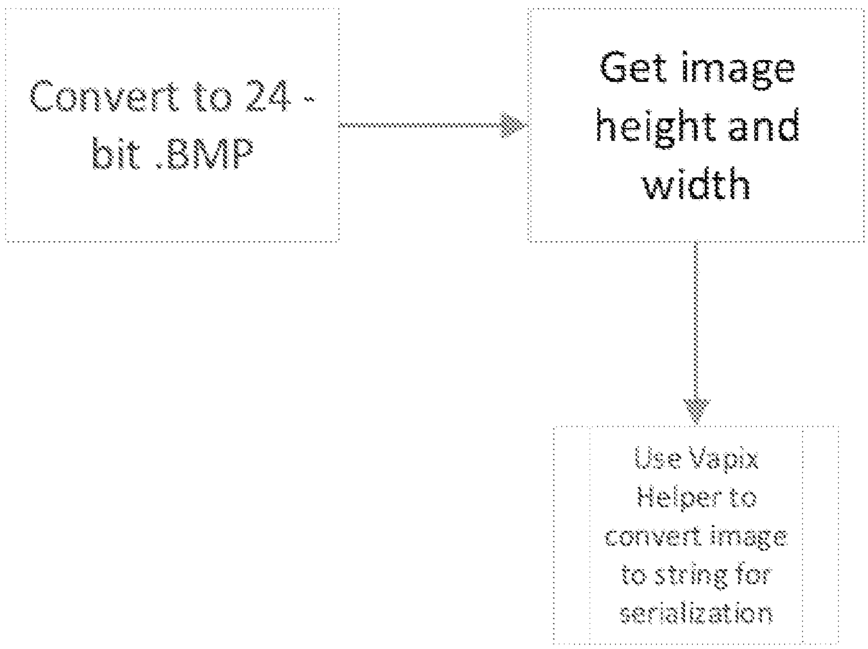
Figure 24:
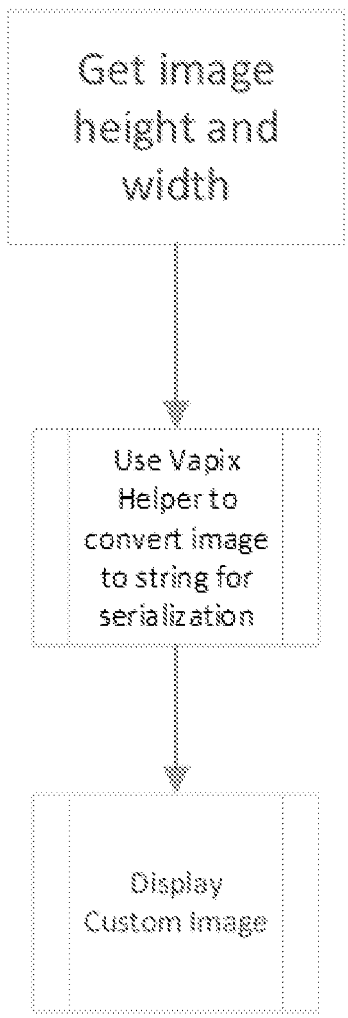
Figure 25:
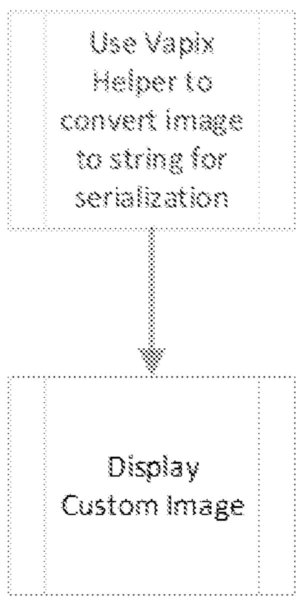
Figure 26:
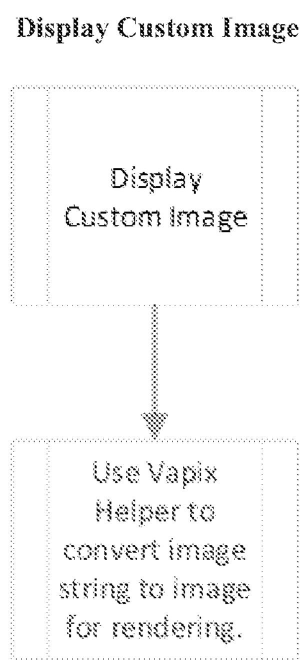
Figure 27:
Figure 28:
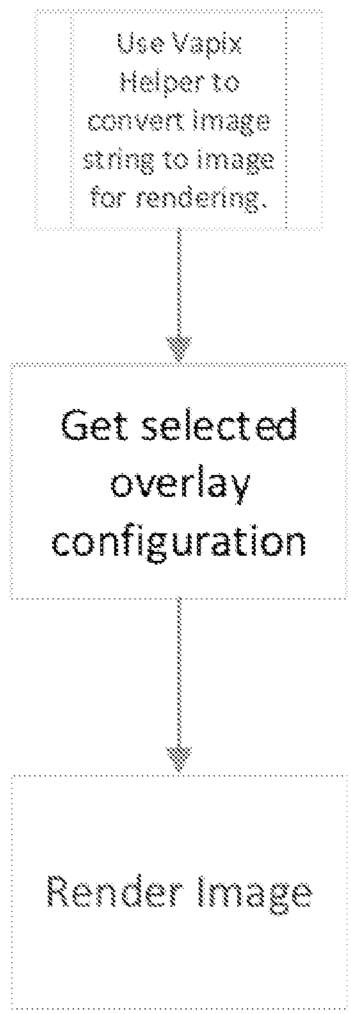
Figure 29:
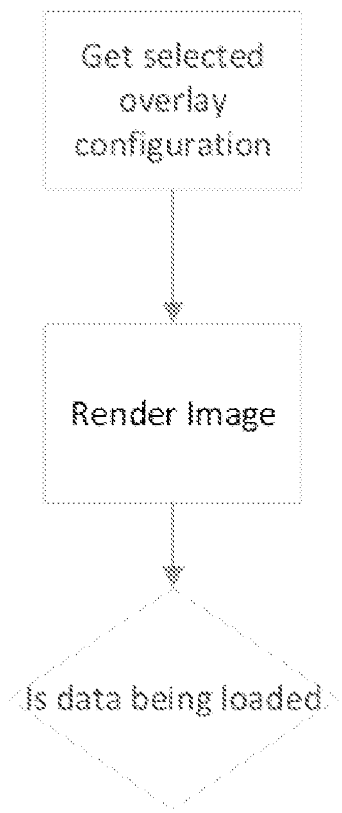
Figure 30:
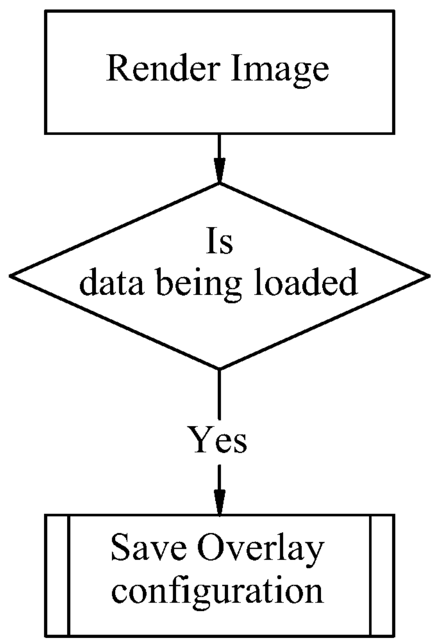
Figure 31:
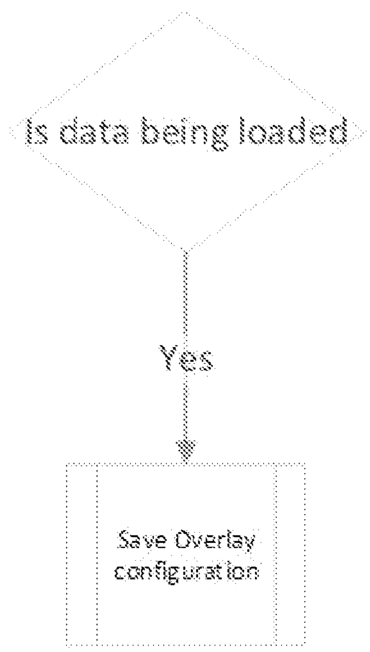
Figure 32:
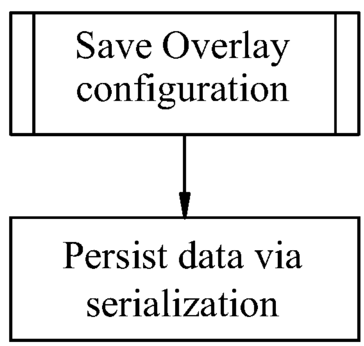
Figure 33:
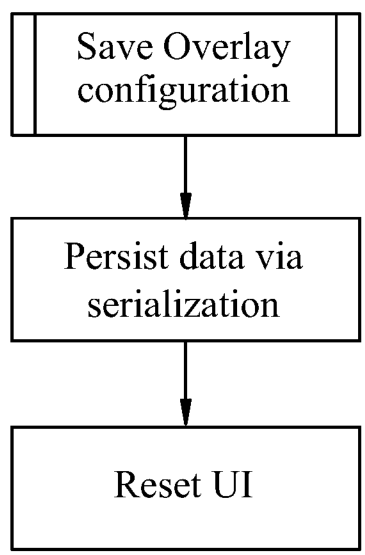
Figure 34:
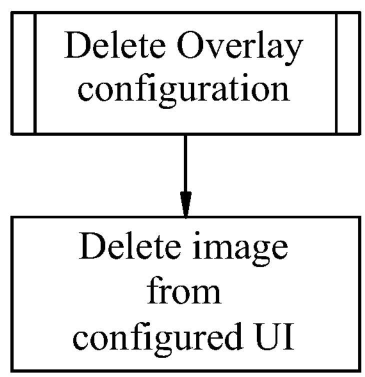
Figure 35:
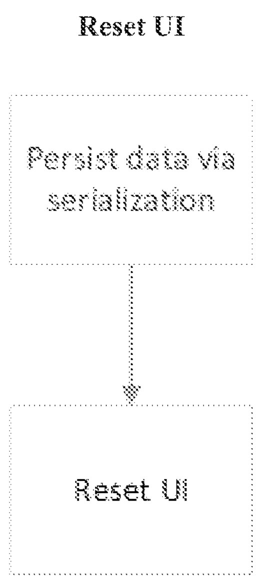
Figure 36:
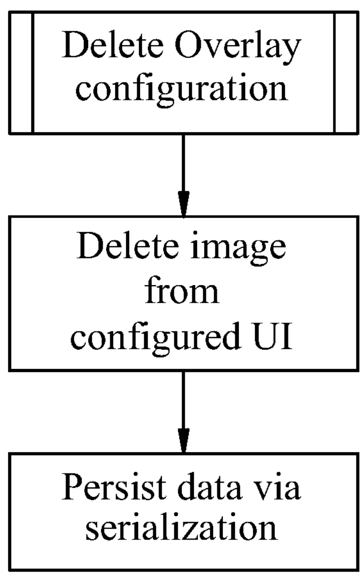
Figure 37:
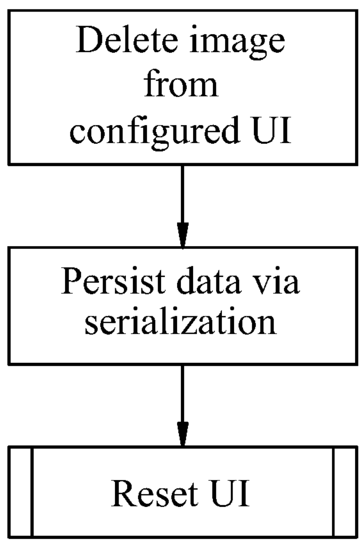
Figure 38:
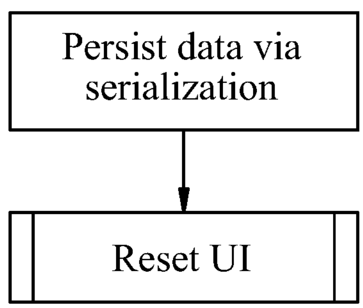

While this invention may be susceptible to embodiment in different forms, there is shown in the drawings and will be described herein in detail, a specific embodiment with the understanding that the present disclosure is to be considered an exemplification of the principles of the invention and is not intended to limit the invention to that as illustrated.

All organizations have the need to monitor, maintain, and react to their critical perimeter infrastructure. Edge device interaction is vital to success in all market verticals. An embodiment of the present invention comprises a plugin which targets perimeter infrastructure by integrating a security camera management system, such as the Axis Vapix platform, with a comprehensive security system management system, such as Genetec's Security Center software, thereby providing a plugin that builds a foundation to utilize many advantages that are found in Security Center such as the creation of native interfaces, entity management, and role failover. As a result, the overall system allows users to brand their edge devices without having to interface with the devices directly and allows images to be applied at the area level.

Figures 1, 39A:
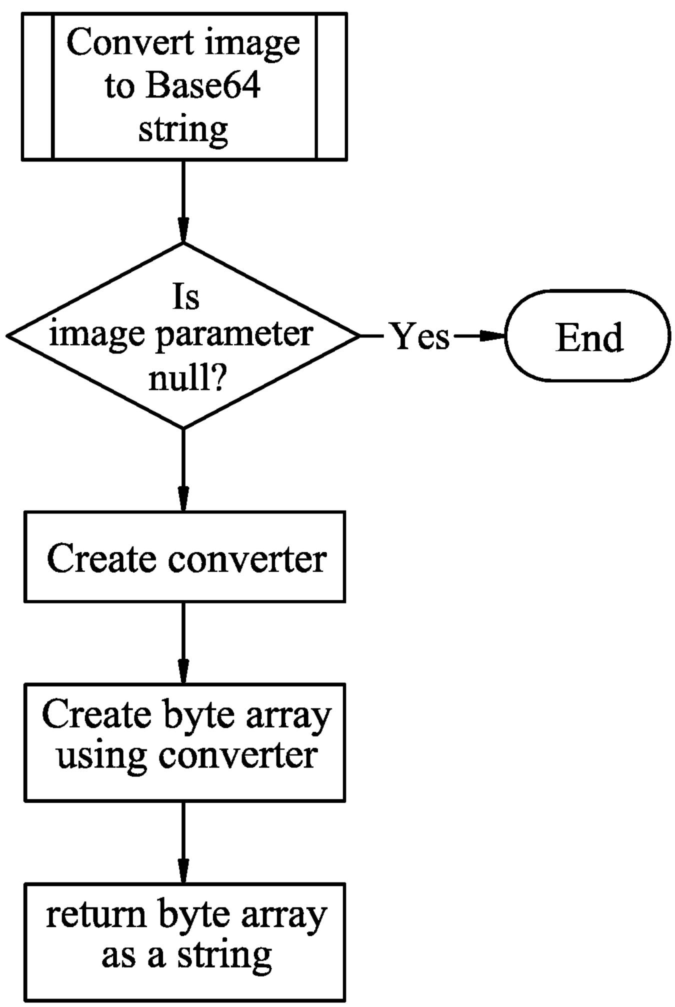
Figures 2, 39A:
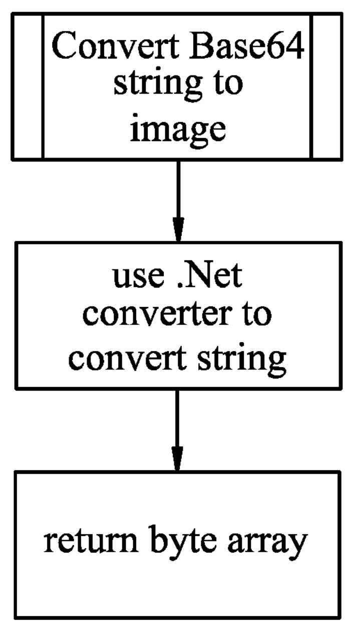
Figure 39B:
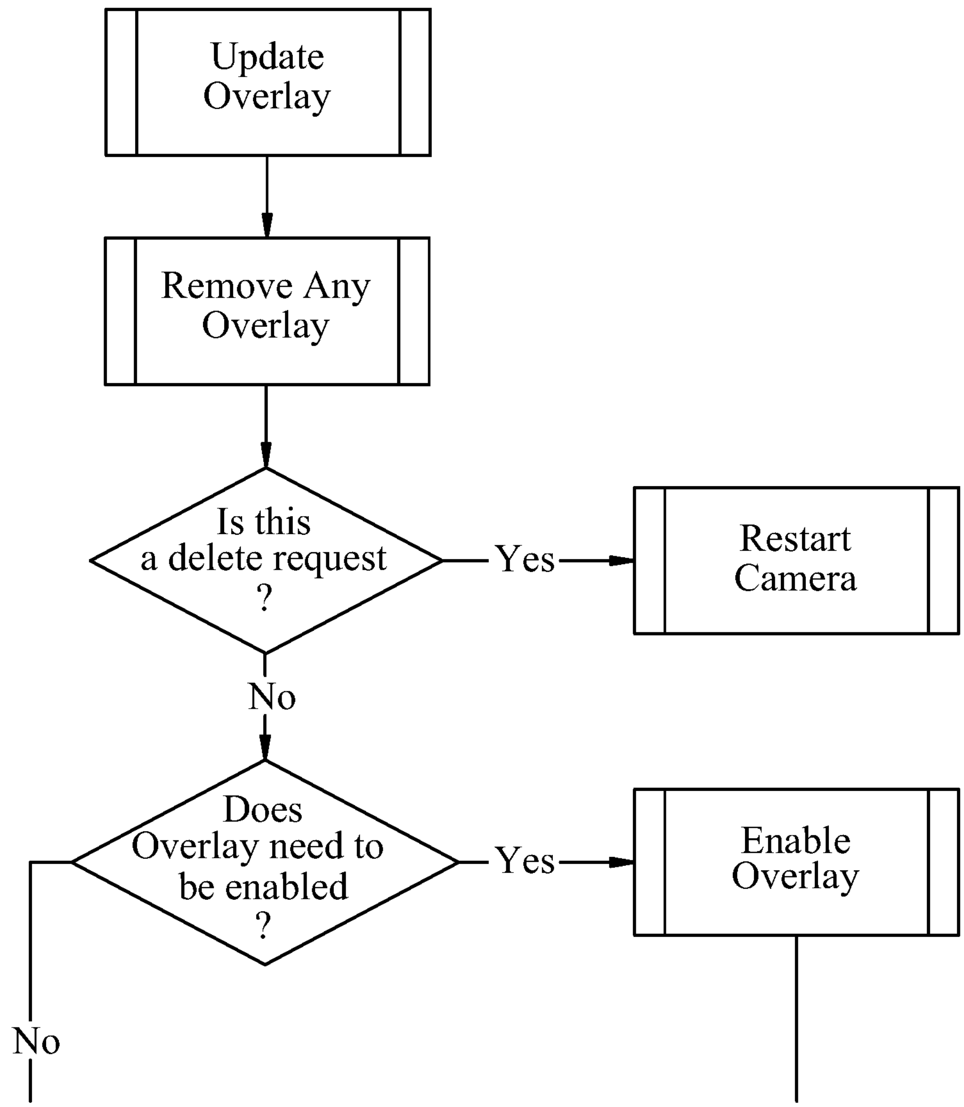
Figure 39C:
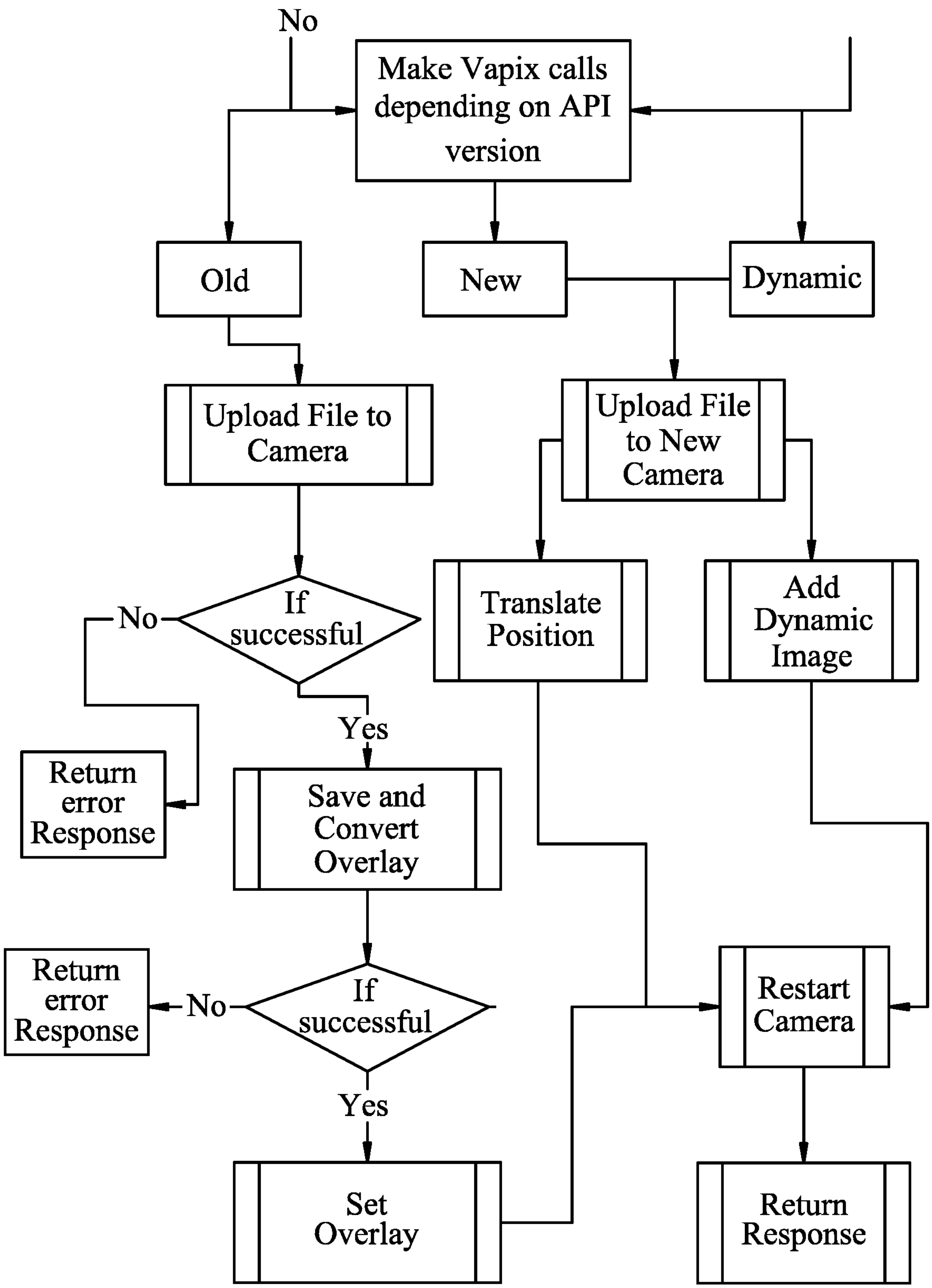
Figure 39D:
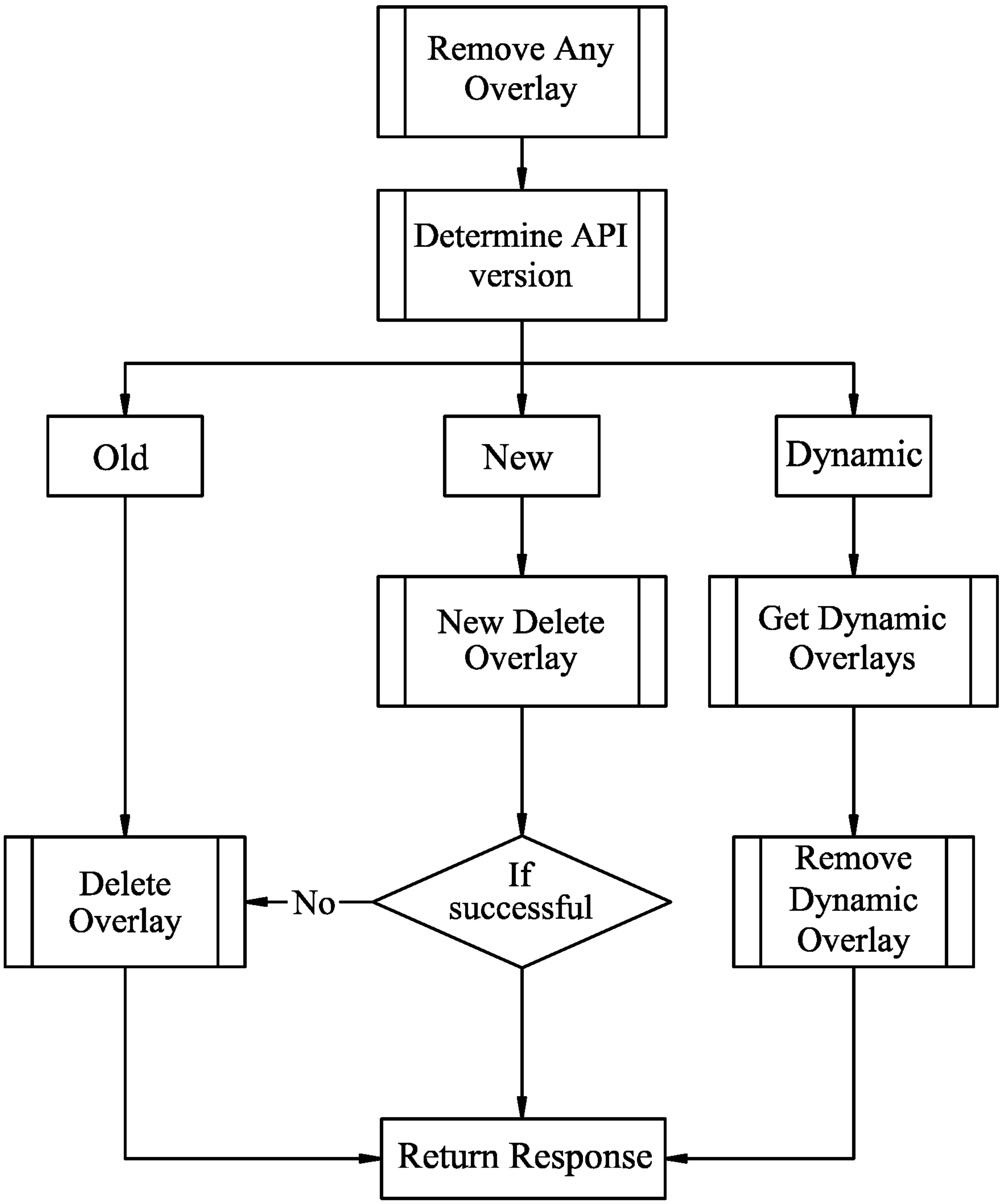
Figure 39E:
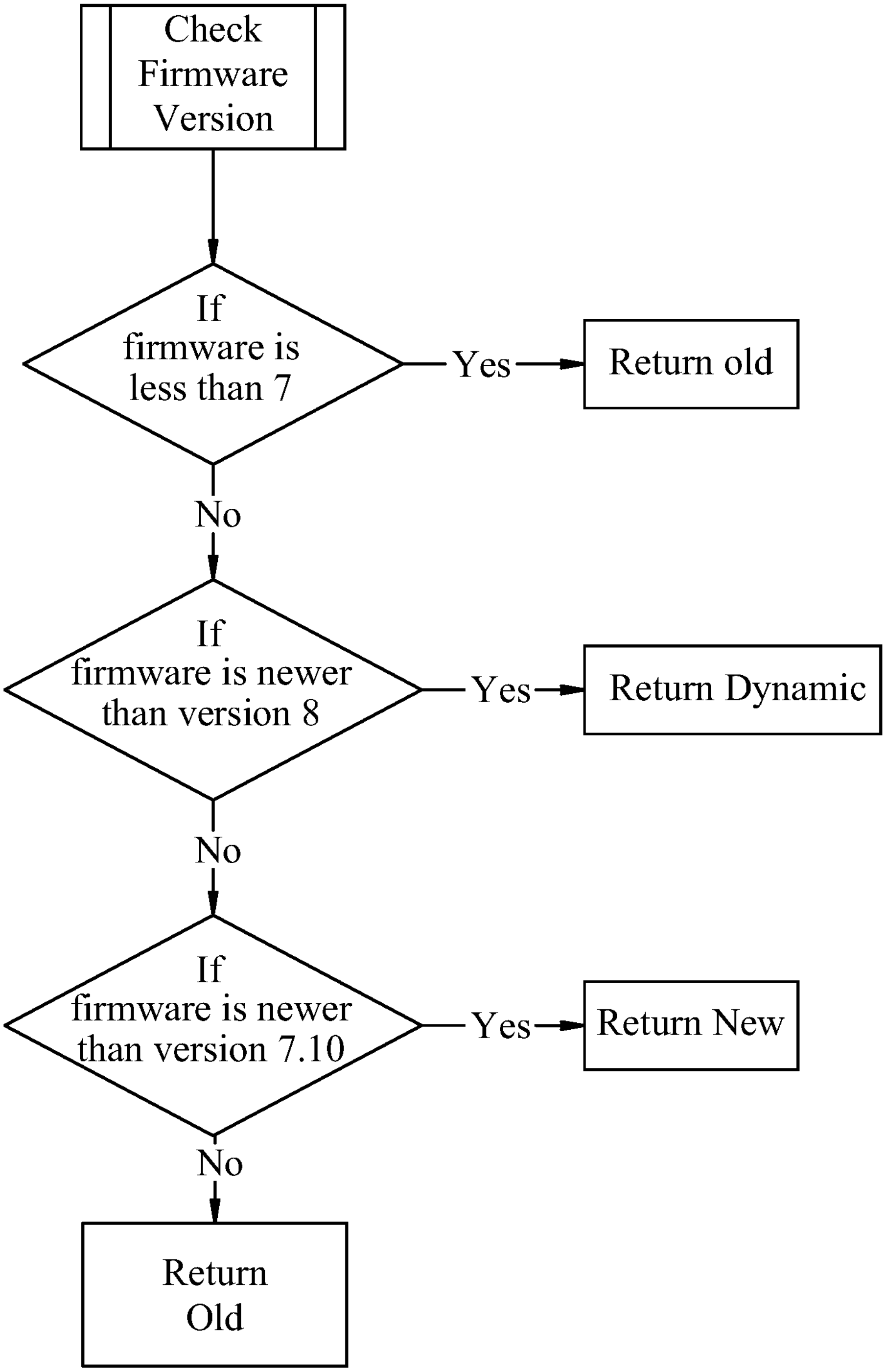
Figures 1, 39F:
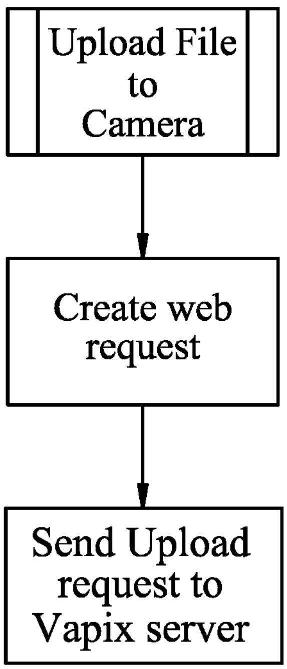
Figures 2, 39F:
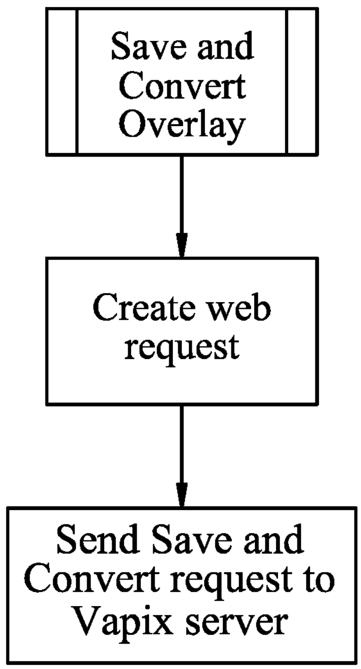
Figures 3, 39F:
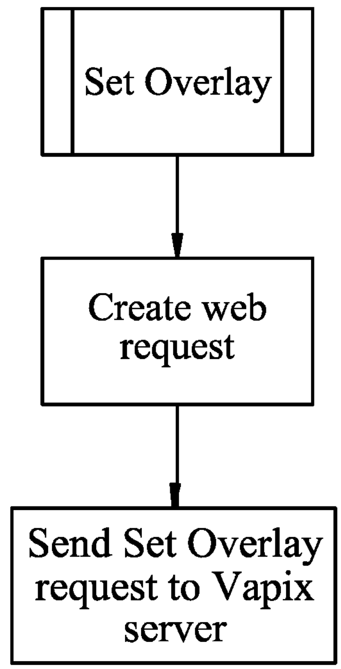
Figures 1, 39G:
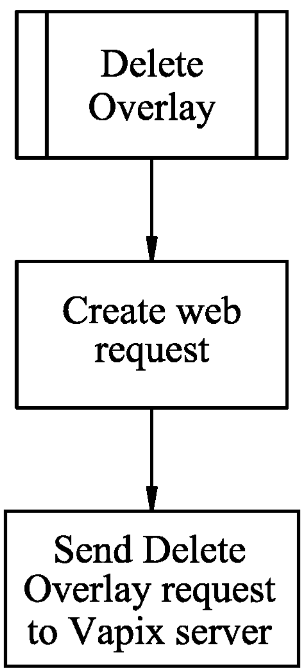
Figures 2, 39G:
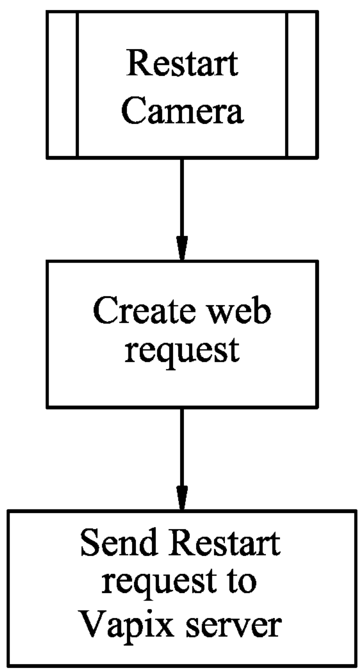
Figures 3, 39G:
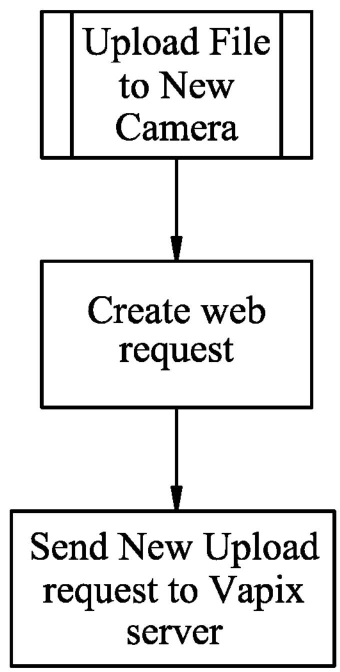
Figures 1, 39H:
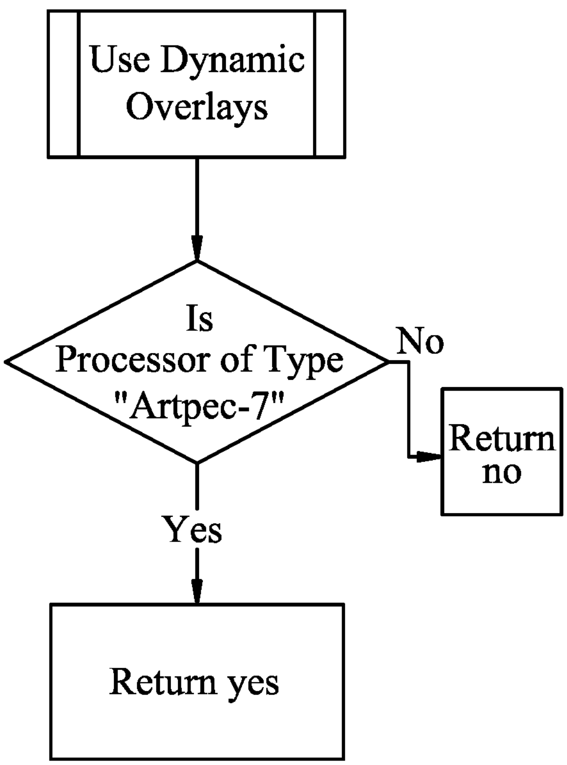
Figures 2, 39H:
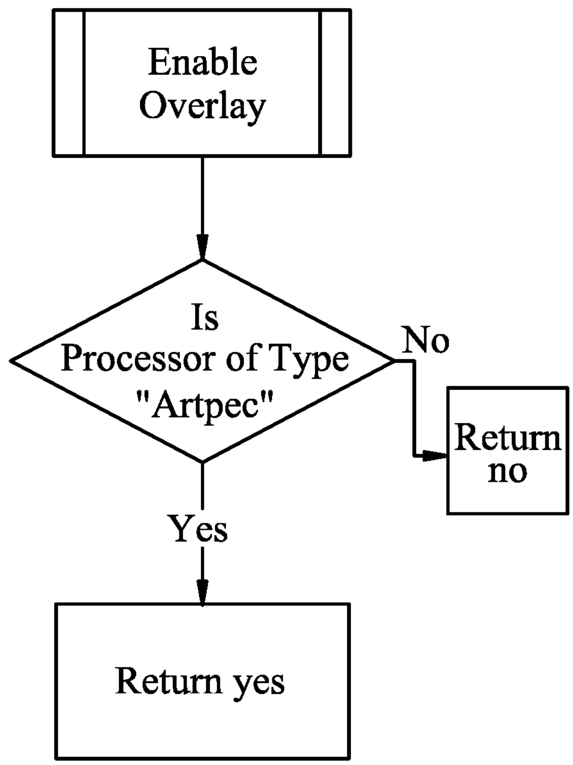
Figures 1, 39I:
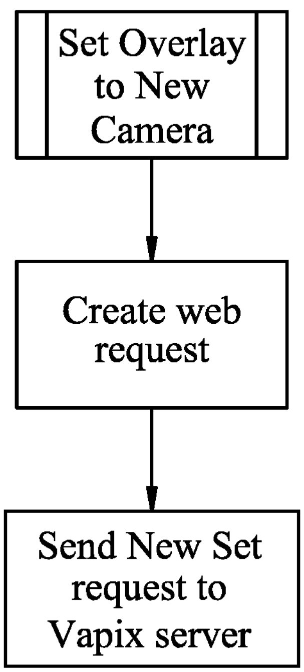
Figures 2, 39I:
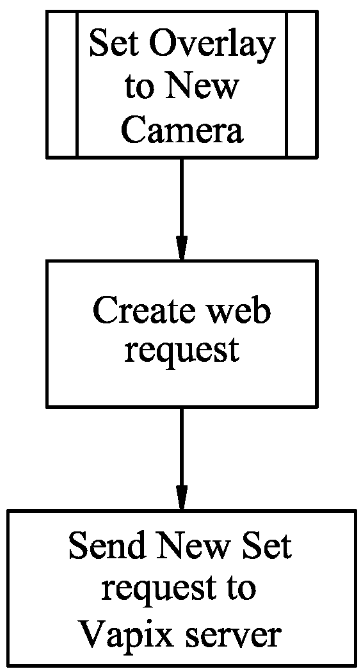
Figures 3, 39I:
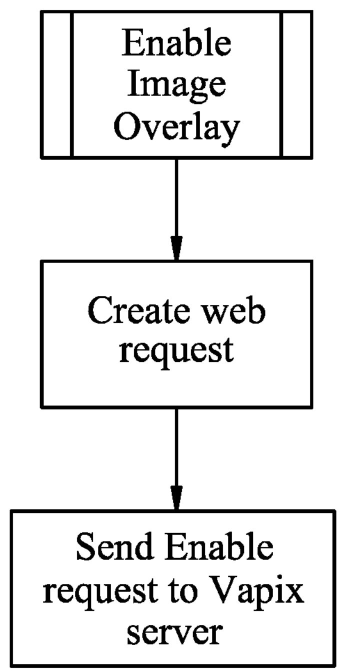
Figures 1, 39J:
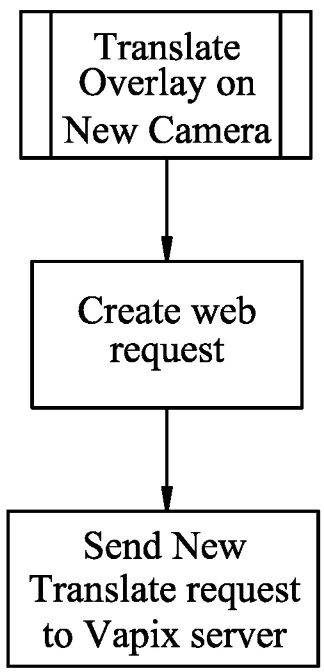
Figures 2, 39J:
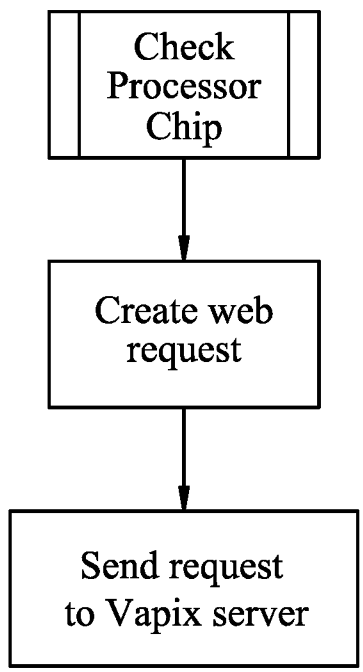
Figures 3, 39J:
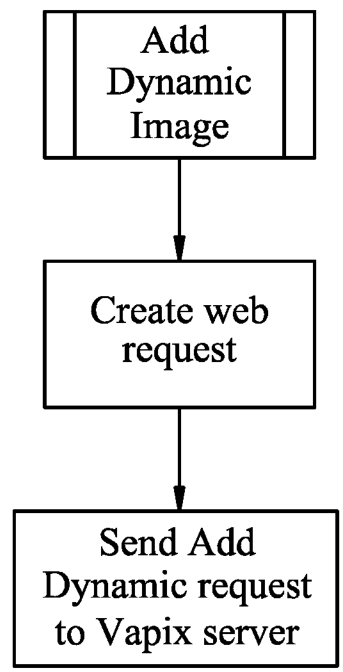
Figures 1, 39K:
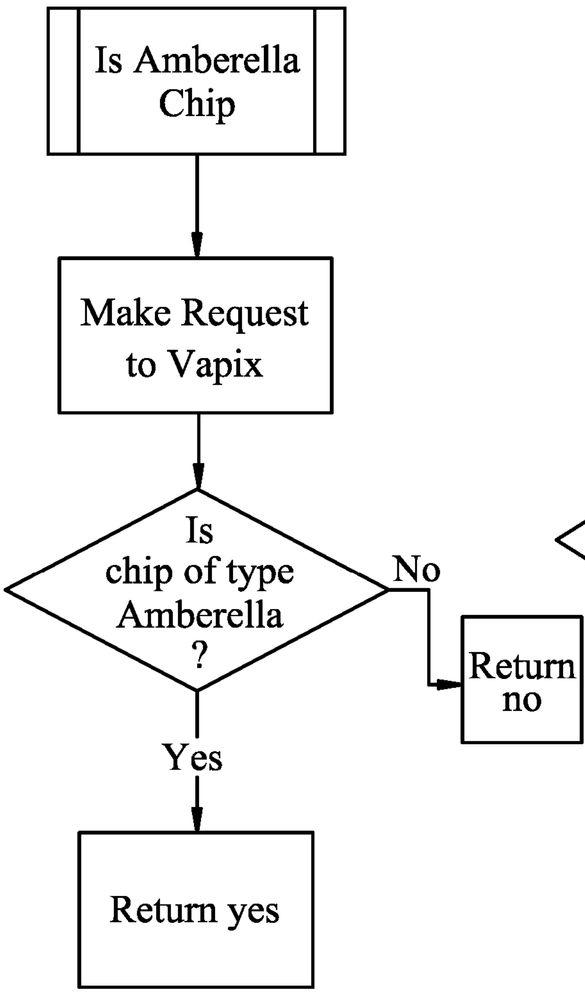
Figures 2, 39K:
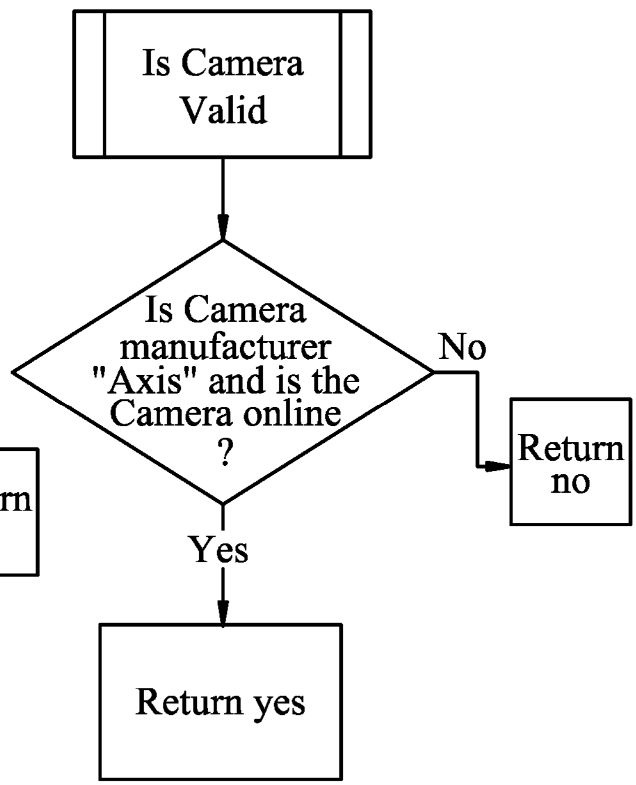
Figures 1, 39L:
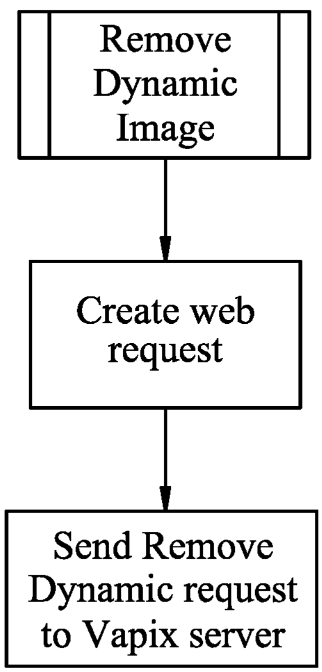
Figures 2, 39L:
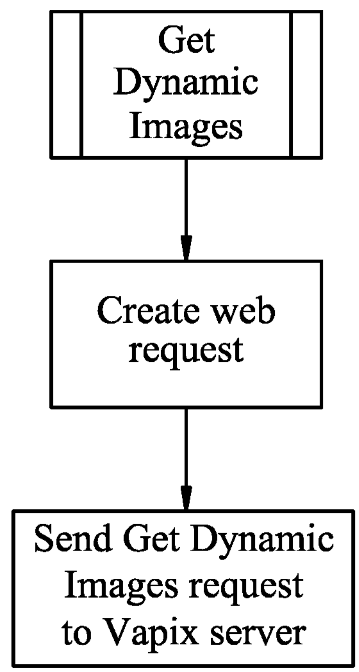
Figure 39M:
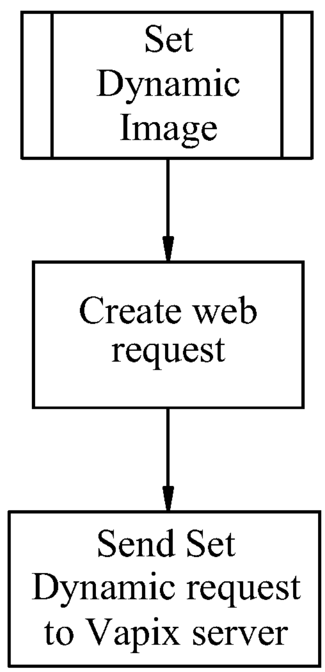
Figure 39N:
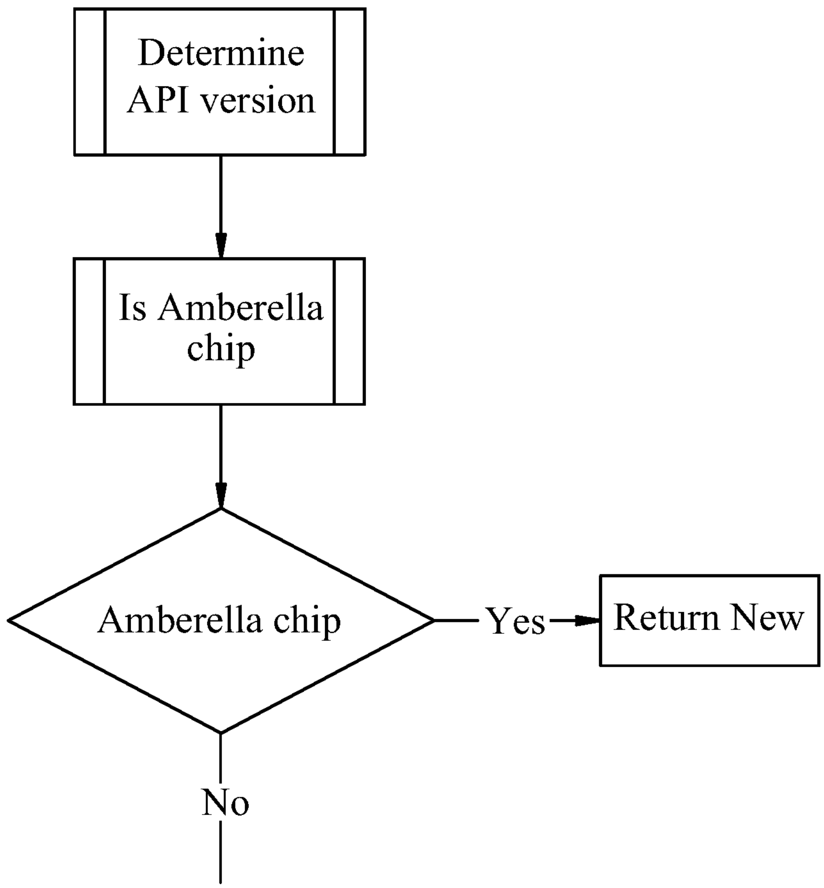
Figure 39O:
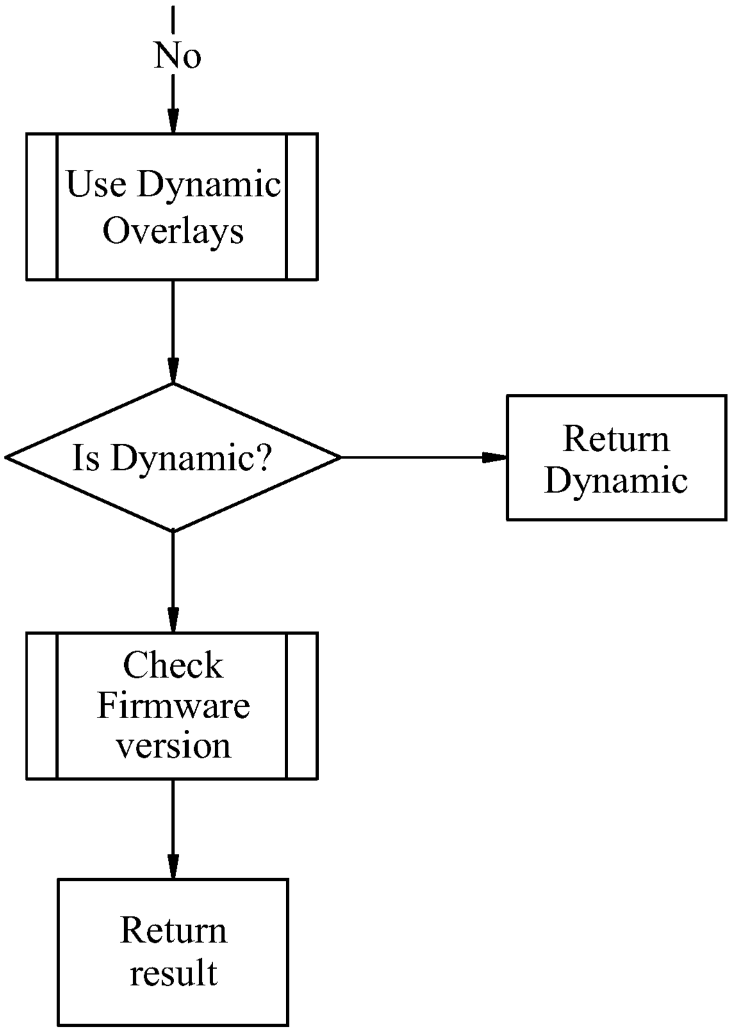
Figure 40:
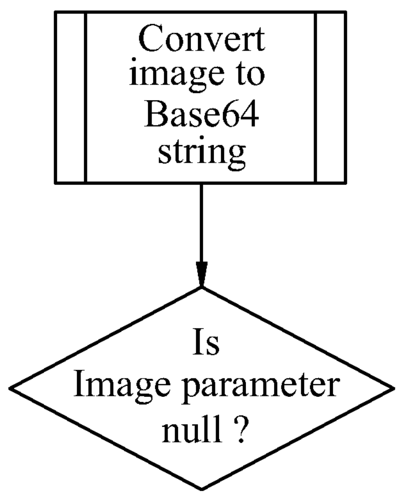
Figure 41:
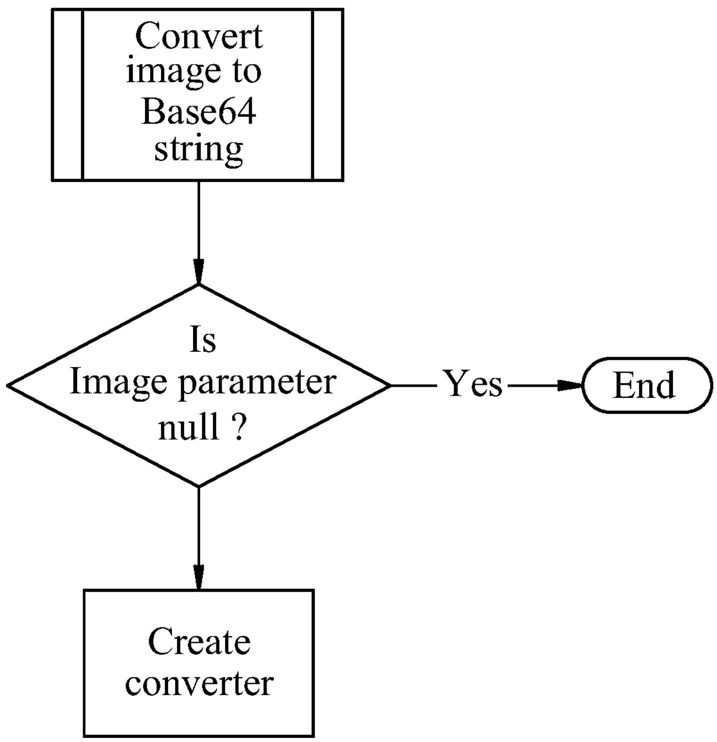
Figure 42:
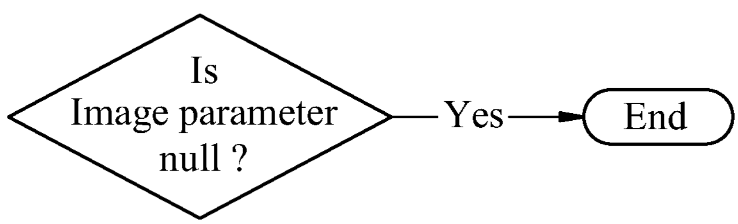
Figure 43:
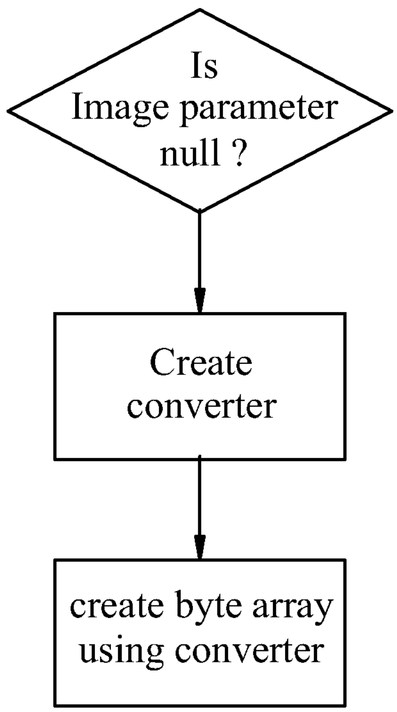
Figure 44:
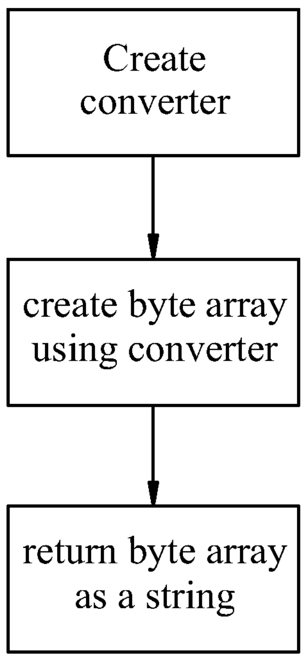
Figure 45:
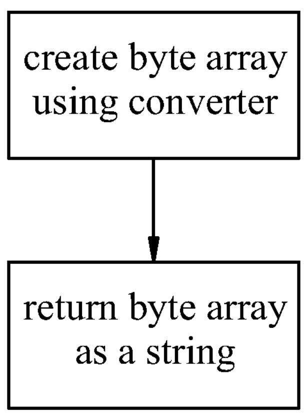
Figure 46:
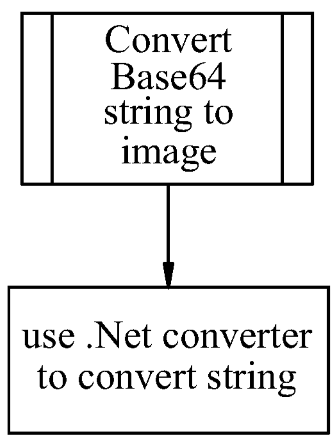
Figure 47:
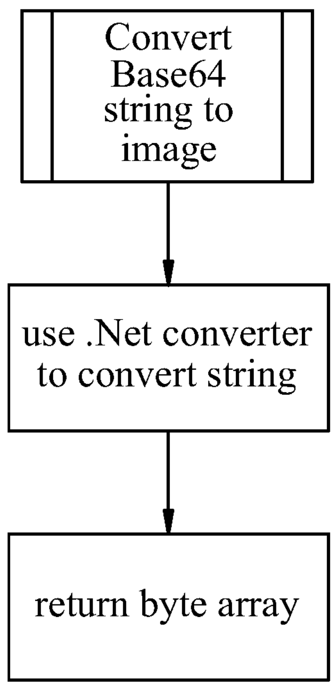
Figure 48:
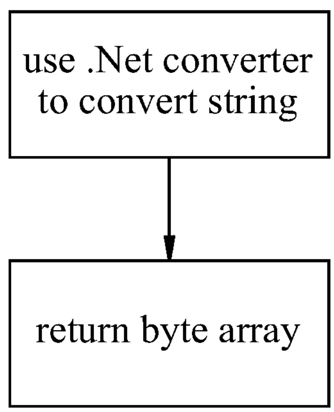
Figure 49:
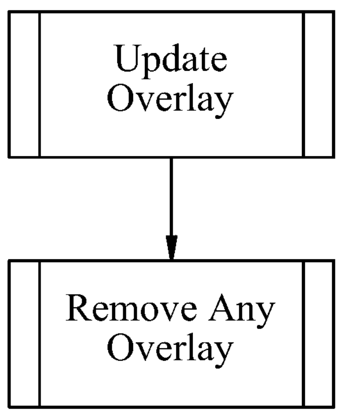
Figure 50:
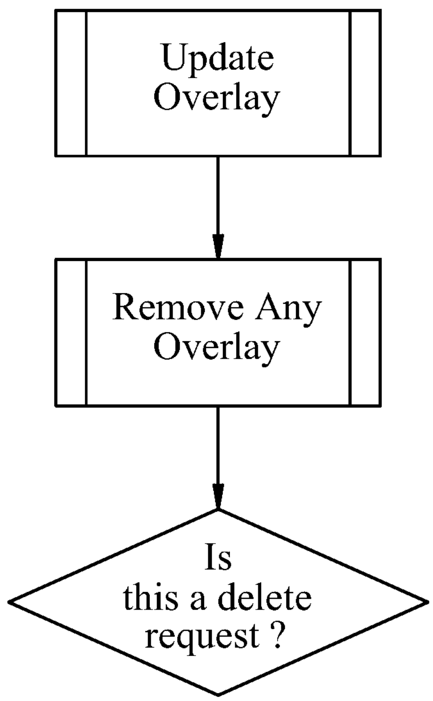
Figure 51:
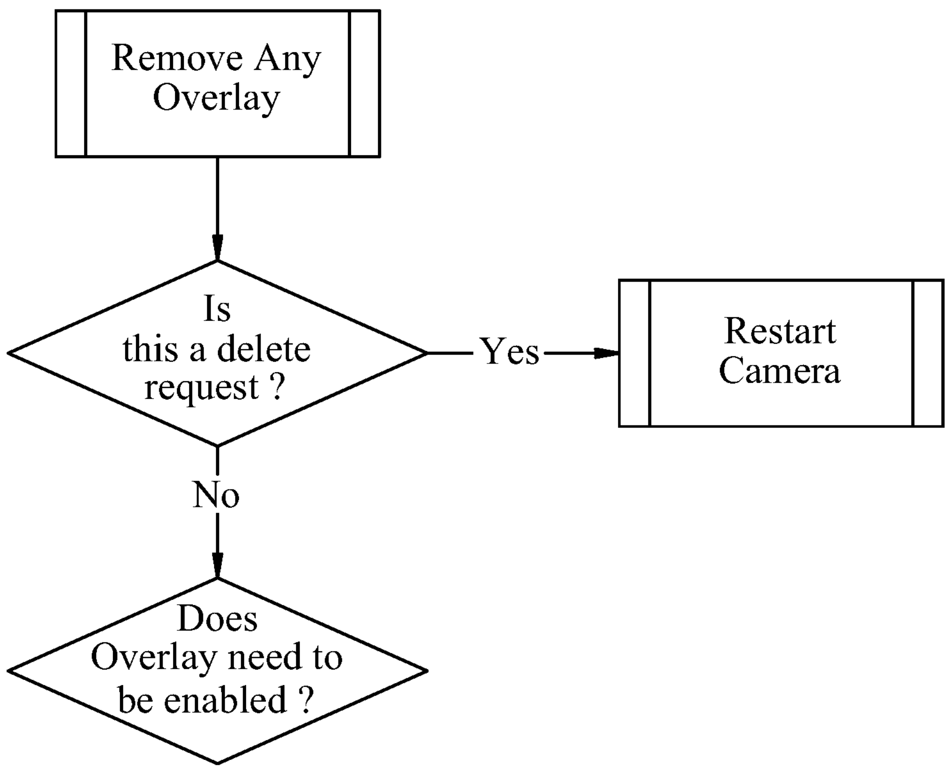
Figure 52:
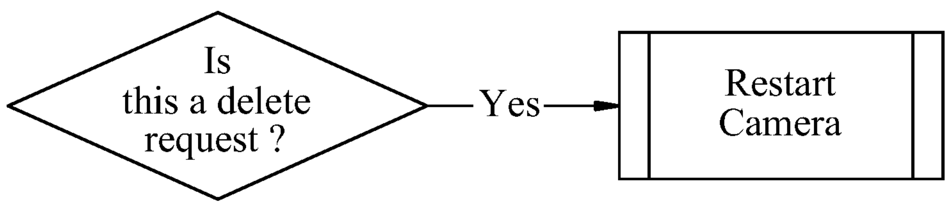
Figure 53:
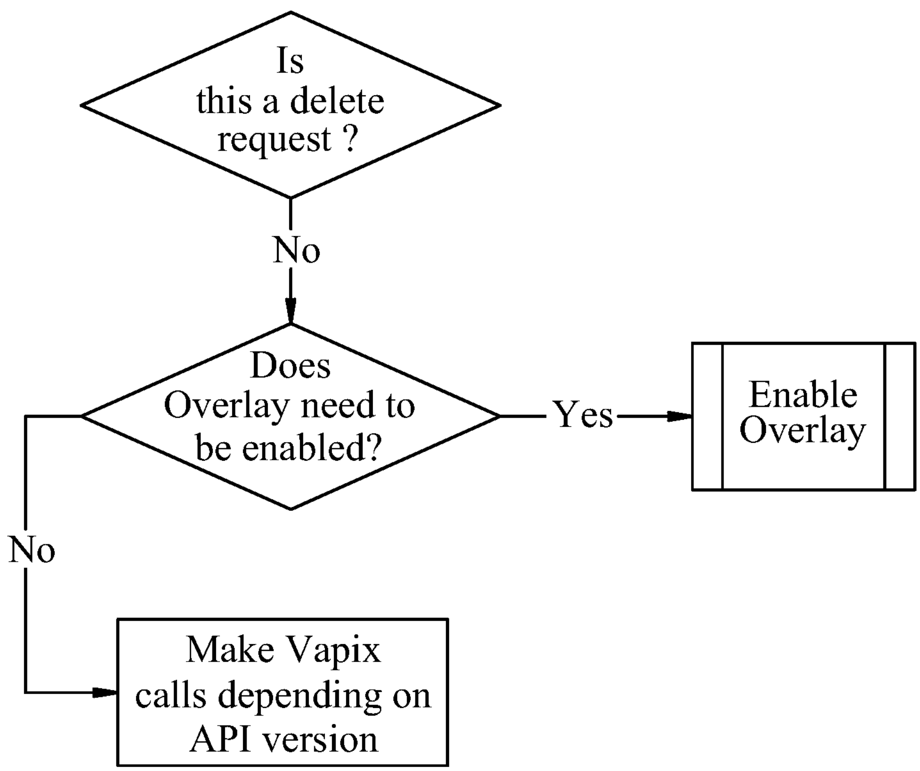
Figure 54:
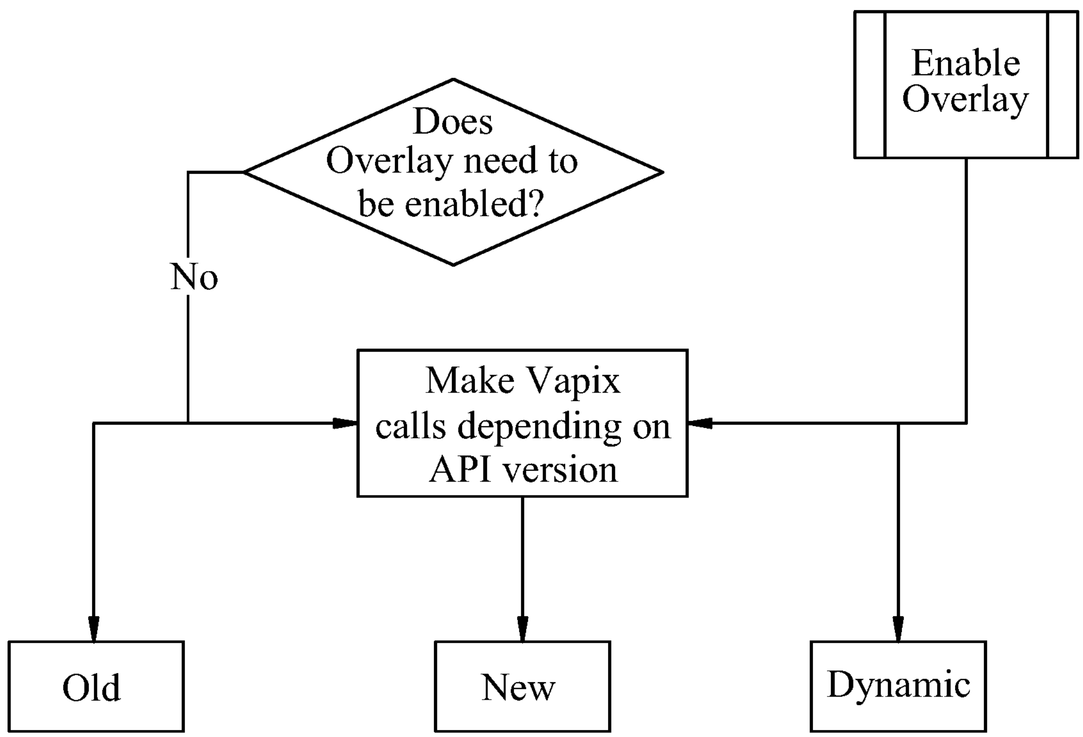
Figure 55:
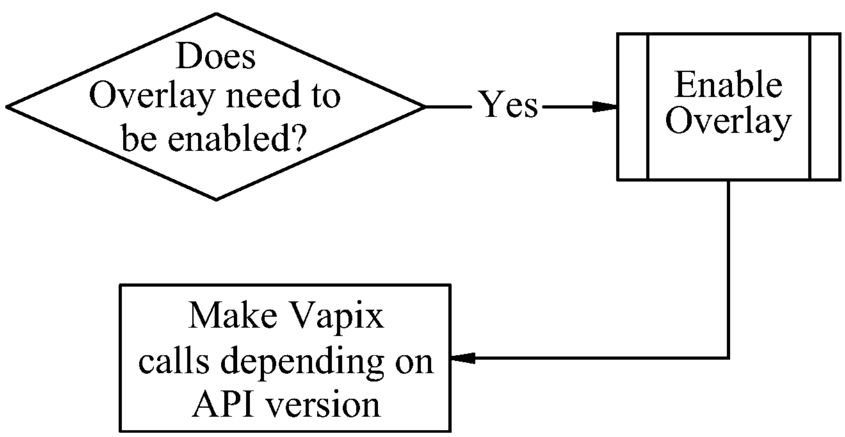
Figure 56:
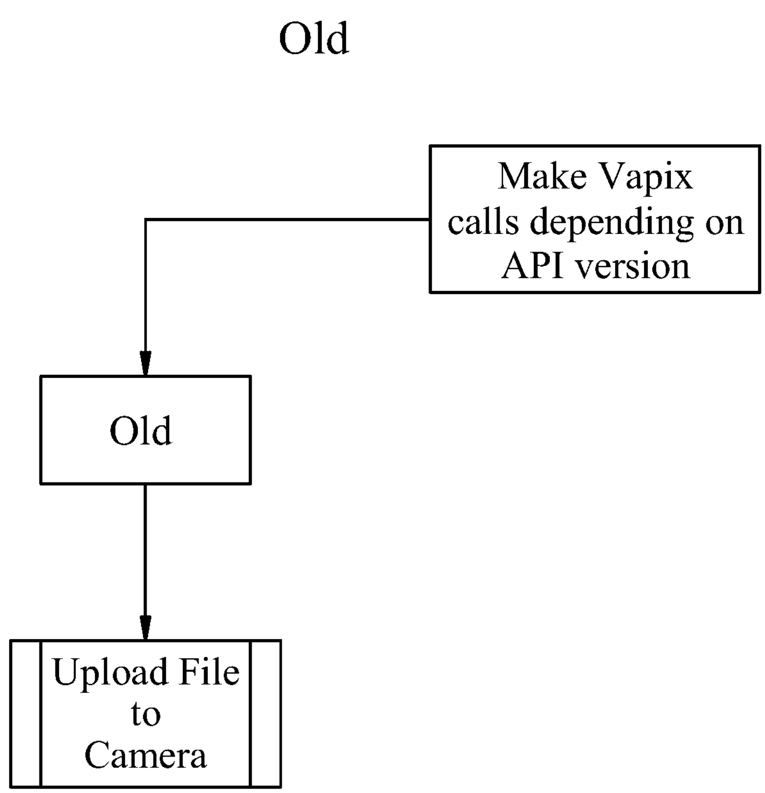
Figure 57:
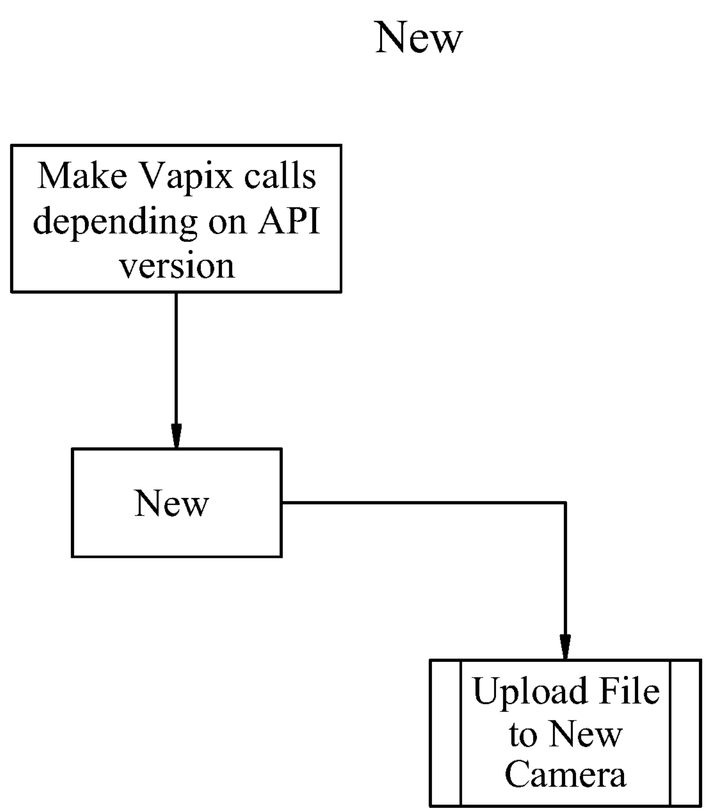
Figure 58:
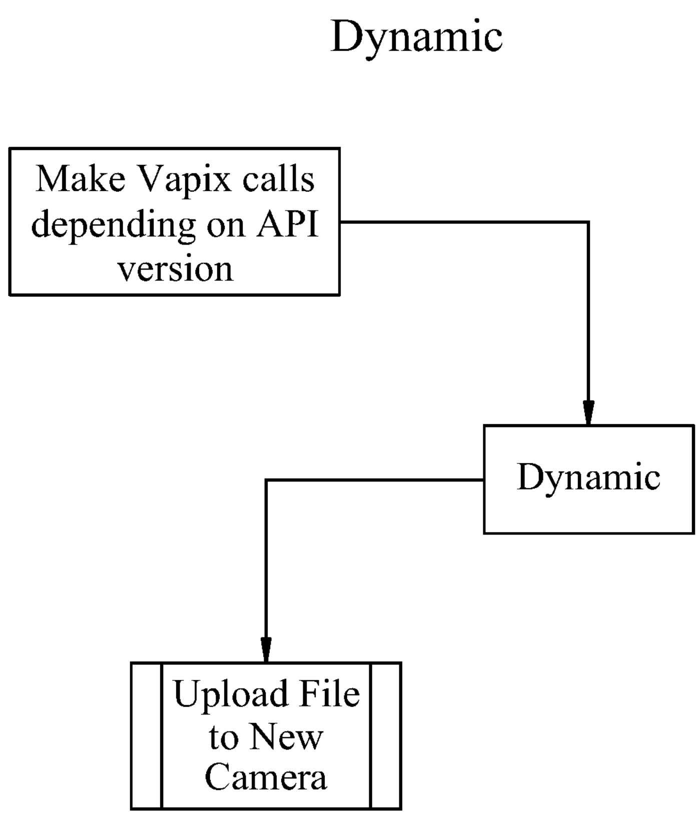
Figure 59:
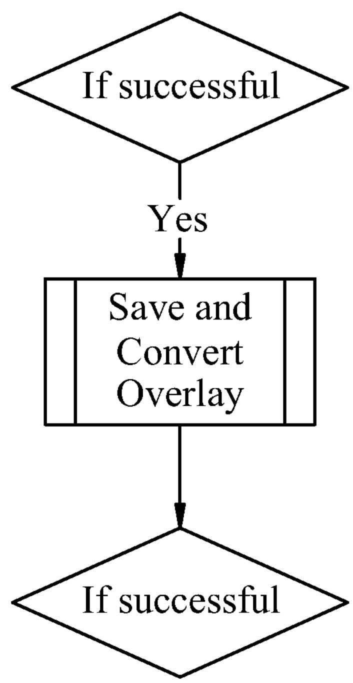
Figure 60:
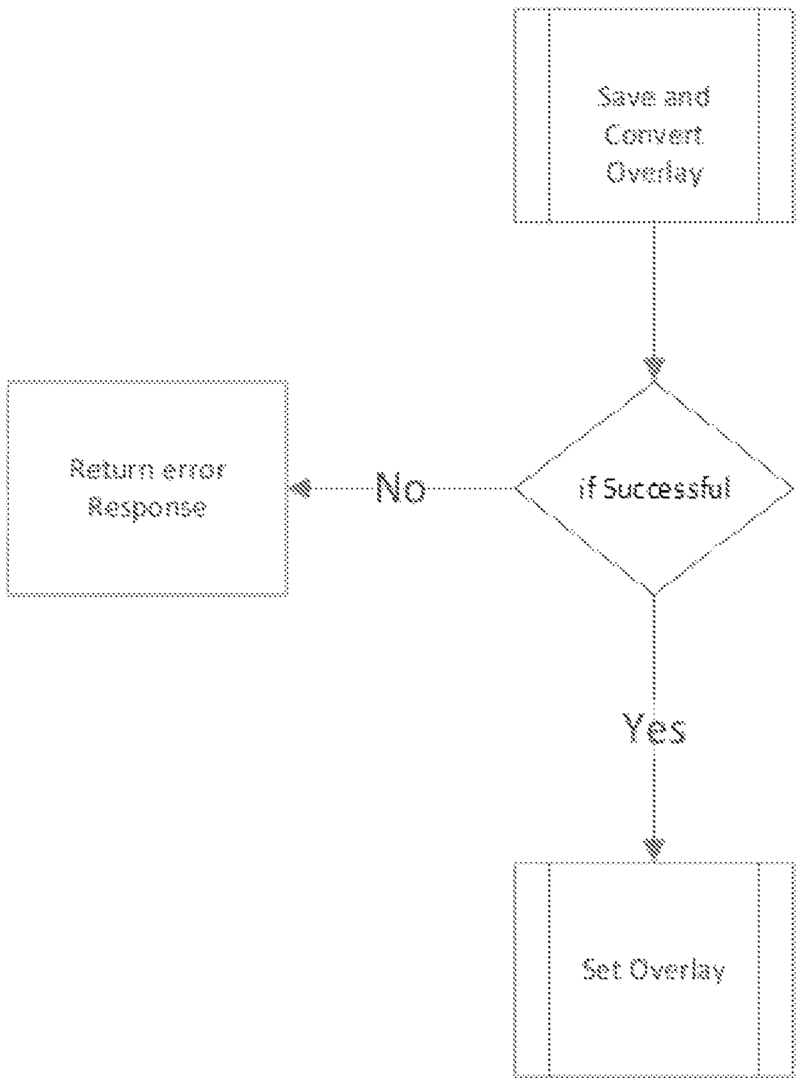
Figure 61:
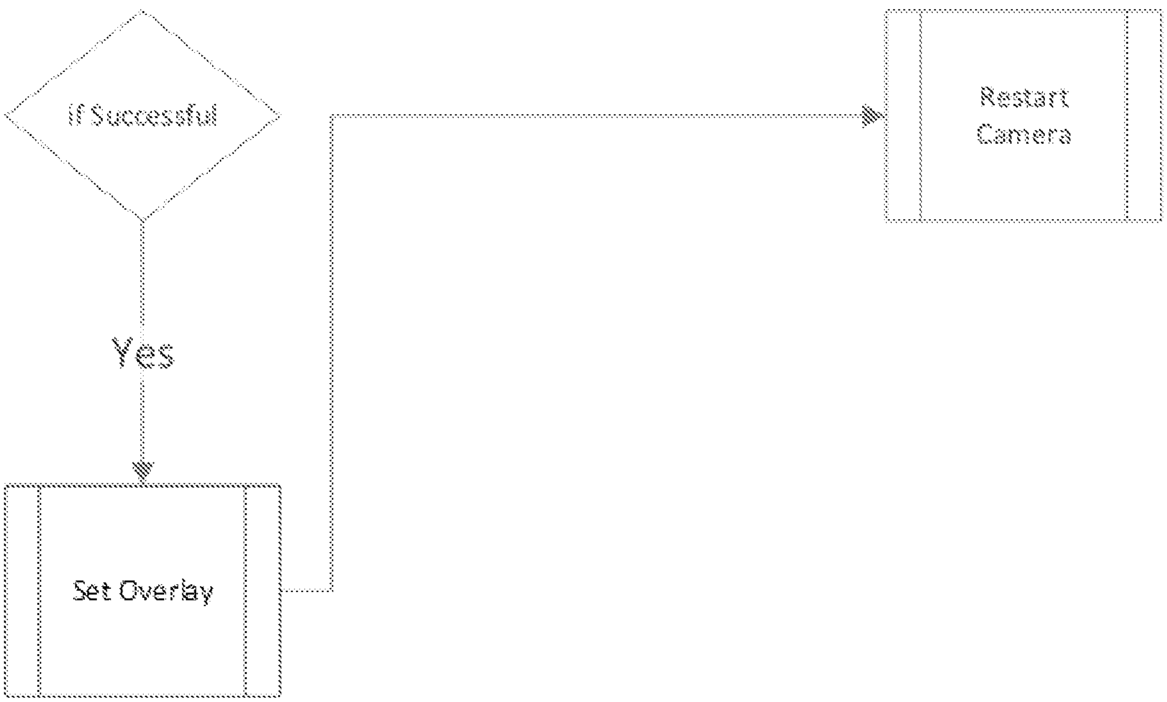
Figure 62:
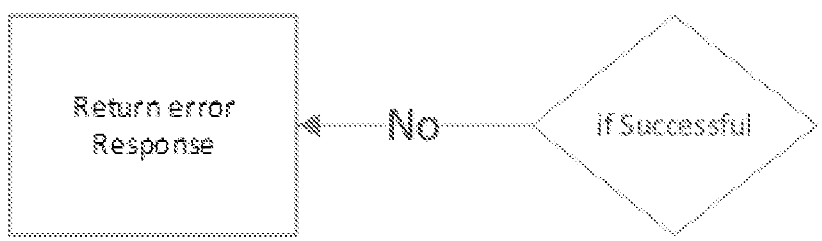
Figure 63:
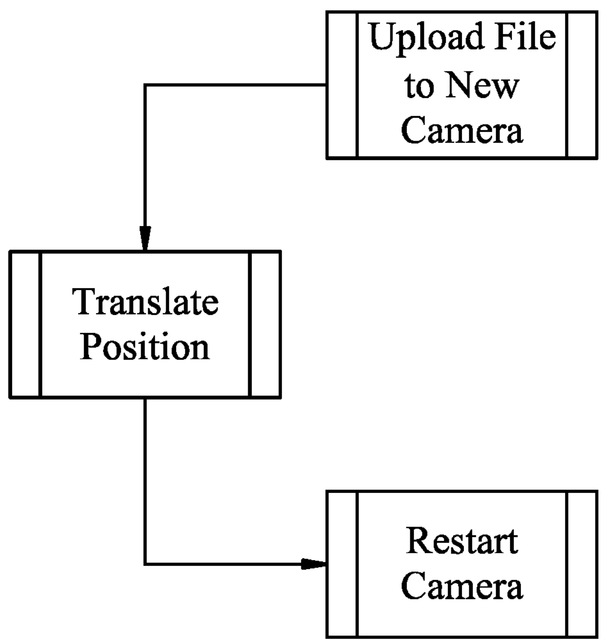
Figure 64:
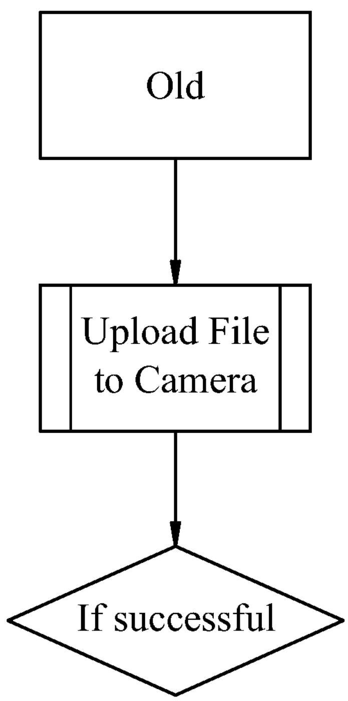
Figure 65:
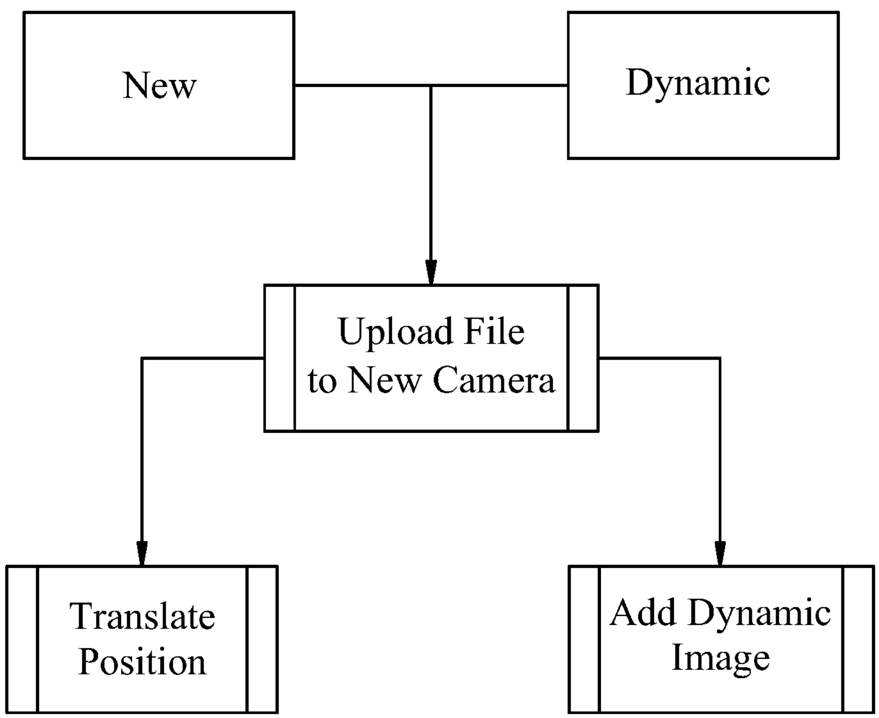
Figure 66:
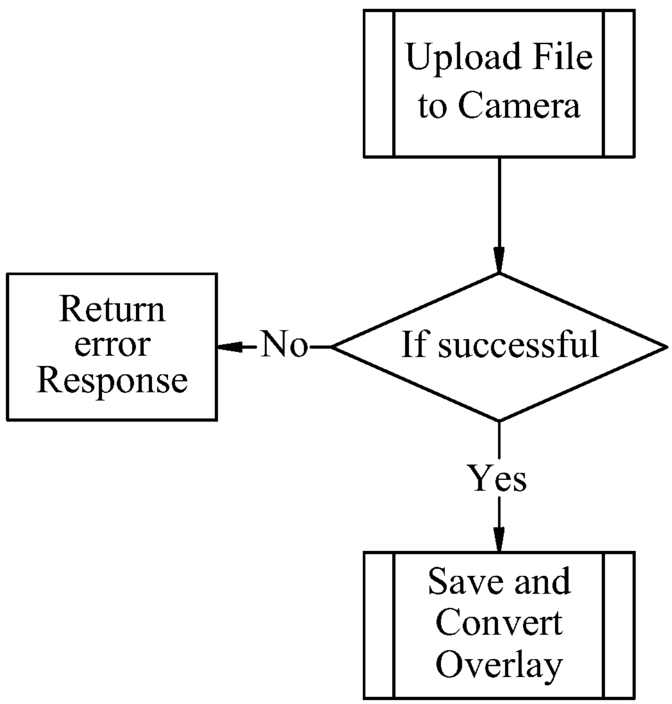
Figure 67:
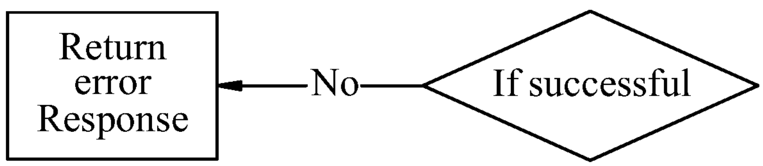
Figure 68:
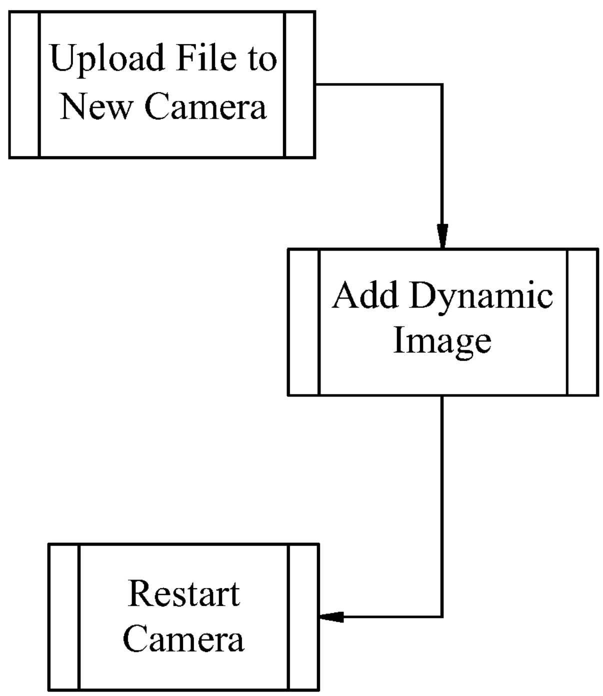
Figure 69:
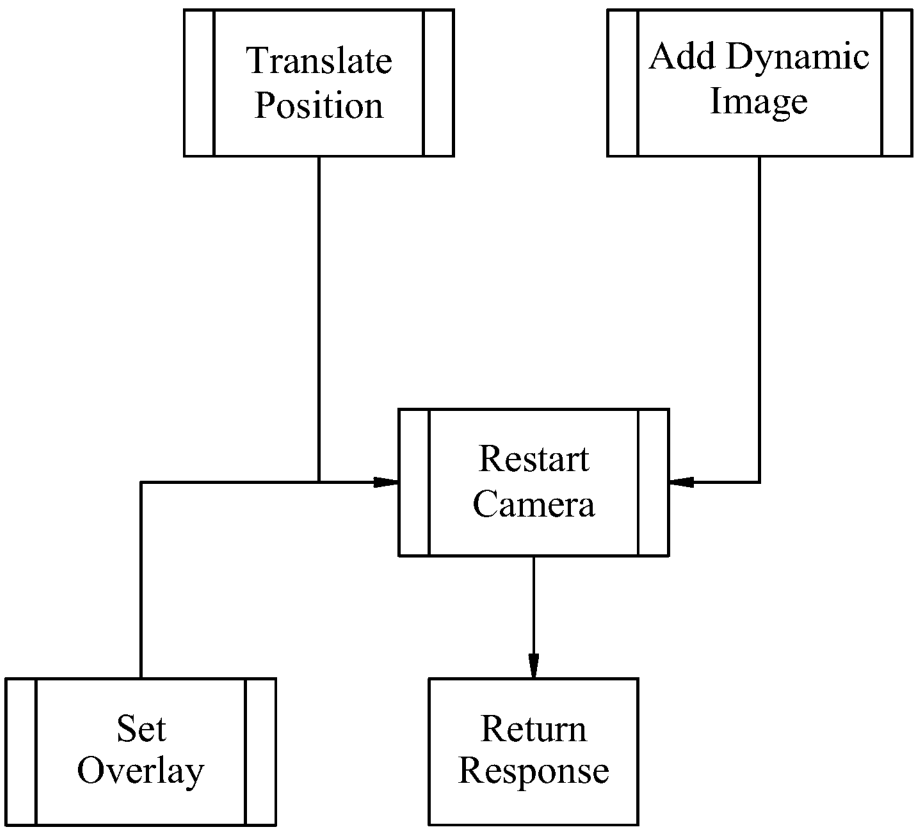
Figure 70:
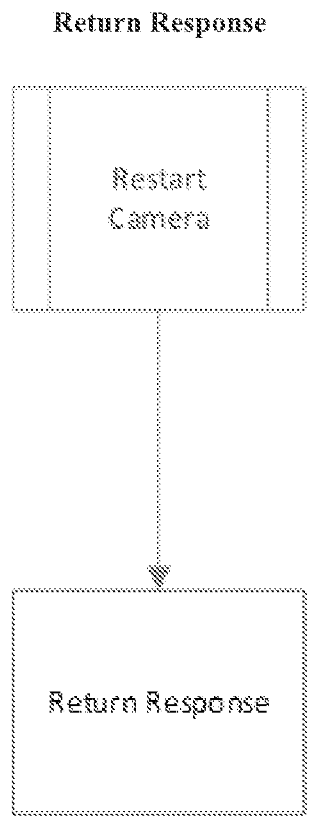
Figure 71:
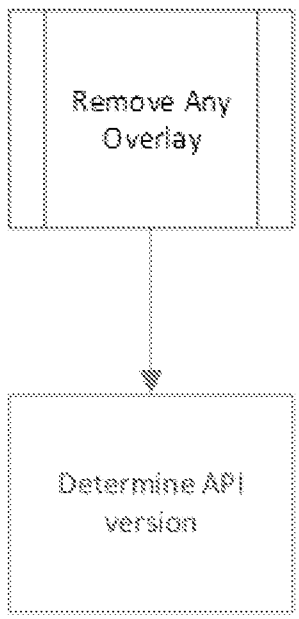
Figure 72:
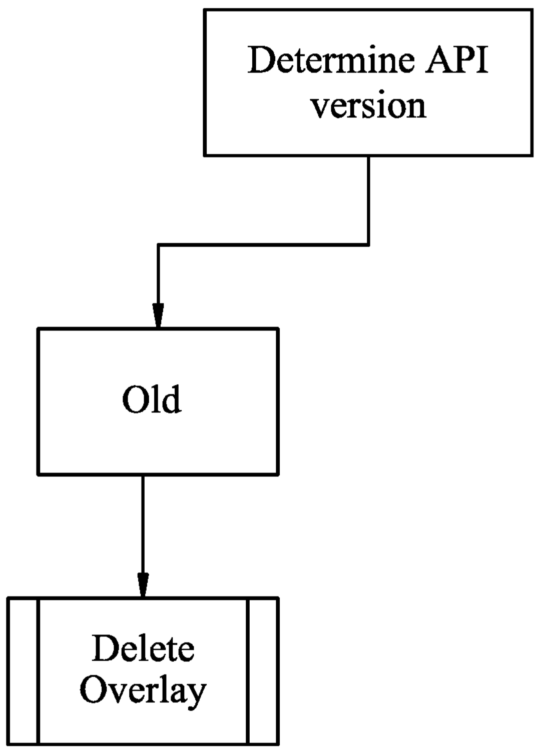
Figure 73:
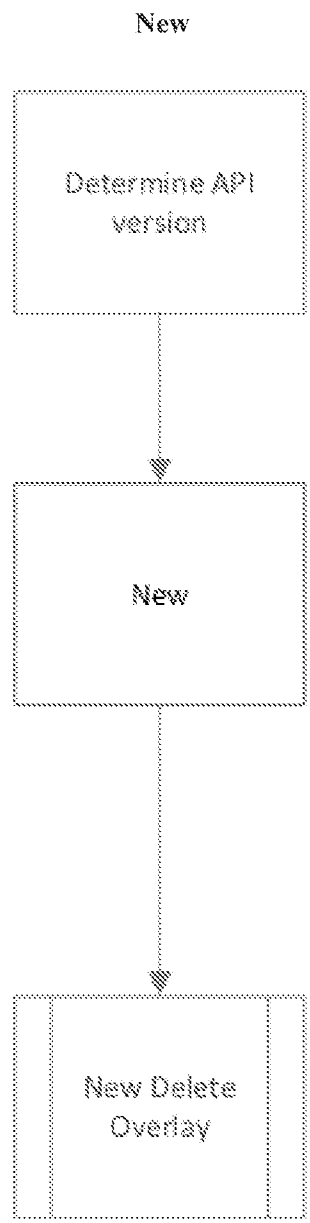
Figure 74:
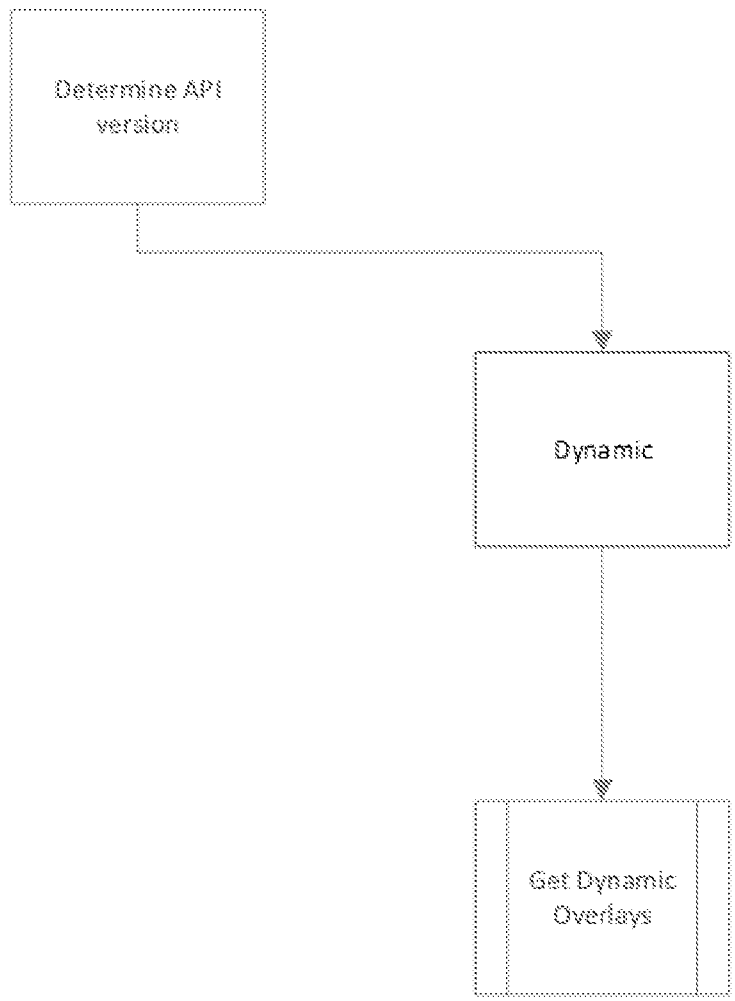
Figure 75:
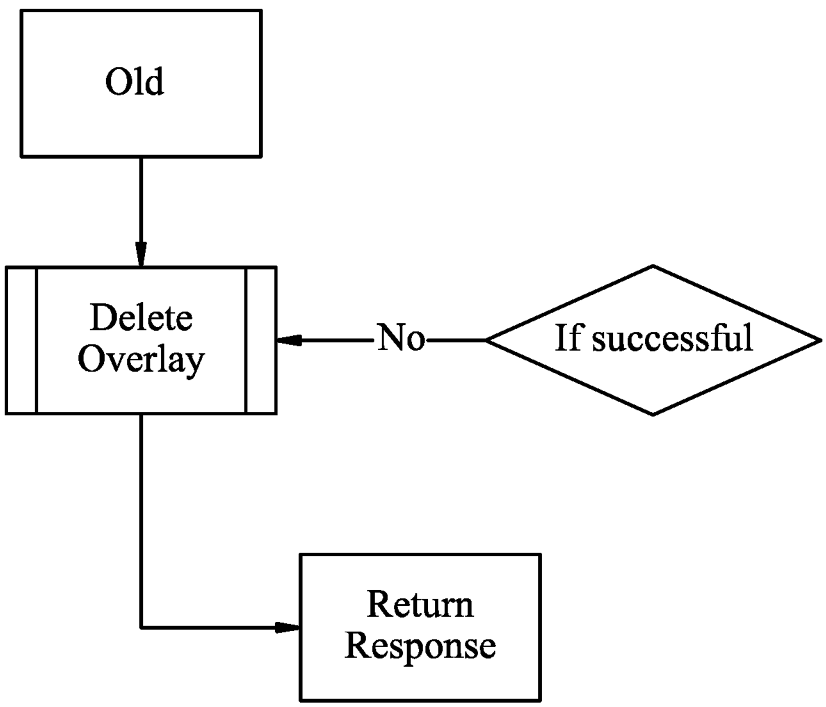
Figure 76:
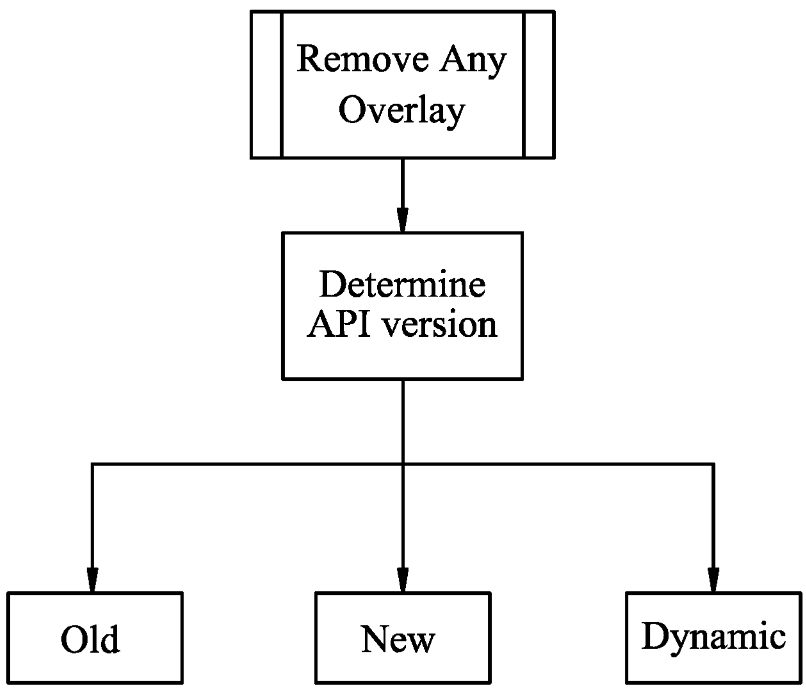
Figure 77:
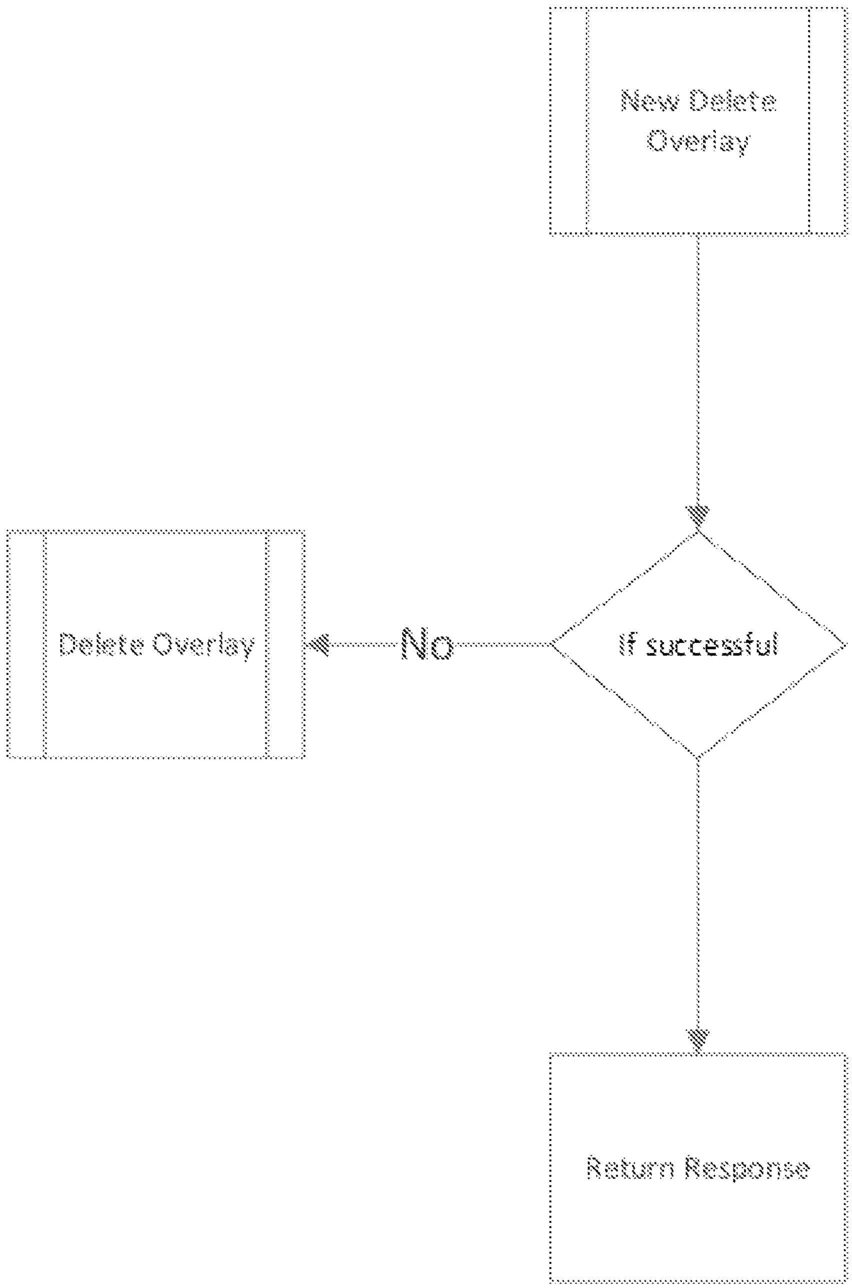
Figure 78:
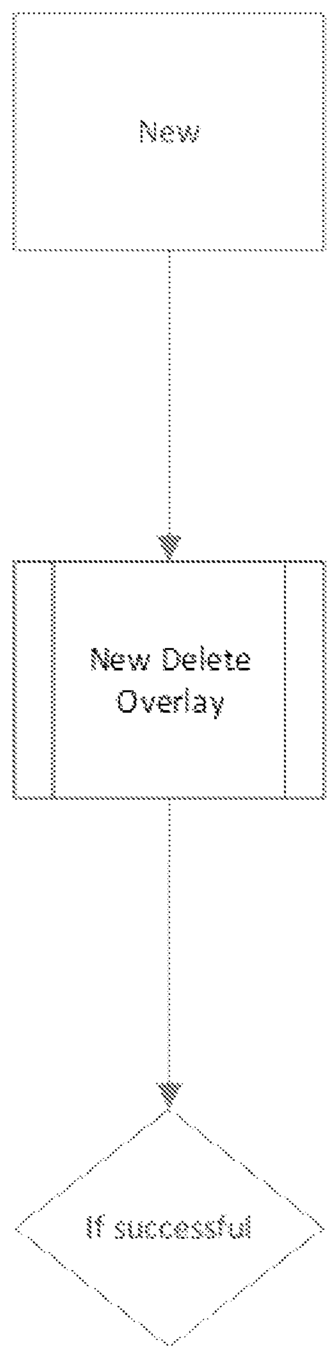
Figure 79:
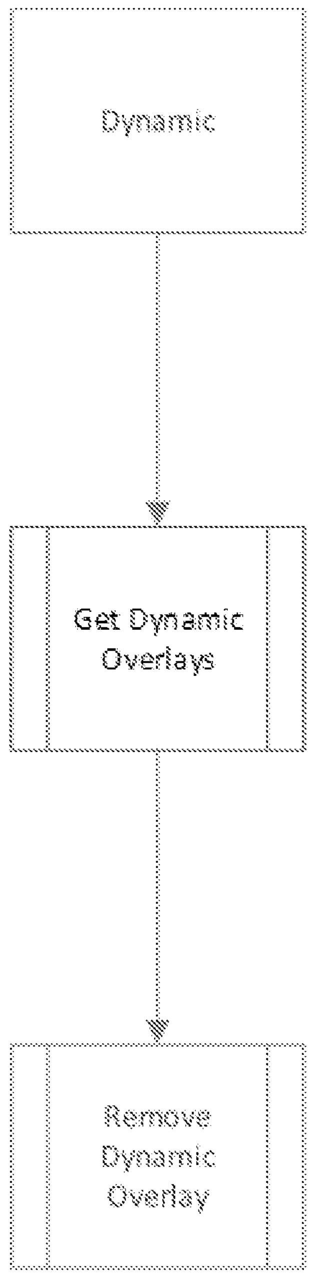
Figure 80:
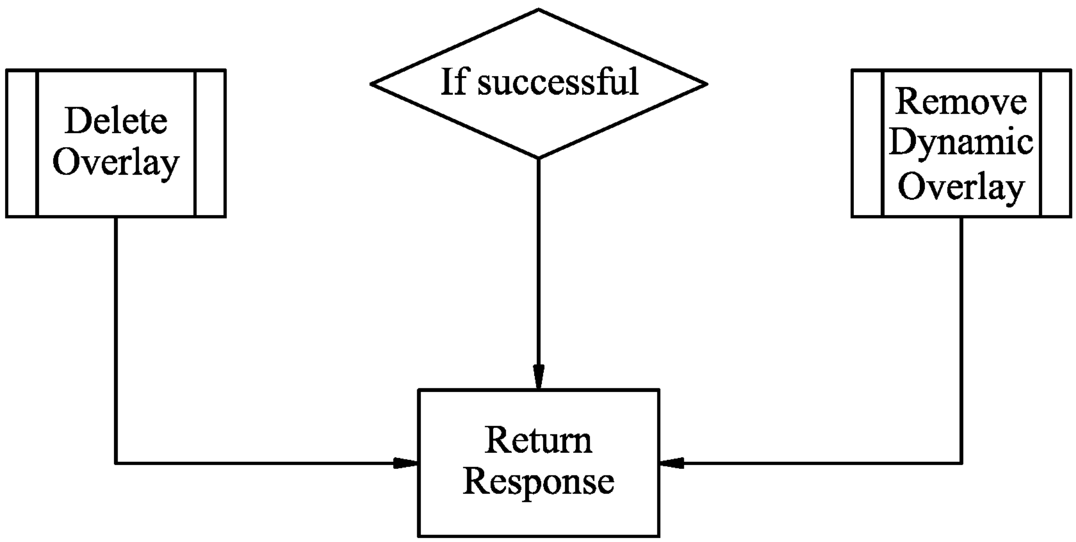
Figure 81:
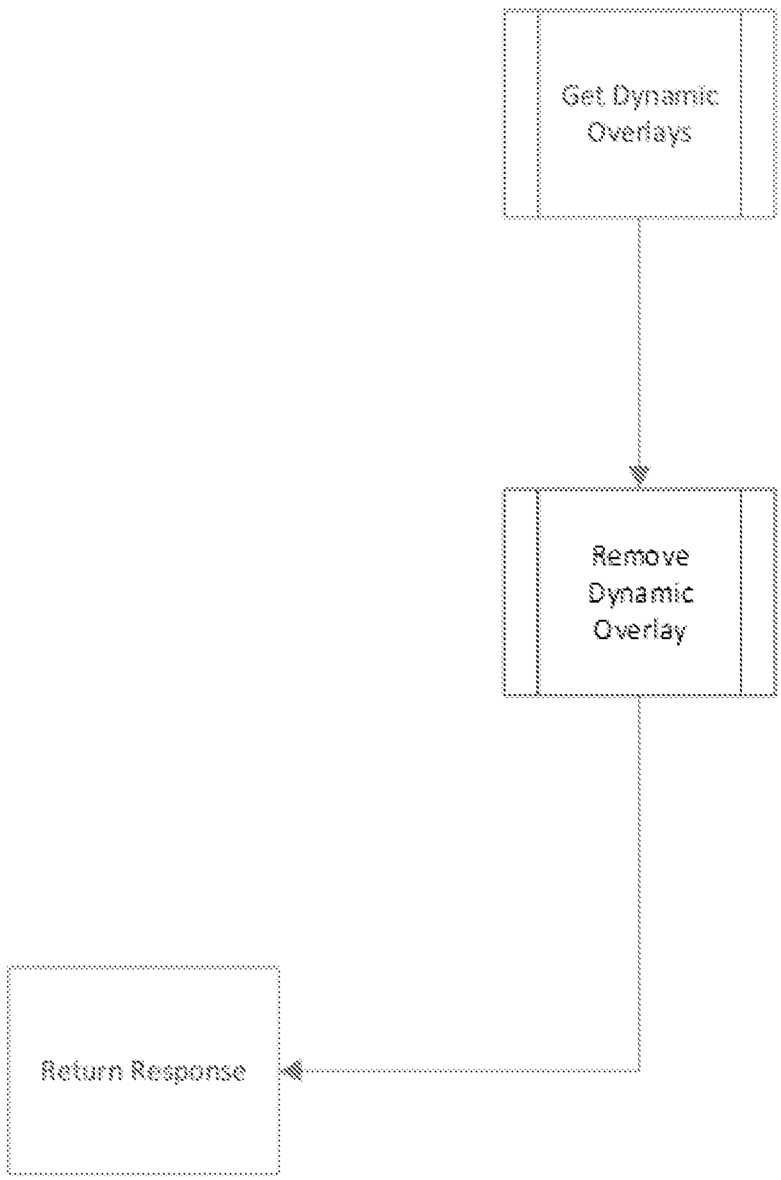
Figure 82:
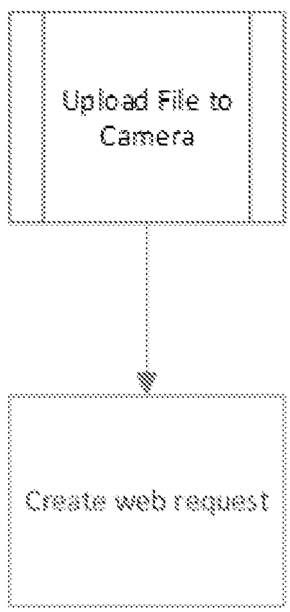
Figure 83:
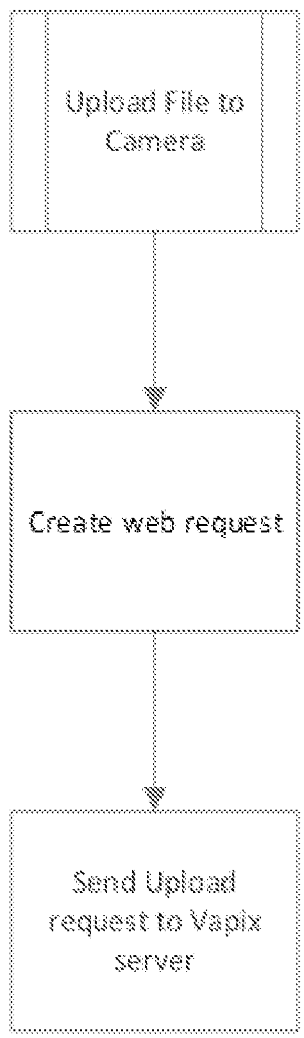
Figure 84:
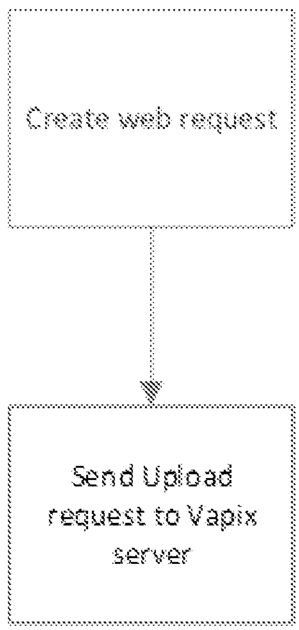
Figure 85:
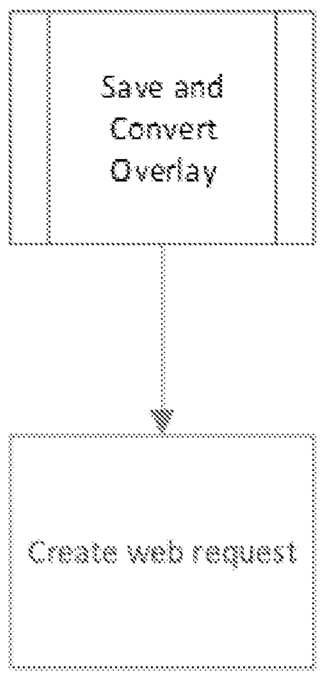
Figure 86:
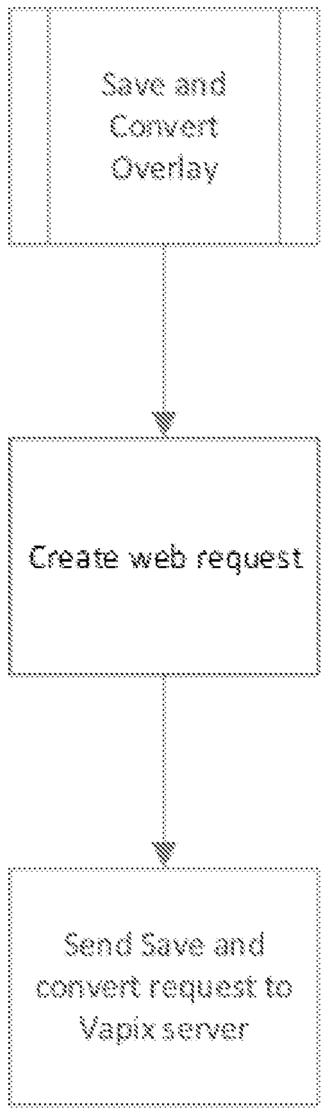
Figure 87:
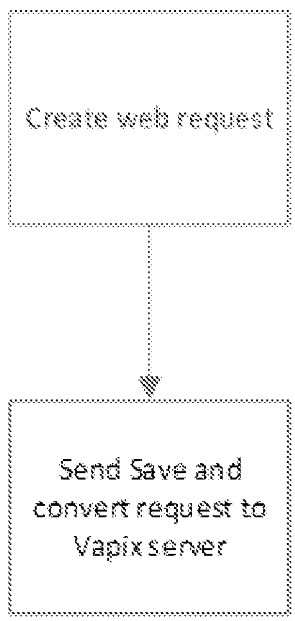
Figure 88:
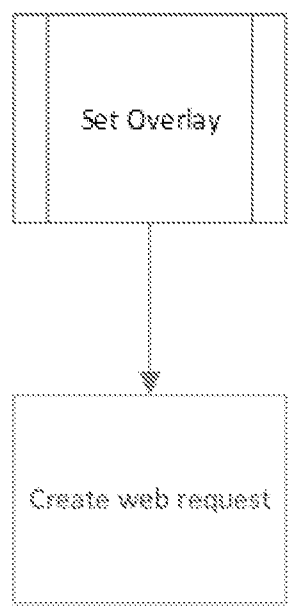
Figure 89:
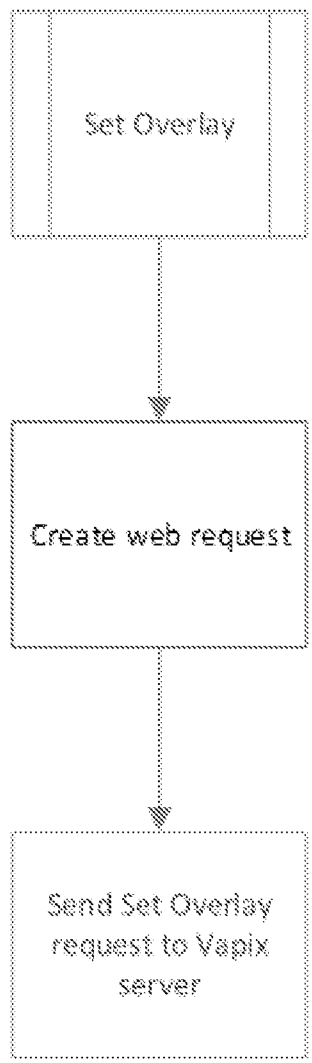
Figure 90:
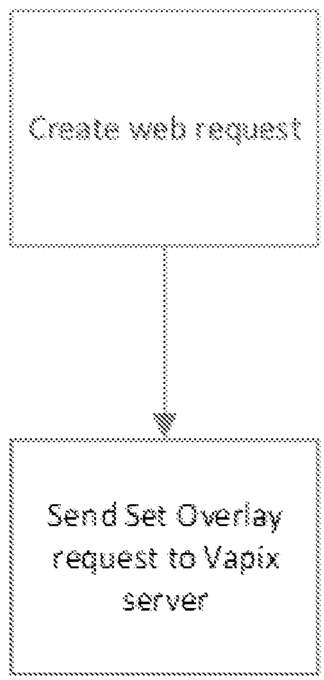
Figure 91:
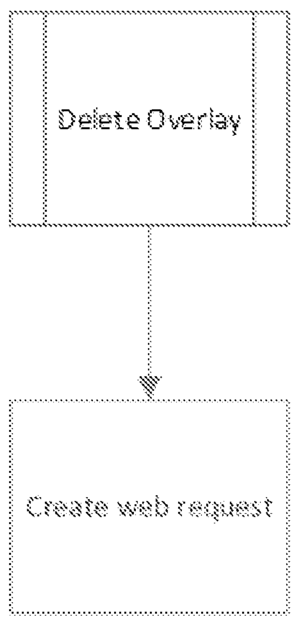
Figure 92:
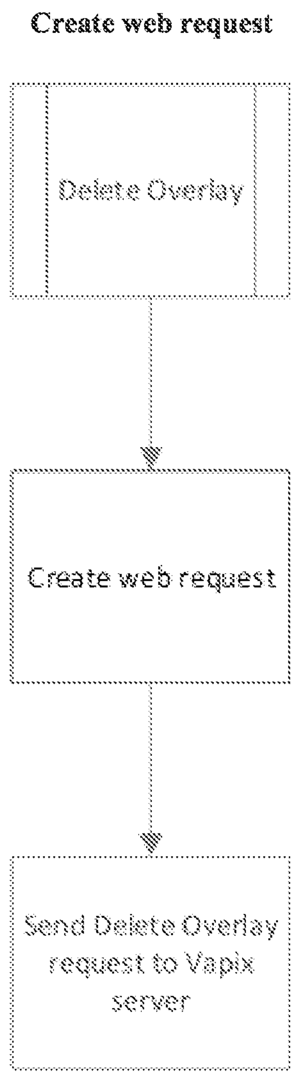
Figure 93:
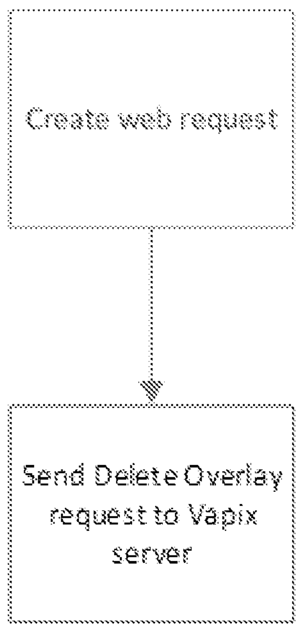
Figure 94:
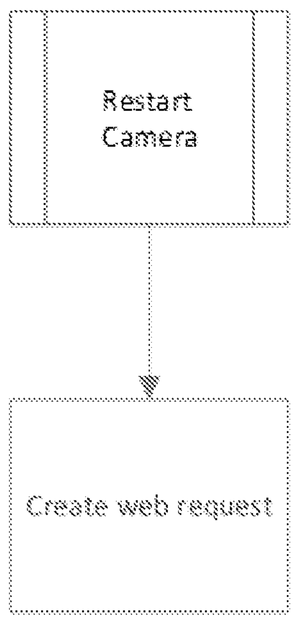
Figure 95:
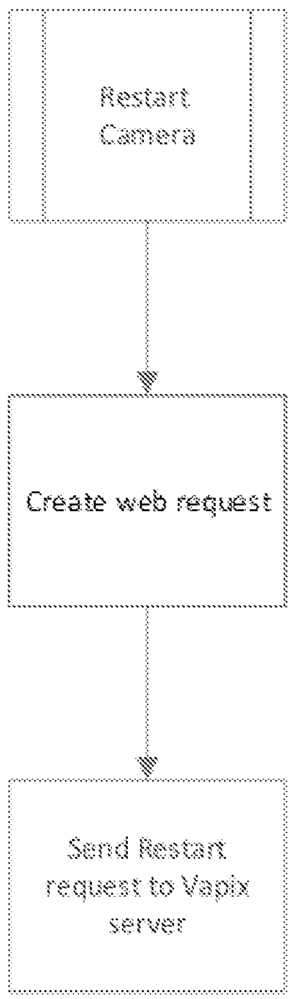
Figure 96:
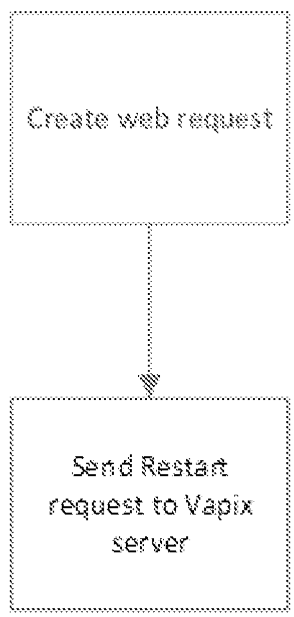
Figure 97:
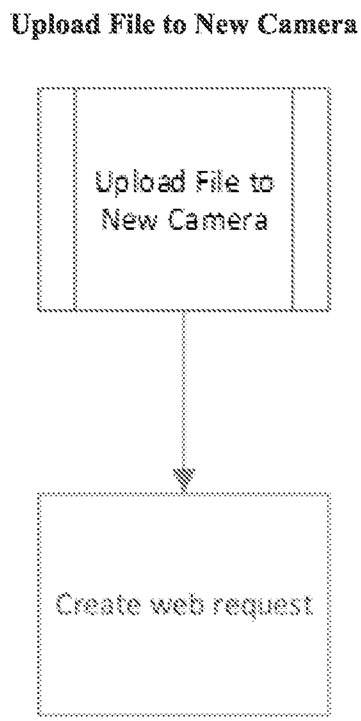
Figure 98:
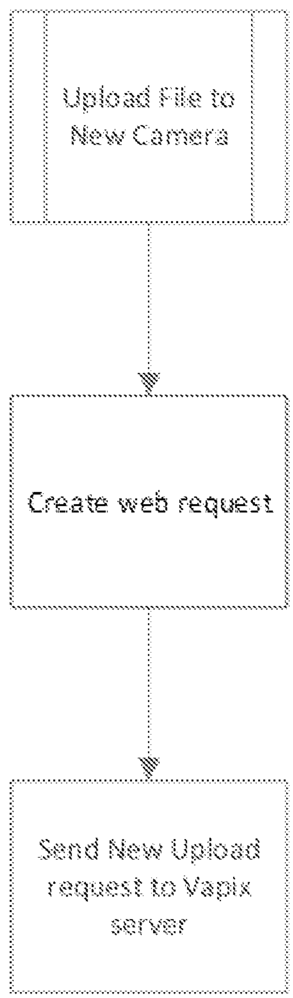
Figure 99:
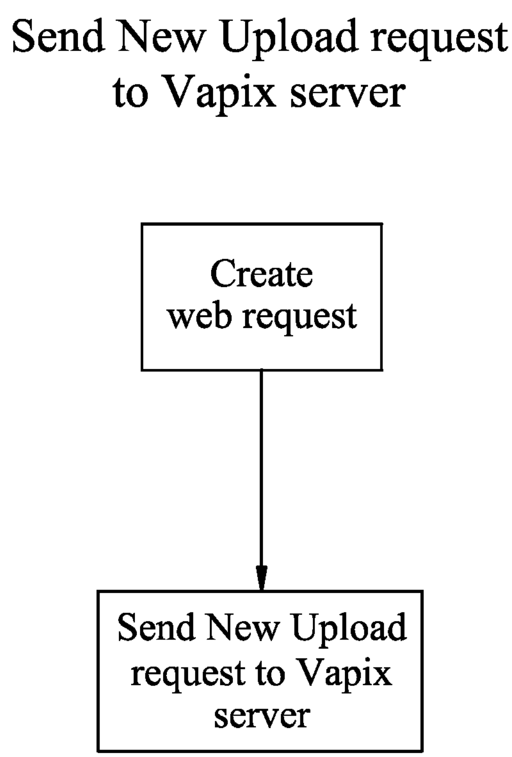
Figure 100:
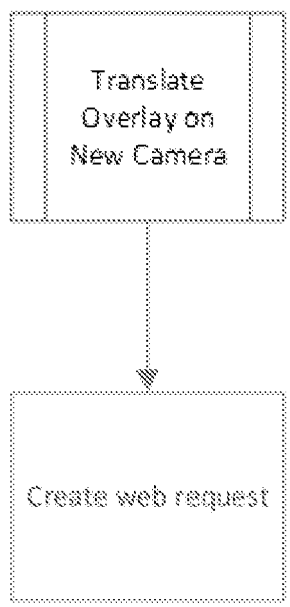
Figure 101:
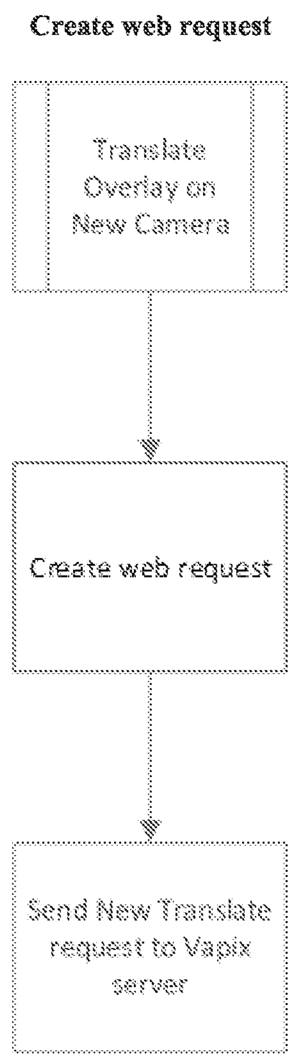
Figure 102:
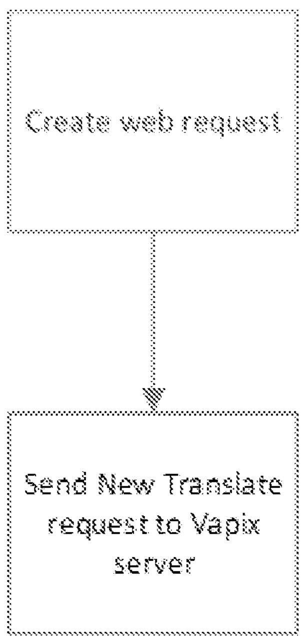
Figure 103:
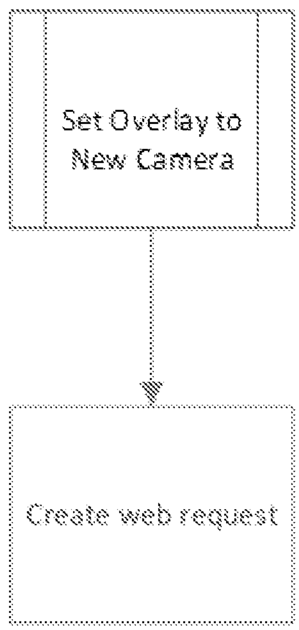
Figure 104:
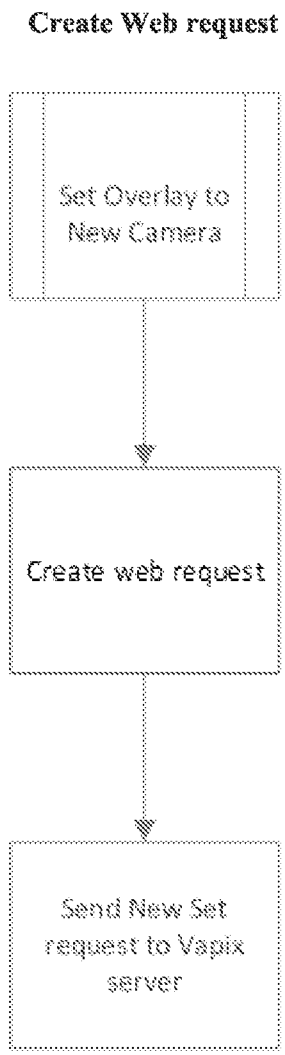
Figure 105:
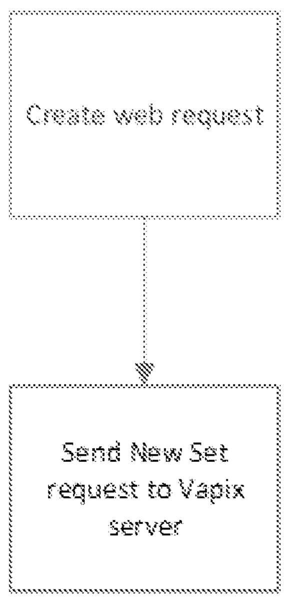
Figure 106:
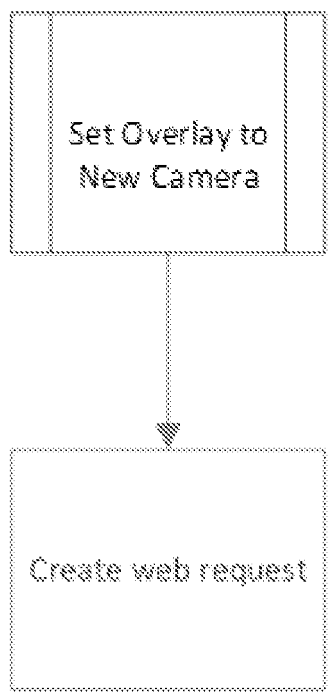
Figure 107:
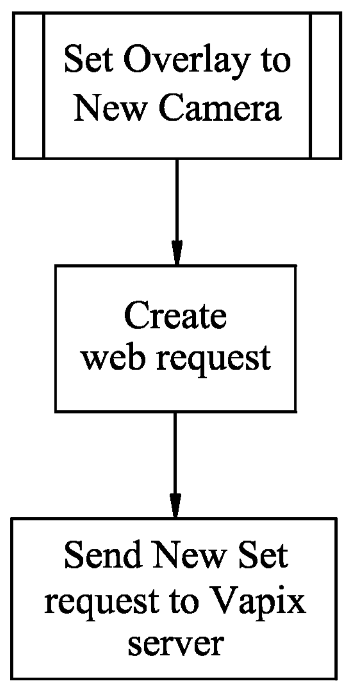
Figure 108:
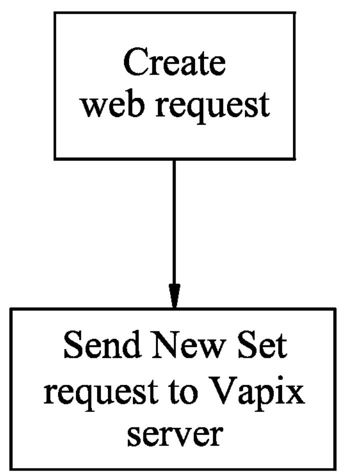
Figure 109:
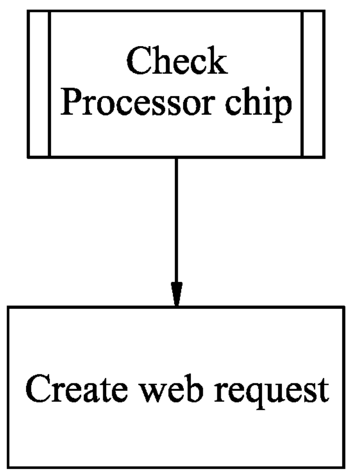
Figure 110:
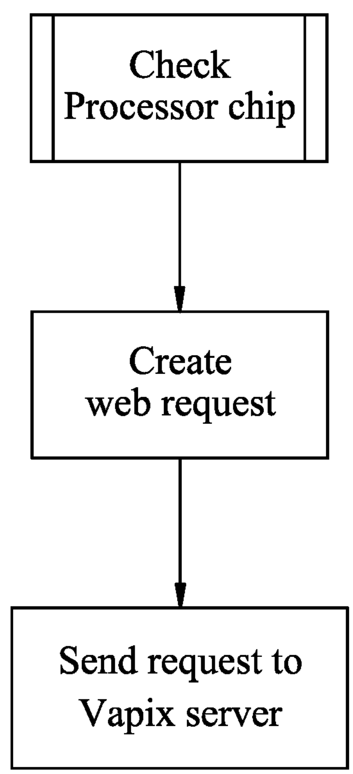
Figure 111:
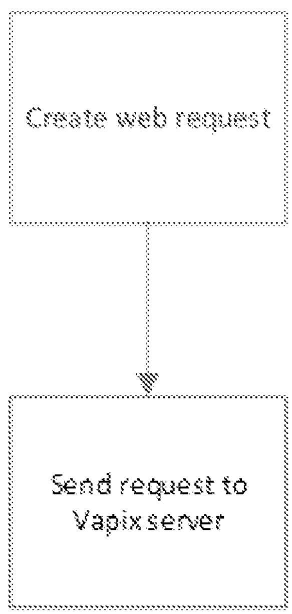
Figure 112:
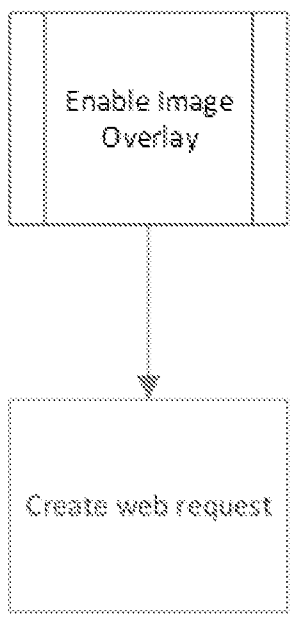
Figure 113:
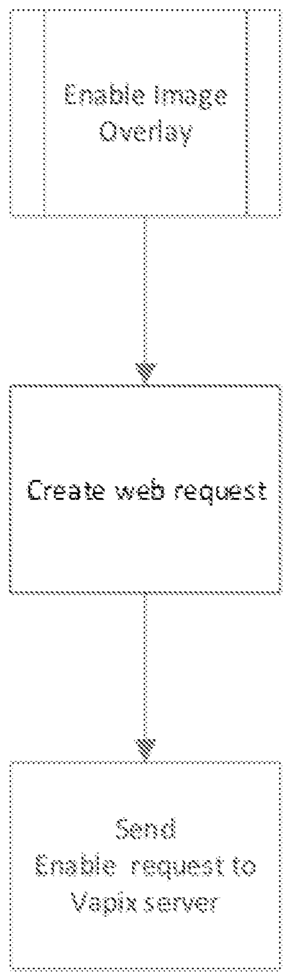
Figure 114:
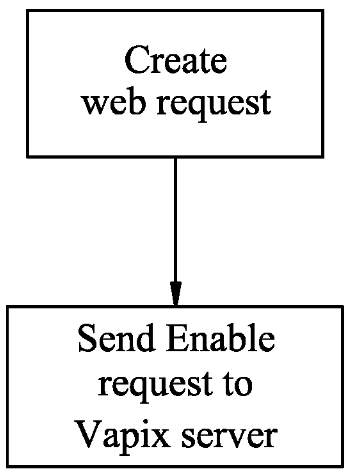
Figure 115:
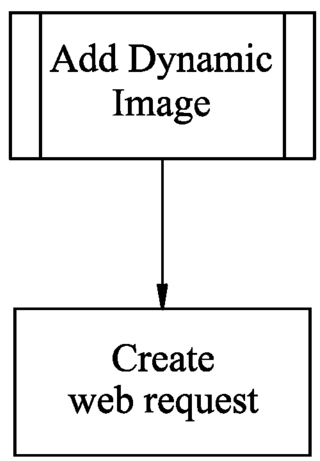
Figure 116:
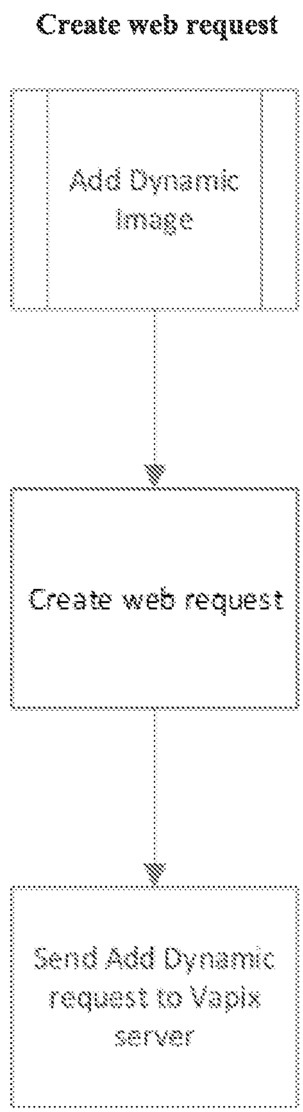
Figure 117:
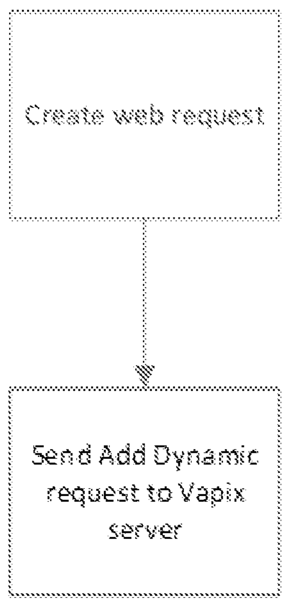
Figure 118:
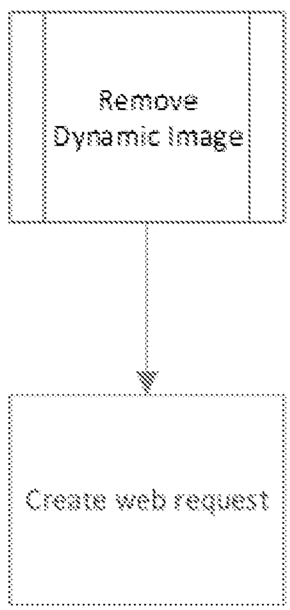
Figure 119:
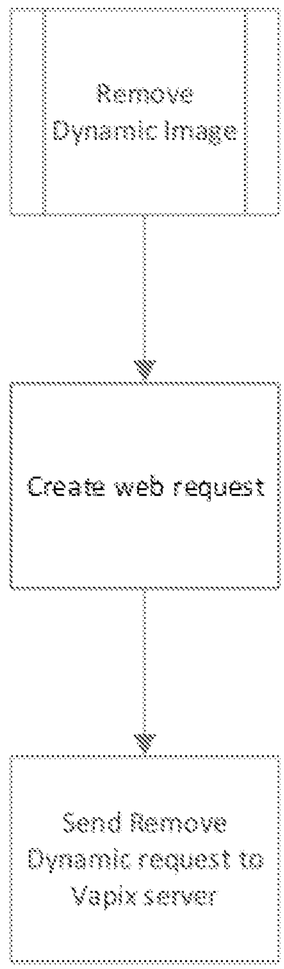
Figure 120:
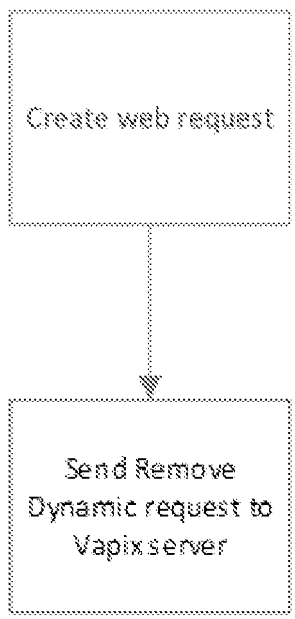
Figure 121:
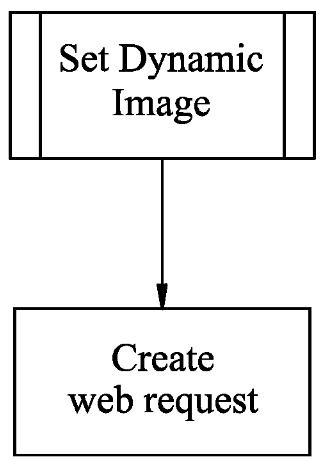
Figure 122:
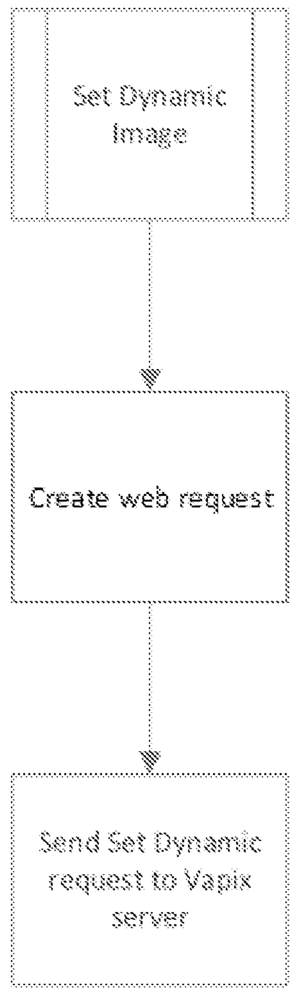
Figure 123:
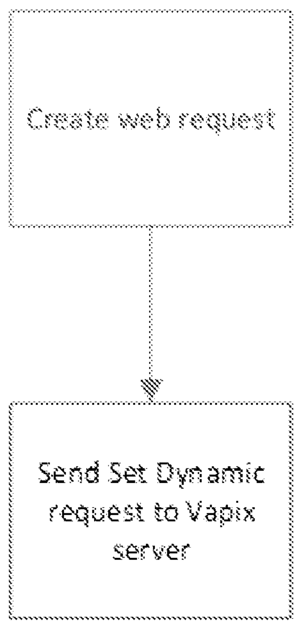
Figure 124:
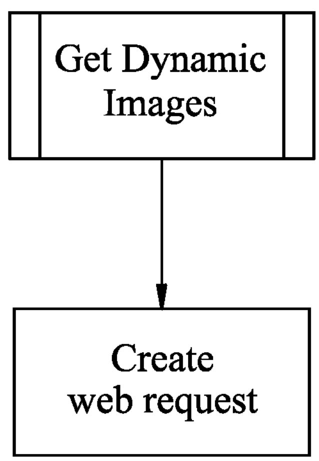
Figure 125:
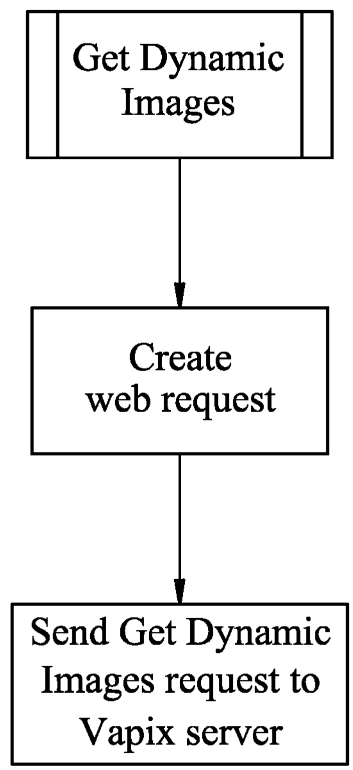
Figure 126:
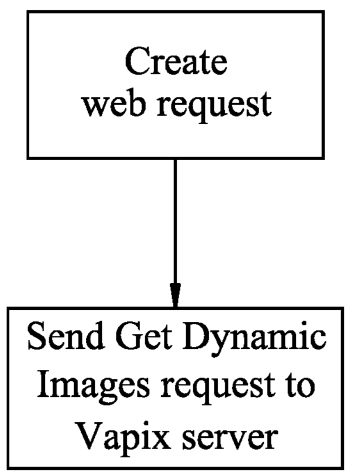
Figure 127:
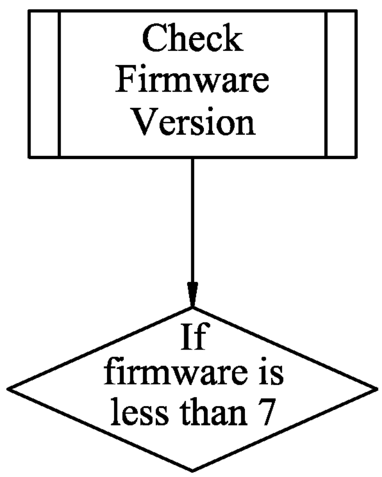
Figure 128:
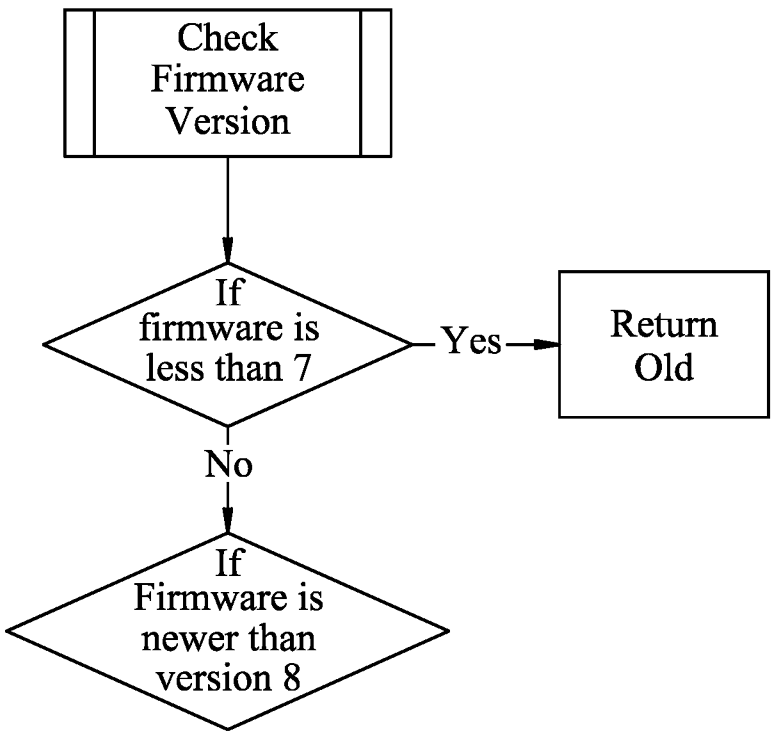
Figure 129:
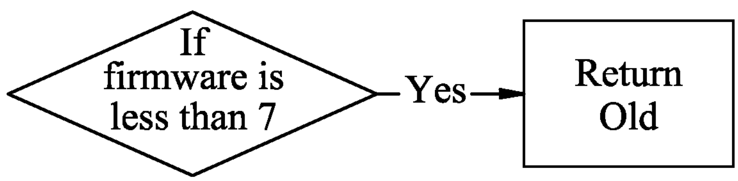
Figure 130:
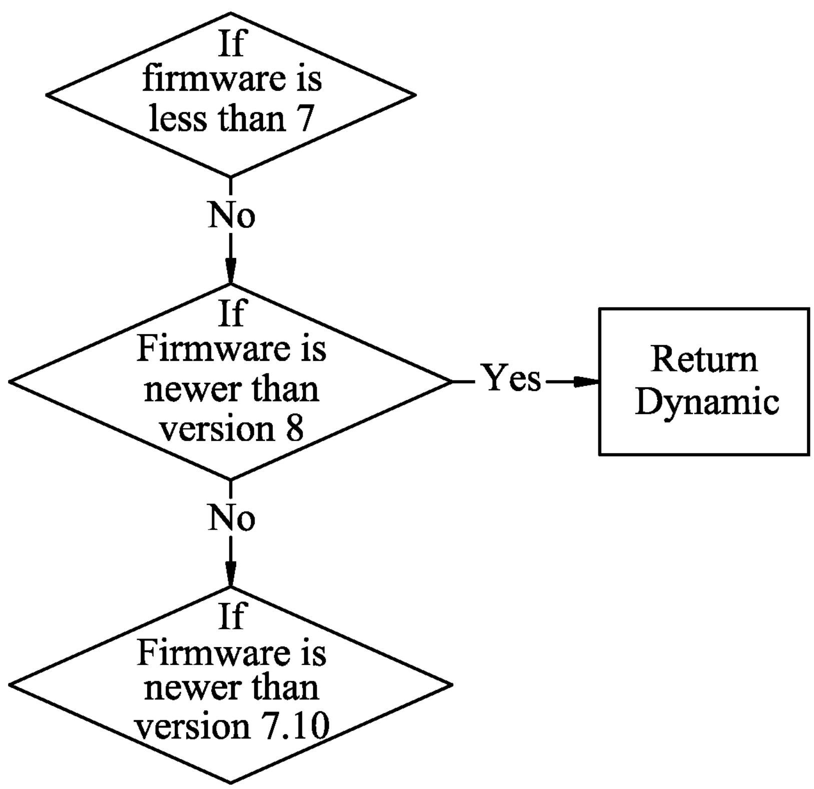
Figure 131:
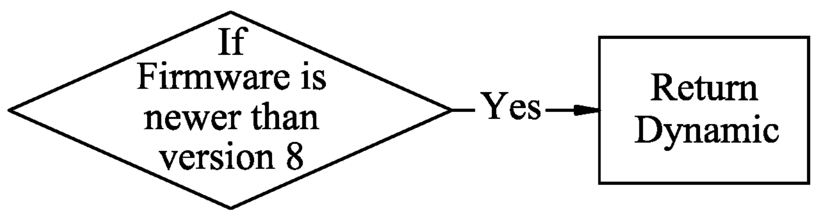
Figure 132:
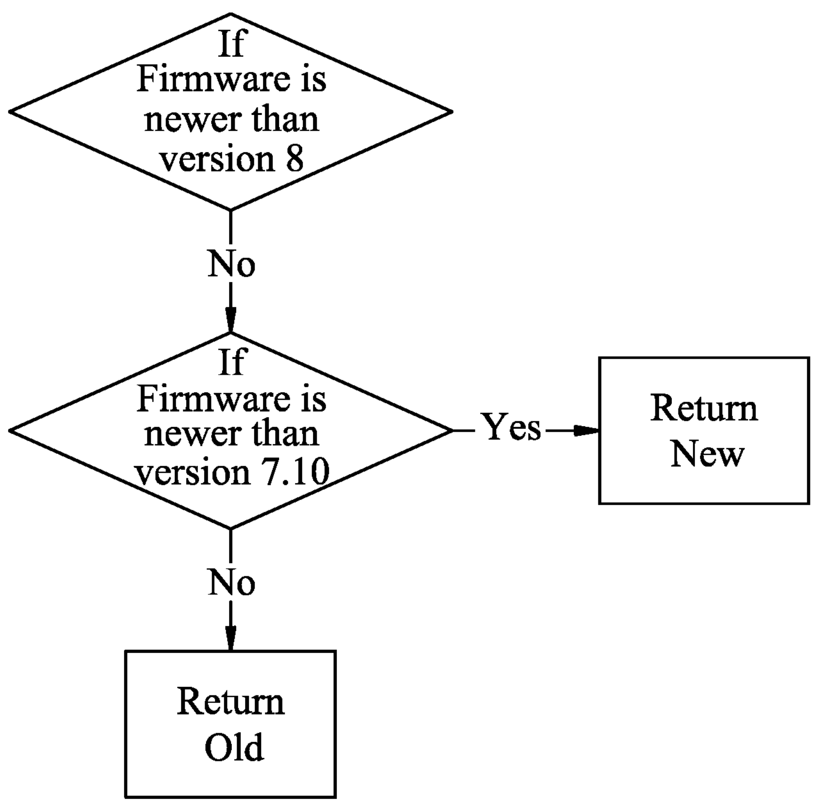
Figure 133:
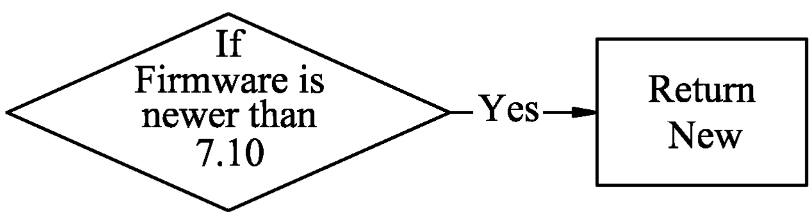
Figure 134:
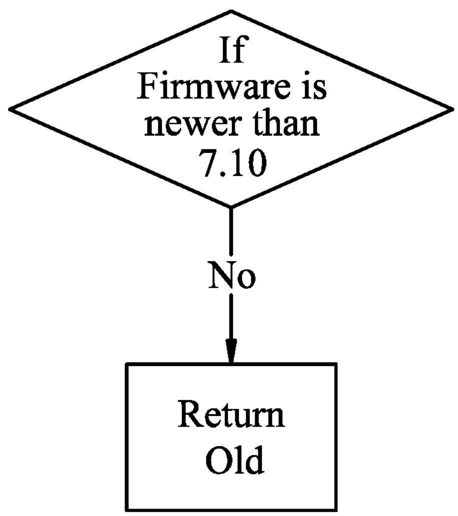
Figure 135:
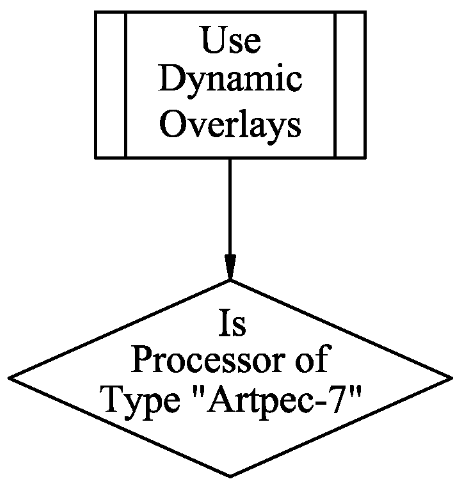
Figure 136:
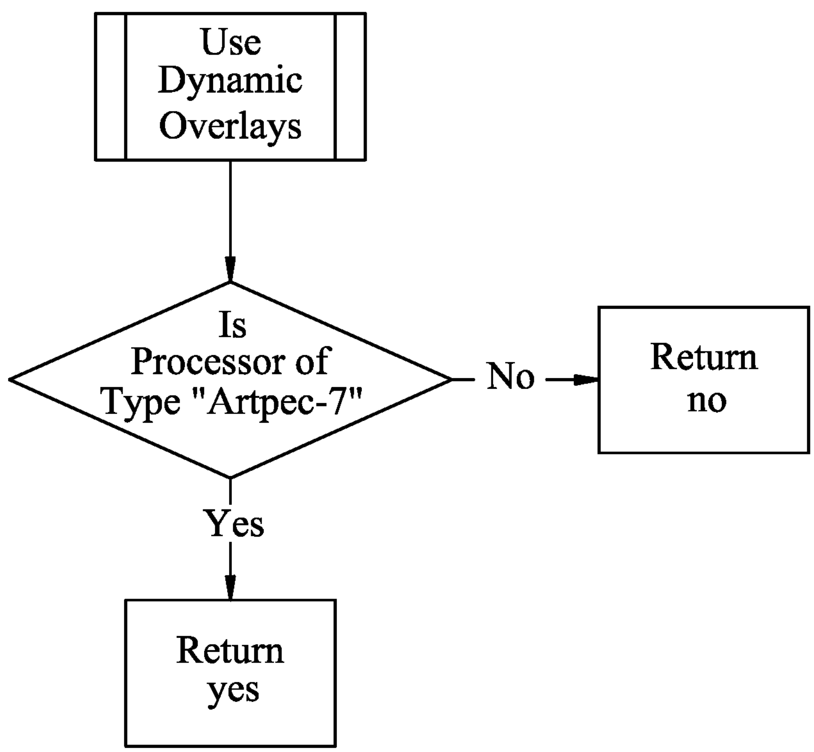
Figure 137:
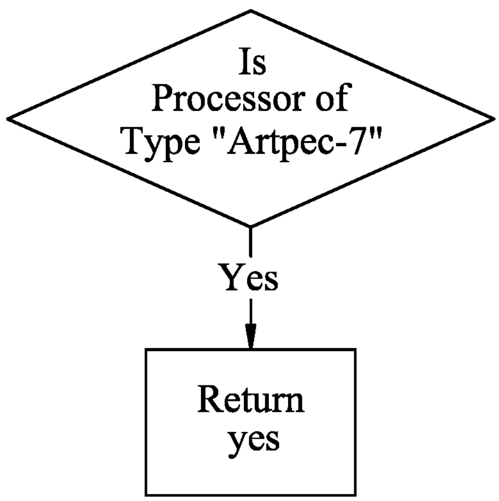
Figure 138:
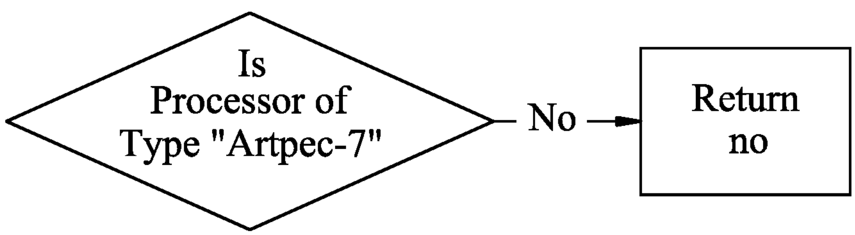
Figure 139:
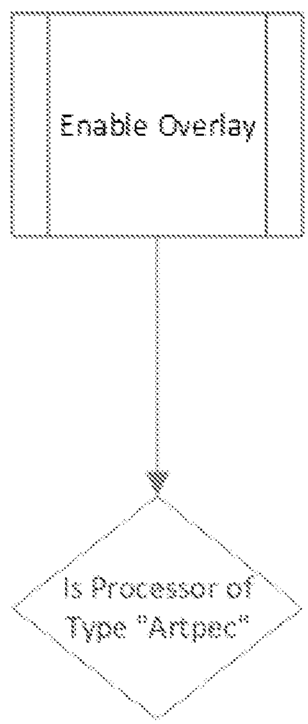
Figure 140:
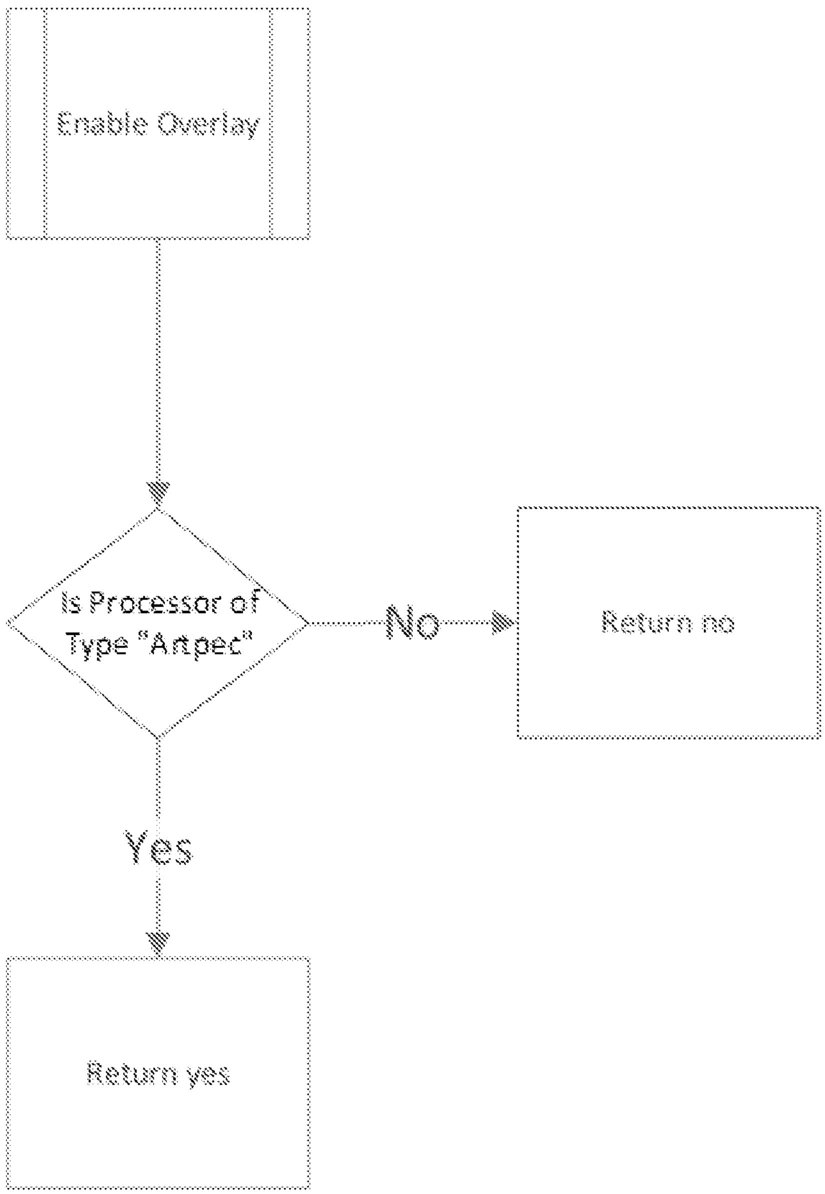
Figure 141:
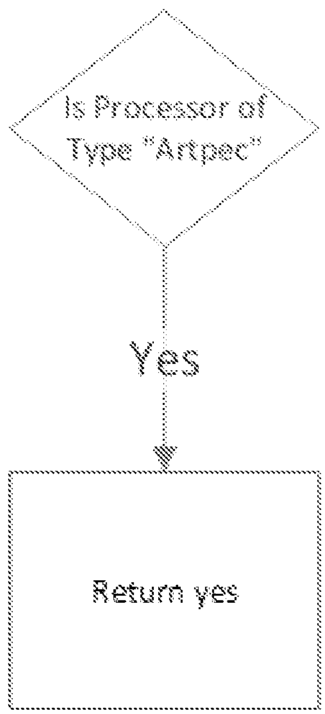
Figure 142:
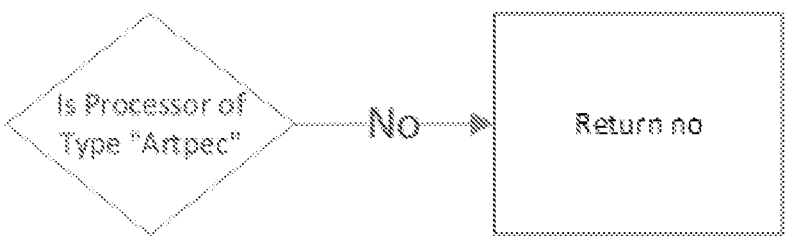
Figure 143:
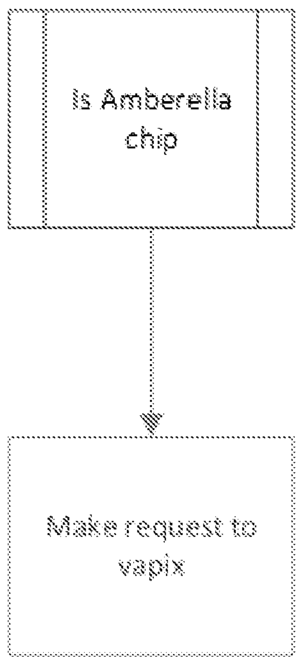
Figure 144:
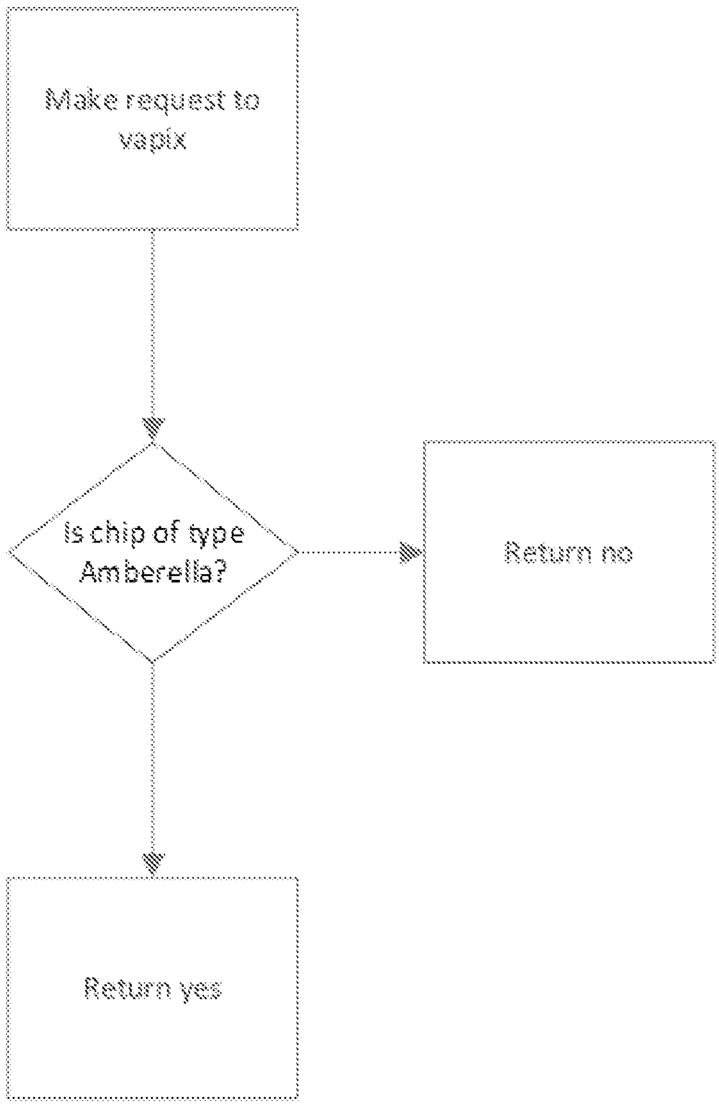
Figure 145:
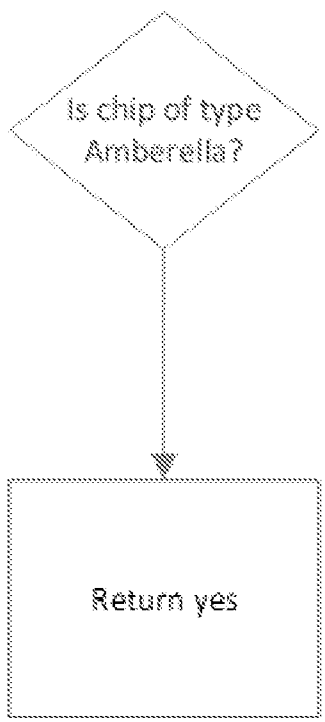
Figure 146:
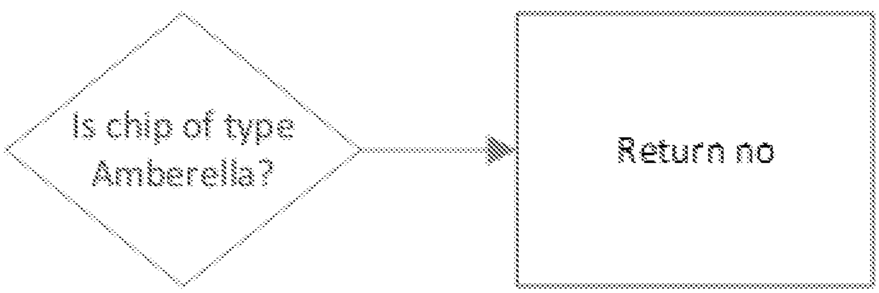
Figure 147:
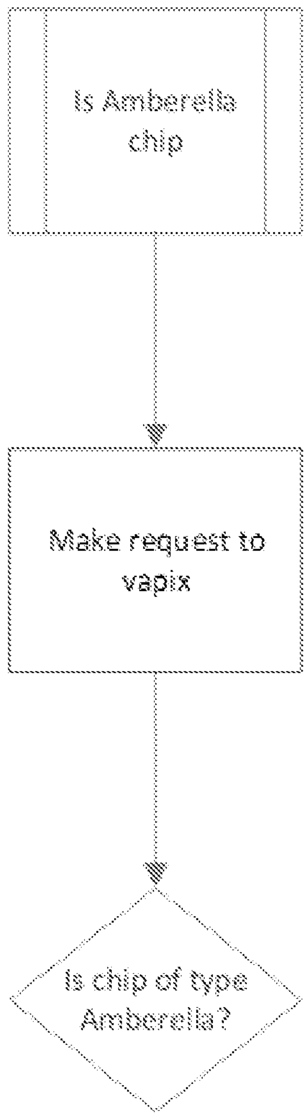
Figure 148:
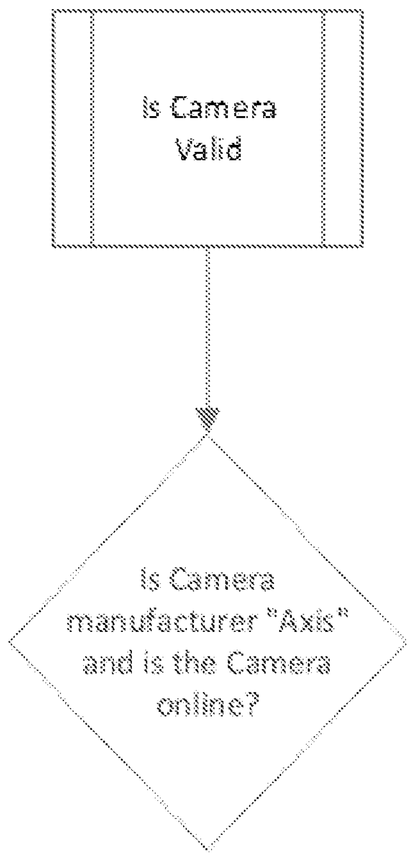
Figure 149:
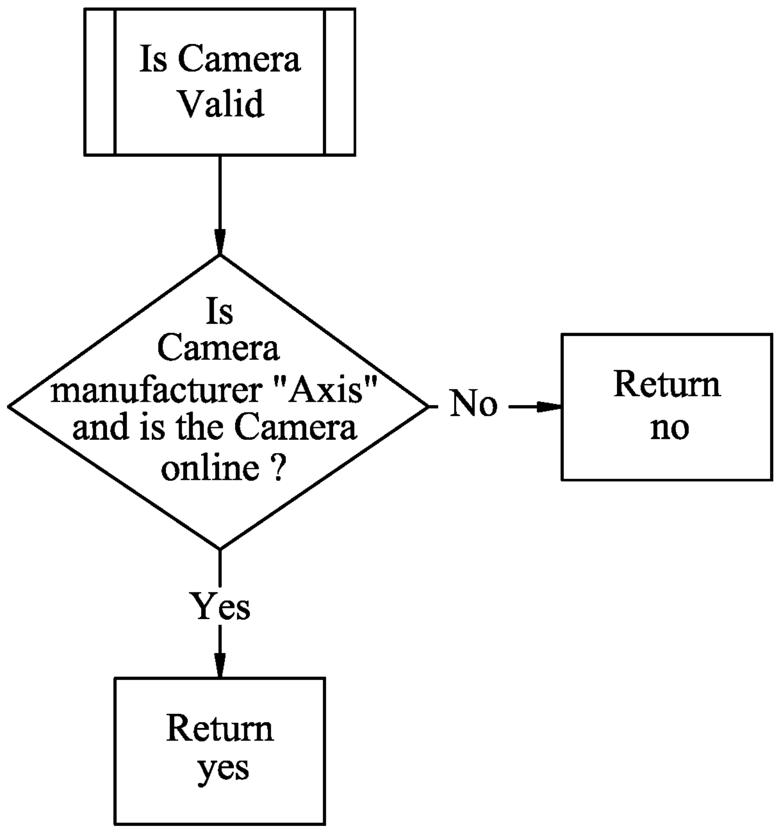
Figure 150:
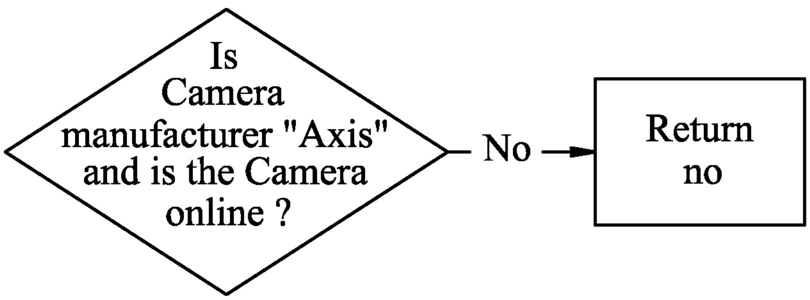
Figure 151:
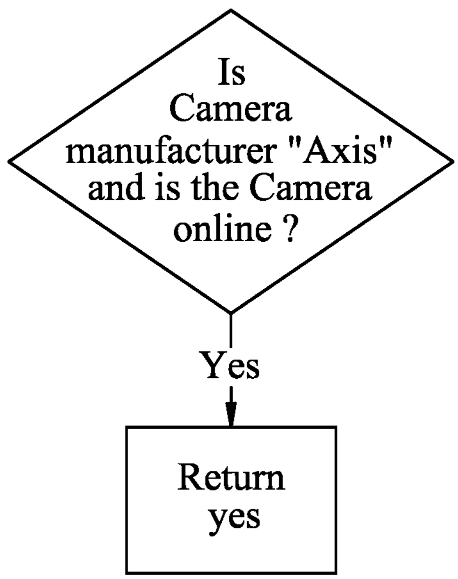
Figure 152:
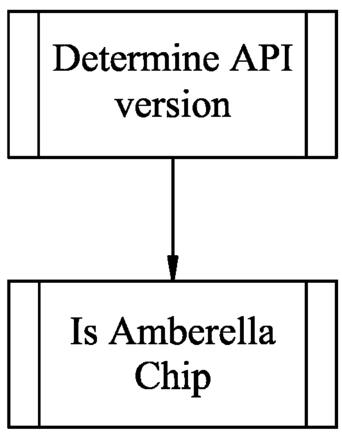
Figure 153:
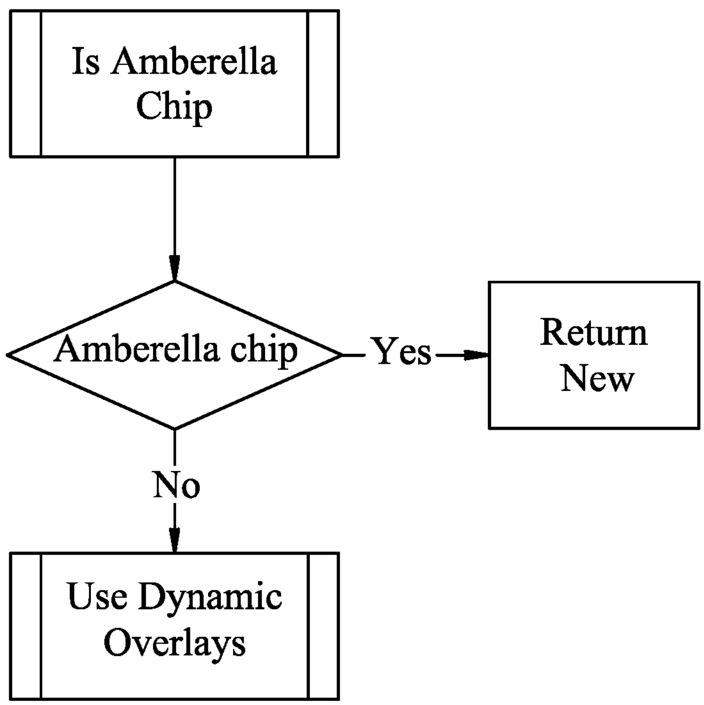
Figure 154:
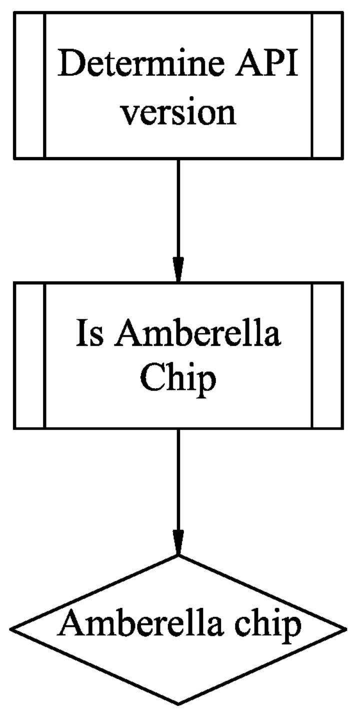
Figure 155:
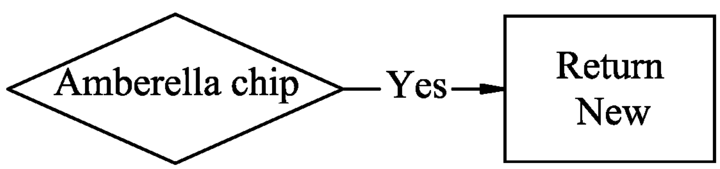
Figure 156:
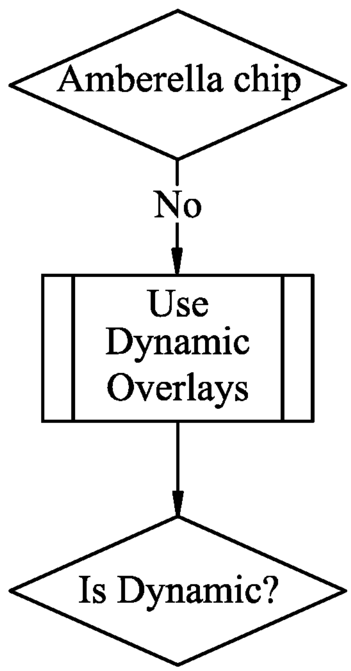
Figure 157:
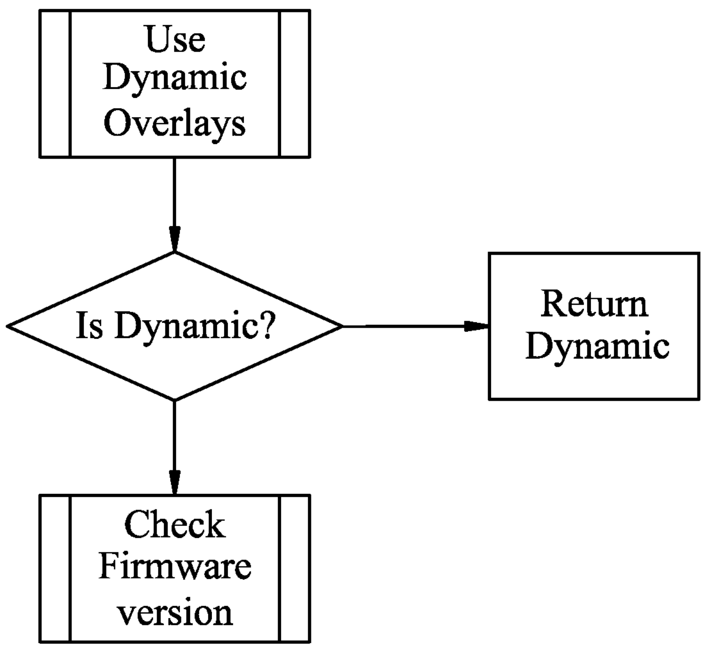
Figure 158:
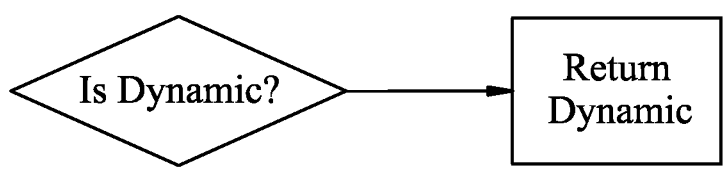
Figure 159:
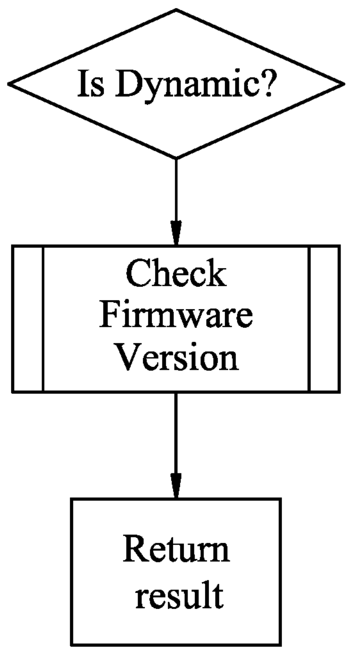
Figure 160:
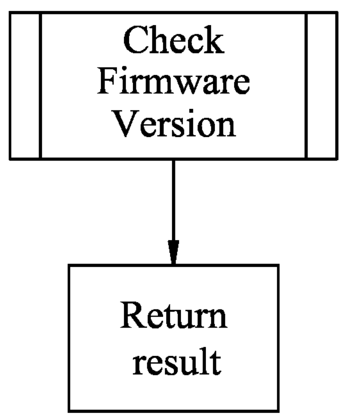
Figure 161:
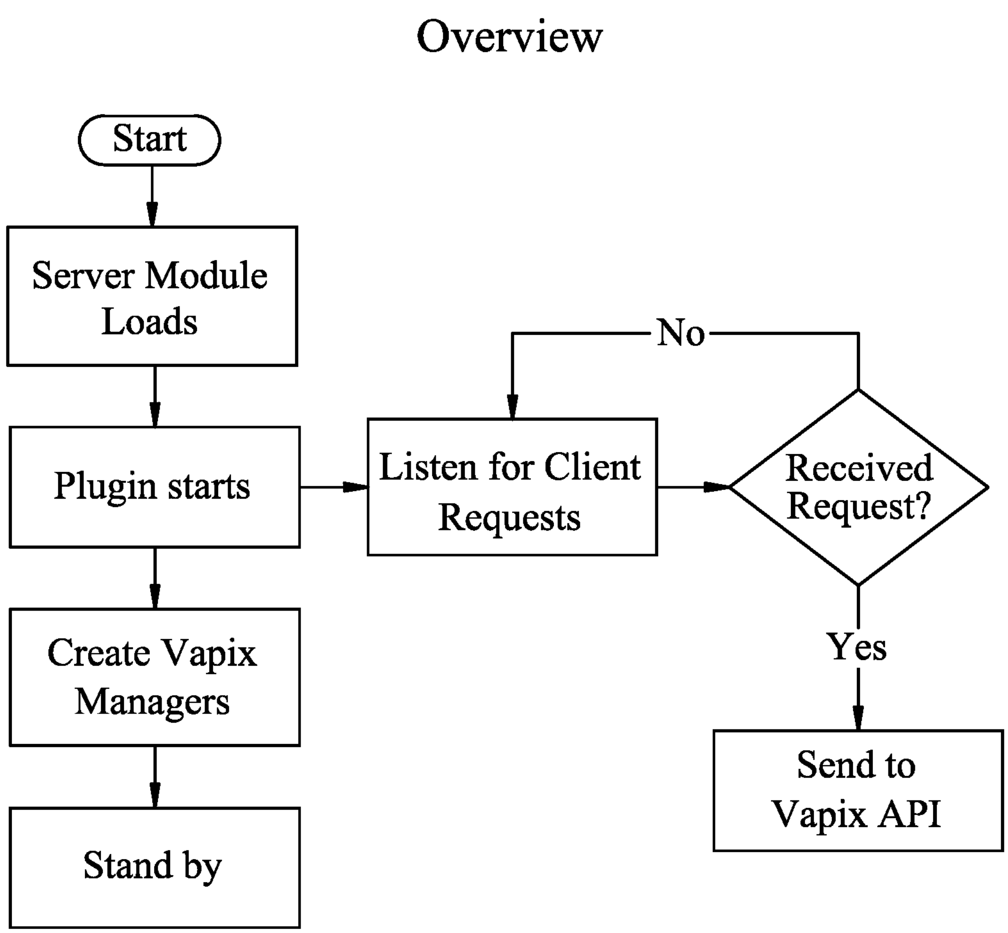
FIGS. 161-169, collectively, illustrate an overview of the plugin.
Figure 162:
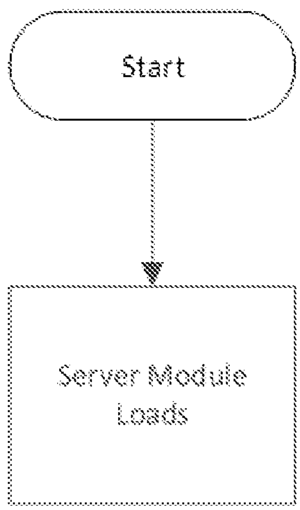
Figure 163:
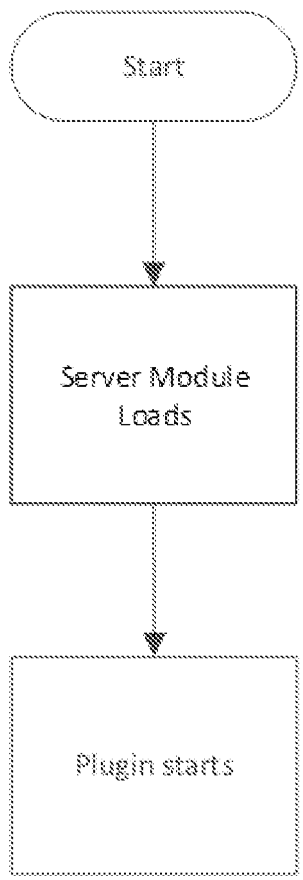
Figure 164:
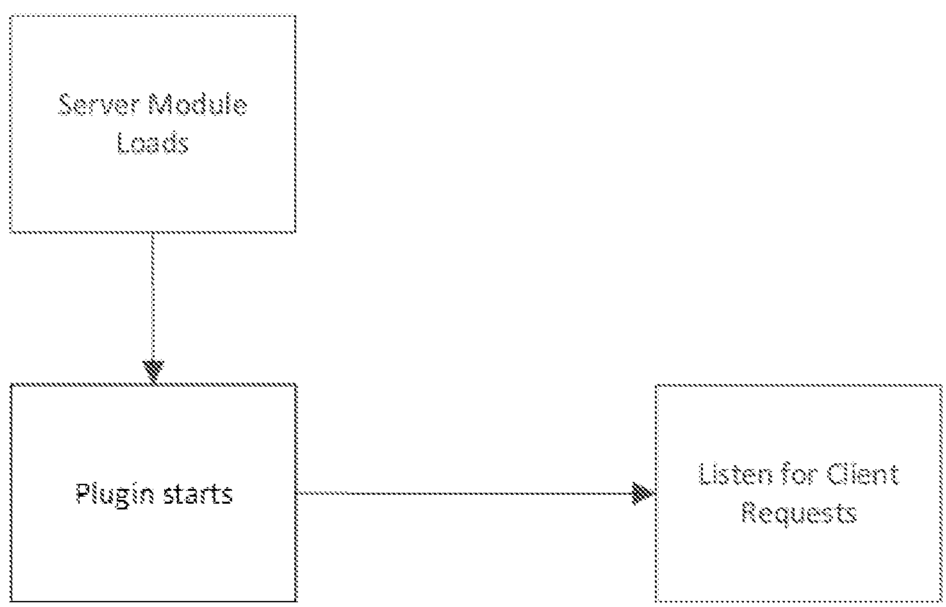
Figure 165:
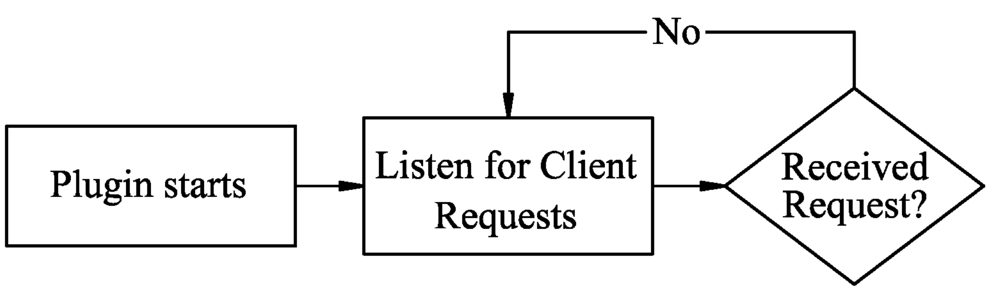
Figure 166:
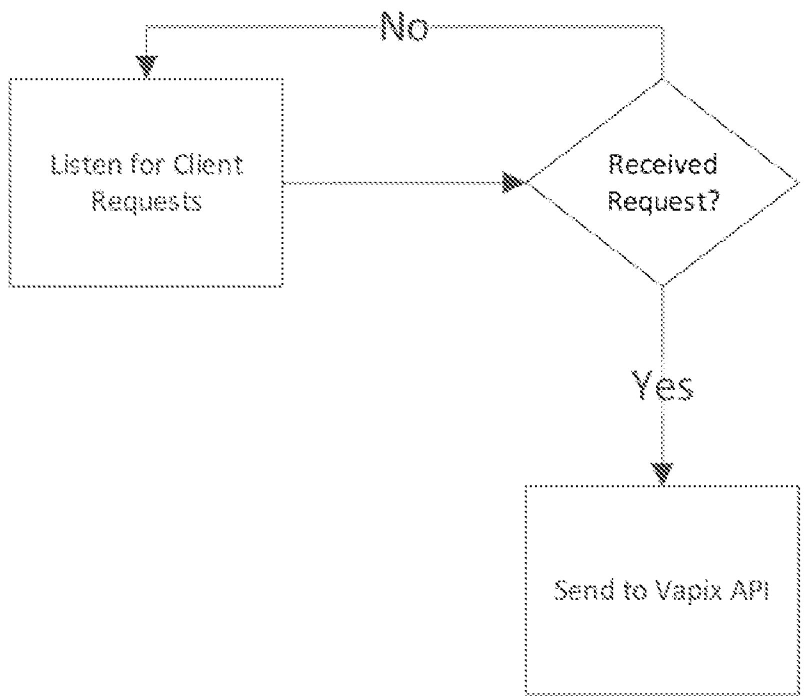
Figure 167:
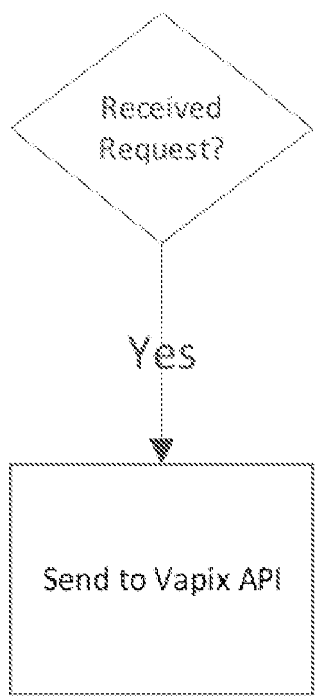
Figure 168:
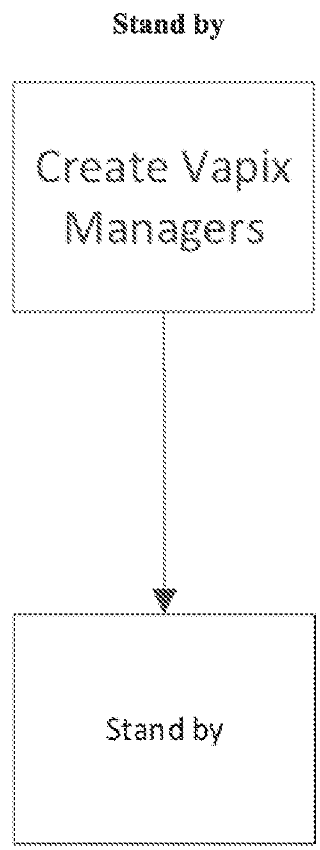
Figure 169:
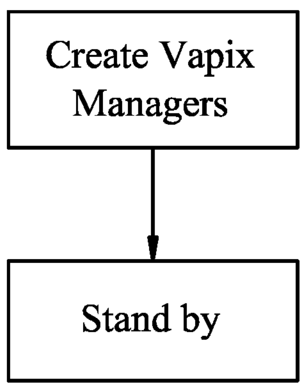
Figure 170A:
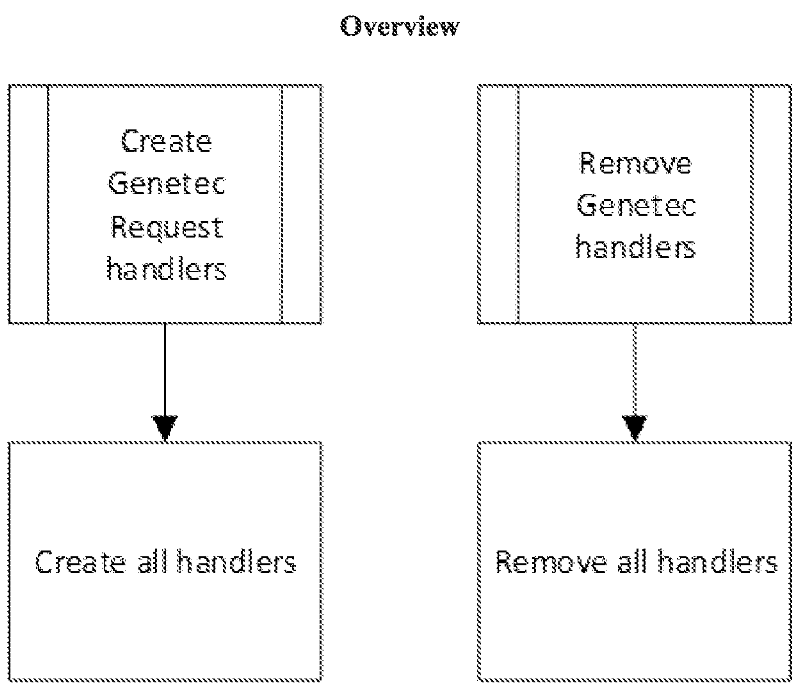
FIGS. 170A through 170F, and FIGS. 171 through 199, collectively, illustrate request handlers of the plugin.
Figure 170B:
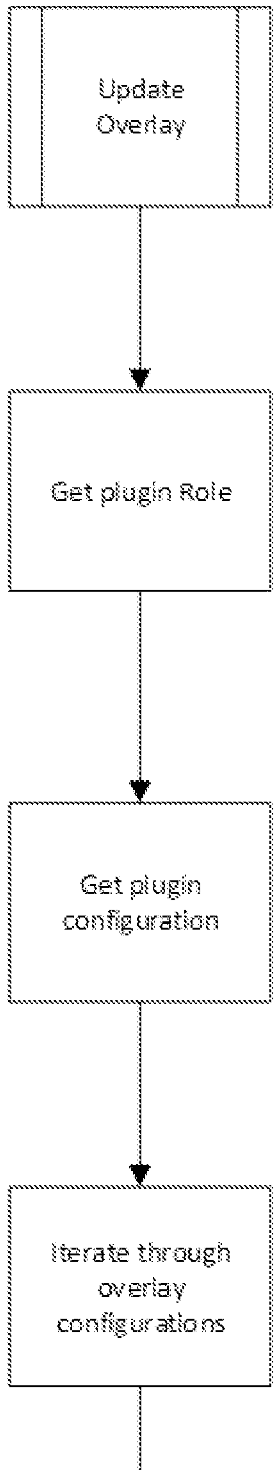
Figure 170C:
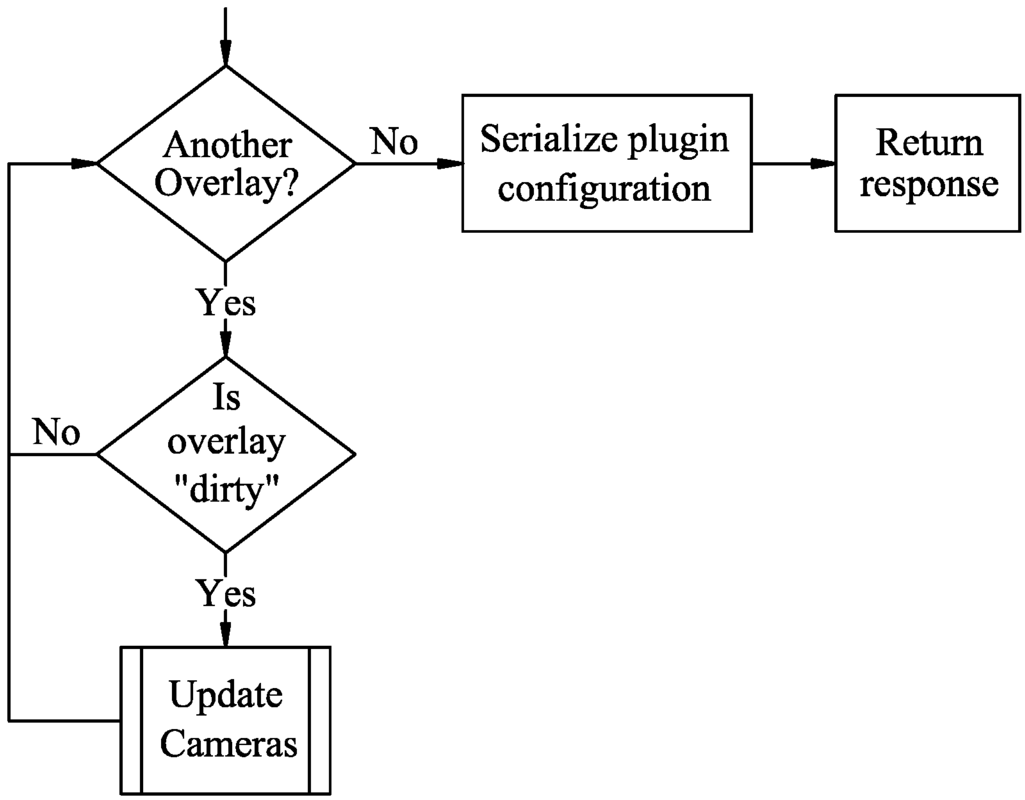
Figure 170D:
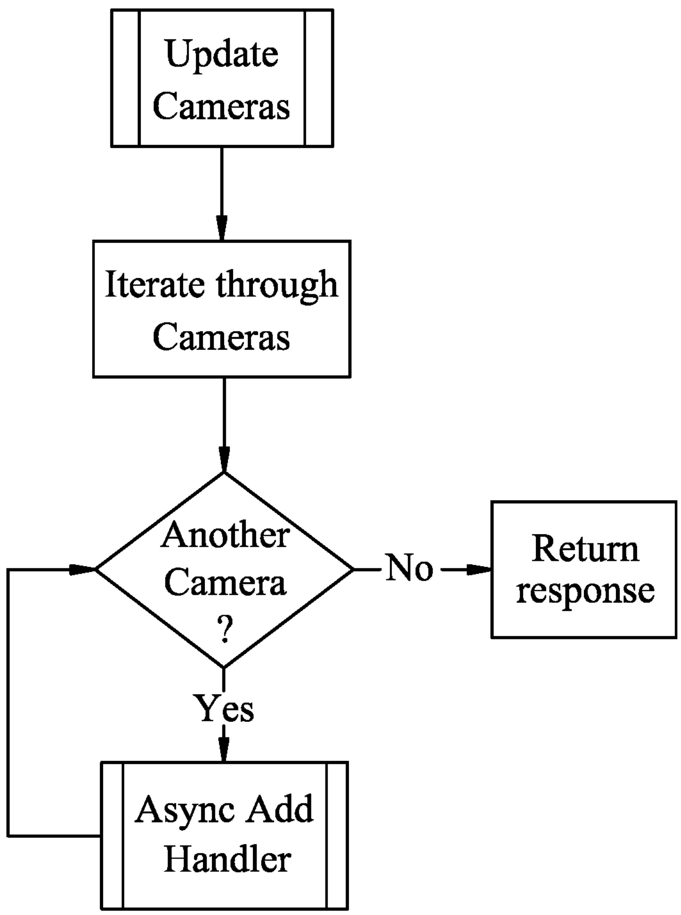
Figure 170E:
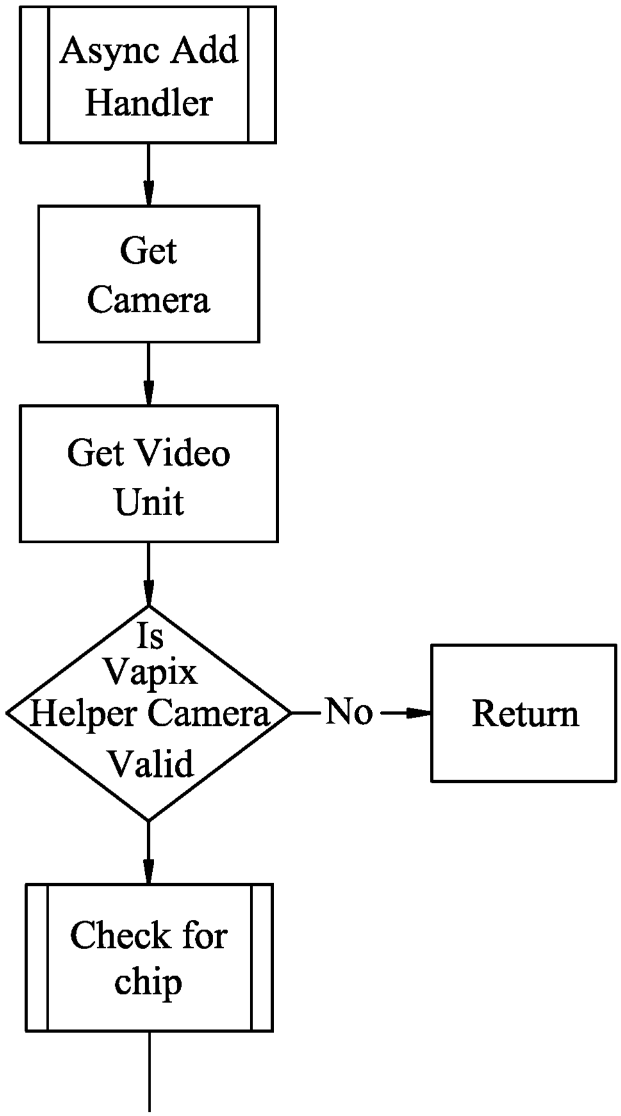
Figure 170F:
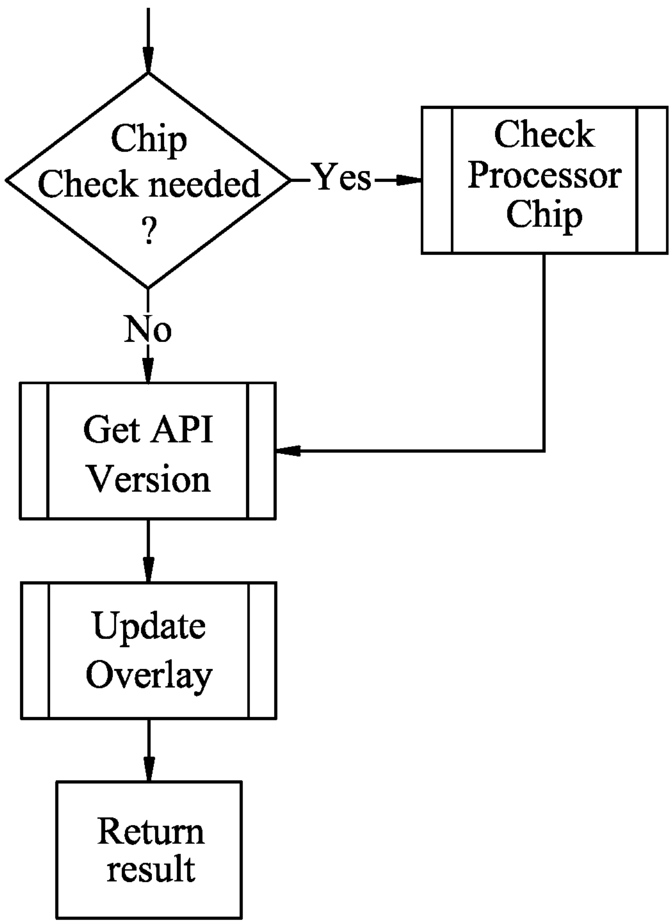
Figure 171:
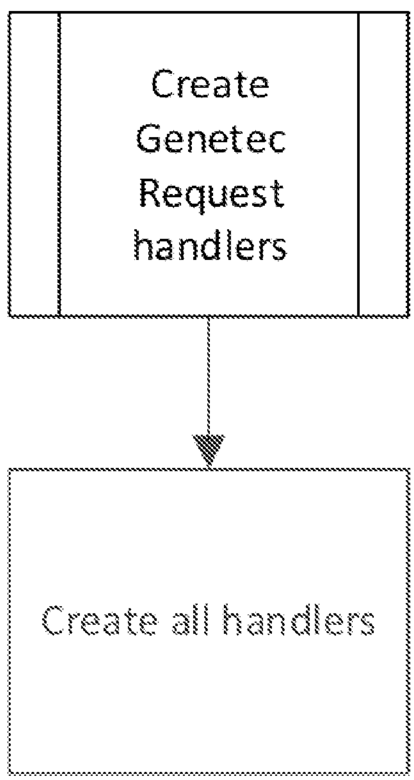
Figure 172:
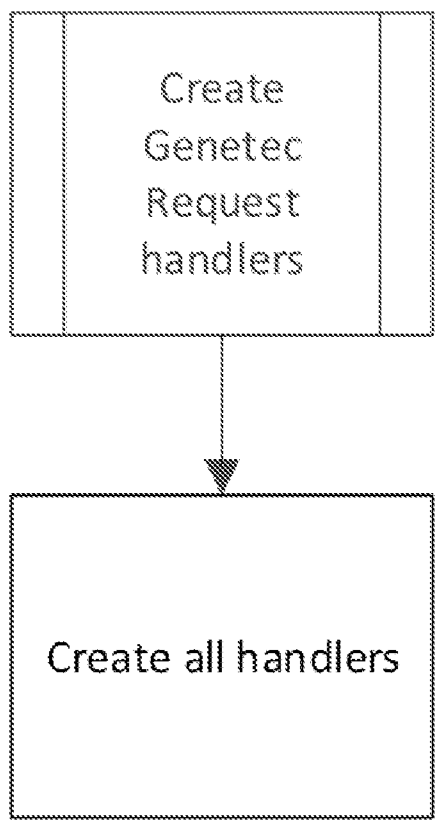
Figure 173:
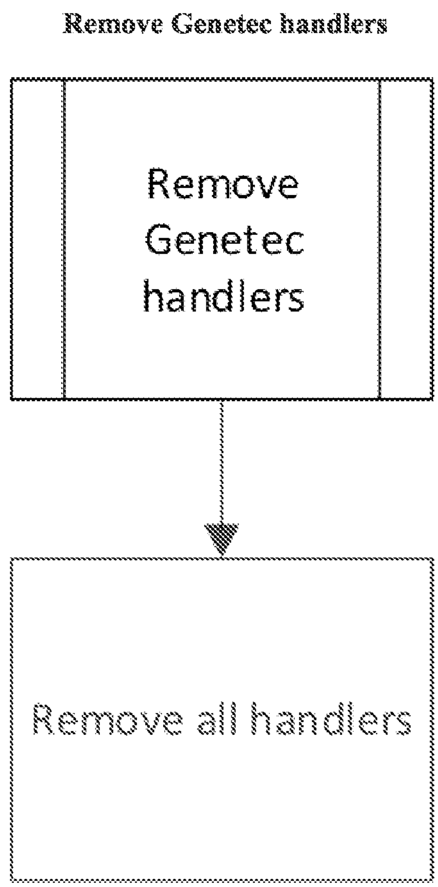
Figure 174:
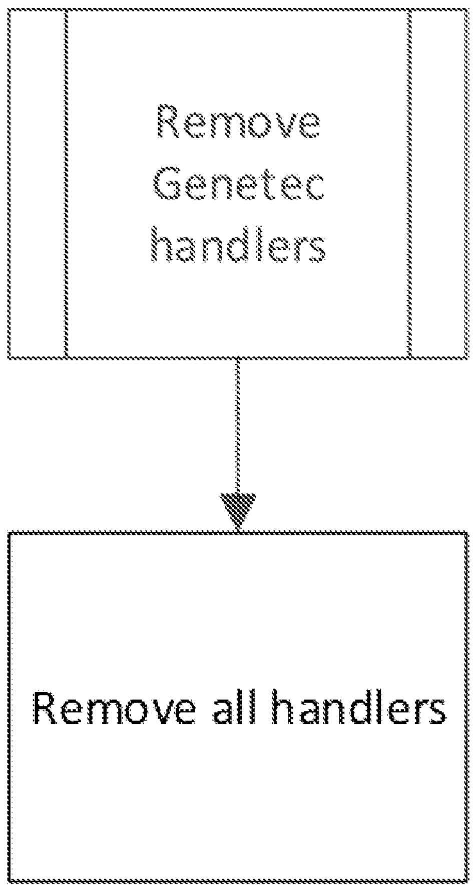
Figure 175:
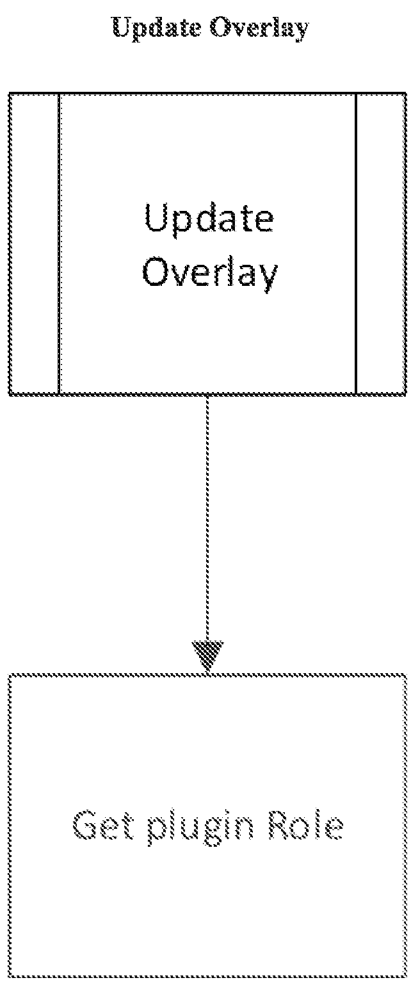
Figure 176:
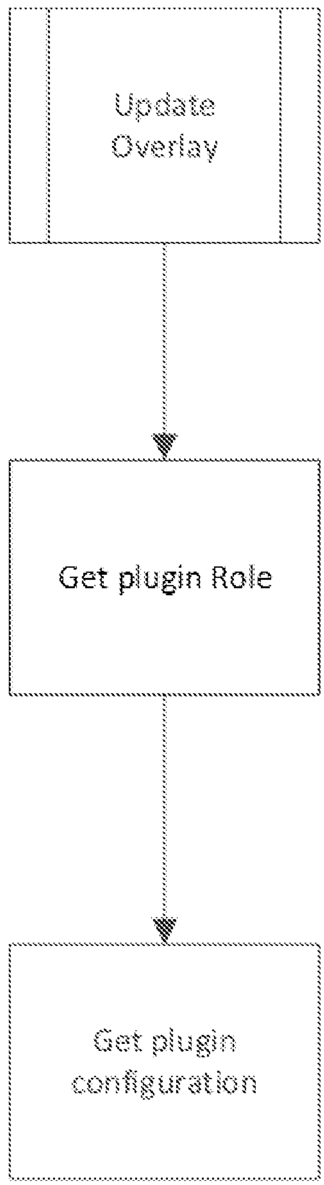
Figure 177:
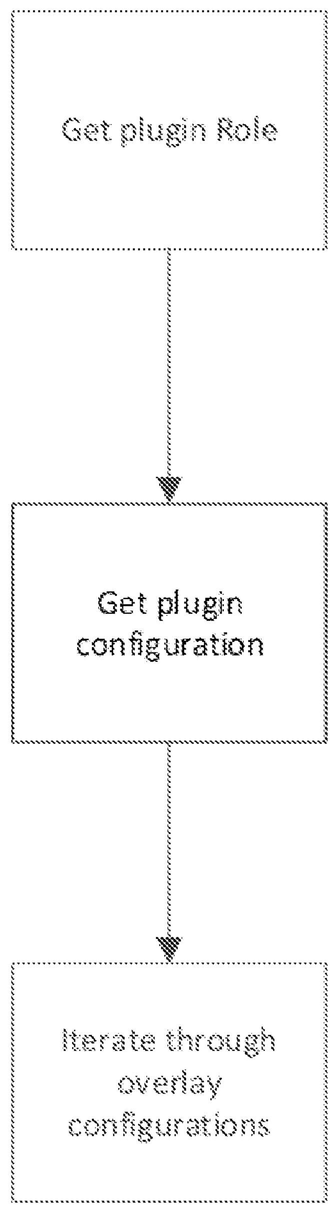
Figure 178:
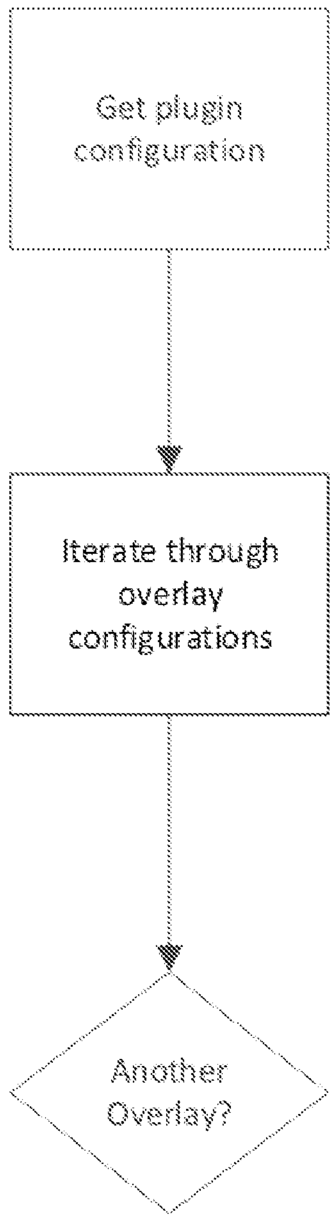
Figure 179:
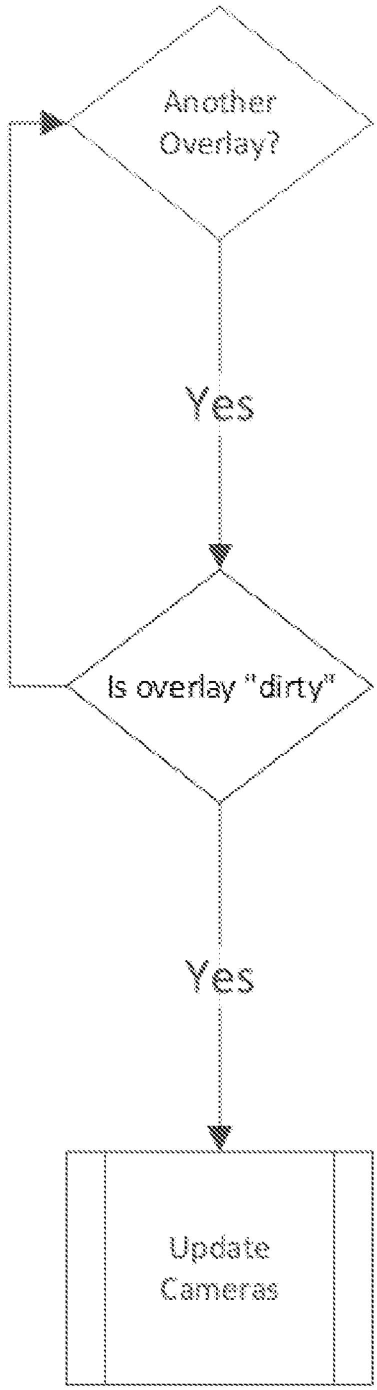
Figure 180:
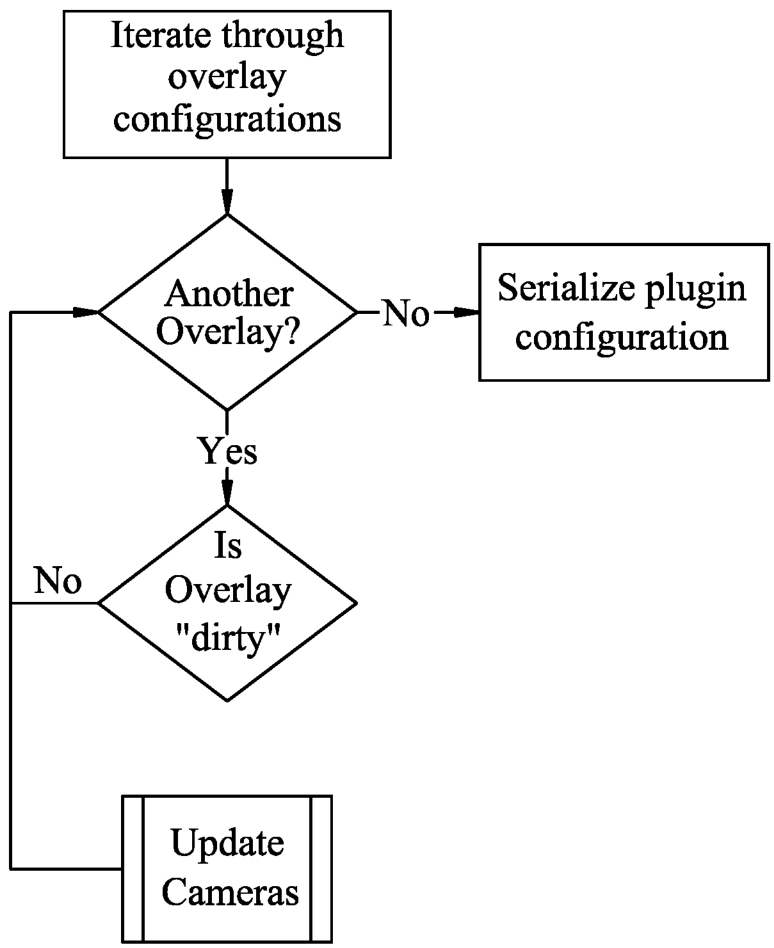
Figure 181:
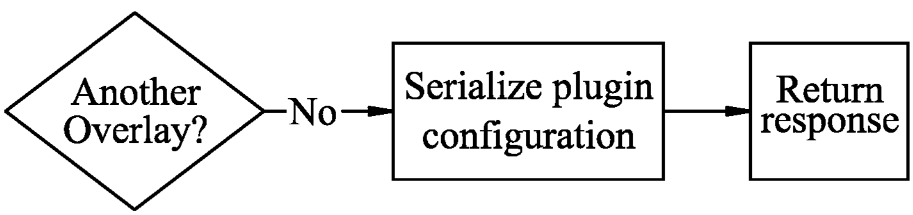
Figure 182:
Figure 183:
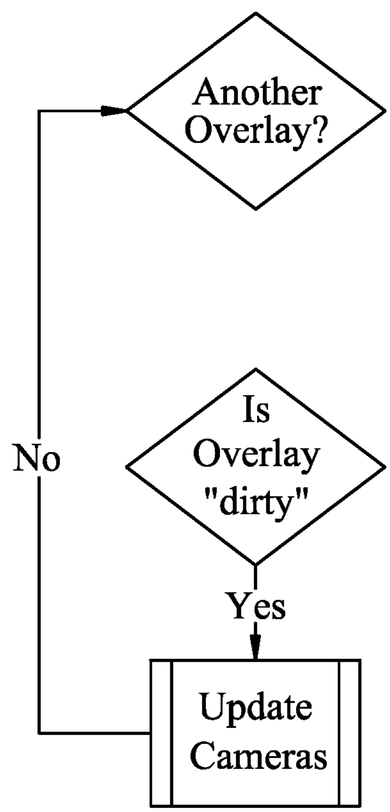
Figure 184:
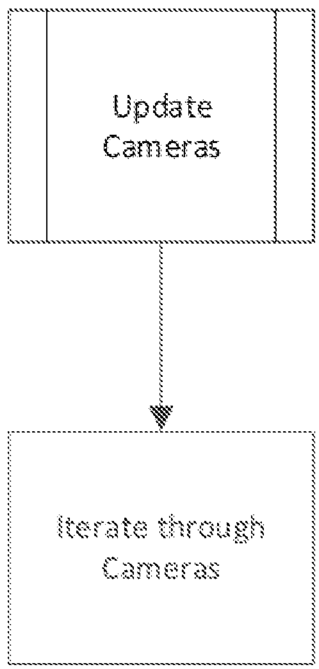
Figure 185:
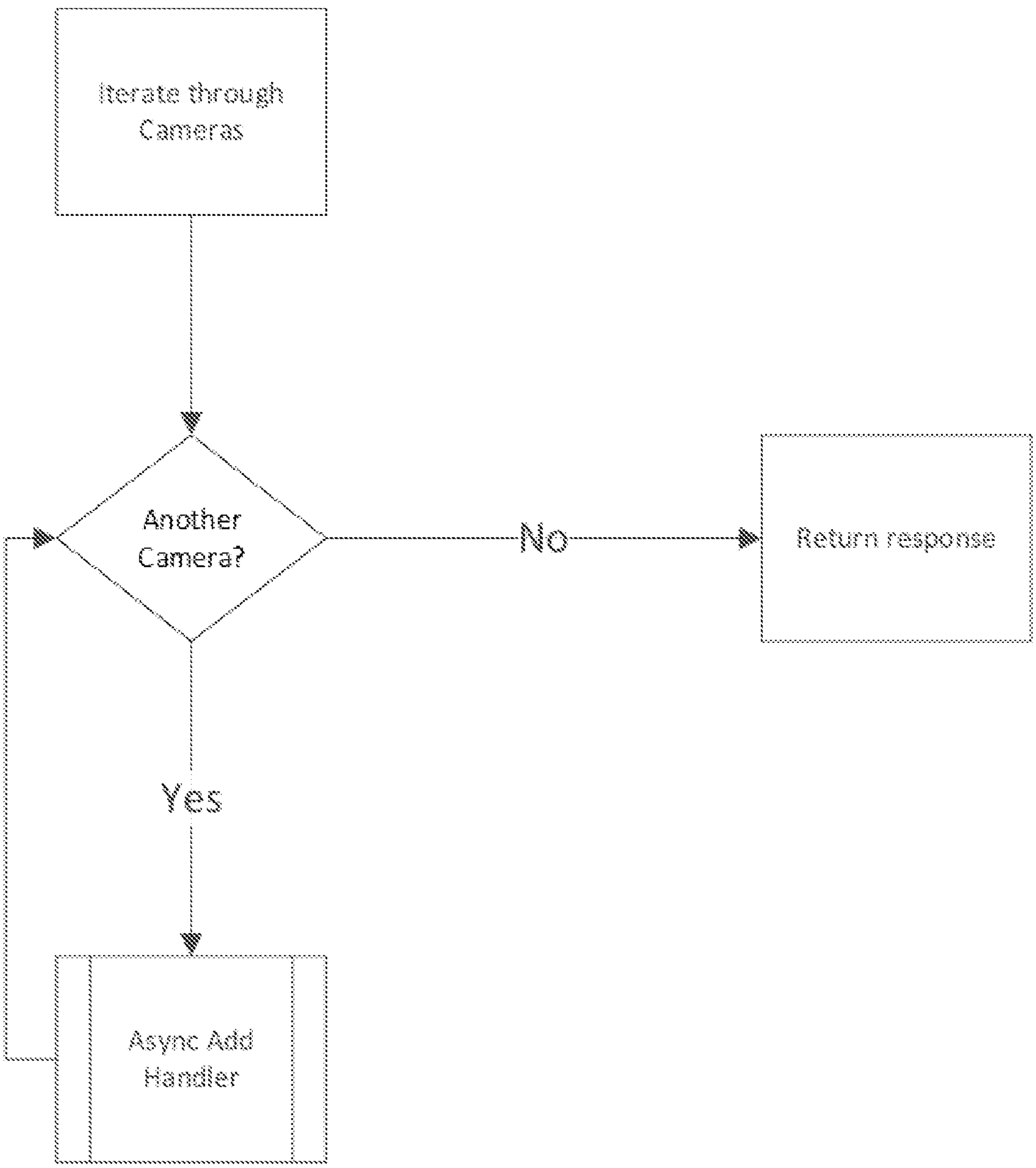
Figure 186:
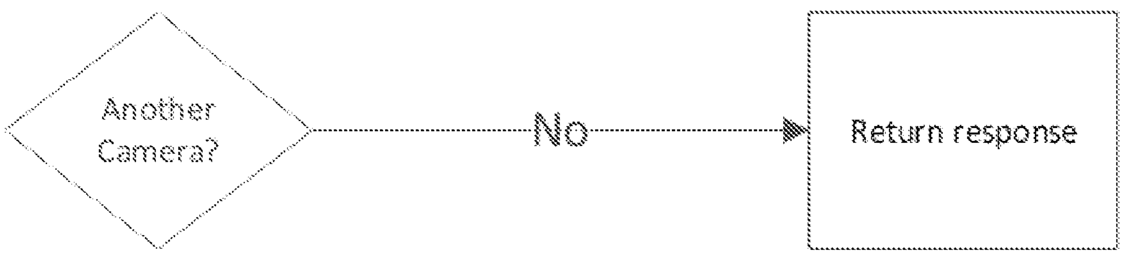
Figure 187:
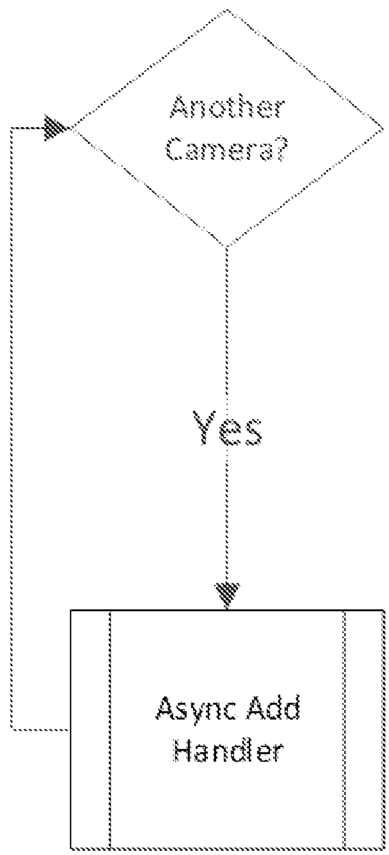
Figure 188:
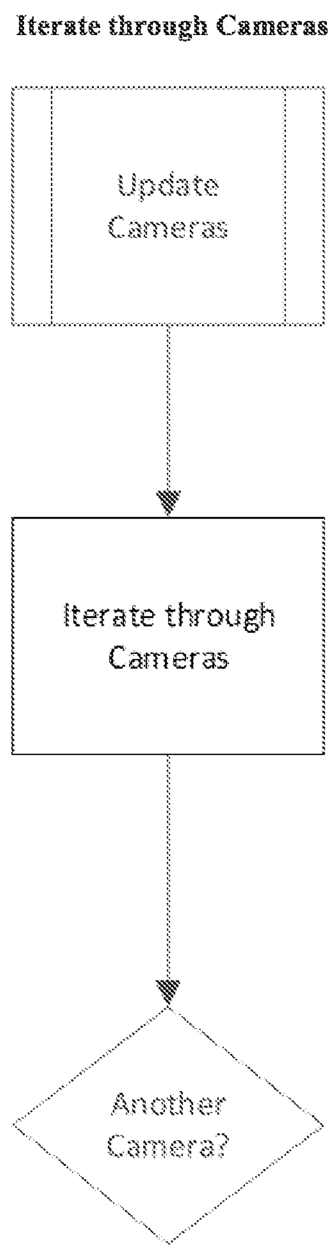
Figure 189:
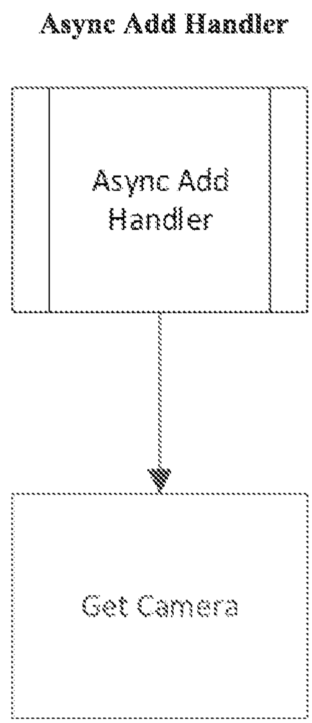
Figure 190:
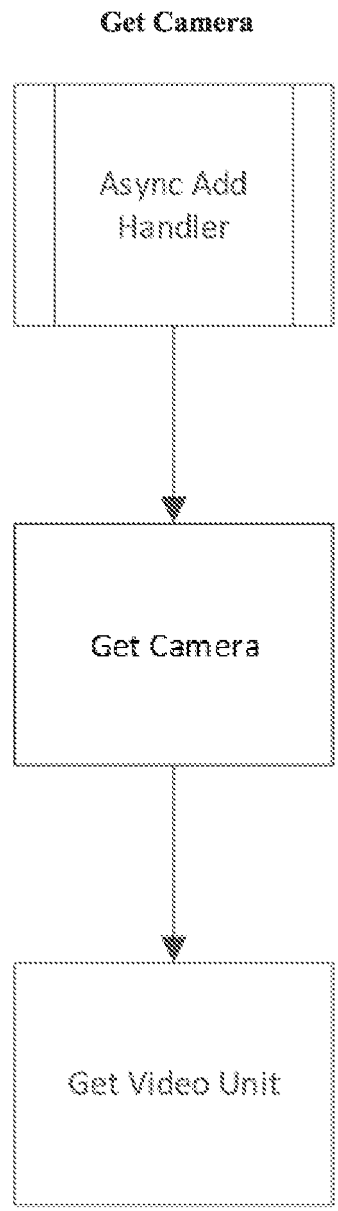
Figure 191:
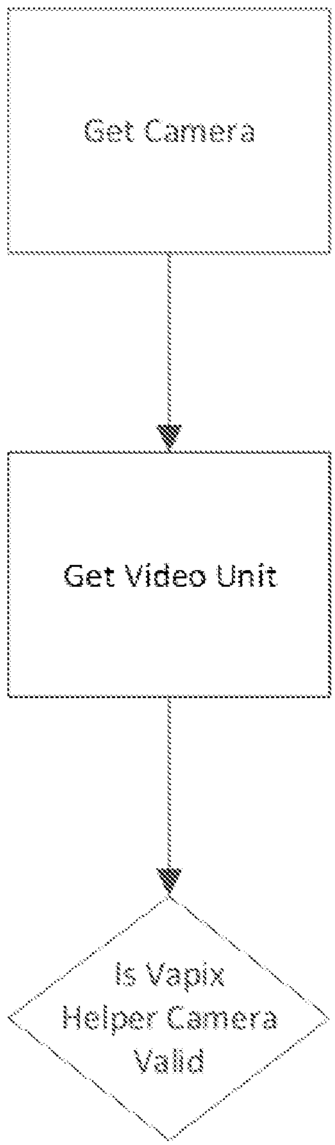
Figure 192:
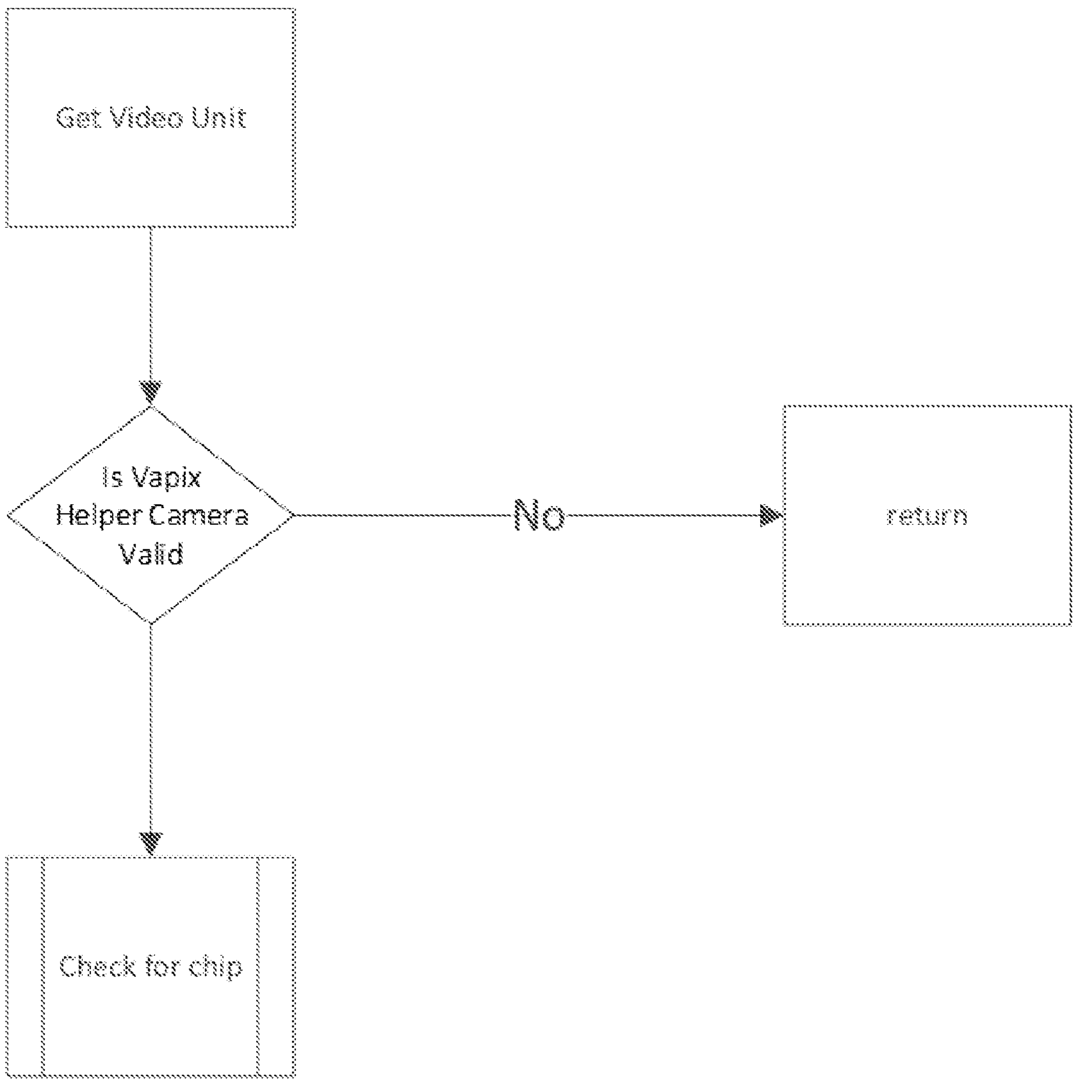
Figure 193:
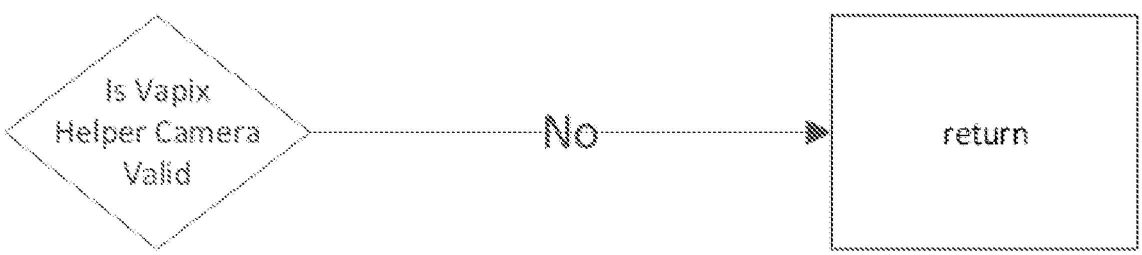
Figure 194:
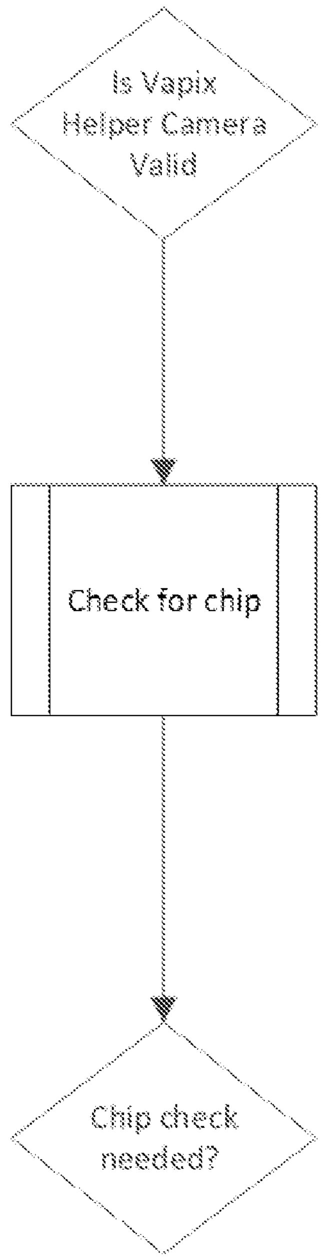
Figure 195:
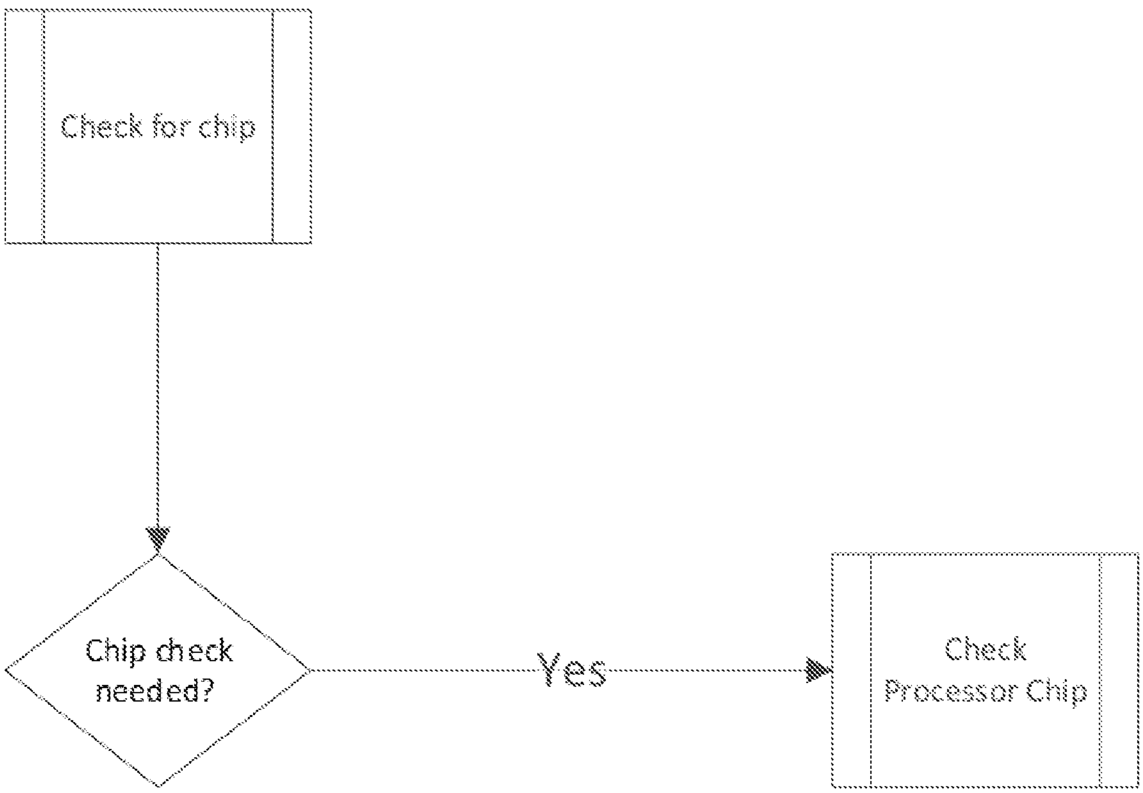
Figure 196:
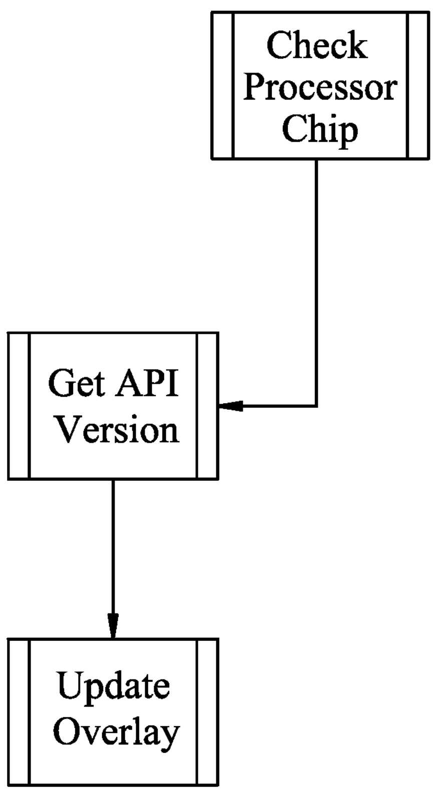
Figure 197:
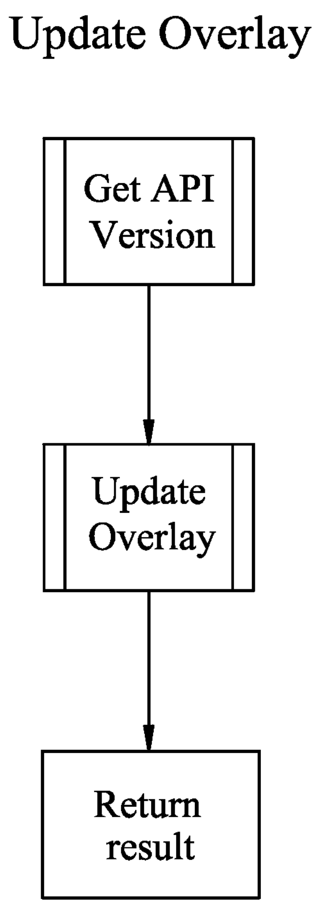
Figure 198:
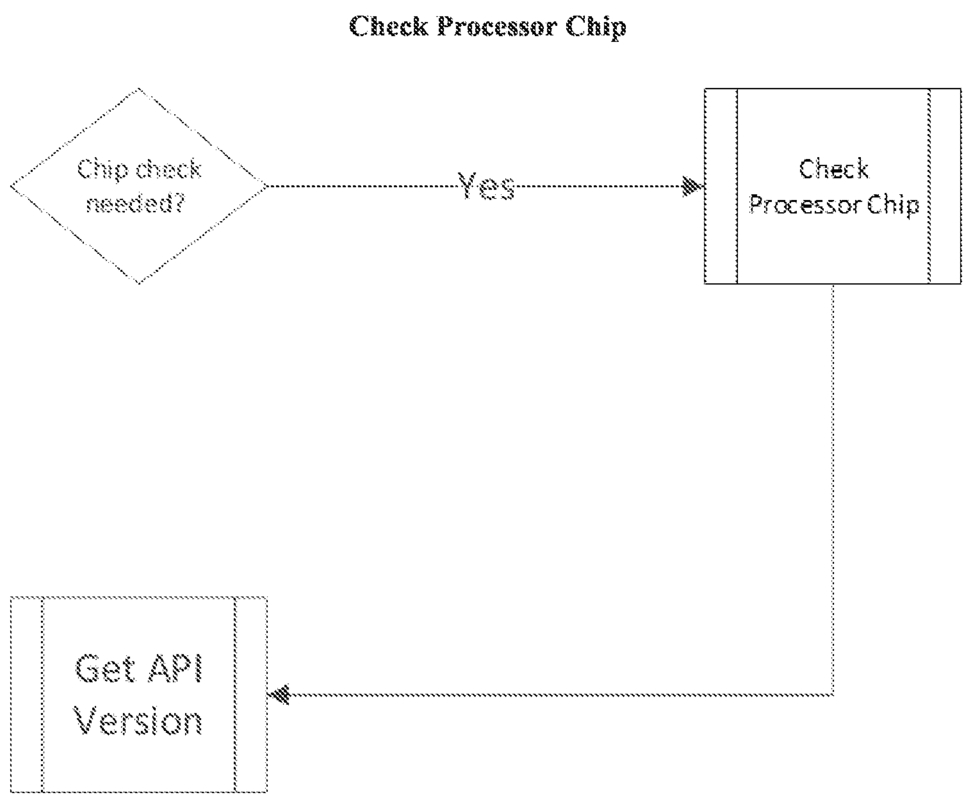
Figure 199:
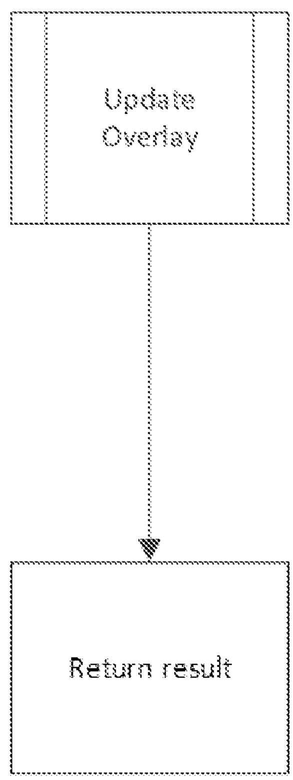
Figure 200A:
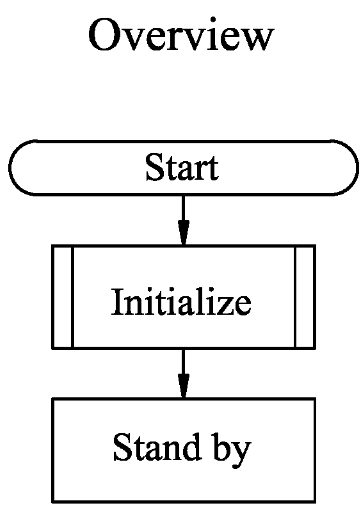
Figure 200B:
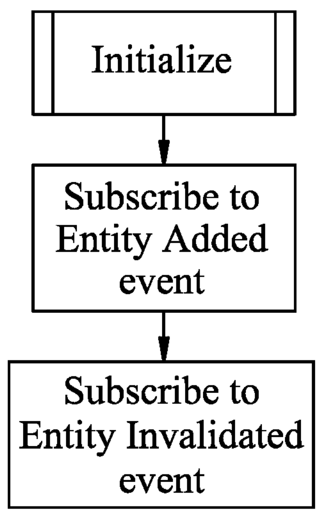
Figure 200C:
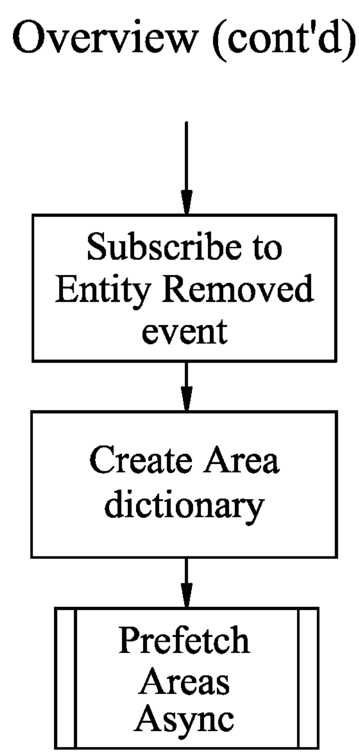
Figure 200D:
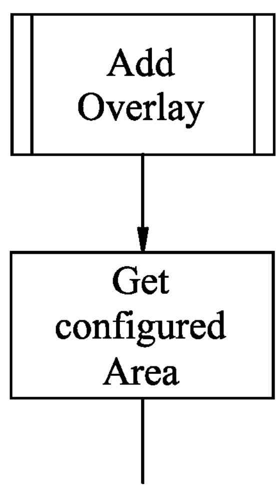
Figure 200E:
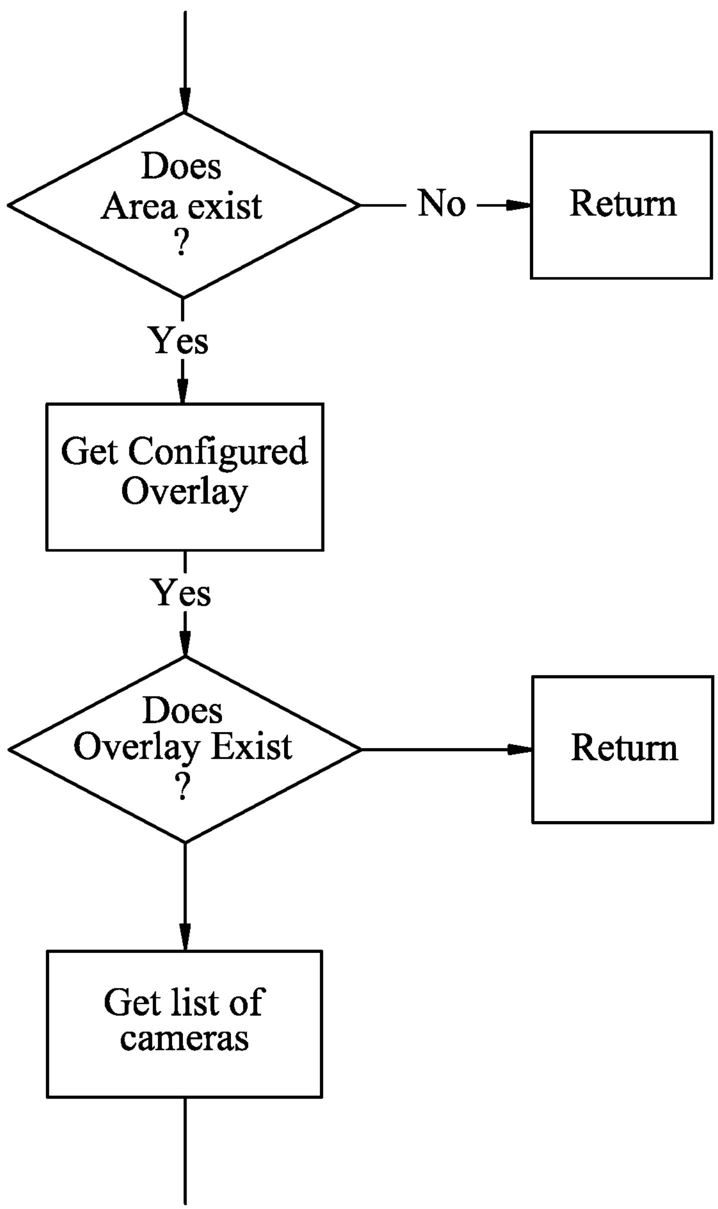
Figure 200F:
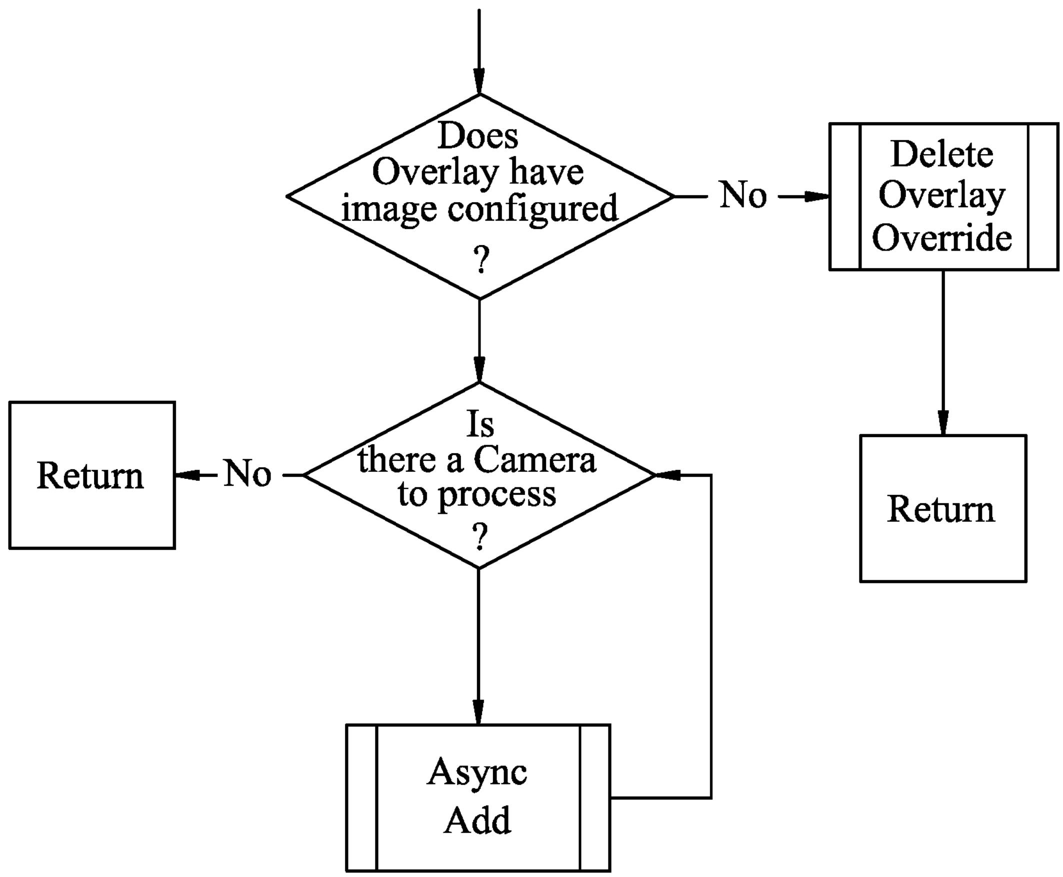
Figure 200G:
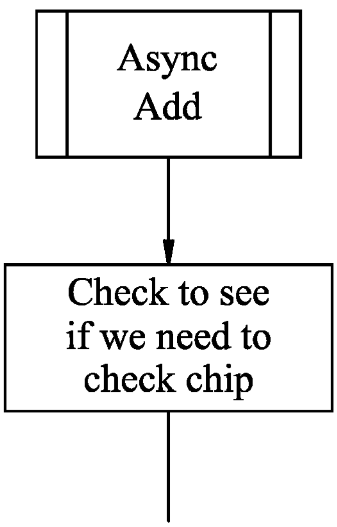
Figure 200H:
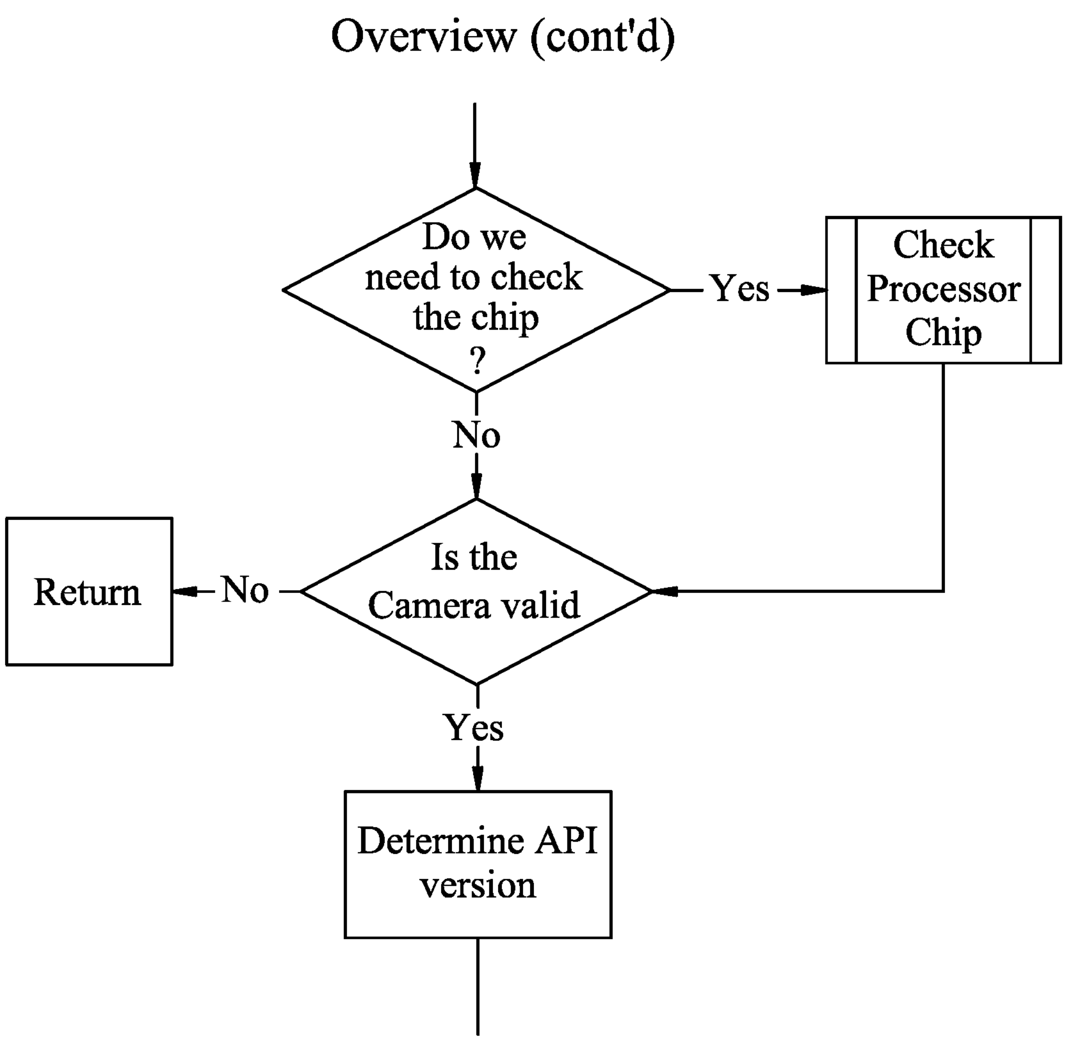
Figure 200I:
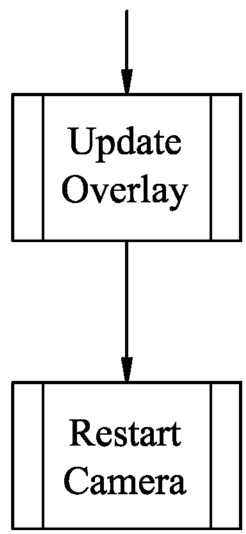
Figure 200J:
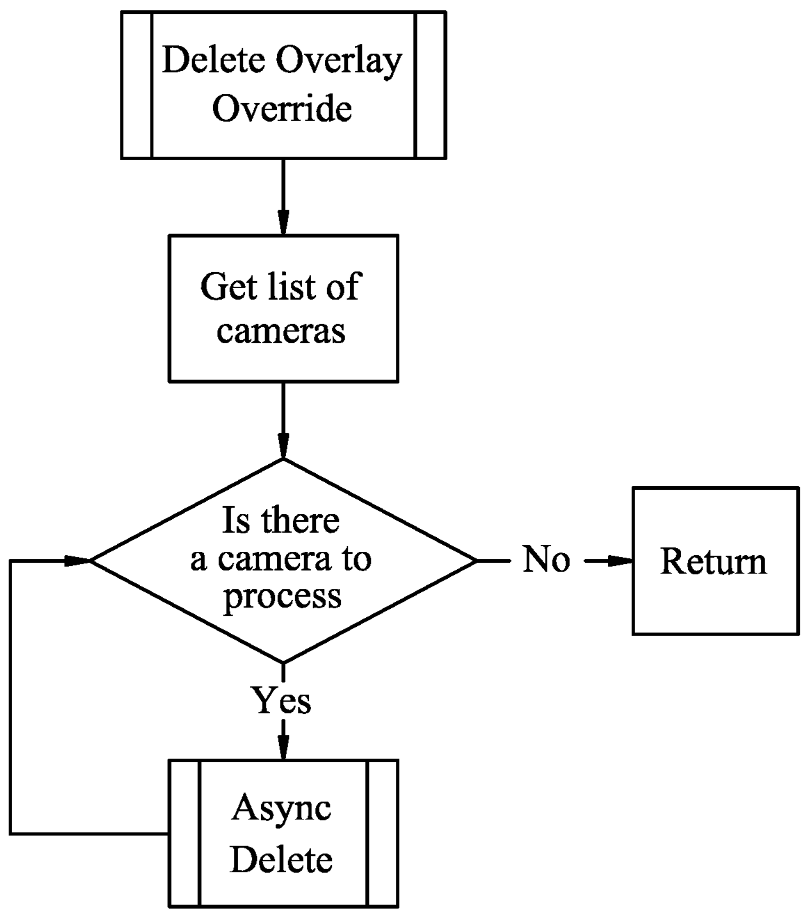
Figure 200K:
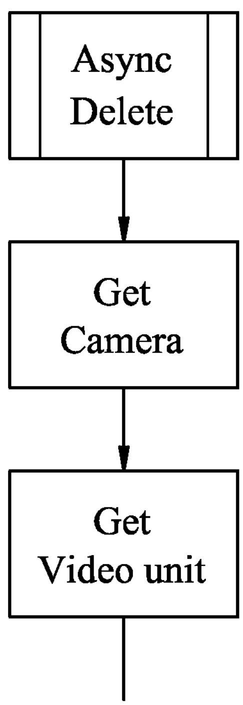
Figure 200L:
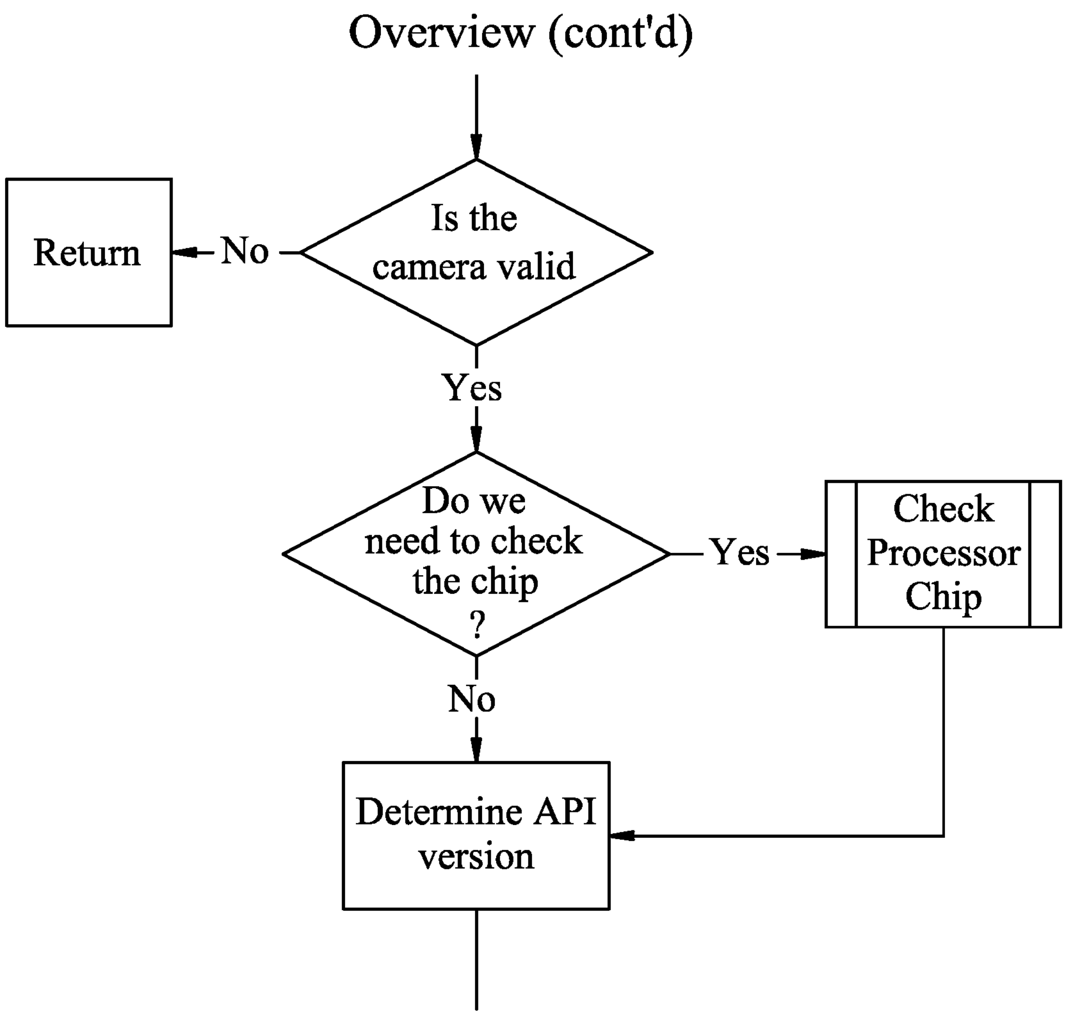
Figure 200M:
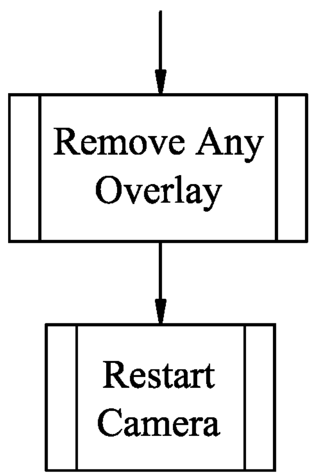
Figure 200N:
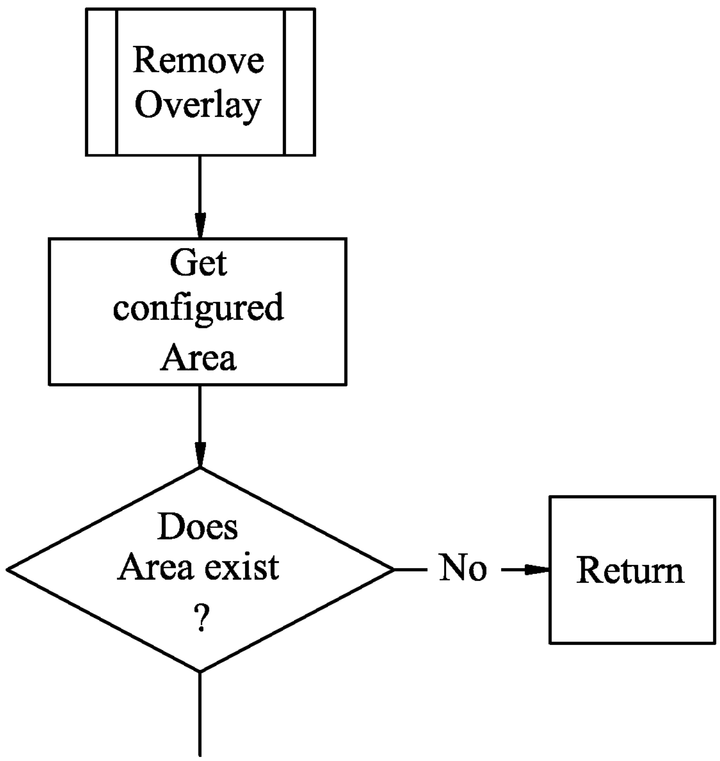
Figure 200O:
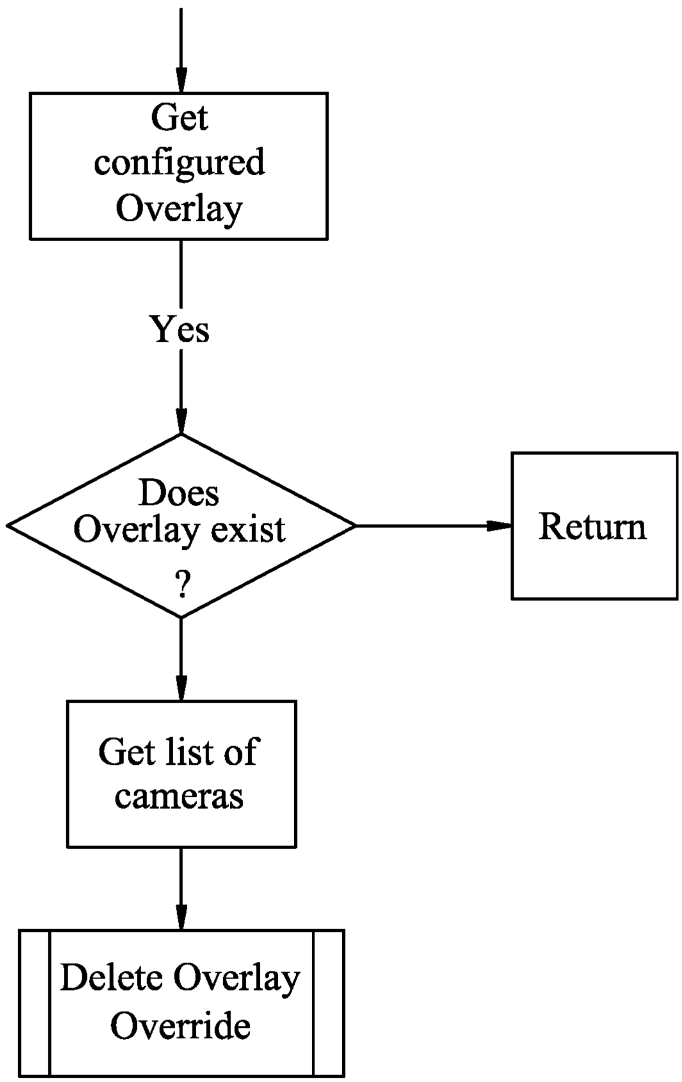
Figure 200P:
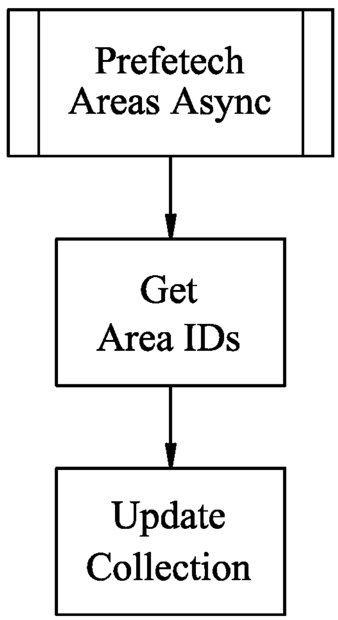
Figure 200R:
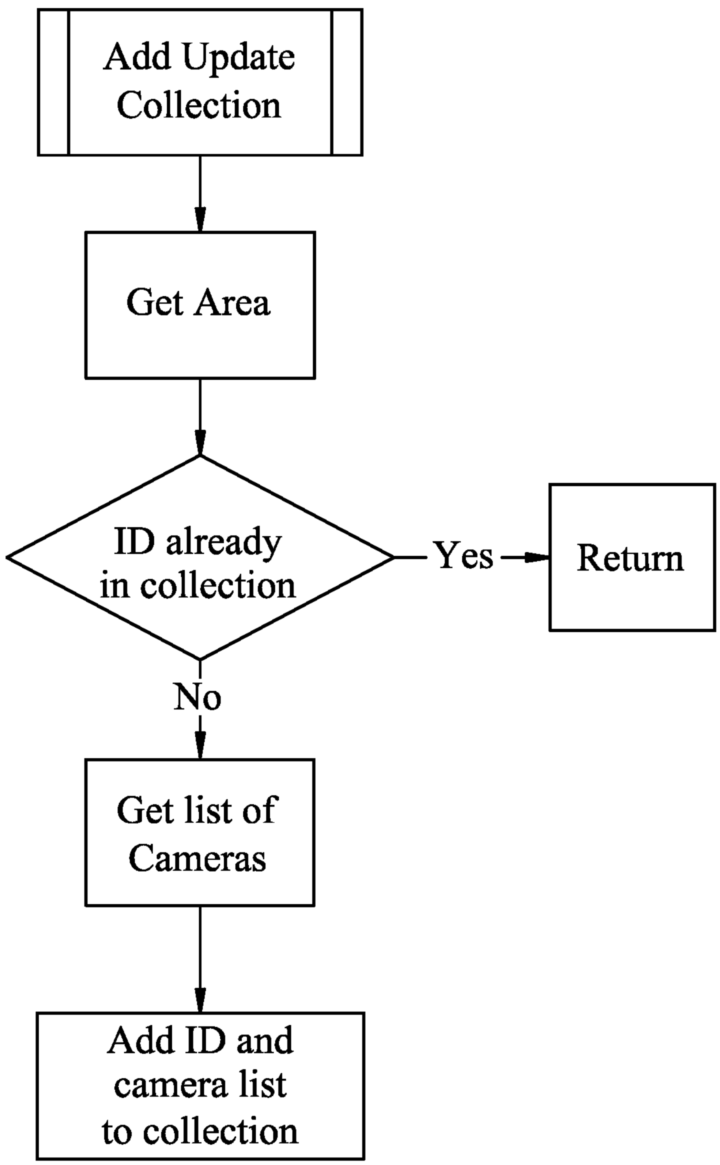
Figure 200S:
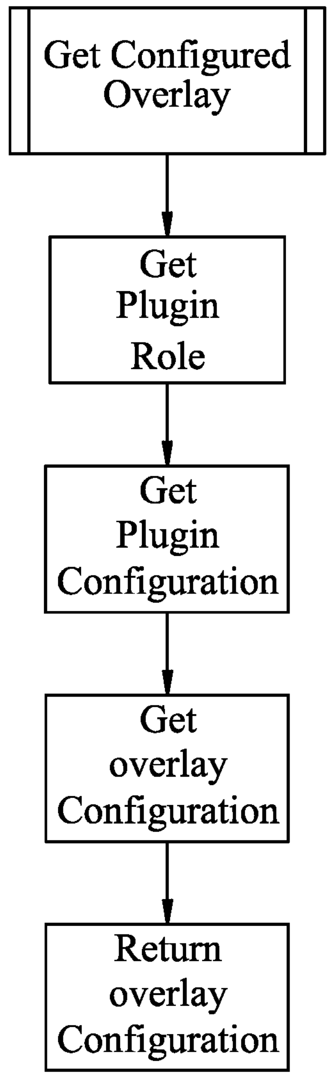
Figure 200T:
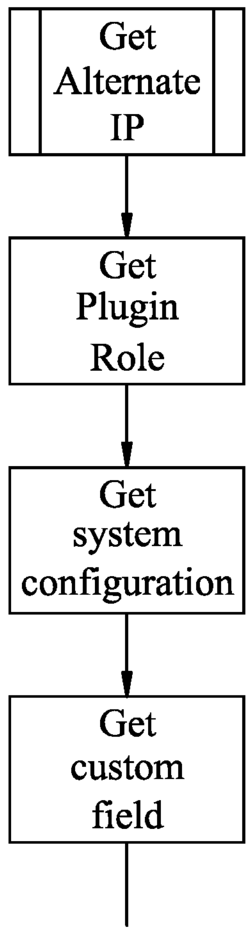
Figure 200U:
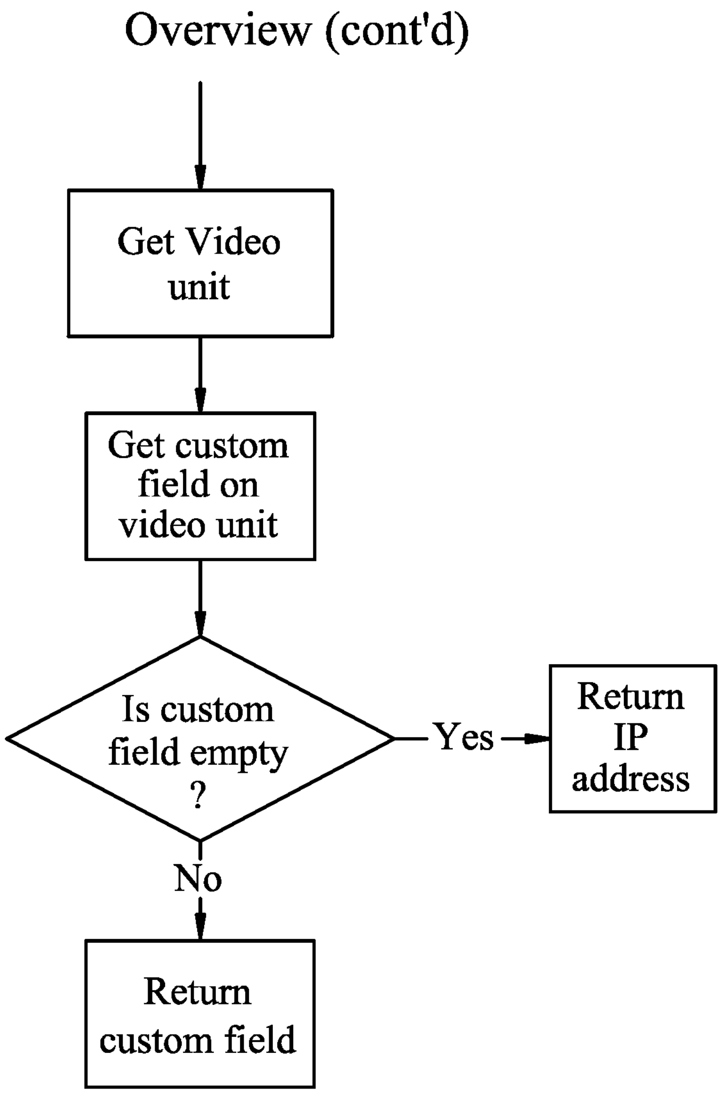
Figure 200V:
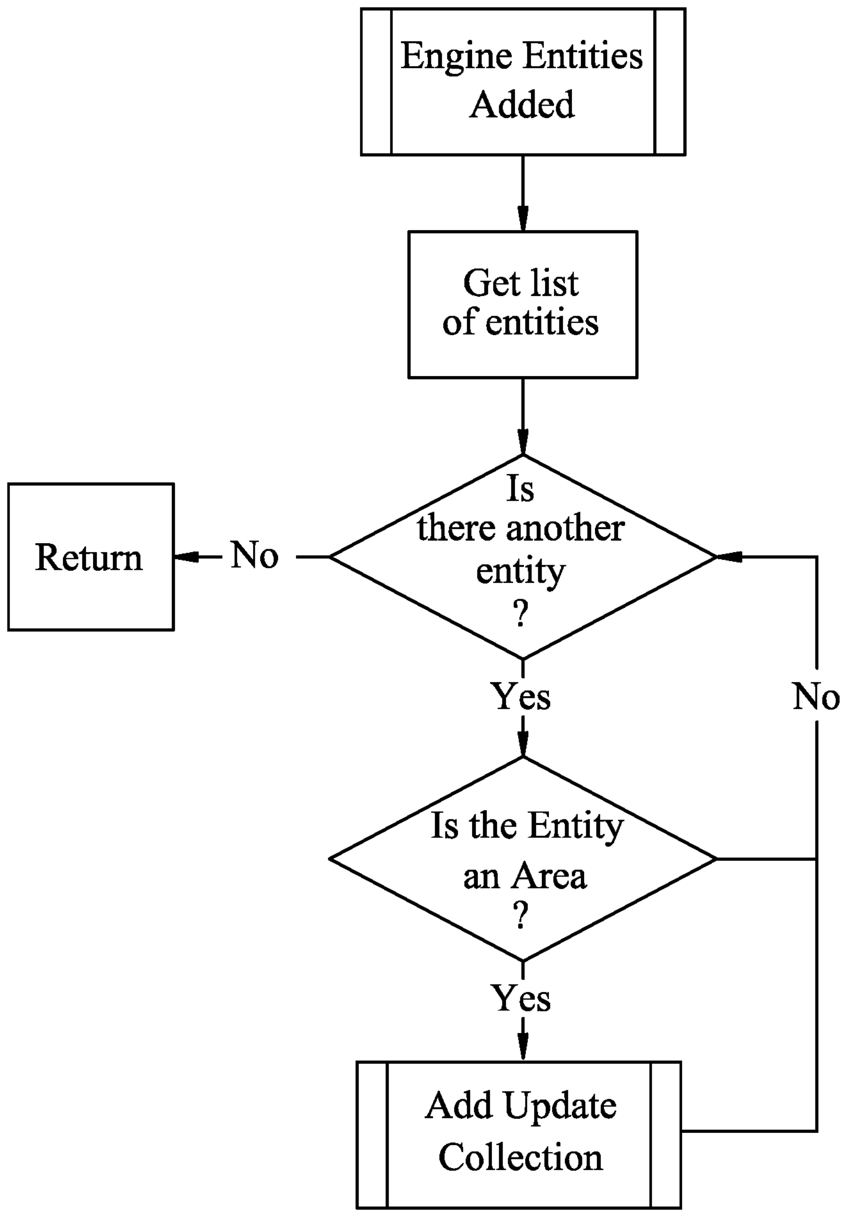
Figure 200W:
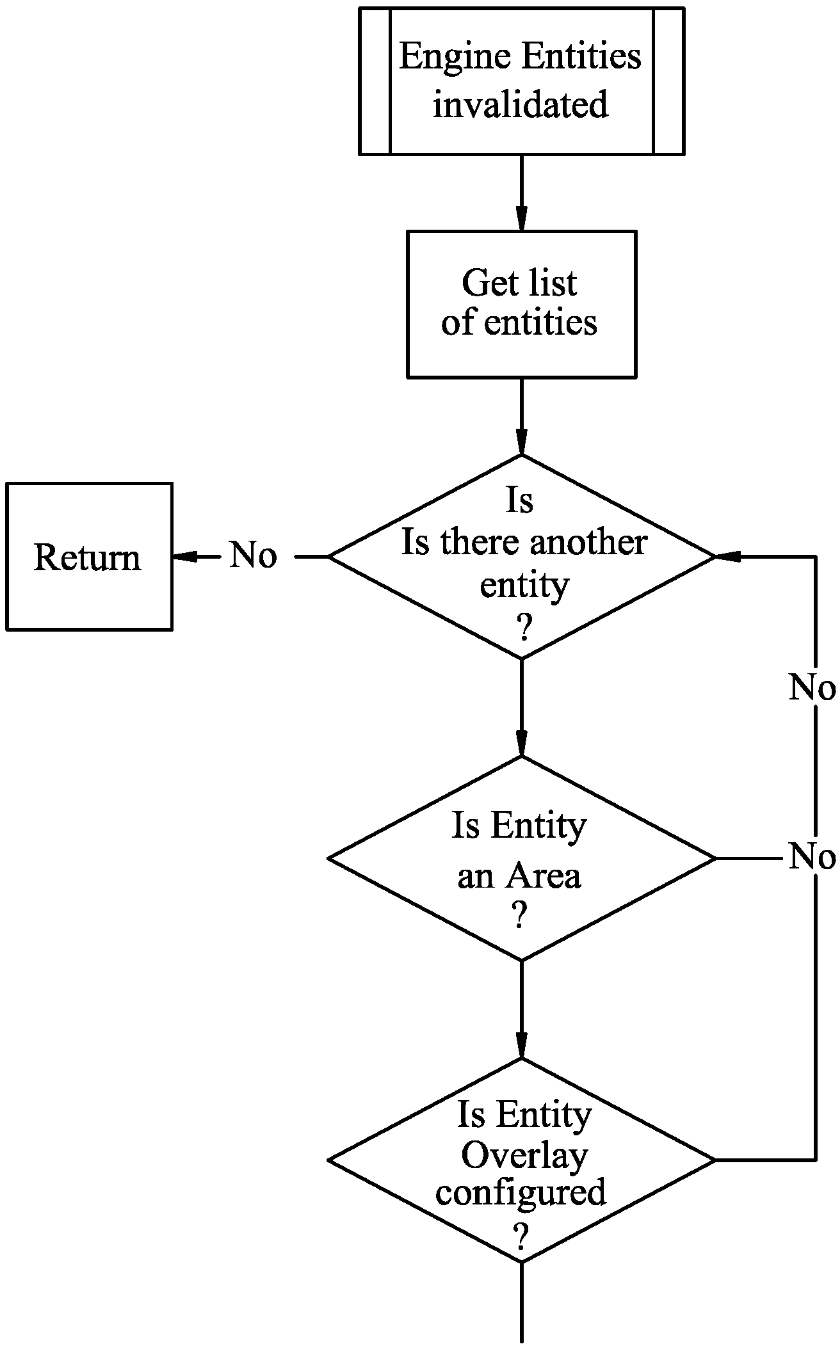
Figure 200X:
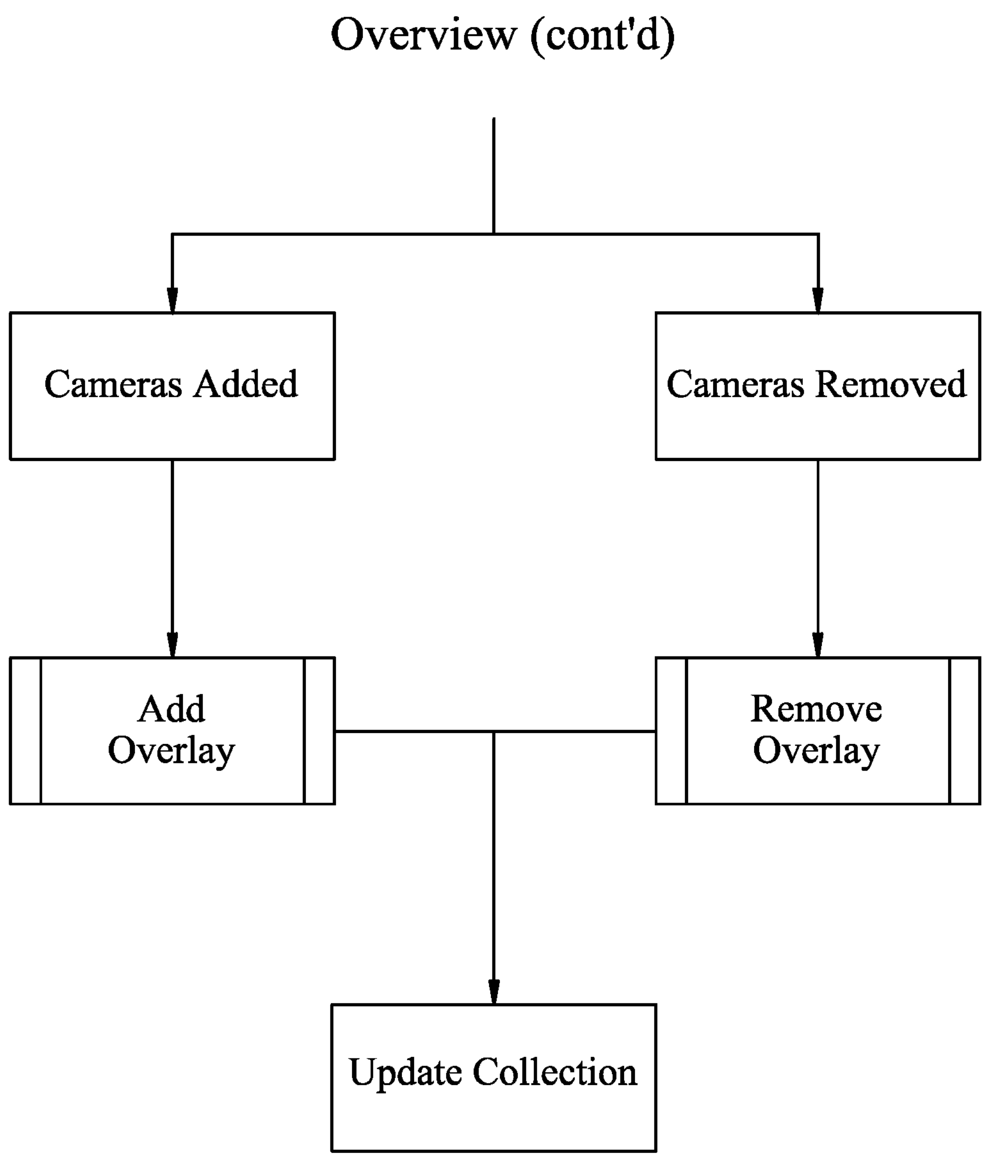
Figure 200Y:
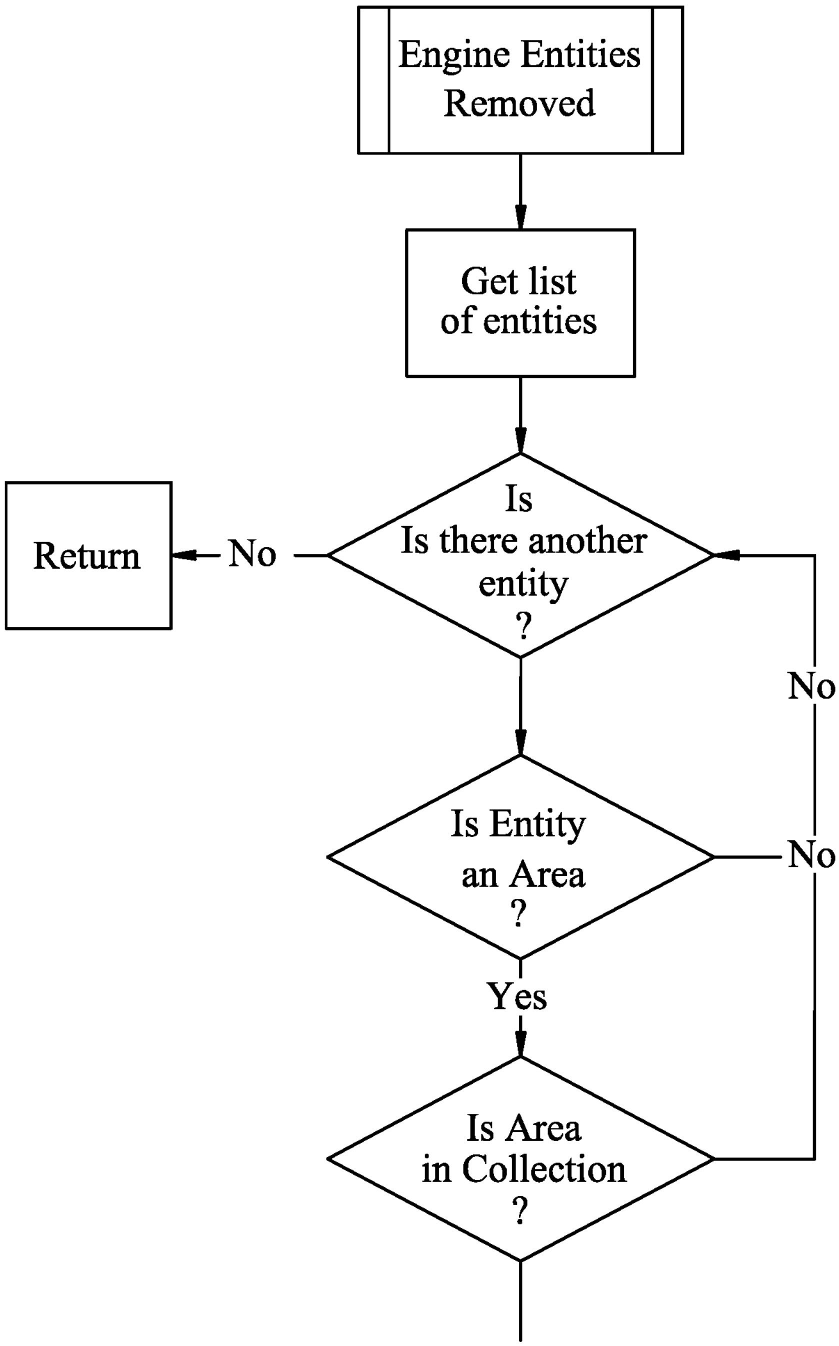
Figure 200Z:
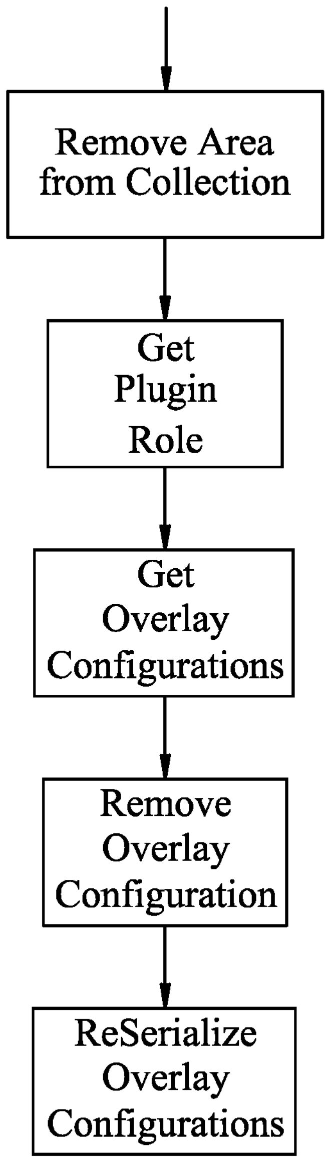
Figure 201:
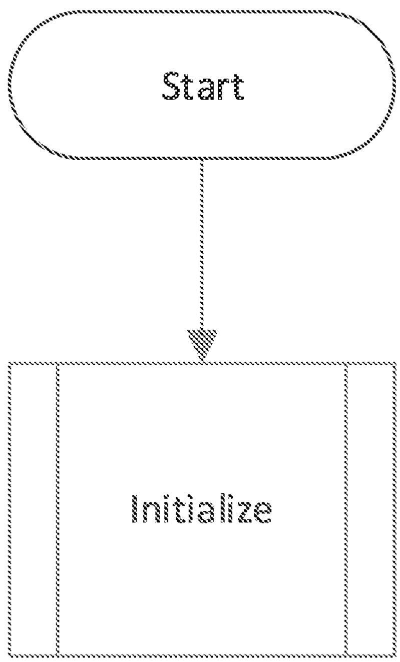
Figure 202:
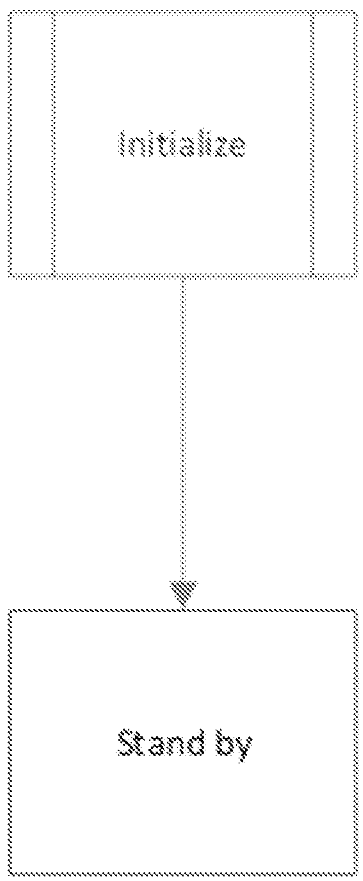
Figure 203:
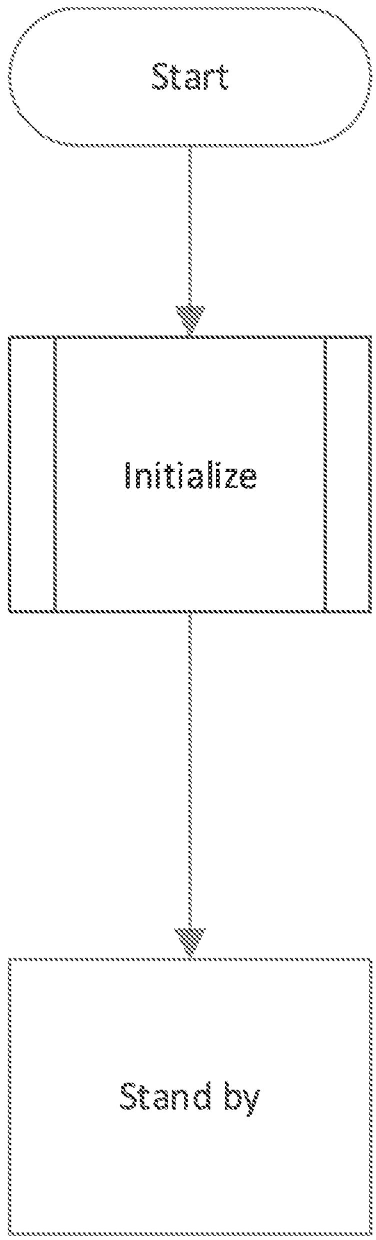
Figure 204:
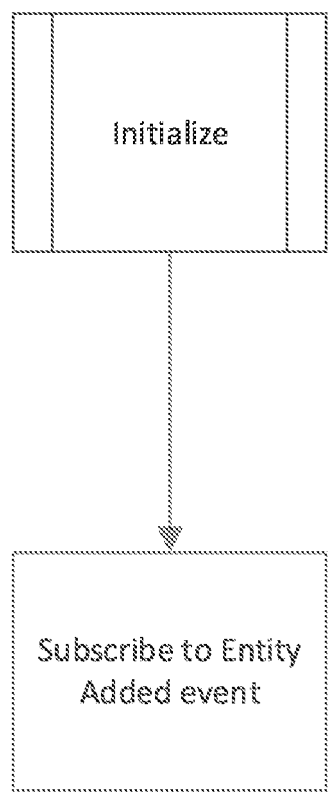
Figure 205:
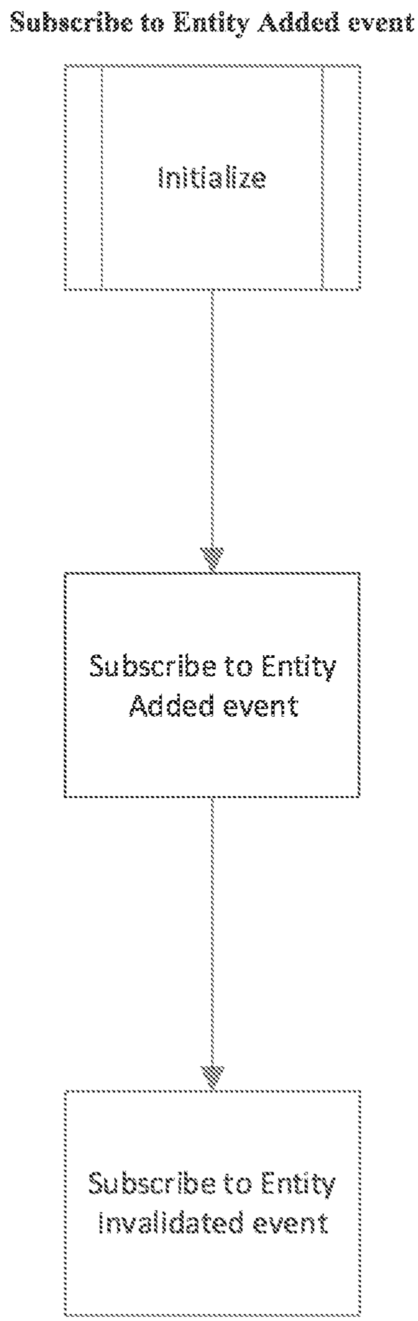
Figure 206:
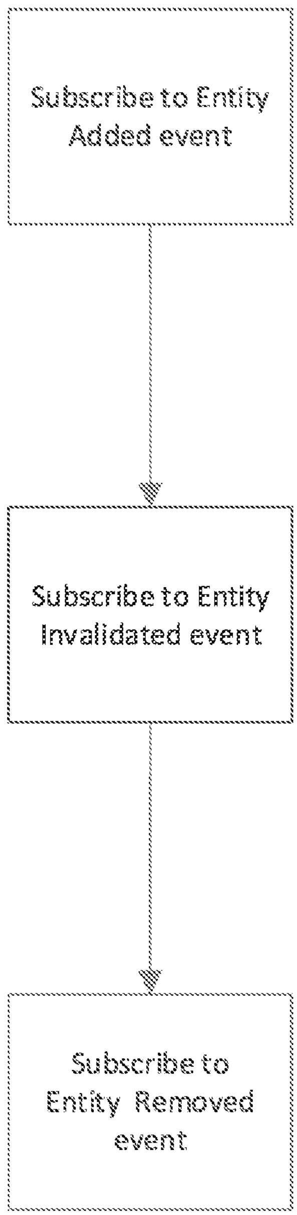
Figure 207:
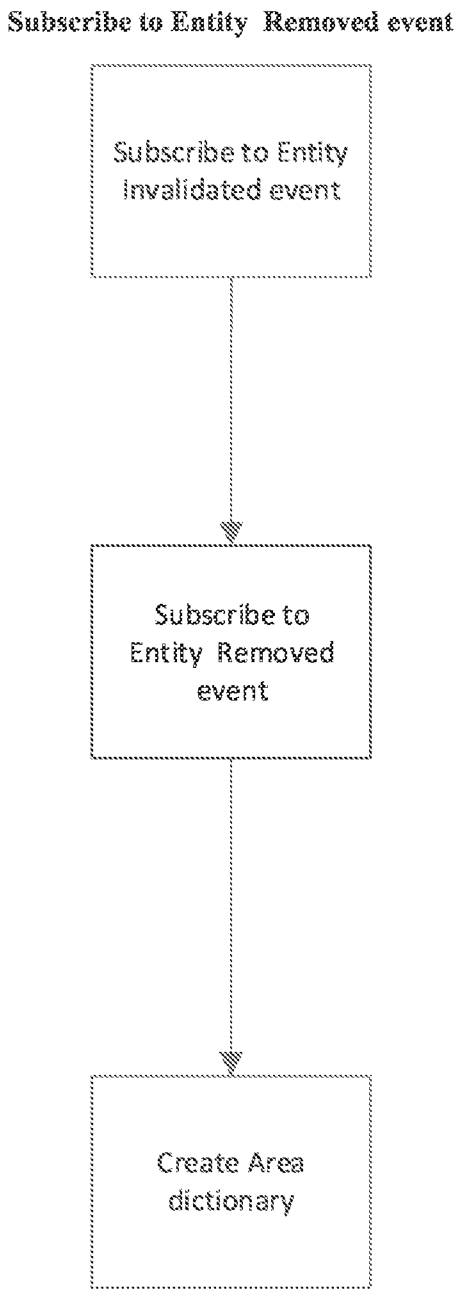
Figure 208:
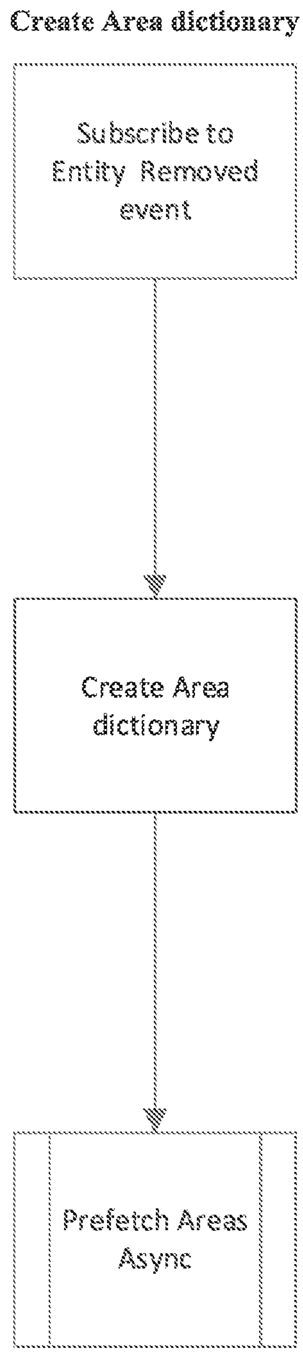
Figure 209:
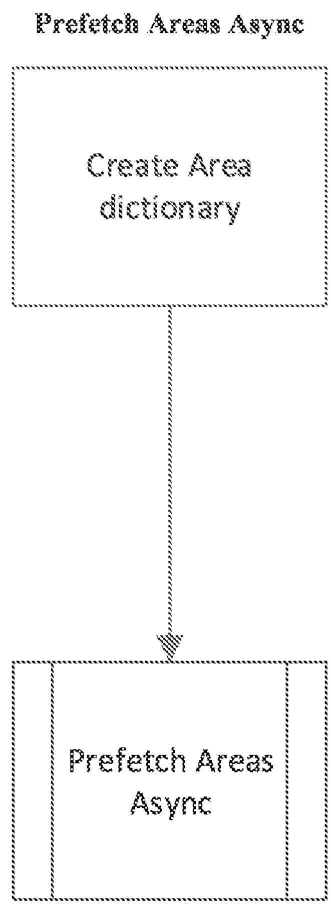
Figure 210:
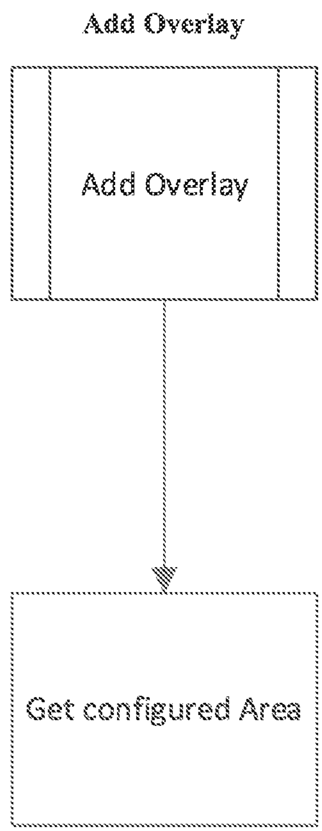
Figure 211:
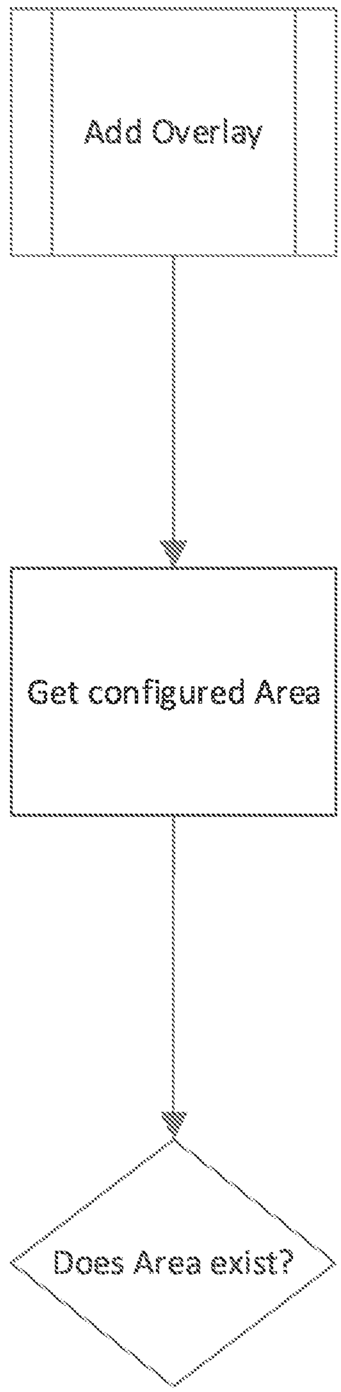
Figure 212:
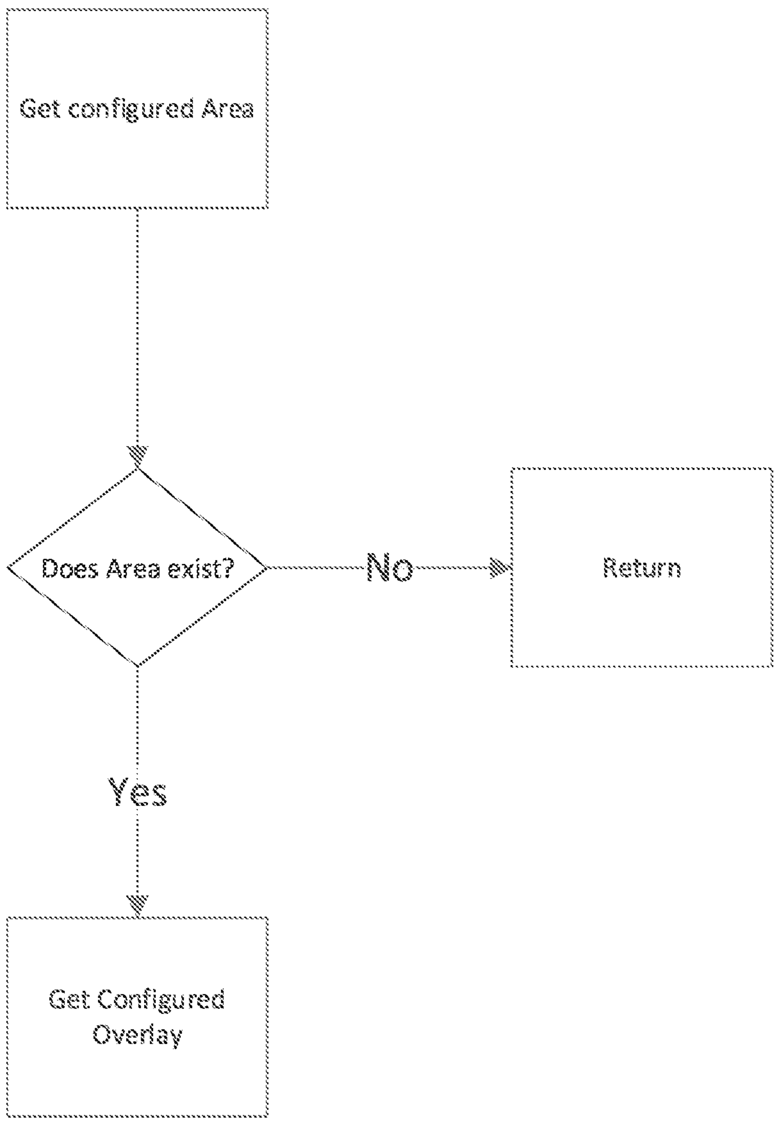
Figure 213:
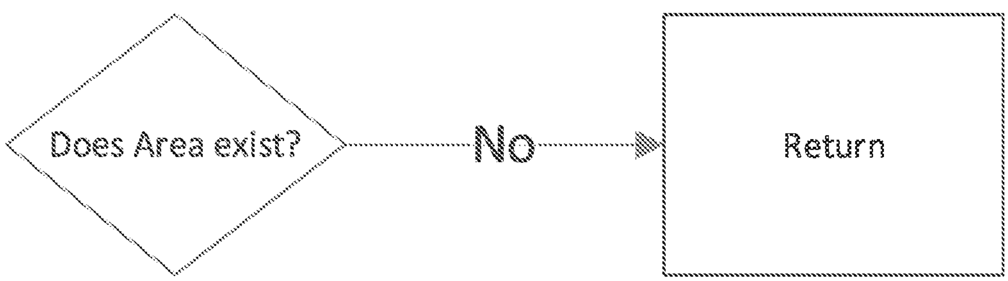
Figure 214:
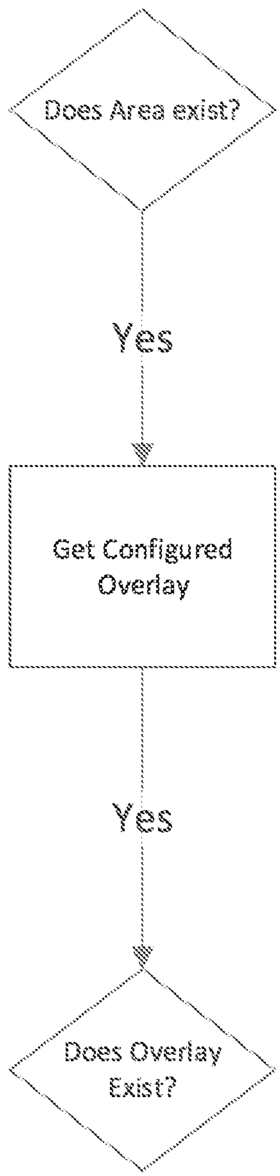
Figure 215:
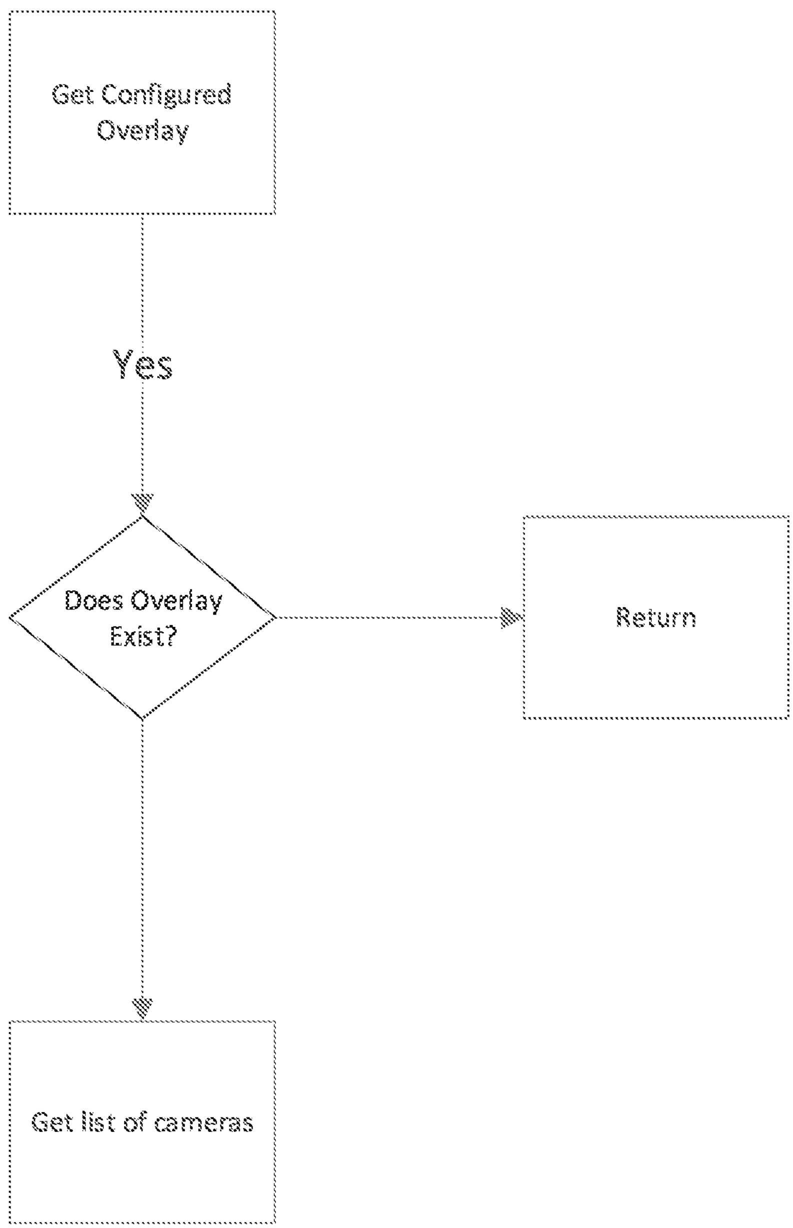
Figure 216:
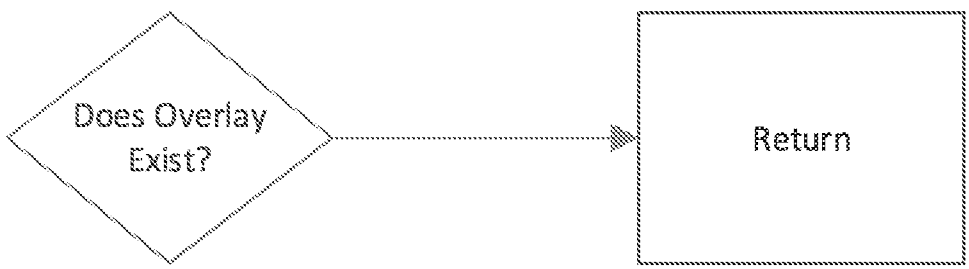
Figure 217:
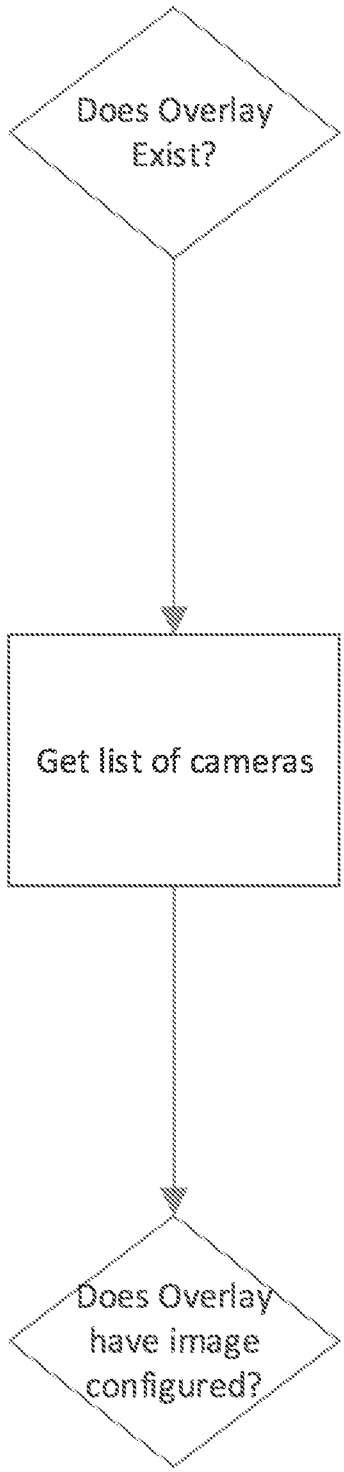
Figure 218:
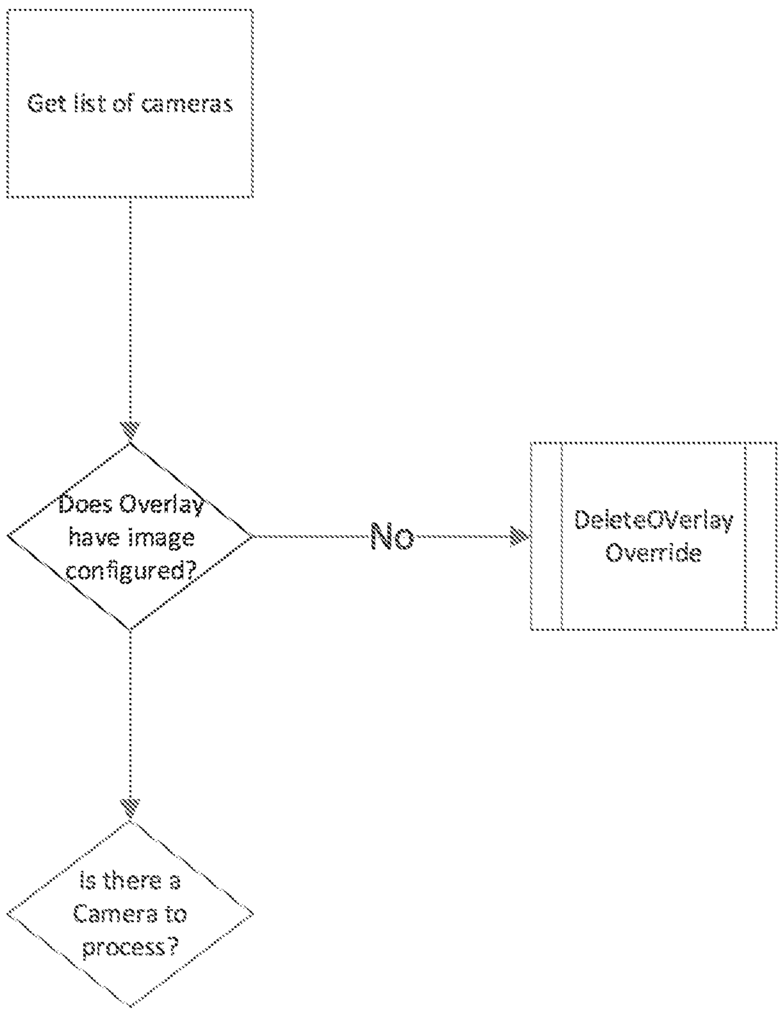
Figure 219:
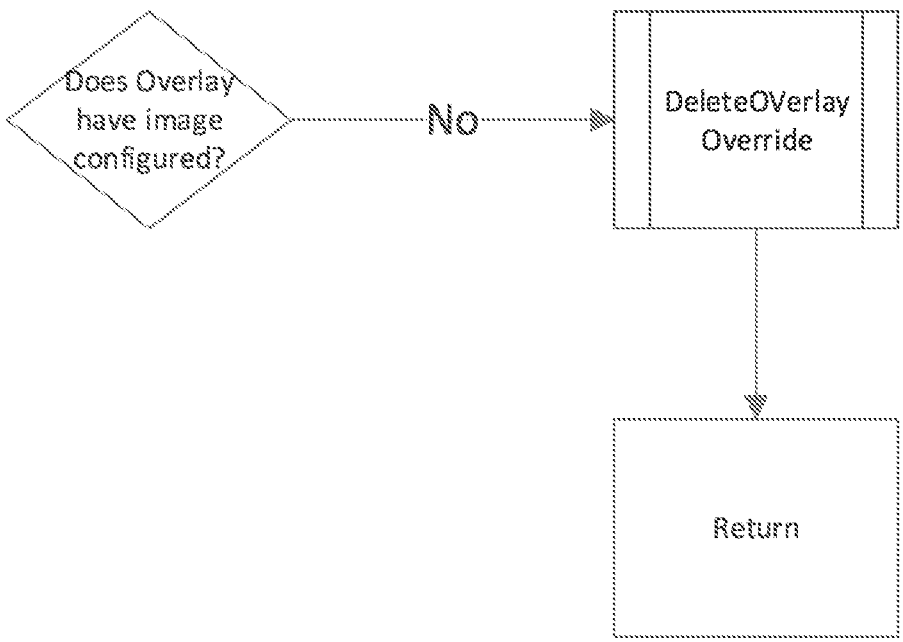
Figure 220:
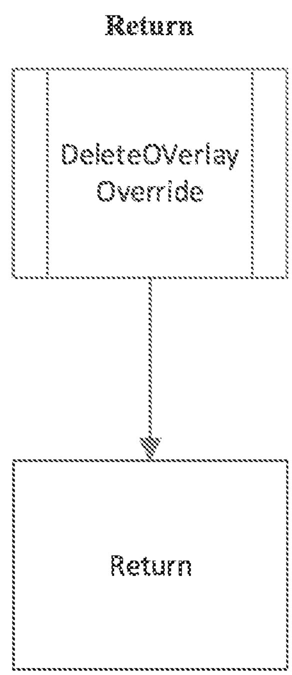
Figure 221:
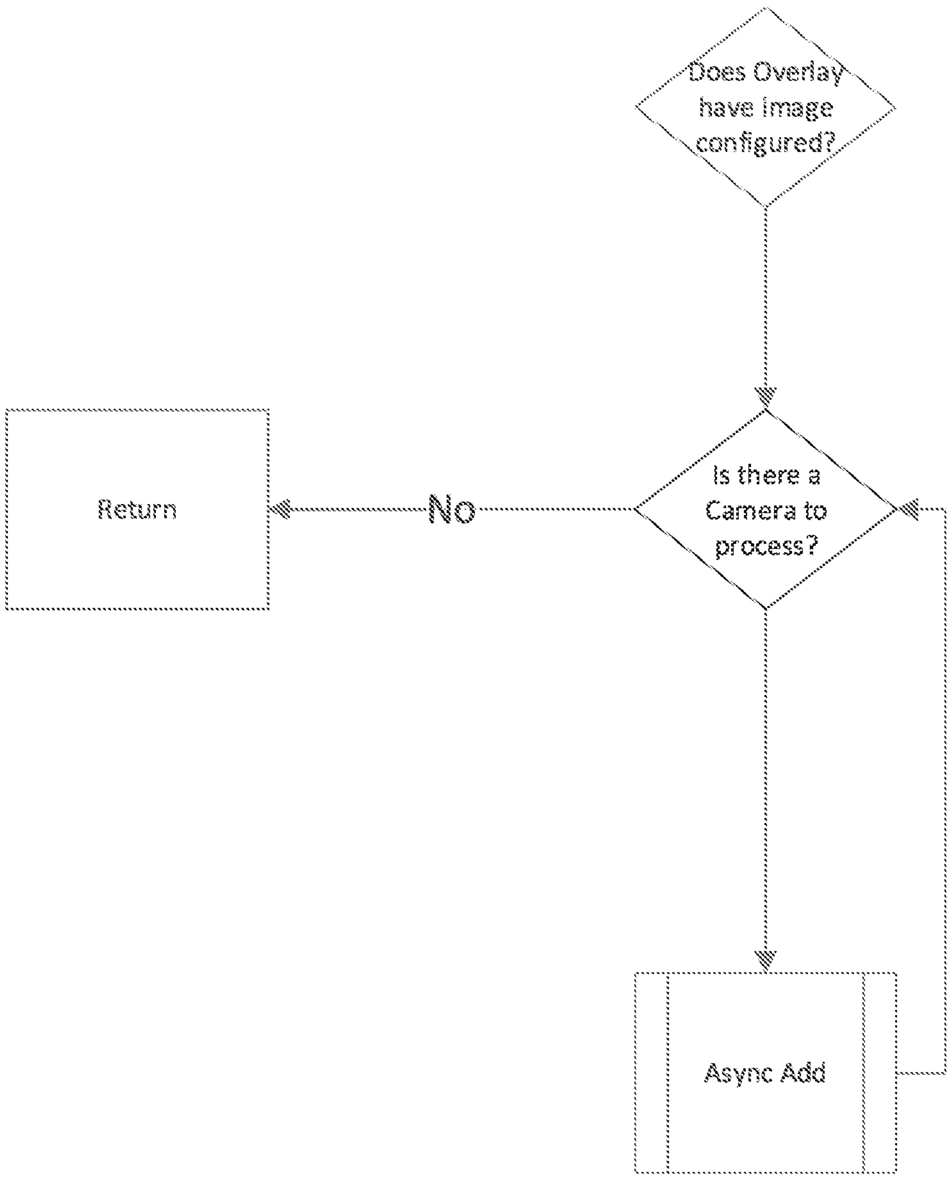
Figure 222:
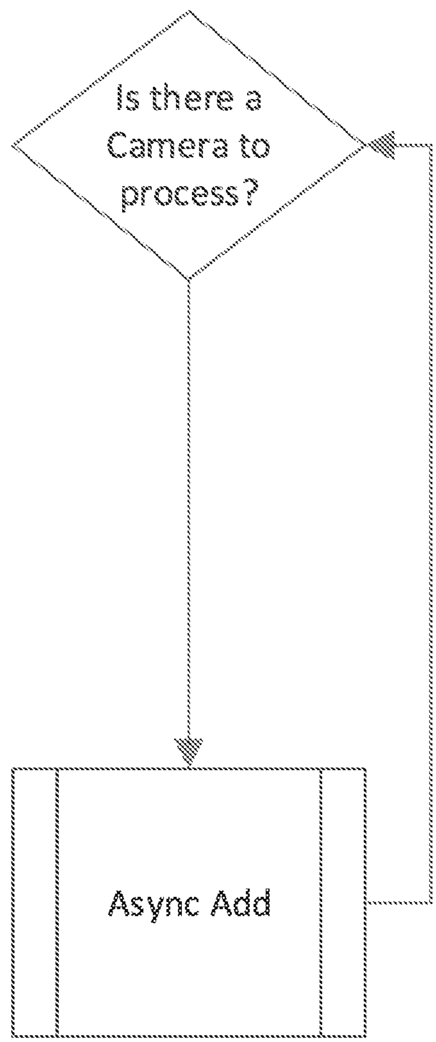
Figure 223:
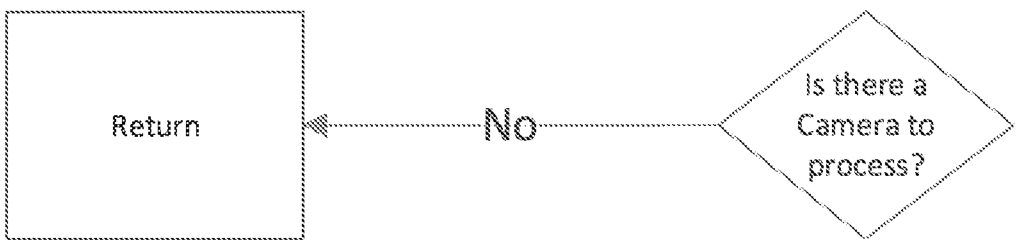
Figure 224:
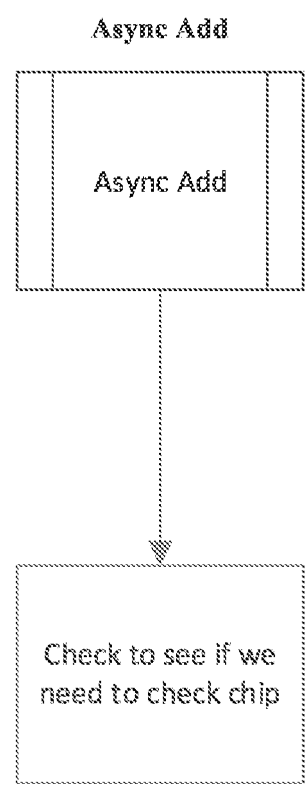
Figure 225:
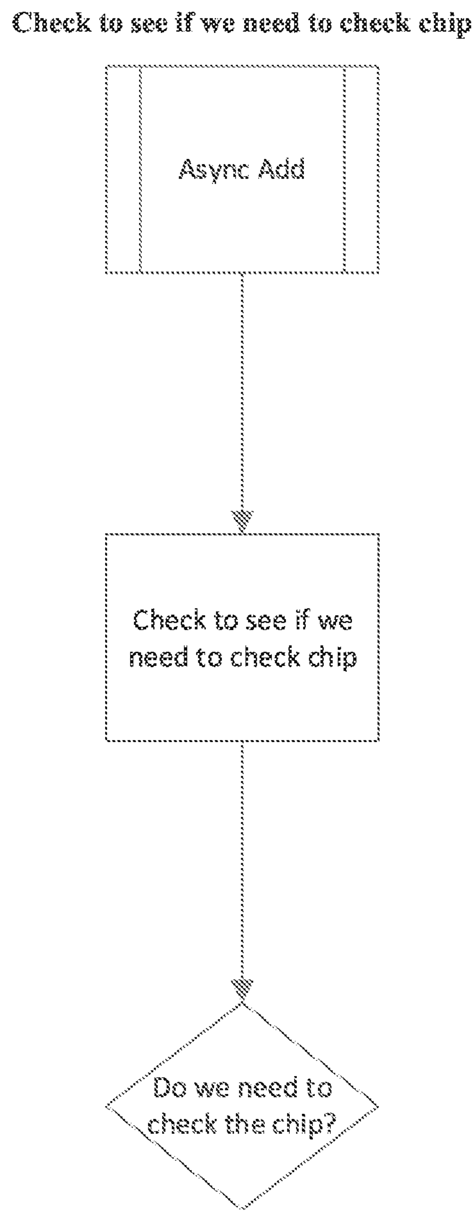
Figure 226:
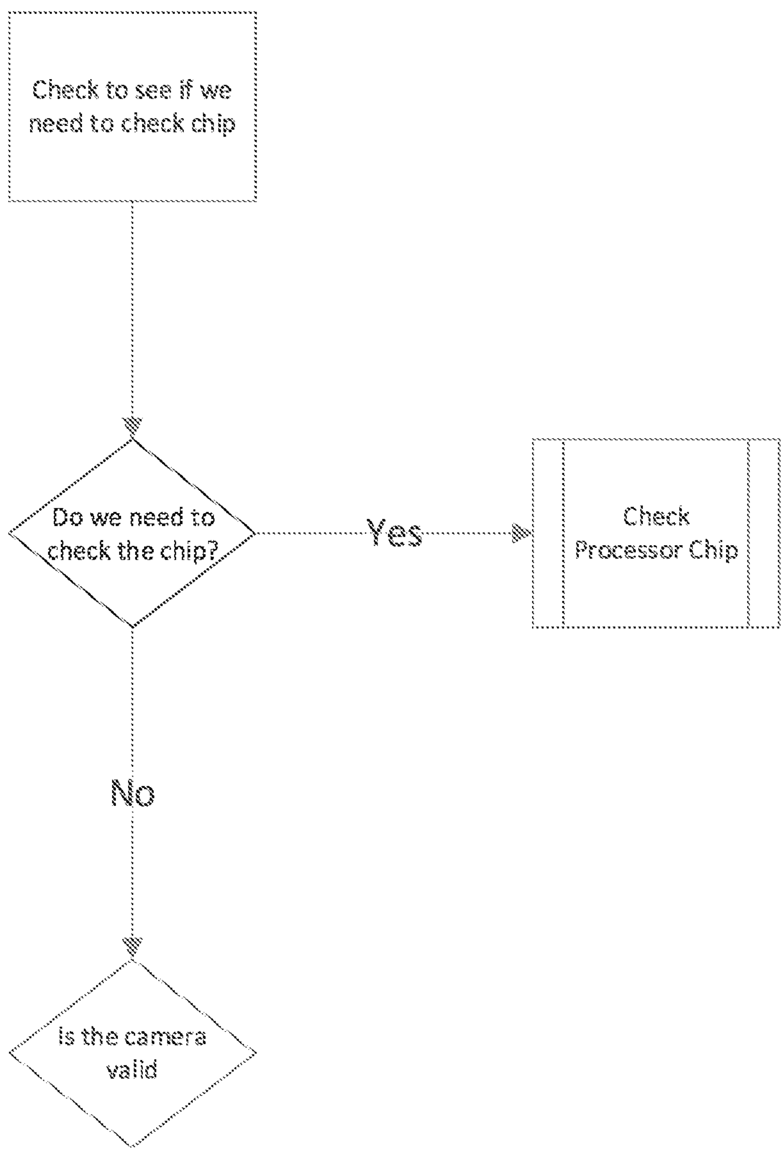
Figure 227:
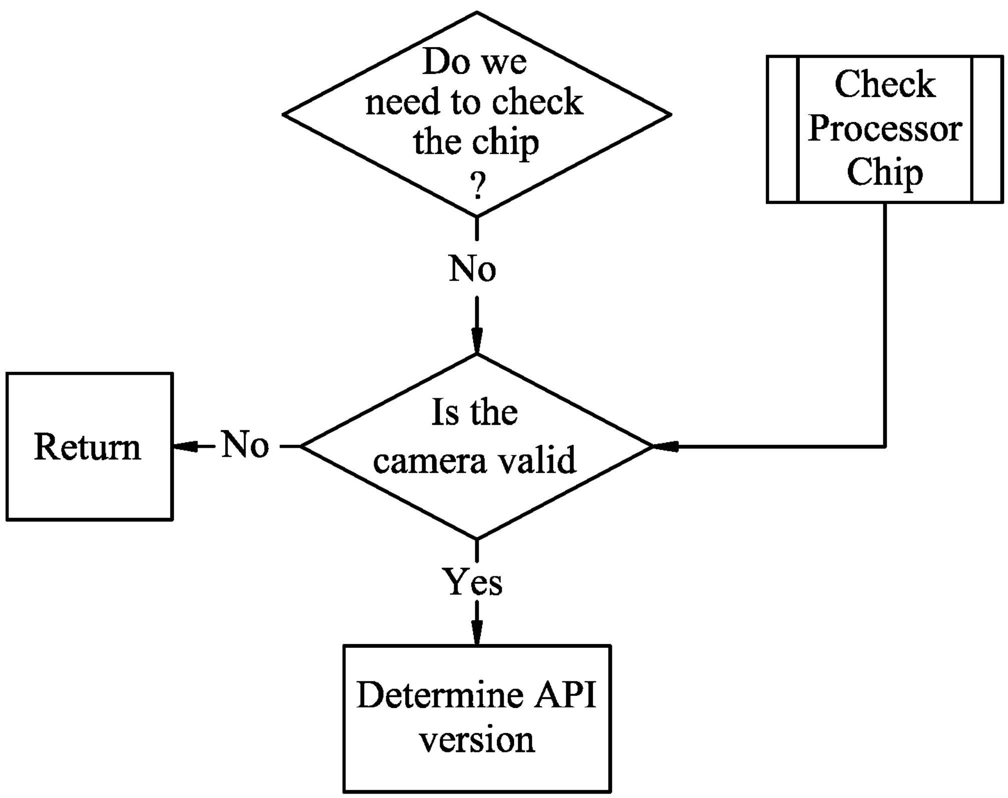
Figure 228:
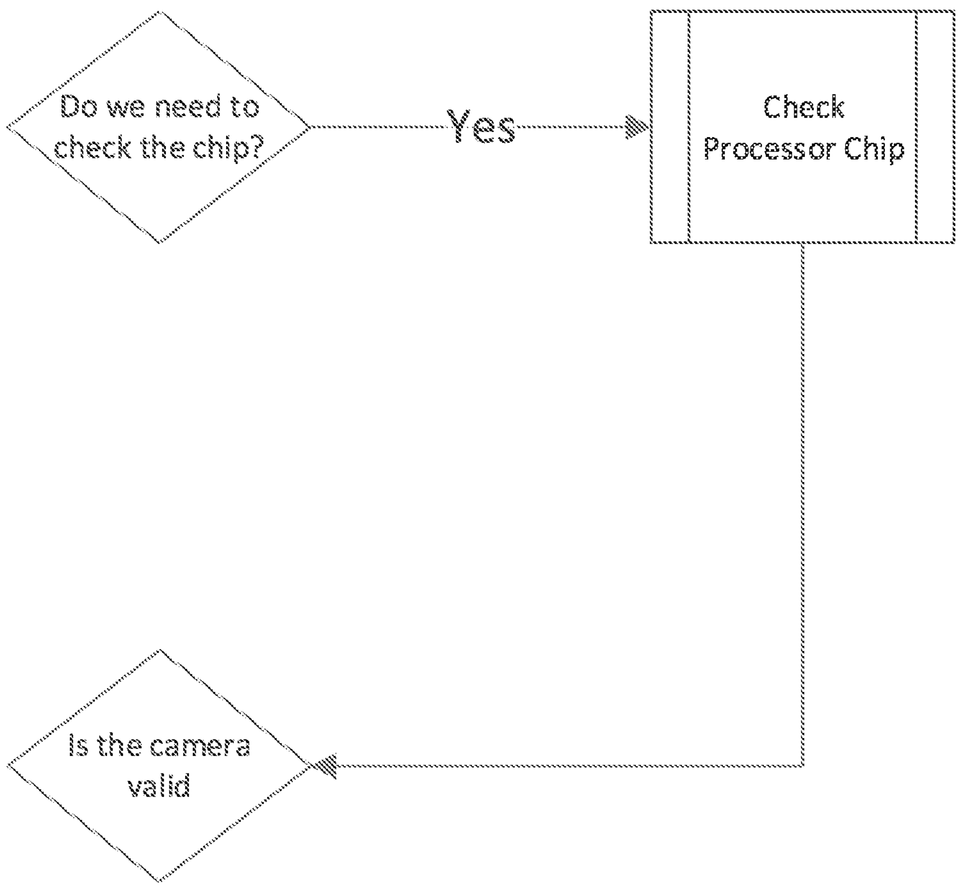
Figure 229:
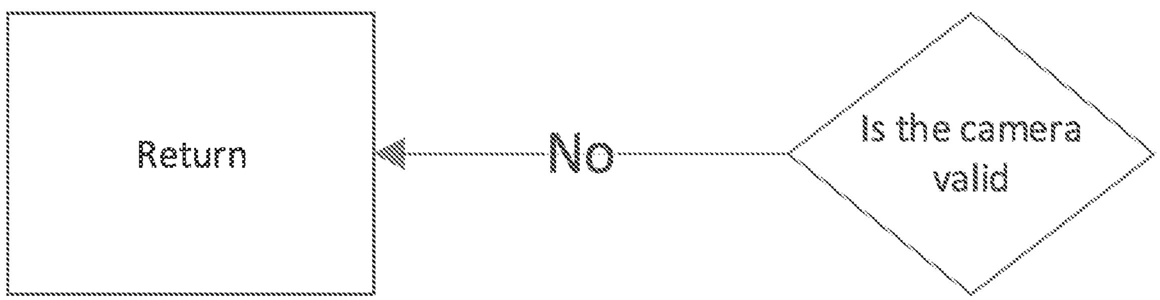
Figure 230:
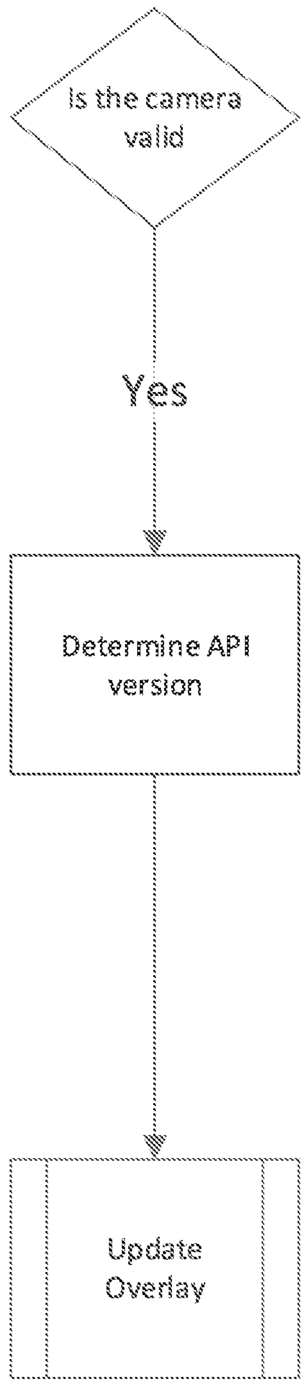
Figure 231:
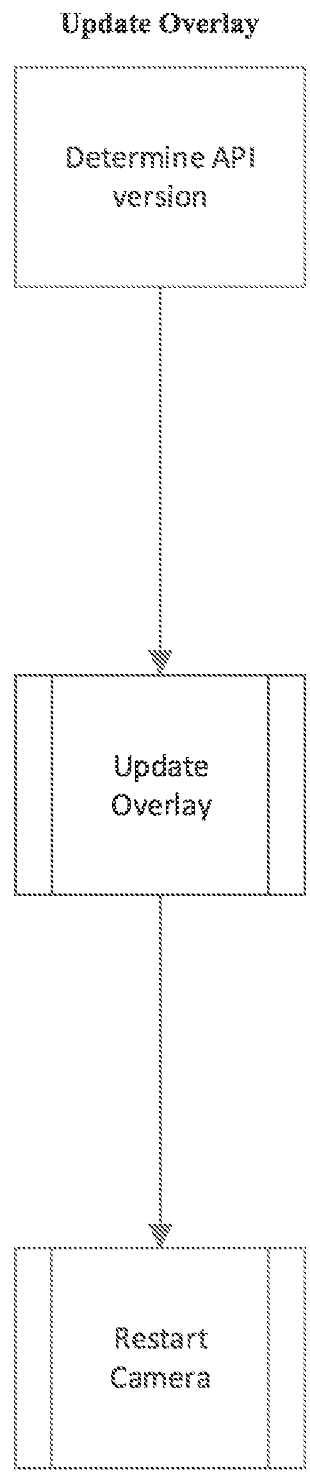
Figure 232:
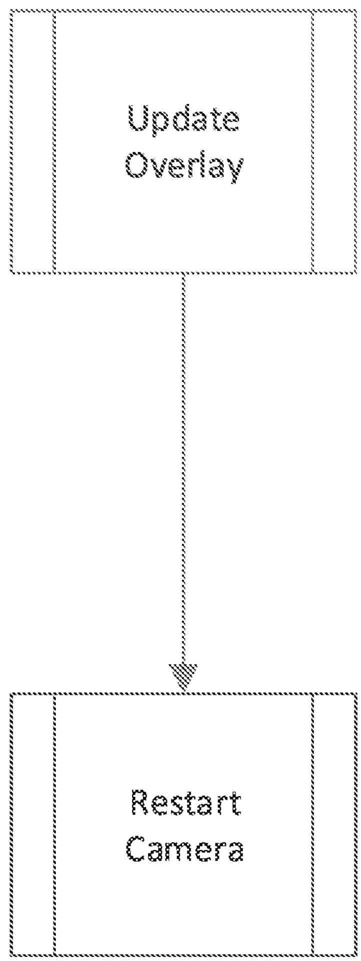
Figure 233:
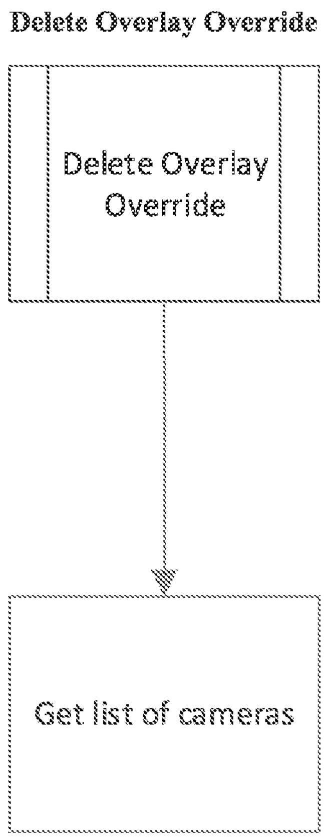
Figure 234:
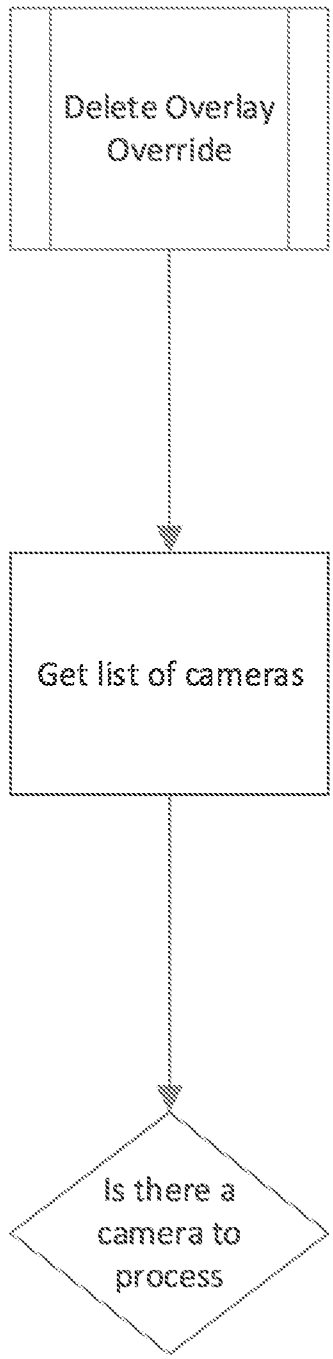
Figure 235:
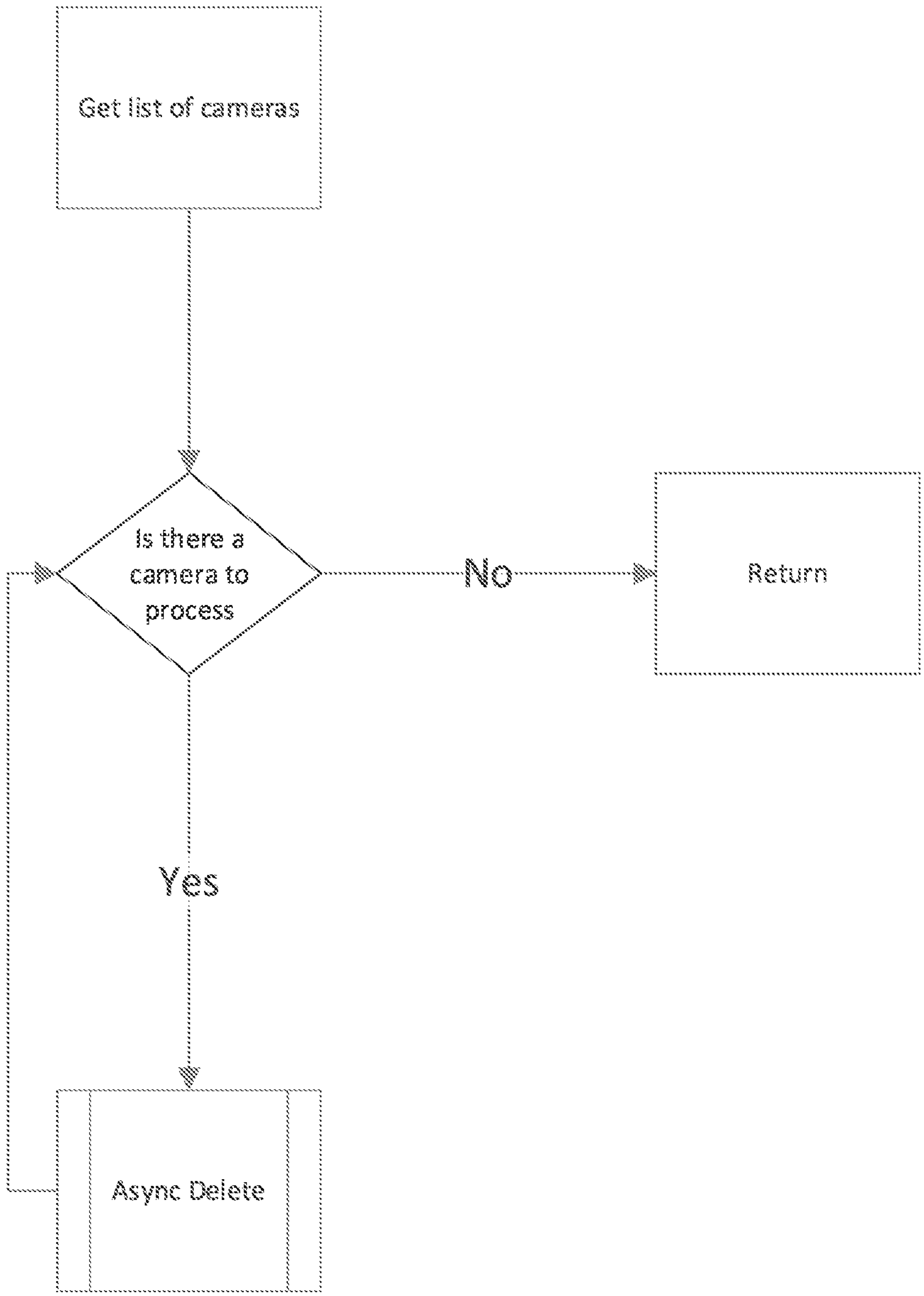
Figure 236:
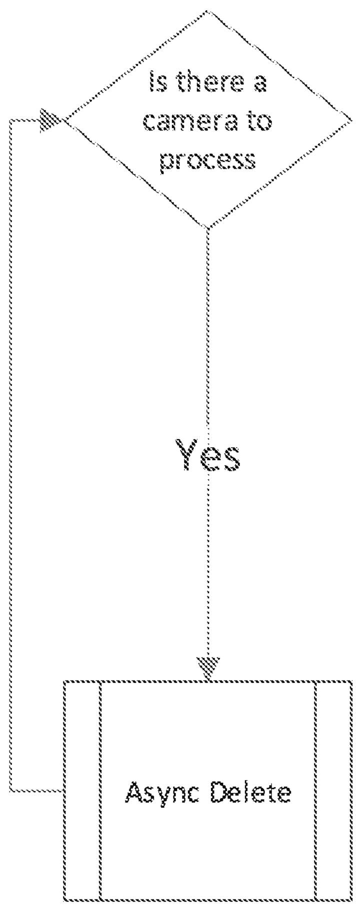
Figure 237:
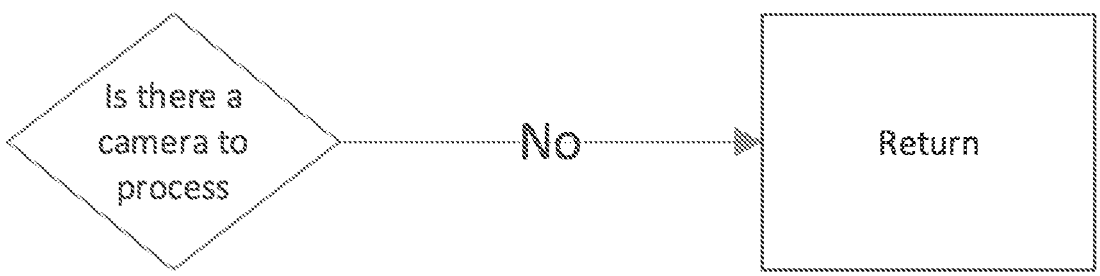
Figure 238:
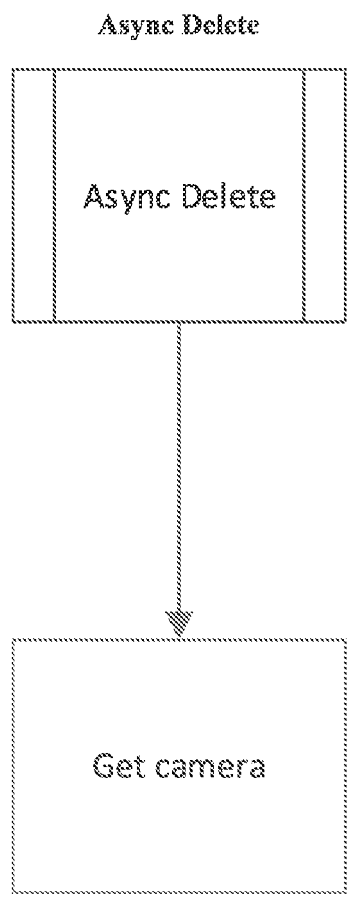
Figure 239:
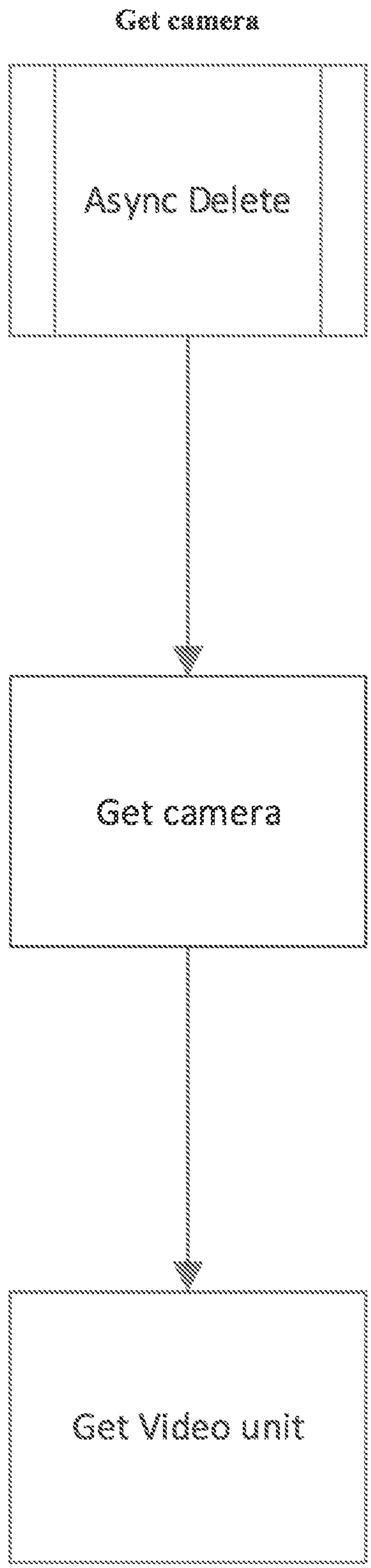
Figure 240:
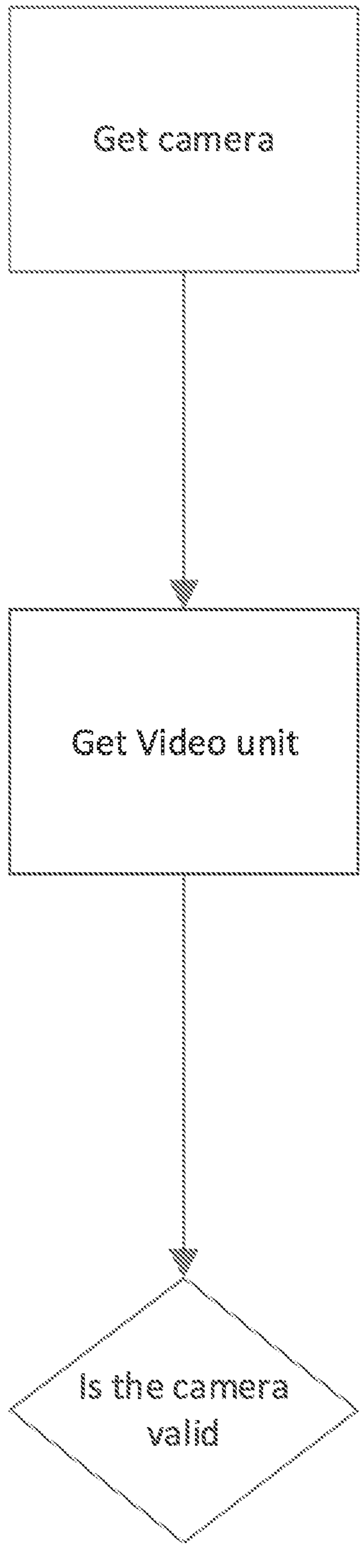
Figure 241:
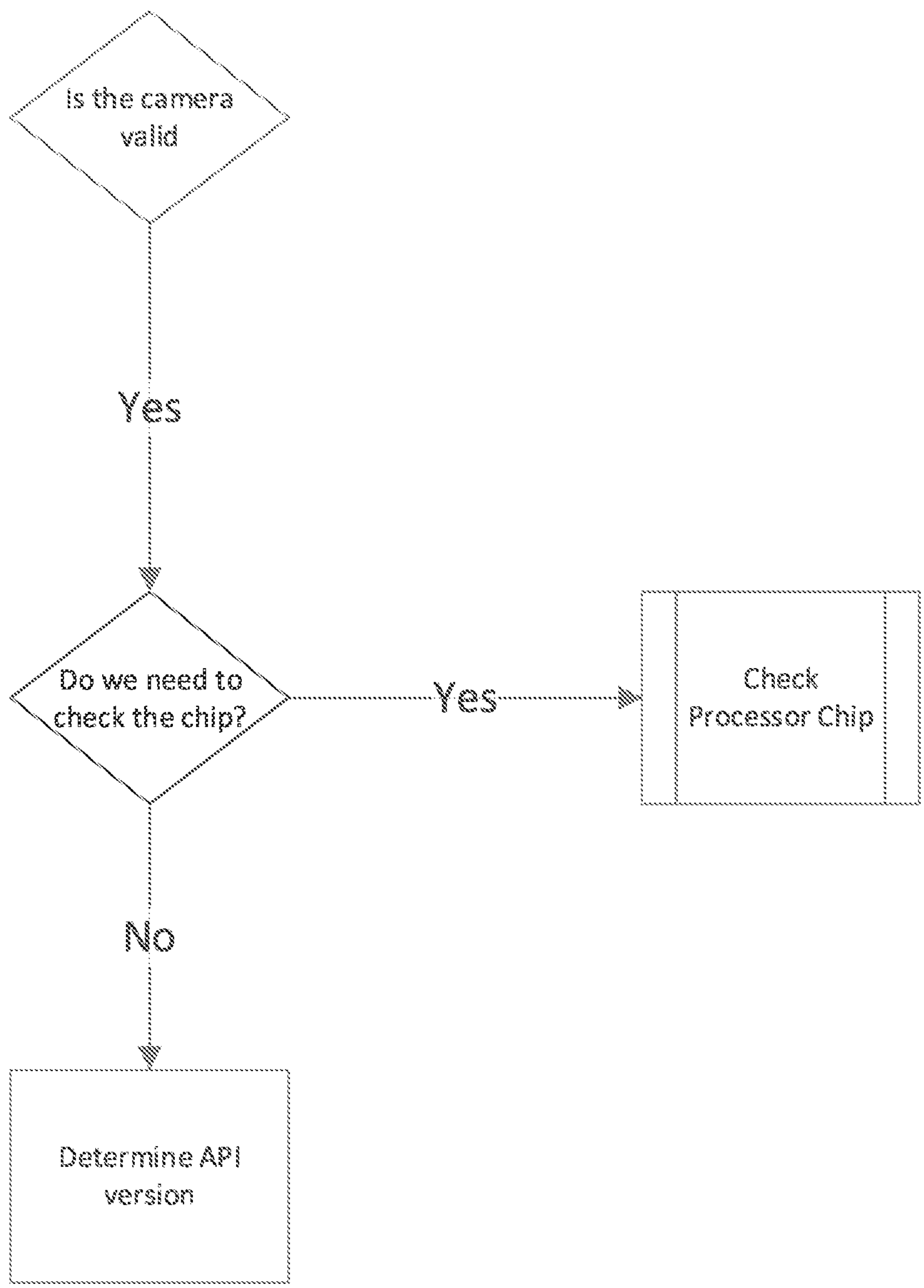
Figure 242:
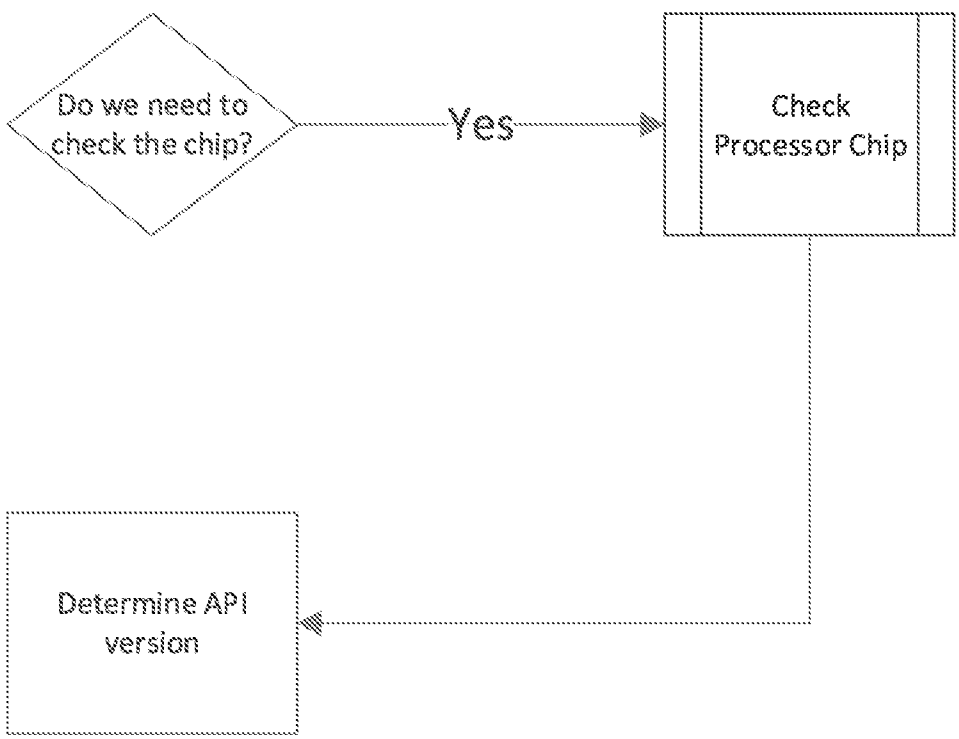
Figure 243:
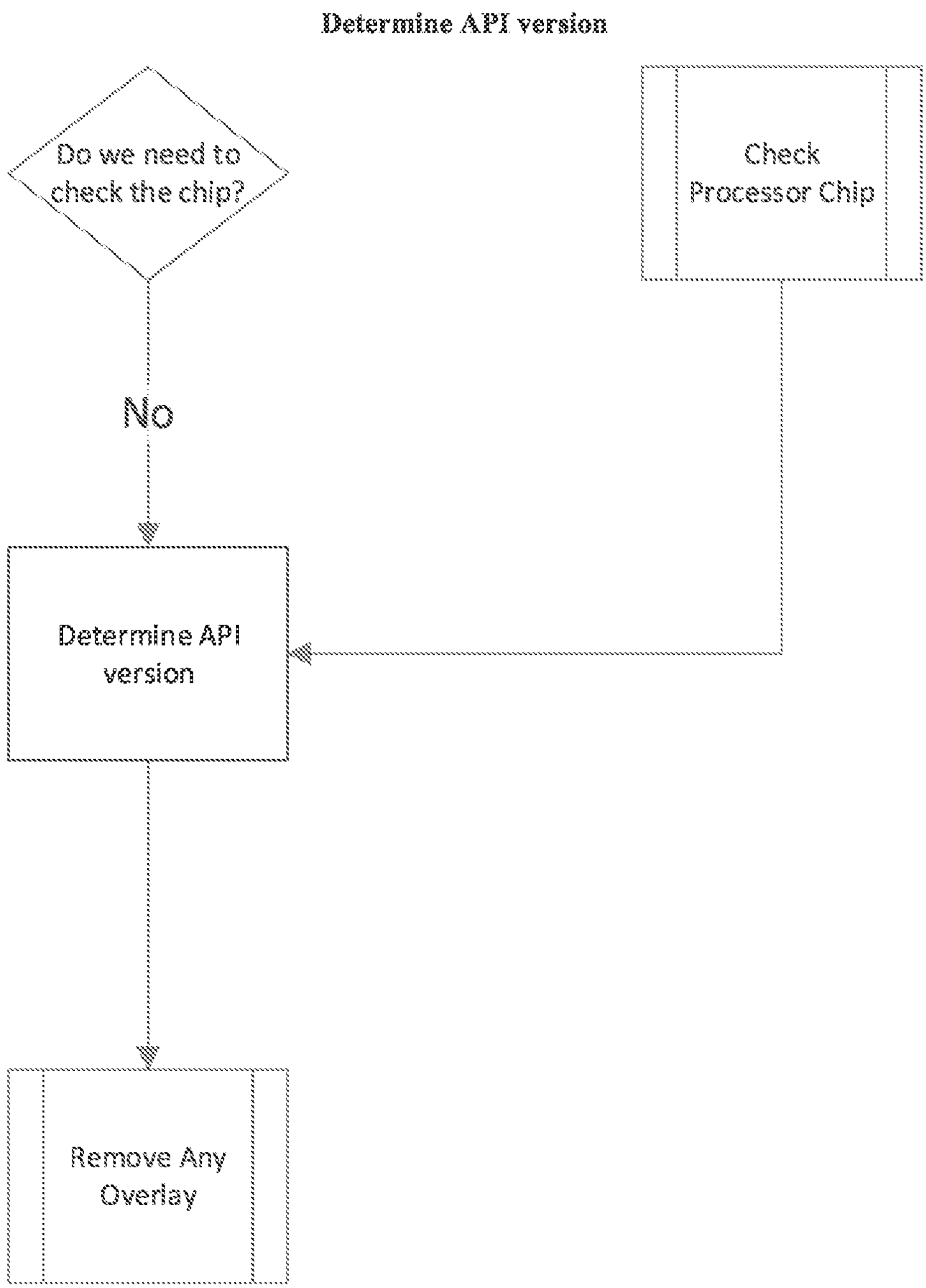
Figure 244:
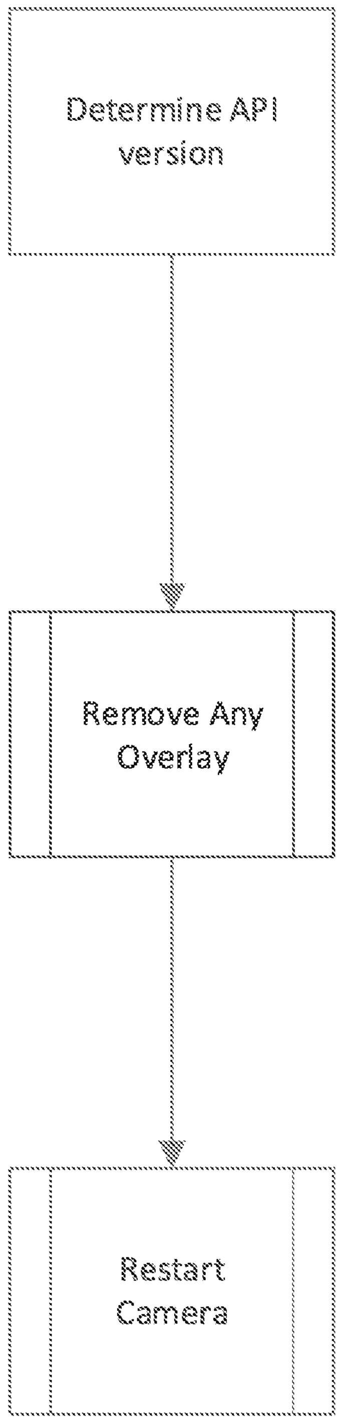
Figure 245:
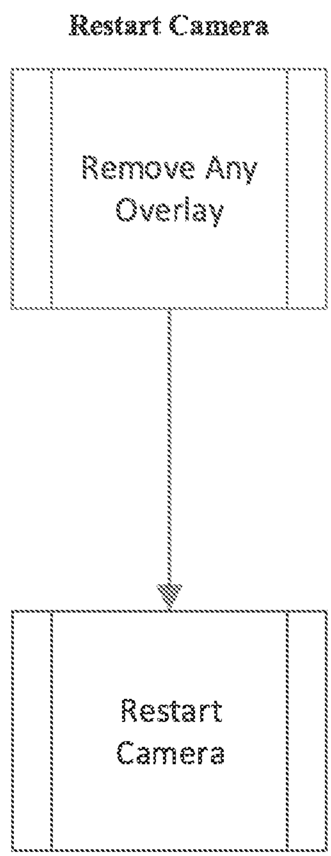
Figure 246:
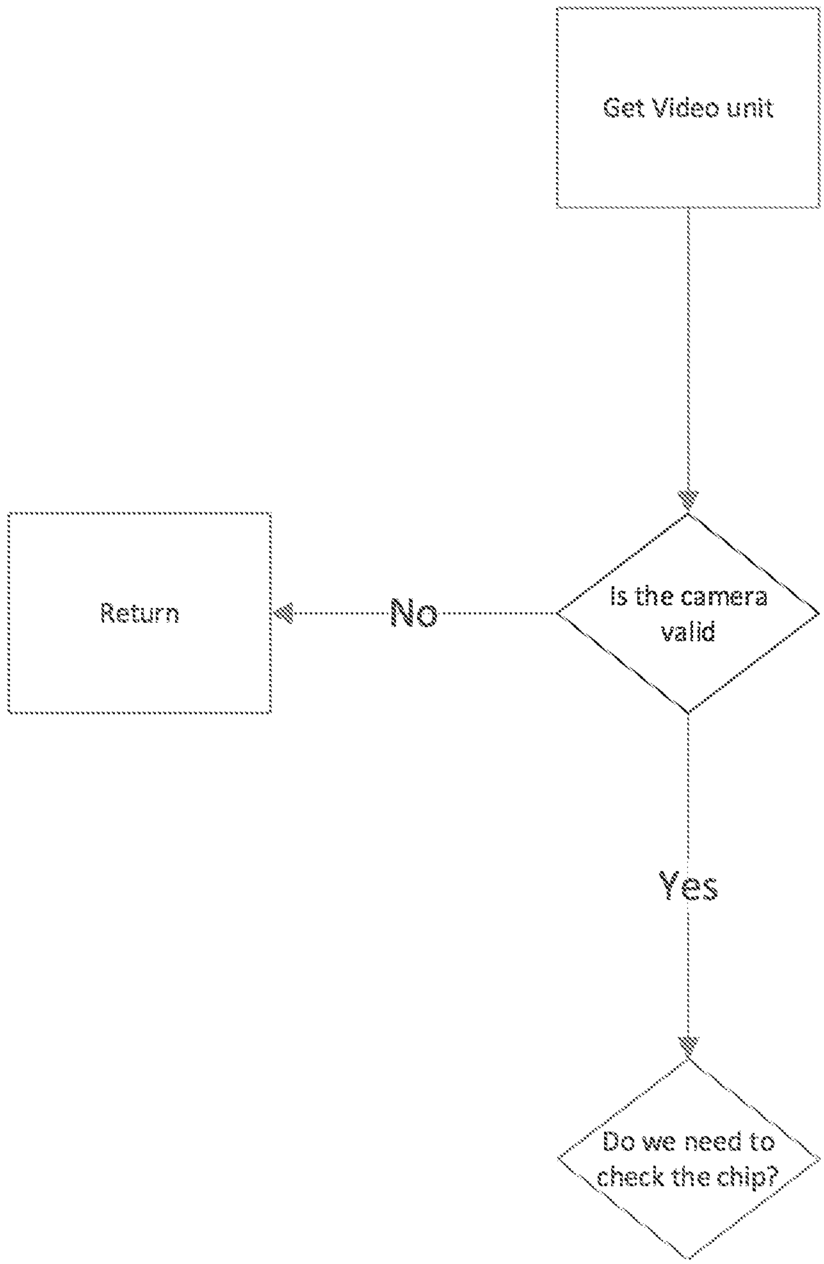
Figure 247:
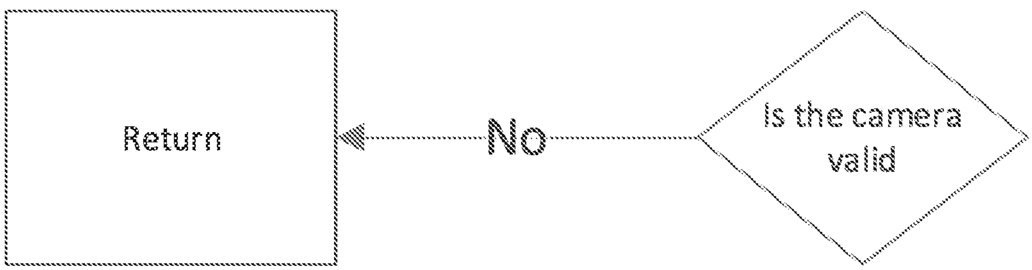
Figure 248:
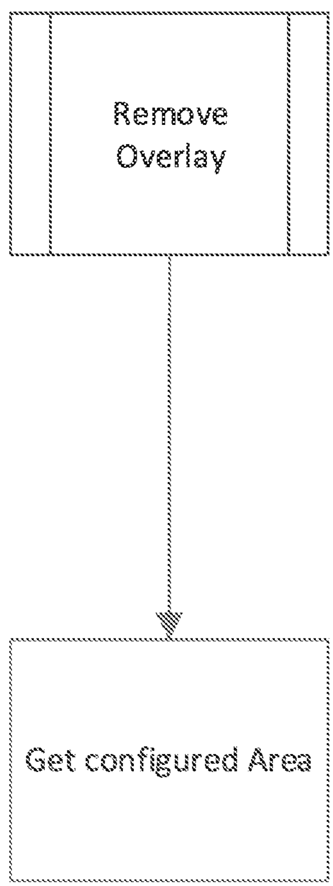
Figure 249:
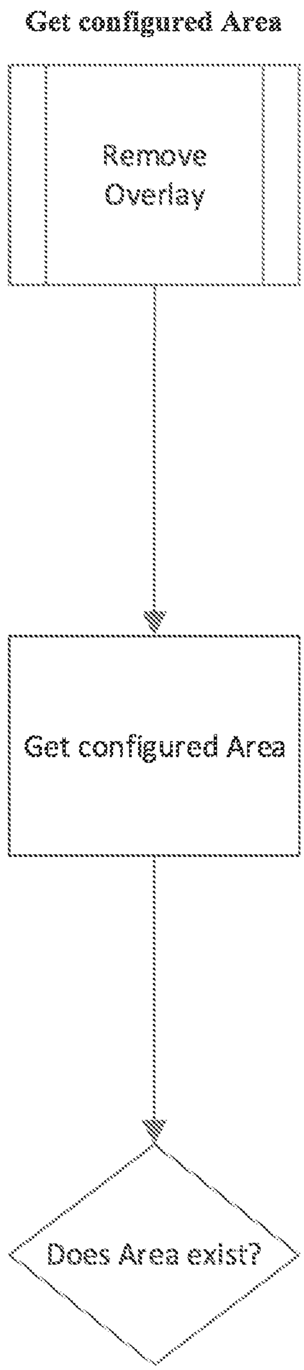
Figure 250:
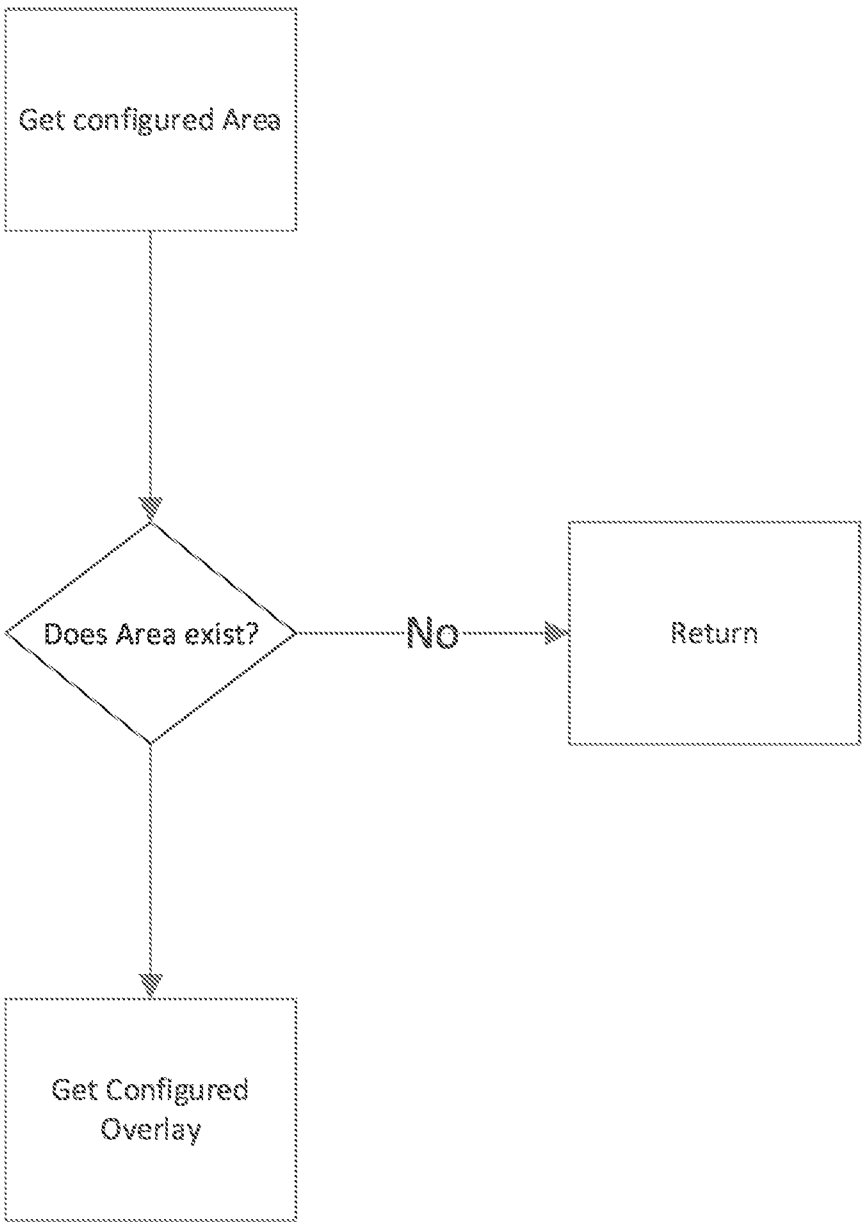
Figure 251:
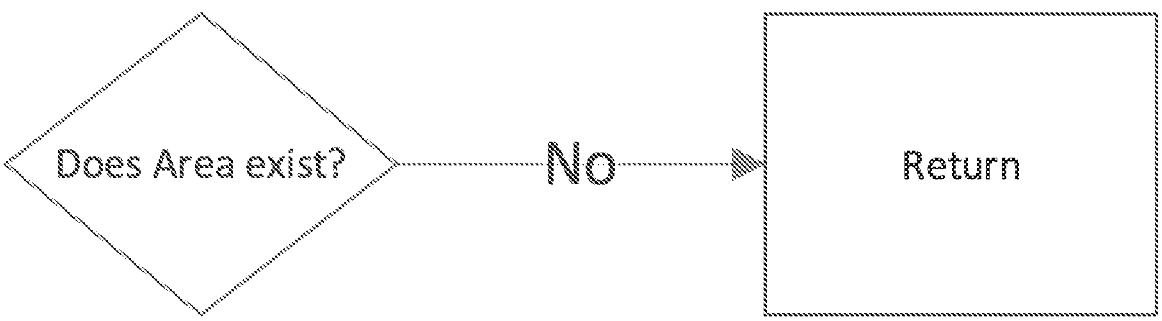
Figure 252:
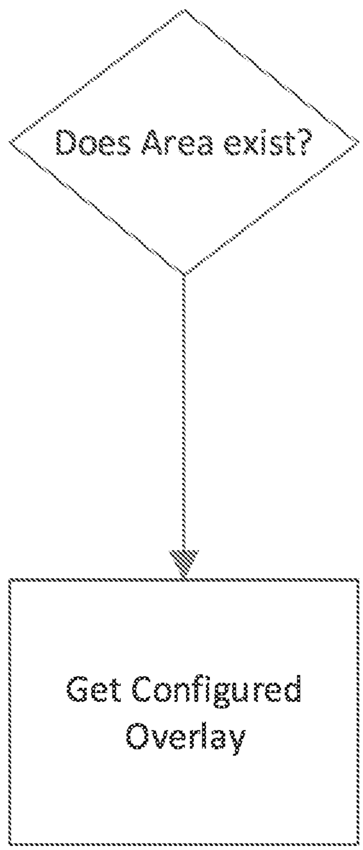
Figure 253:
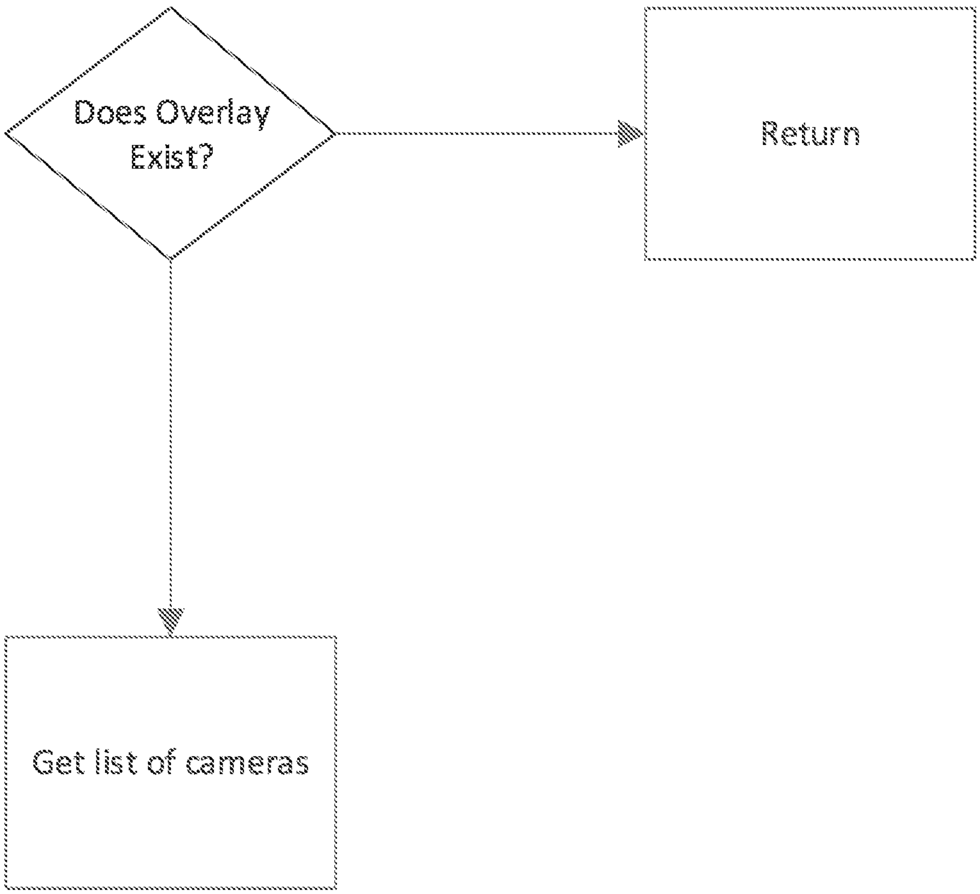
Figure 254:
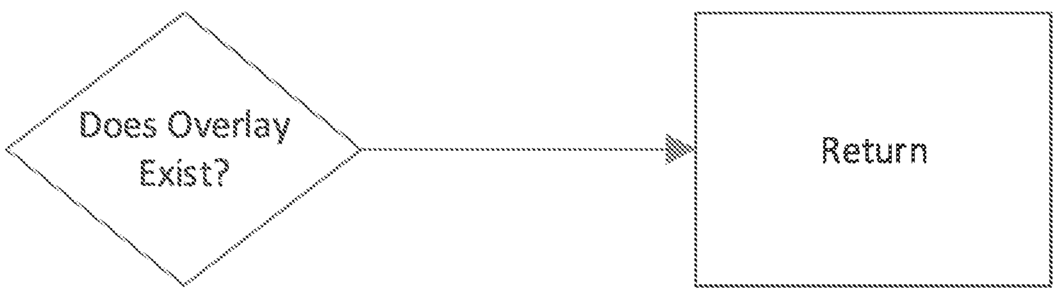
Figure 255:
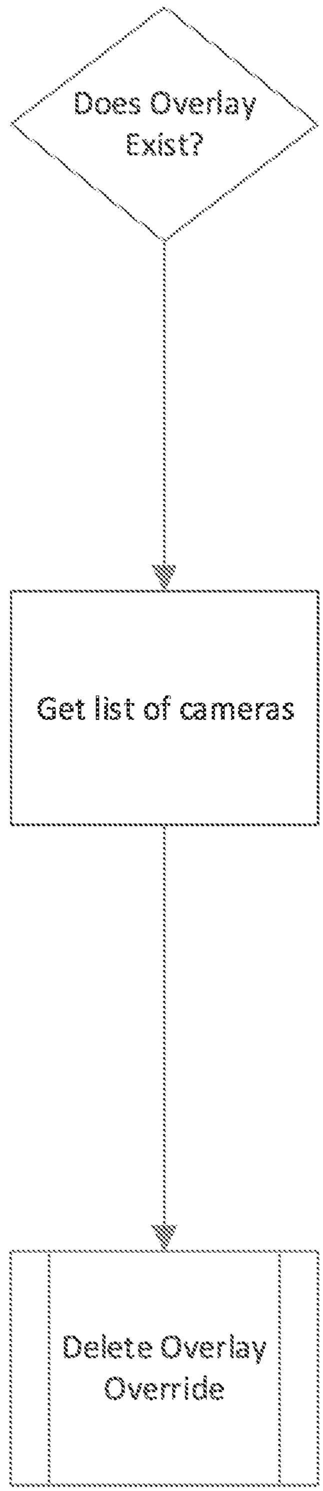
Figure 256:
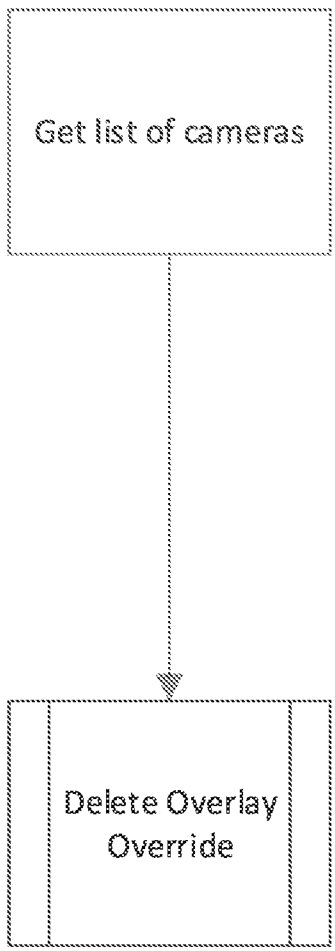
Figure 257:
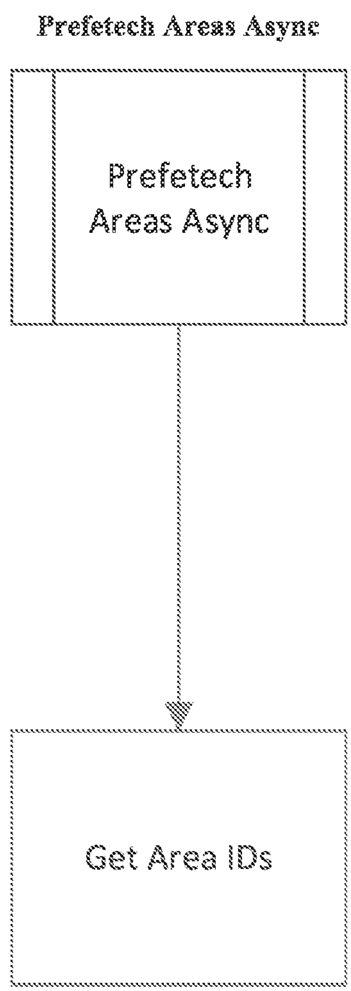
Figure 258:
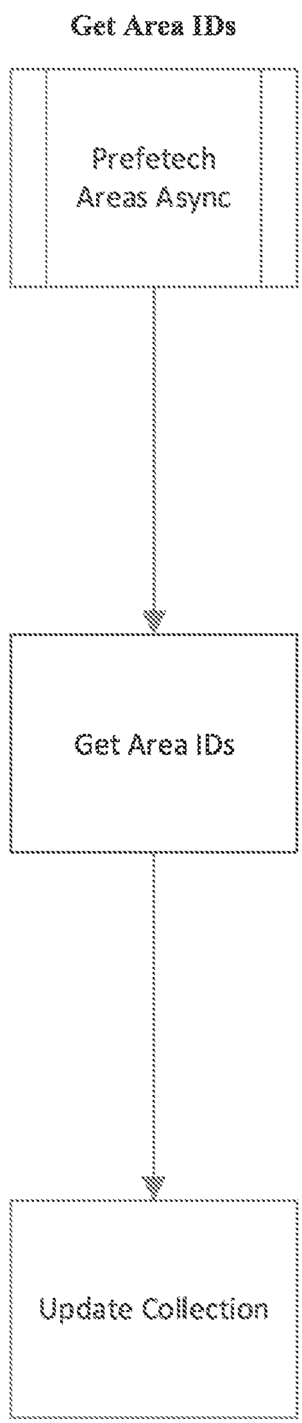
Figure 259:
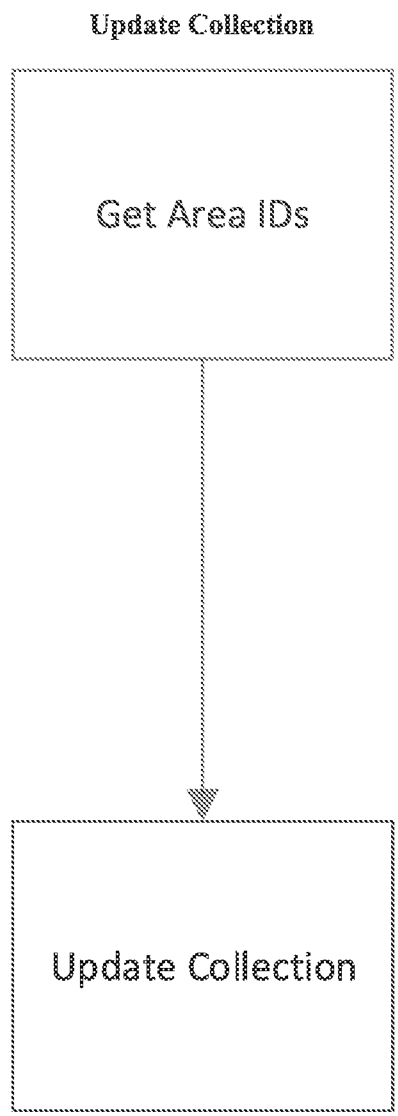
Figure 260:
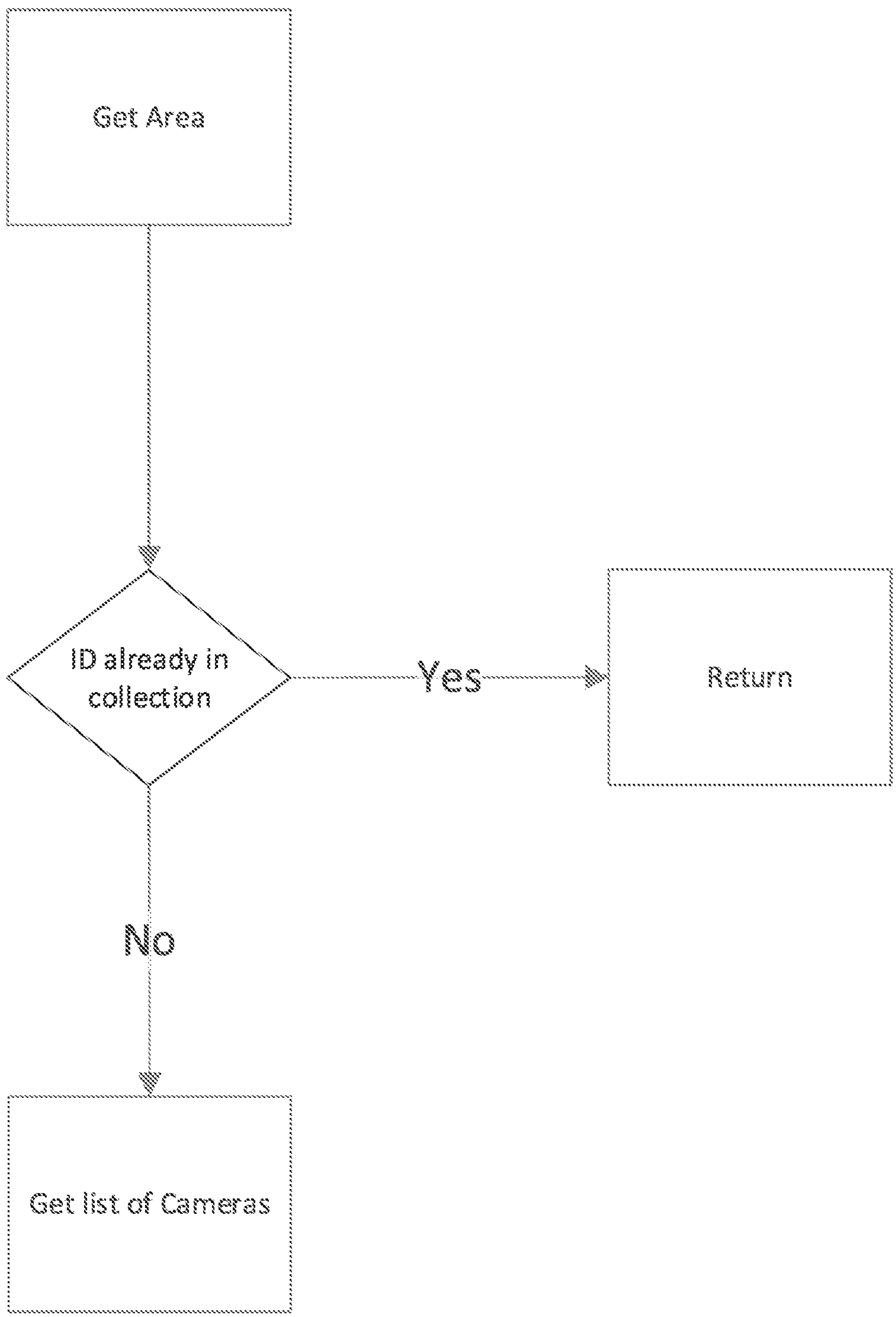
Figure 261:
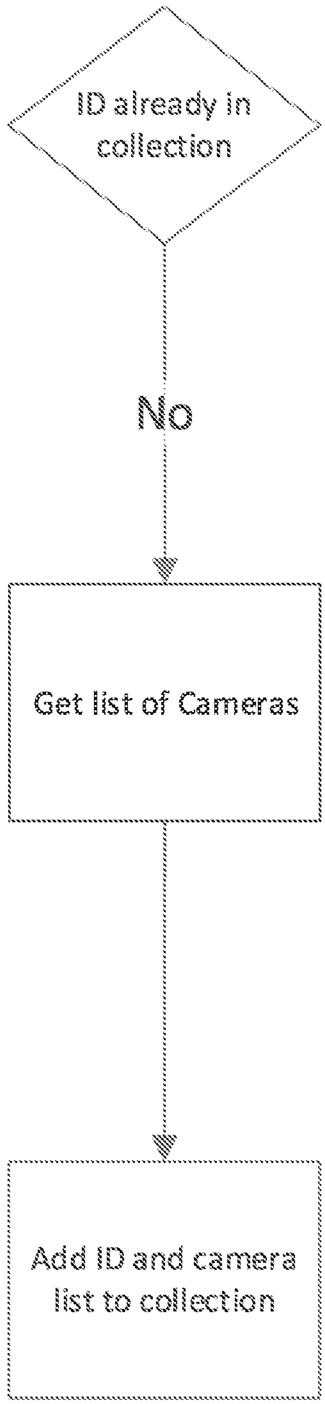
Figure 262:
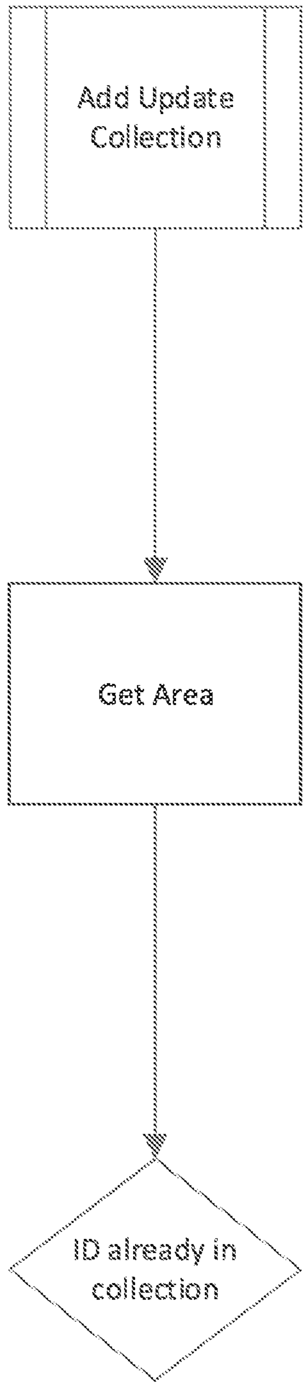
Figure 263:
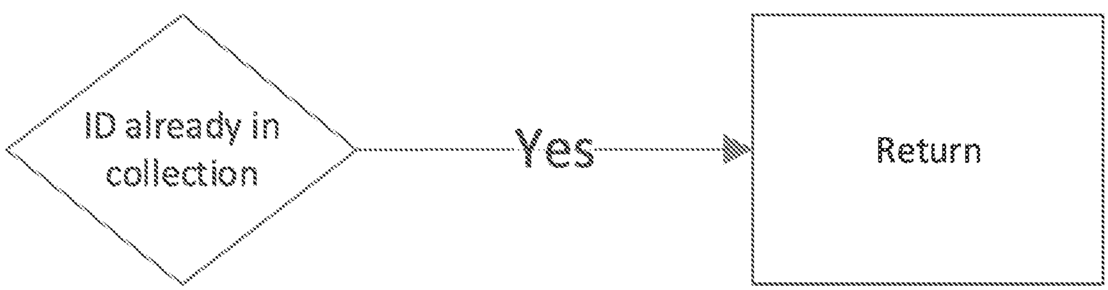
Figure 264:
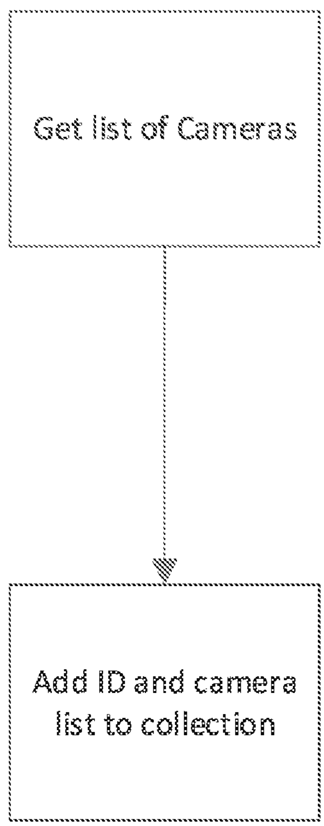
Figure 265:
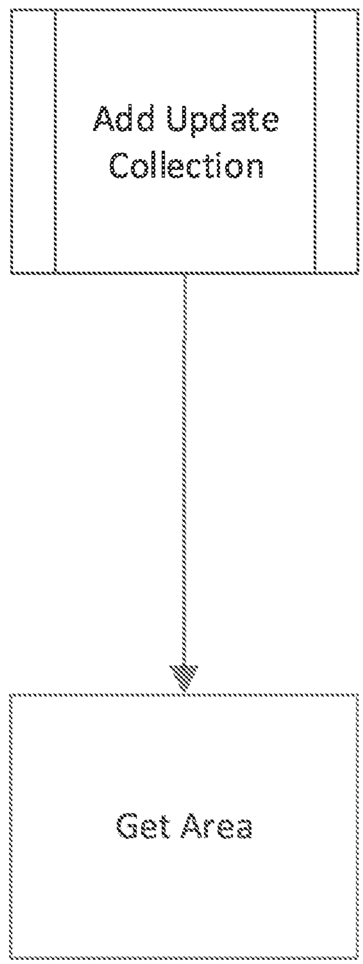
Figure 266:
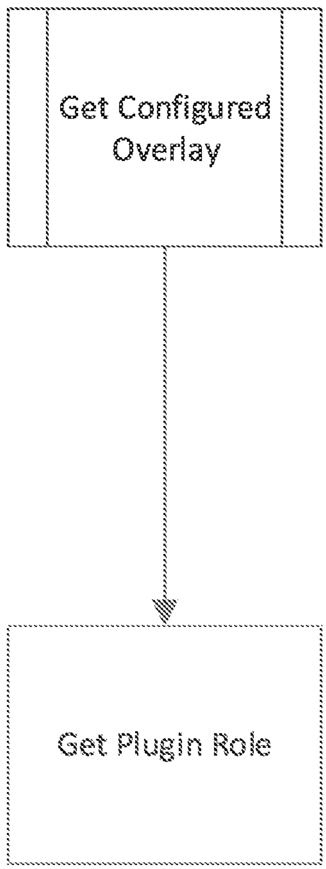
Figure 267:
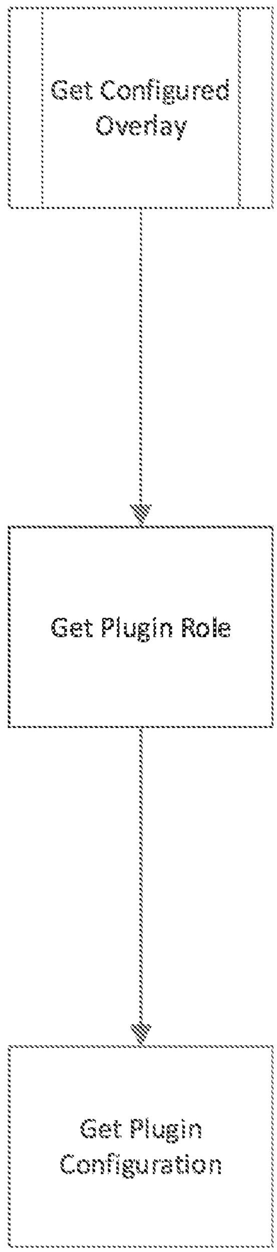
Figure 268:
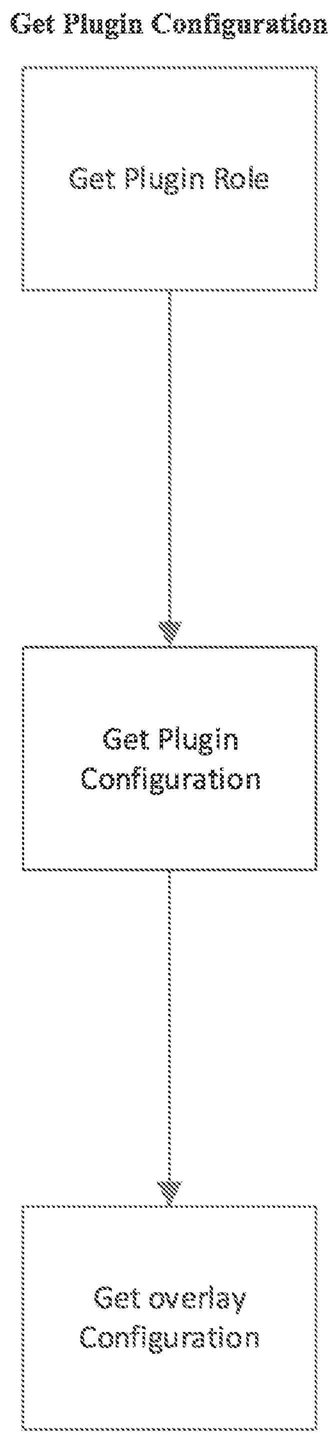
Figure 269:
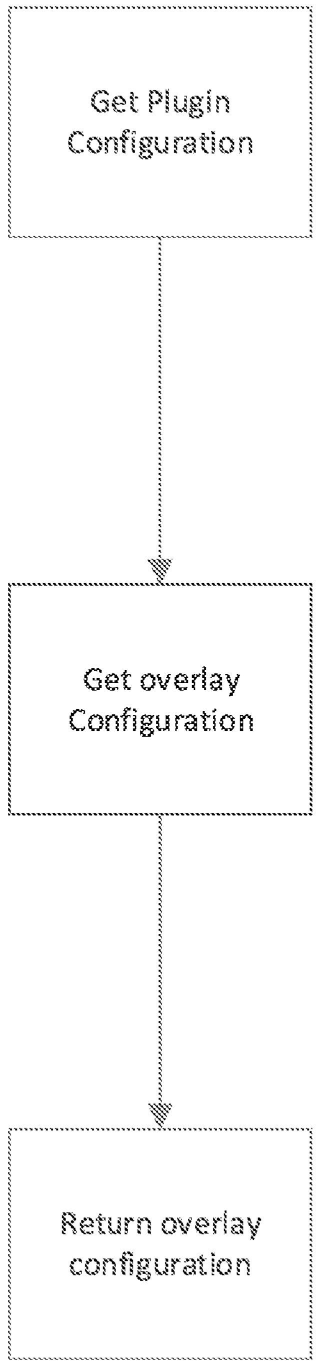
Figure 270:
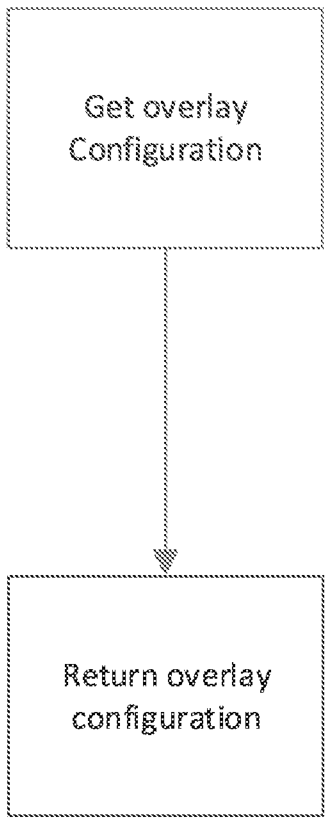
Figure 271:
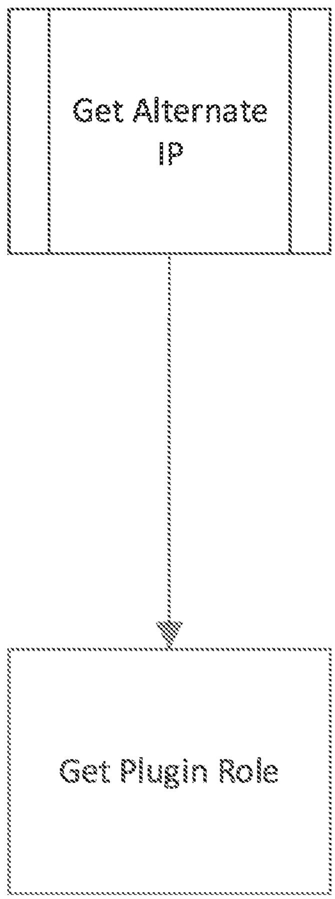
Figure 272:
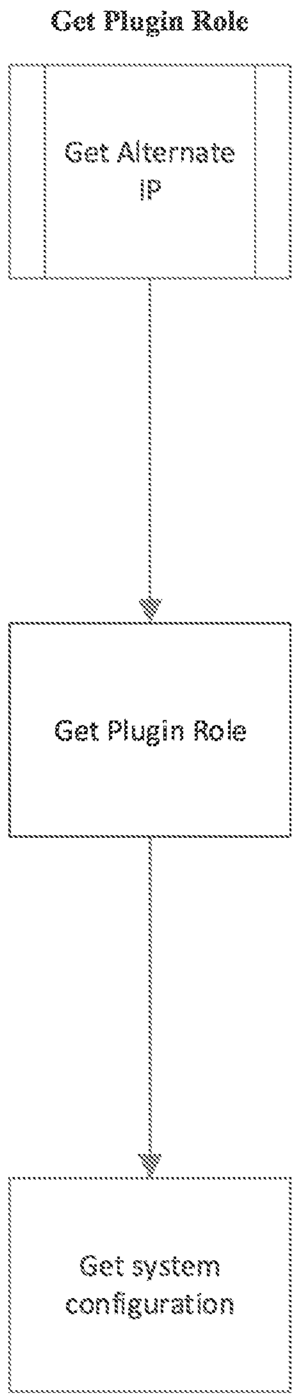
Figure 273:
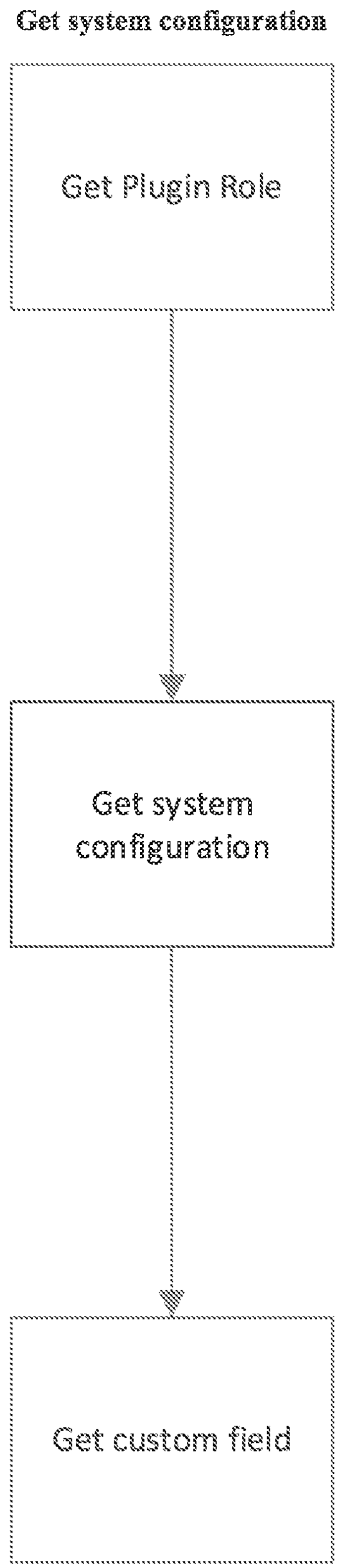
Figure 274:
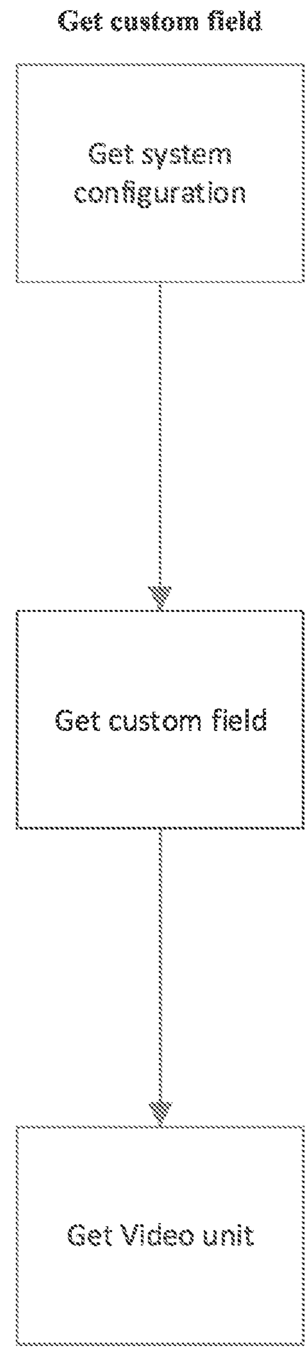
Figure 275:
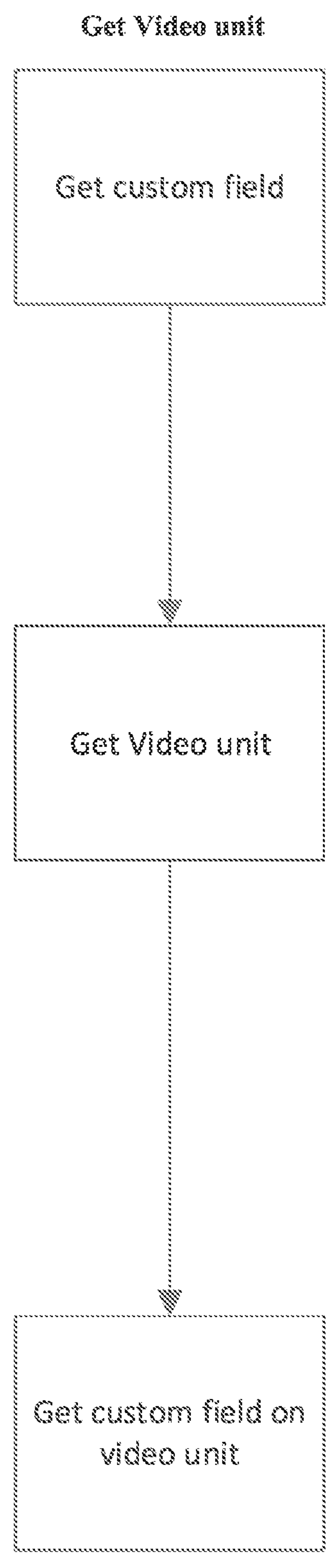
Figure 276:
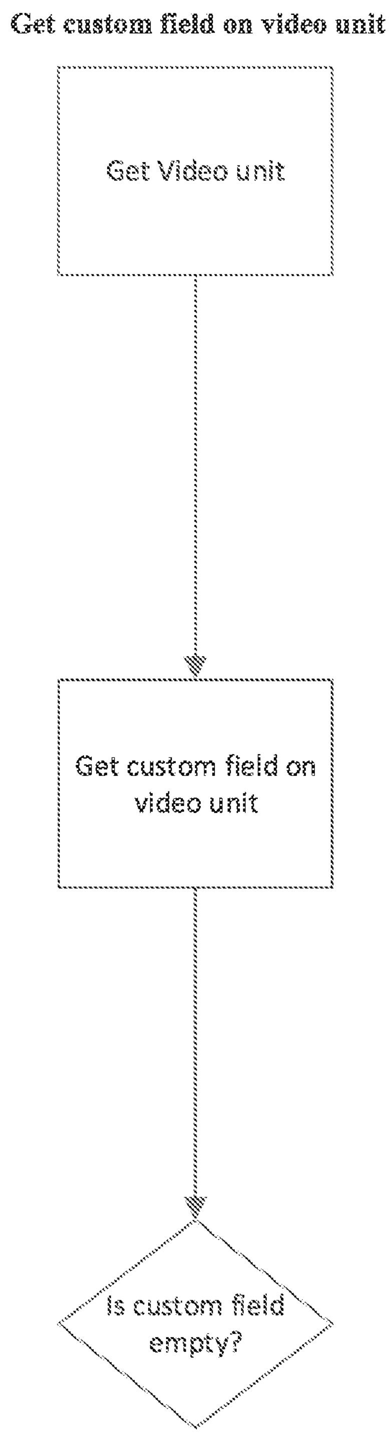
Figure 277:
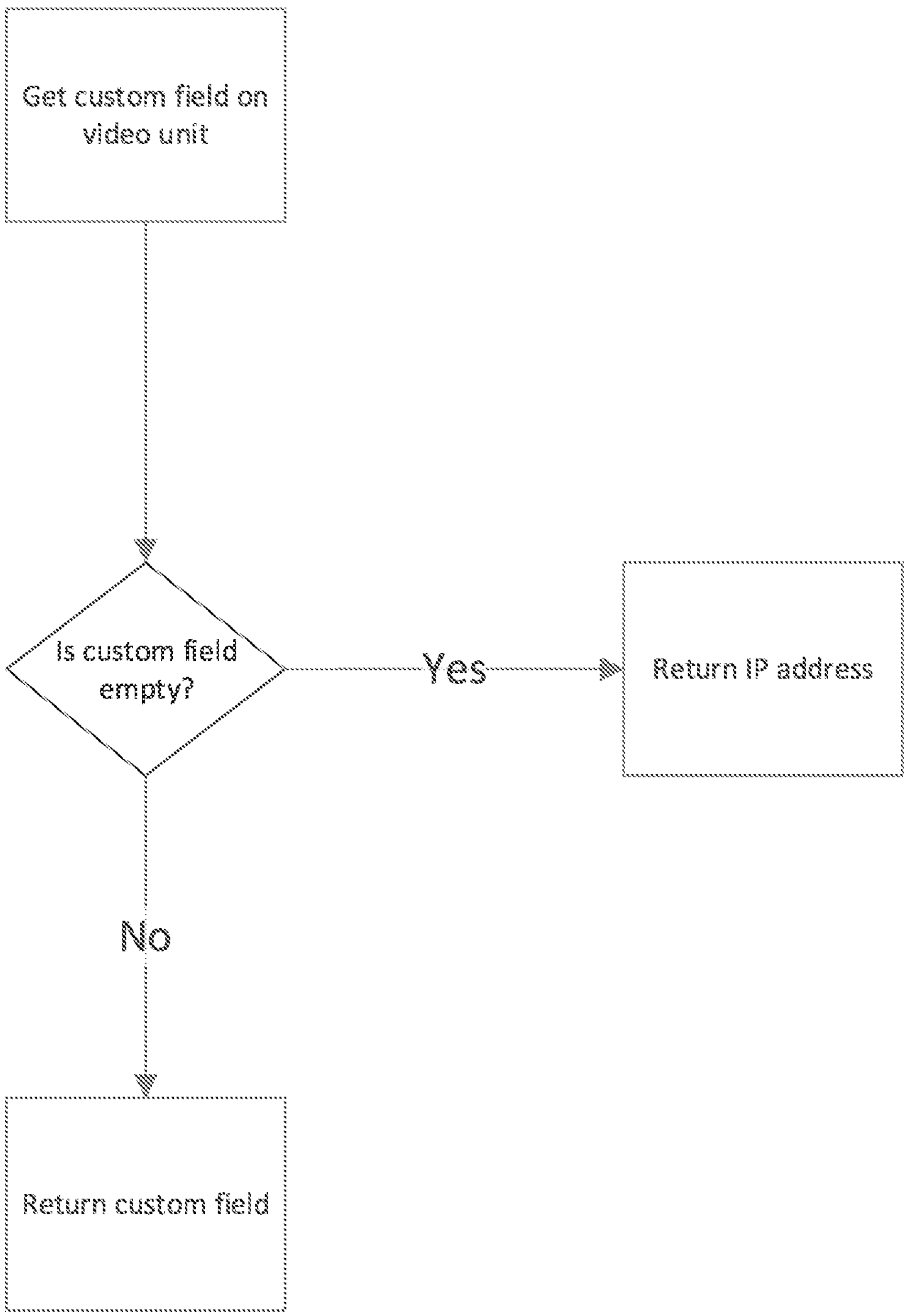
Figure 278:
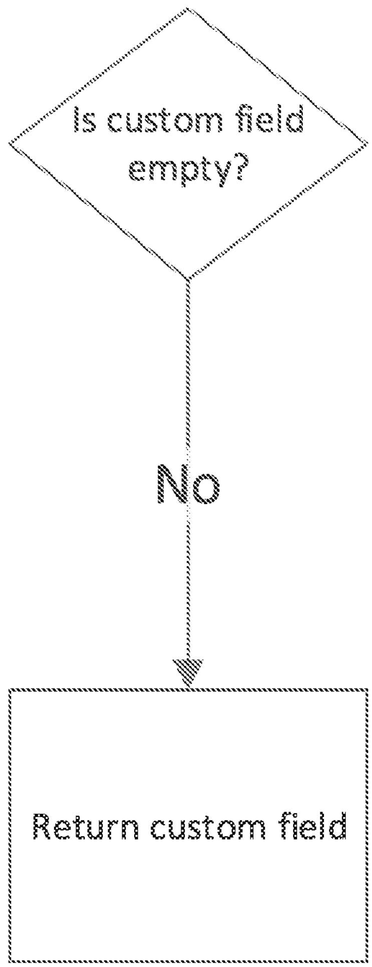
Figure 279:
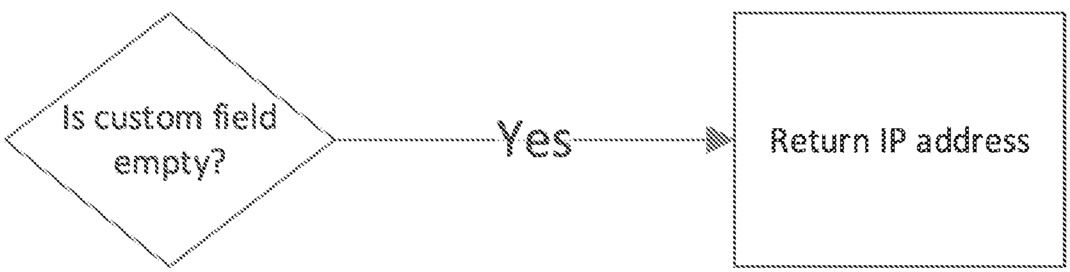
Figure 280:
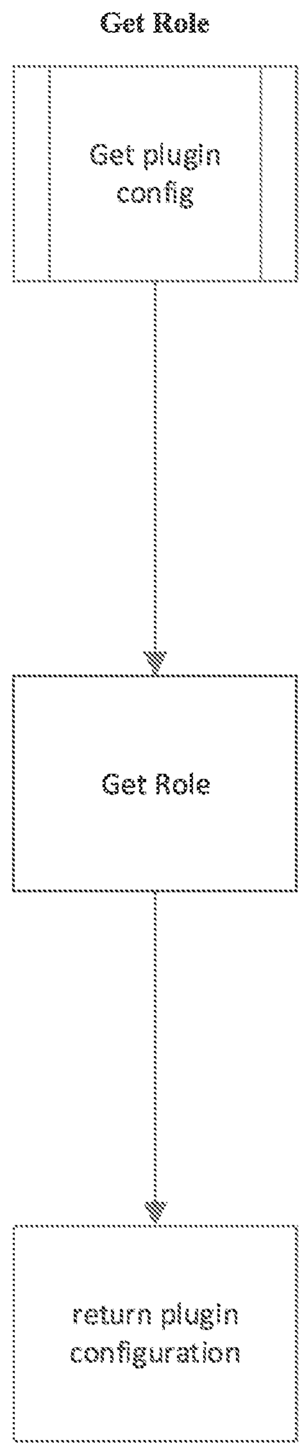
Figure 281:
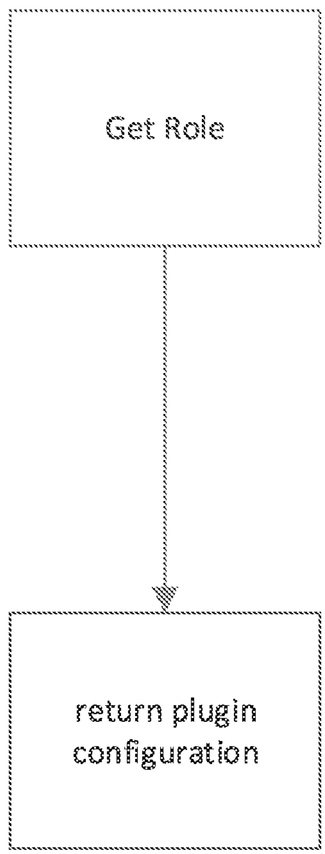
Figure 282:
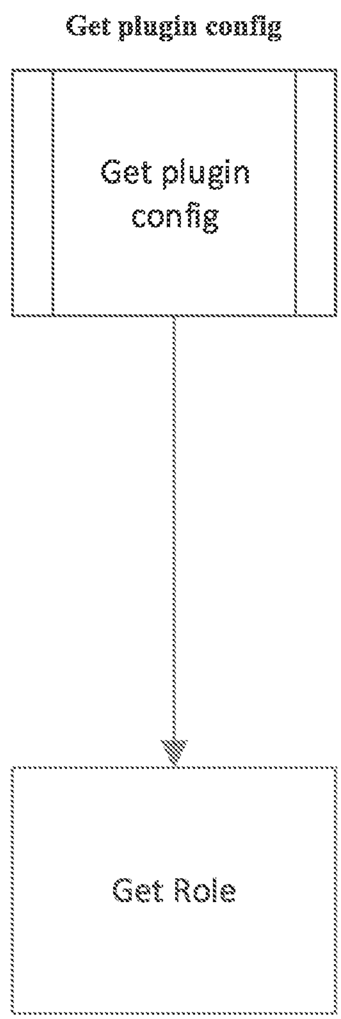
Figure 283:
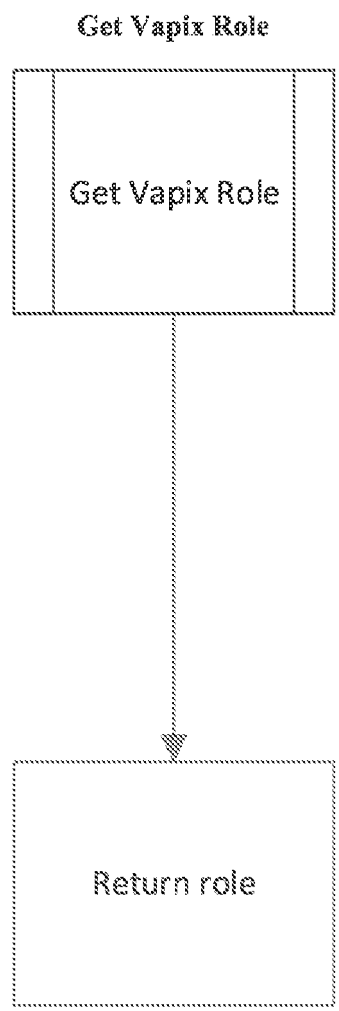
Figure 284:
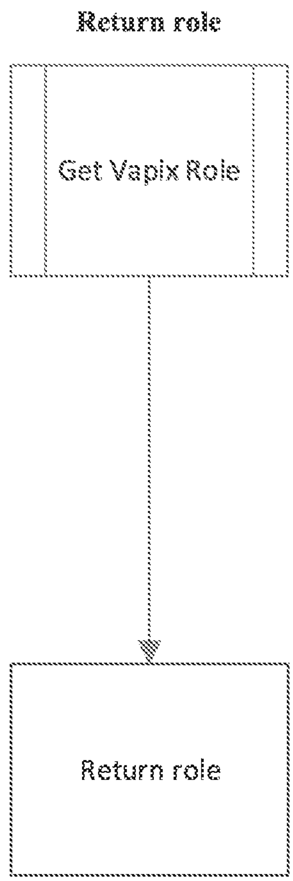
Figure 285:
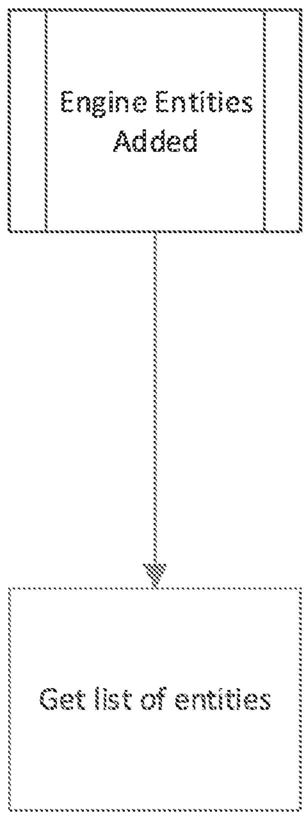
Figure 286:
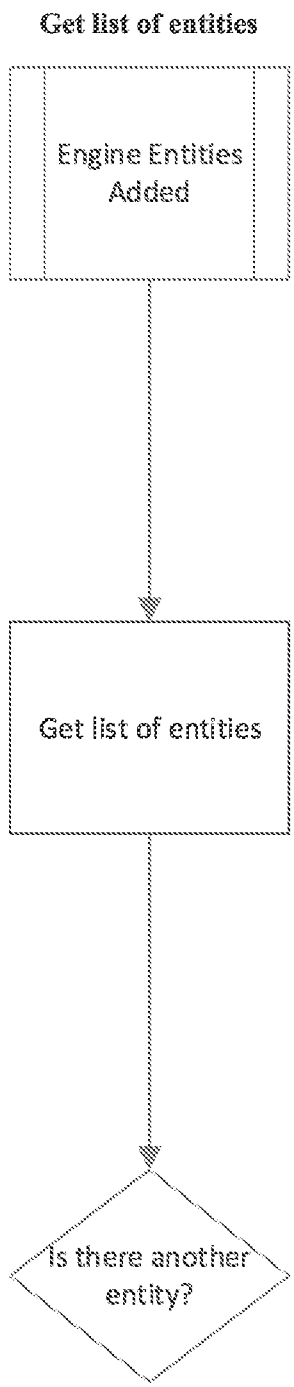
Figure 287:
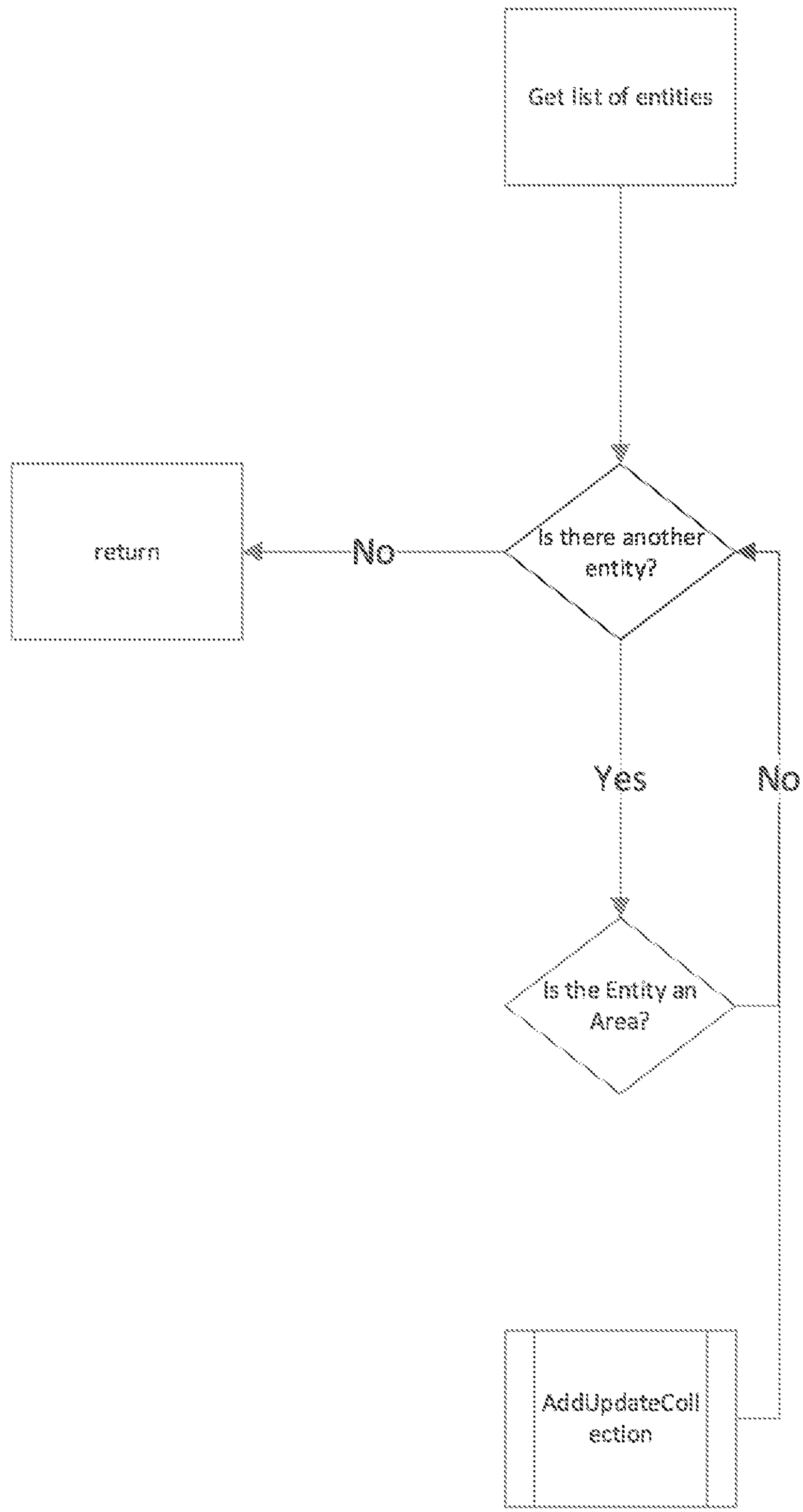
Figure 288:
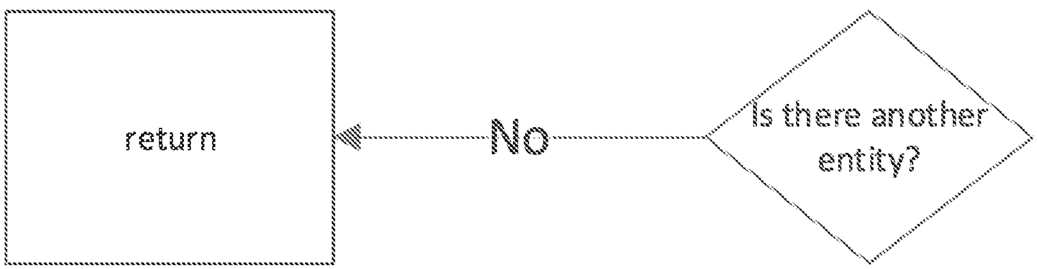
Figure 289:
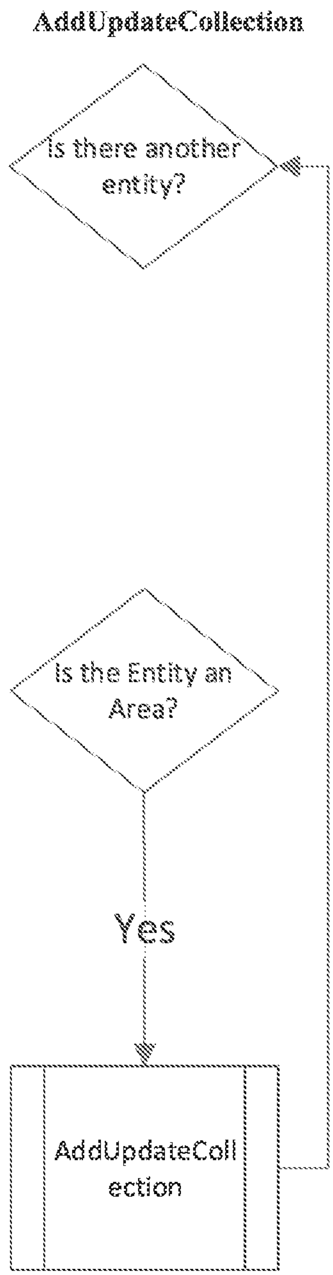
Figure 290:
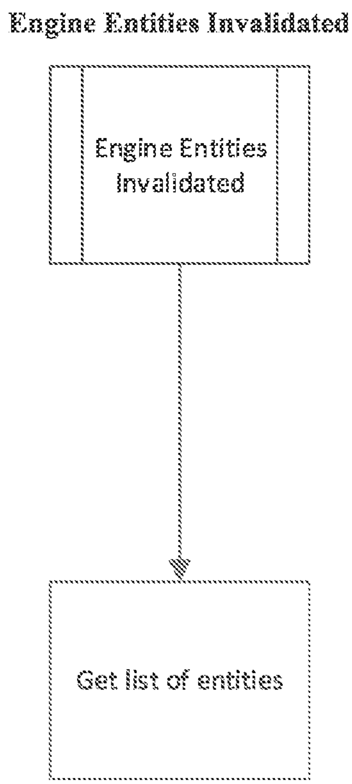
Figure 291:
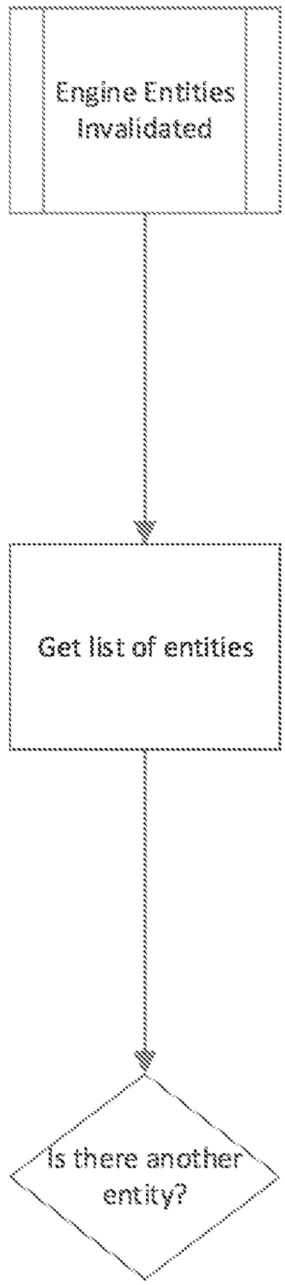
Figure 292:
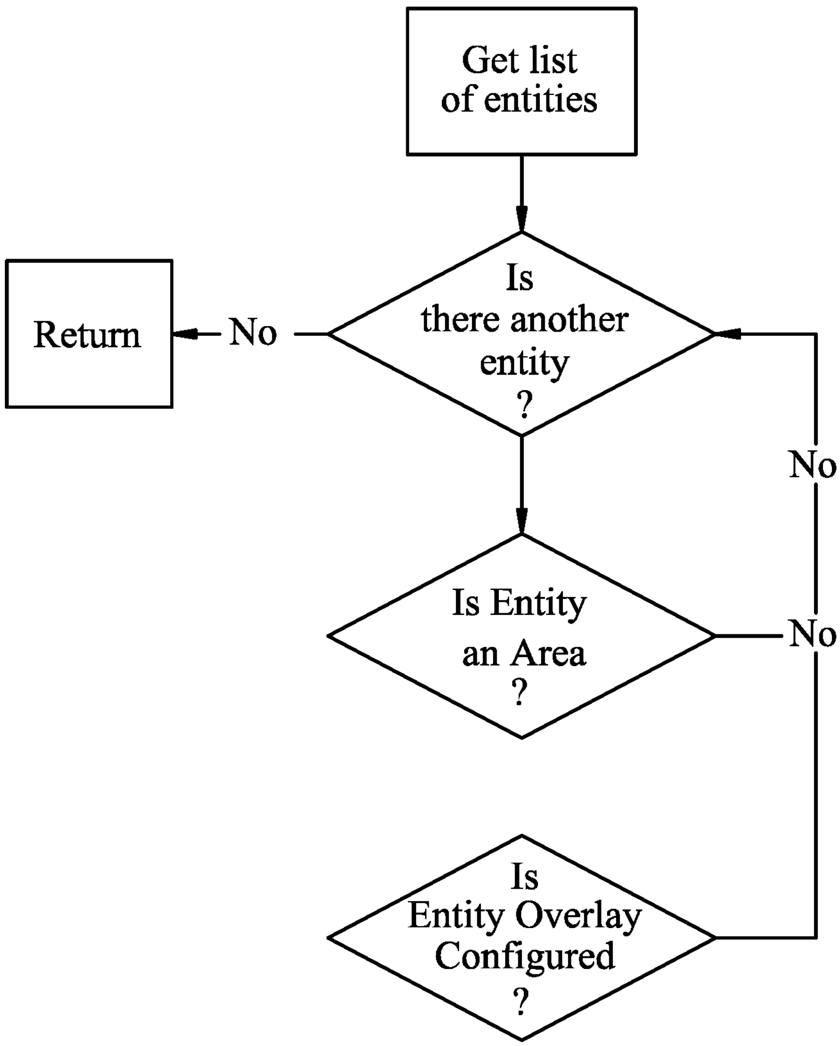
Figure 293:
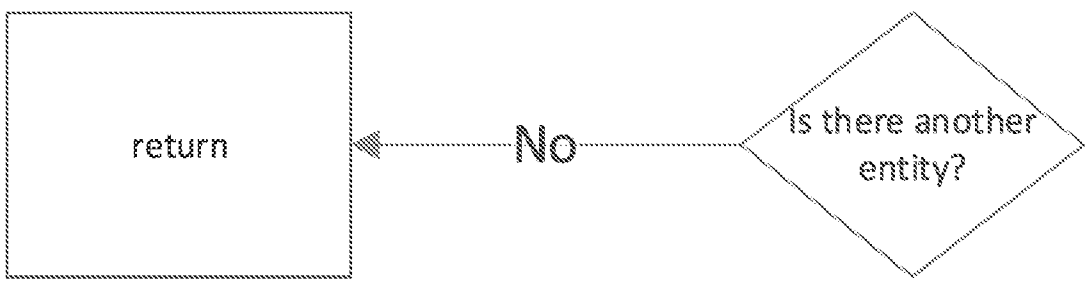
Figure 294:
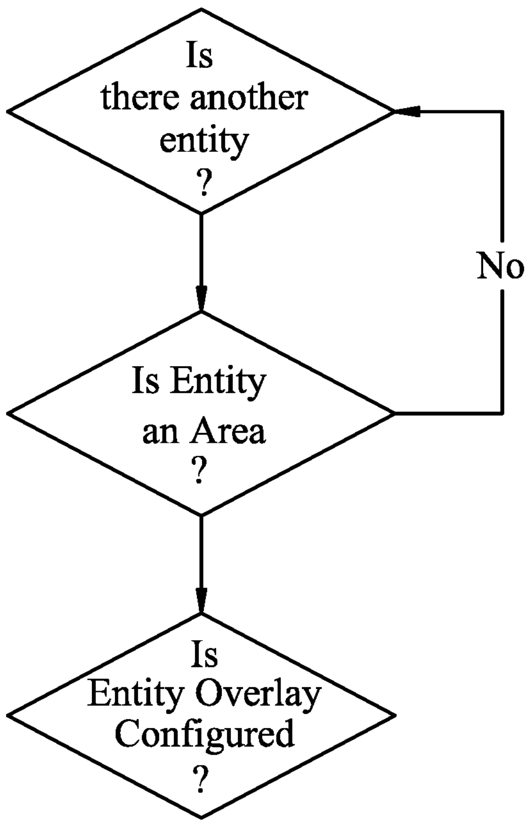
Figure 295:
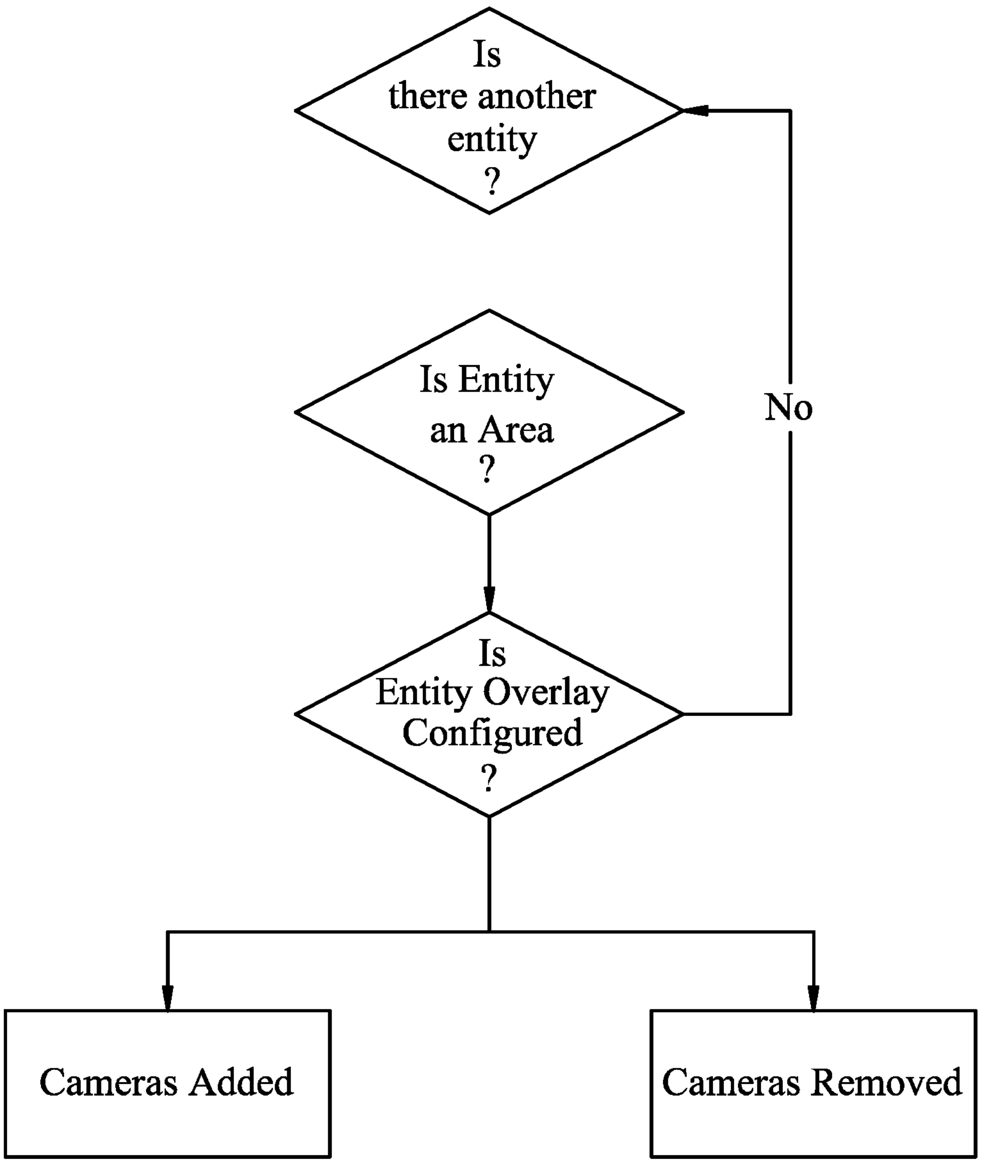
Figure 296:
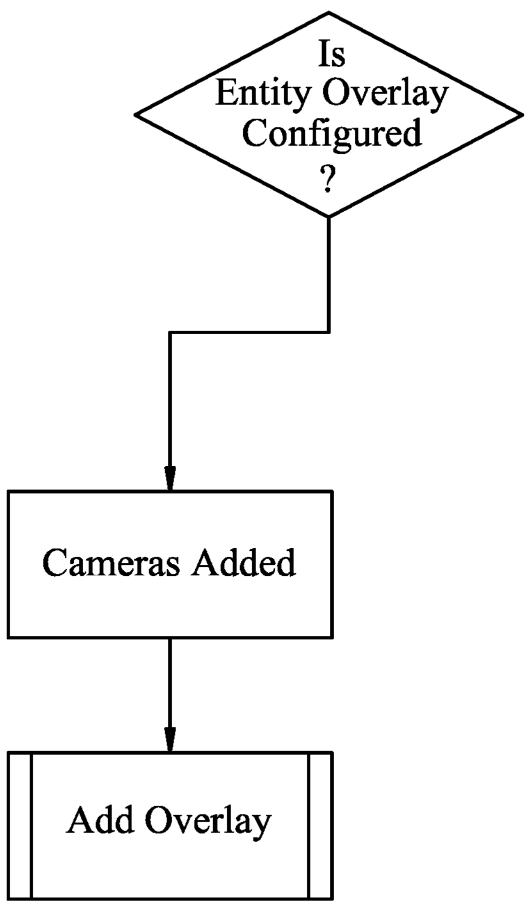
Figure 297:
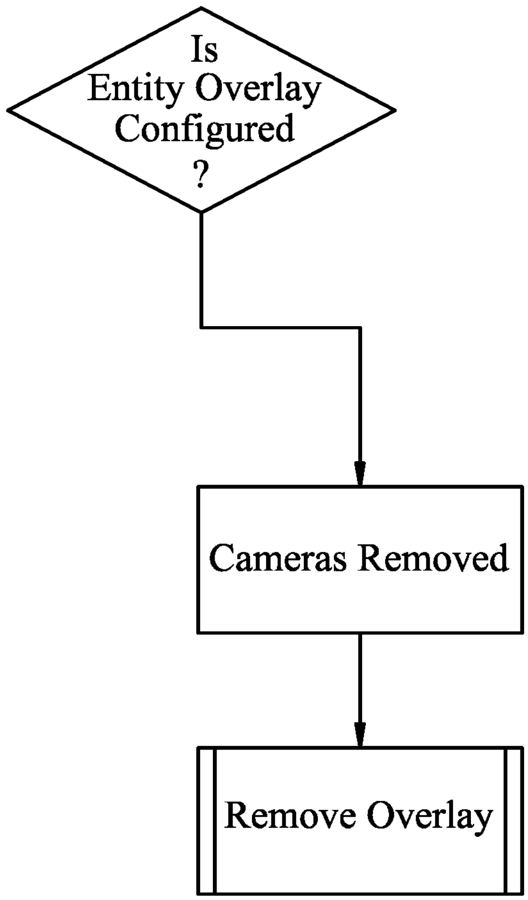
Figure 298:
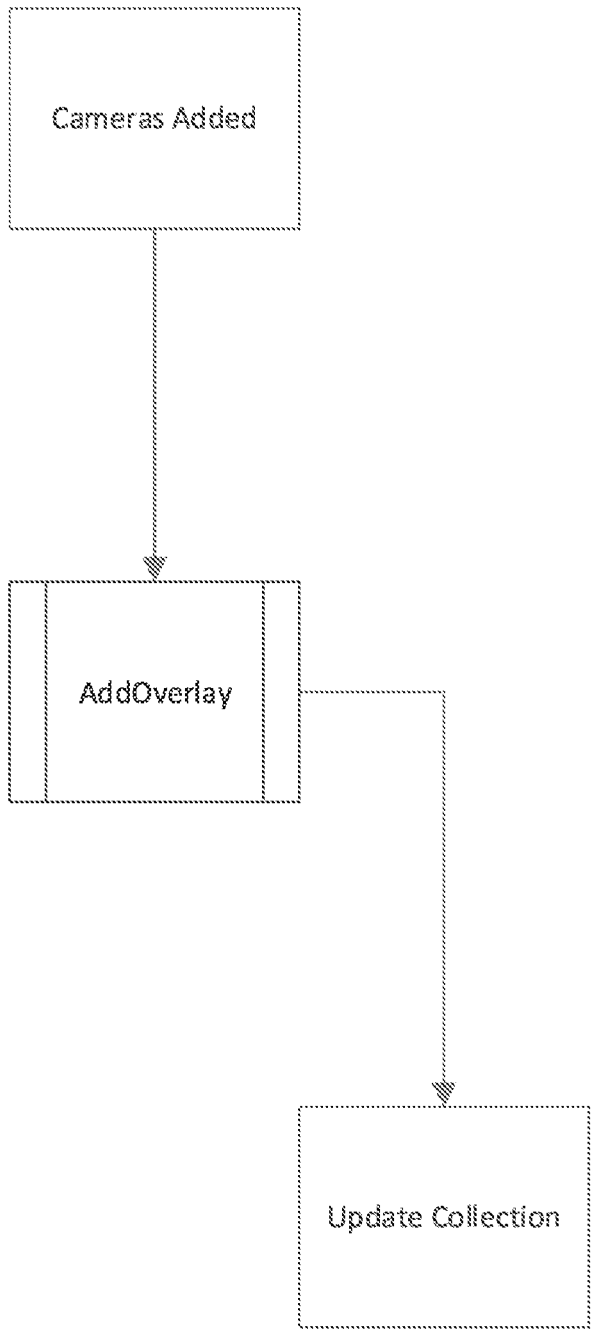
Figure 299:
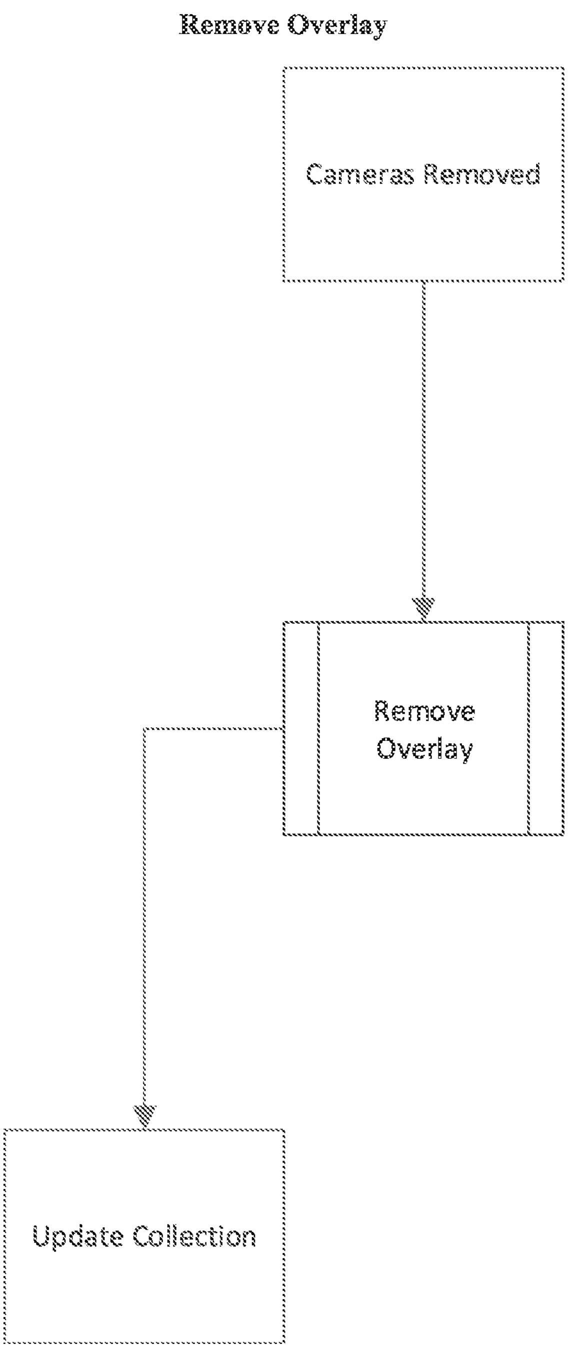
Figure 300:
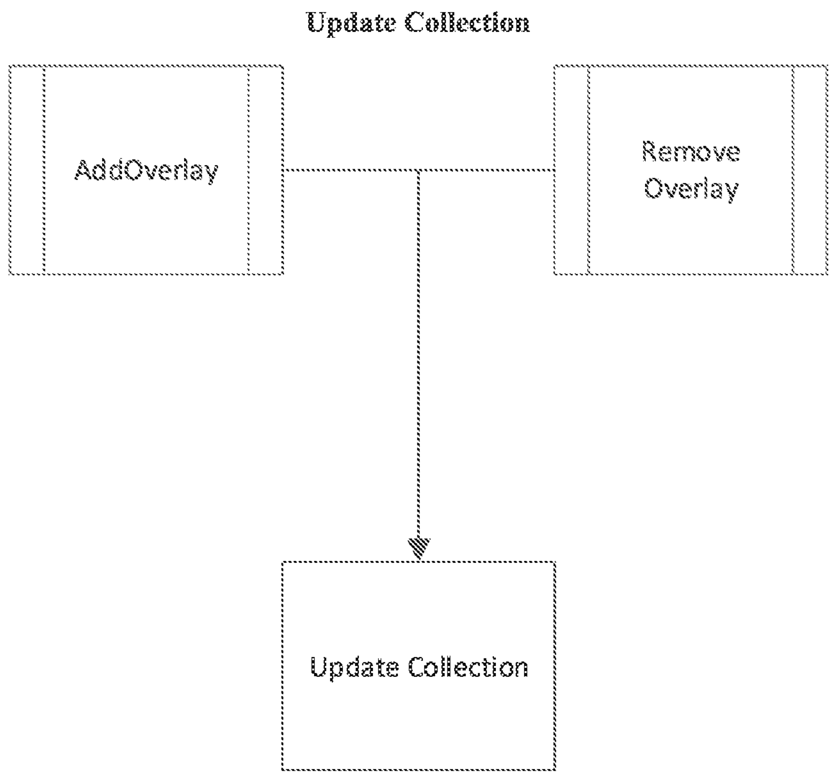
Figure 301:
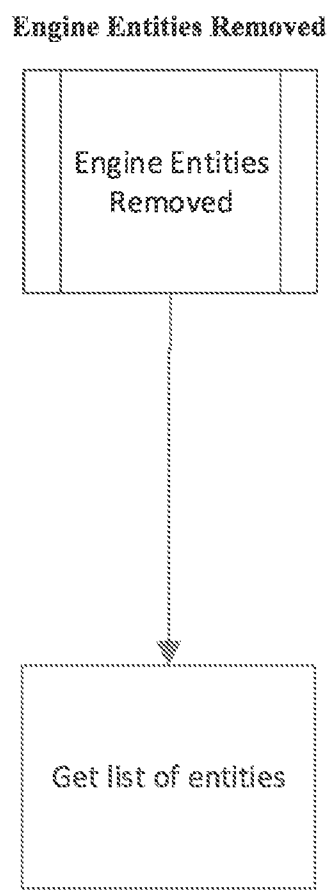
Figure 302:
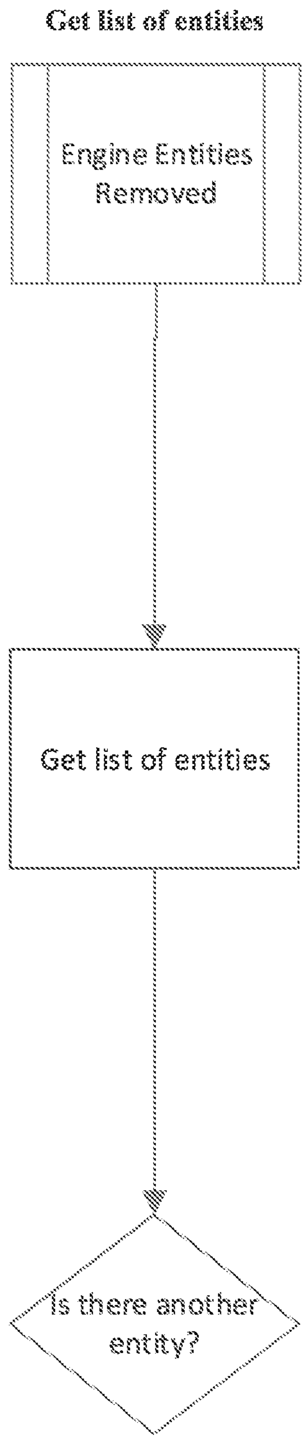
Figure 303:
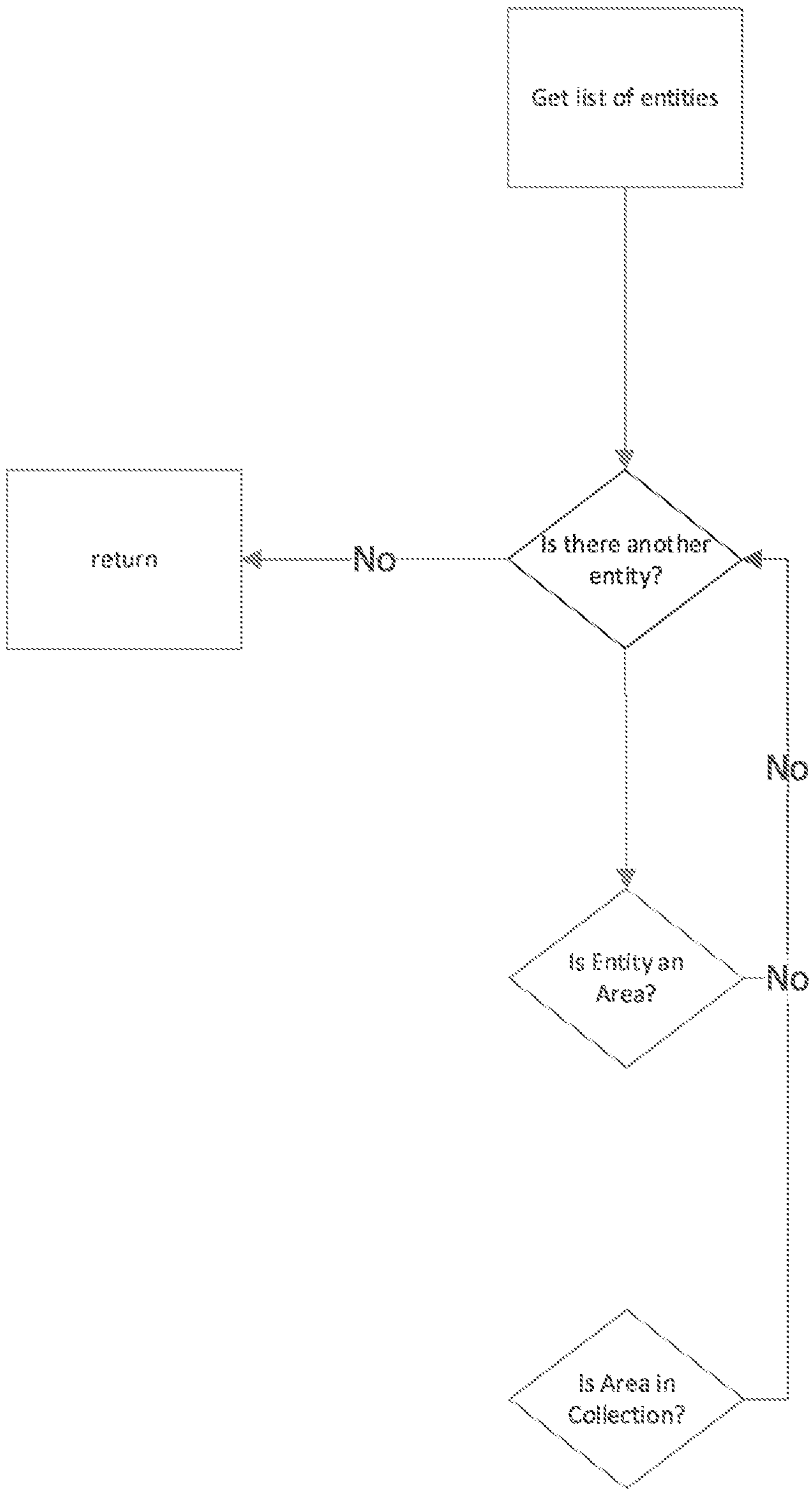
Figure 304:
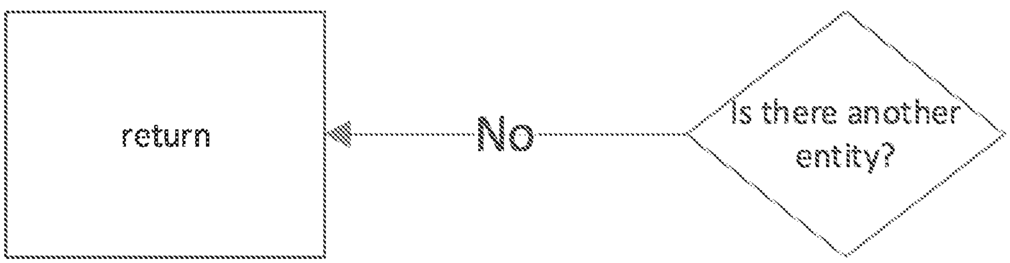
Figure 305:
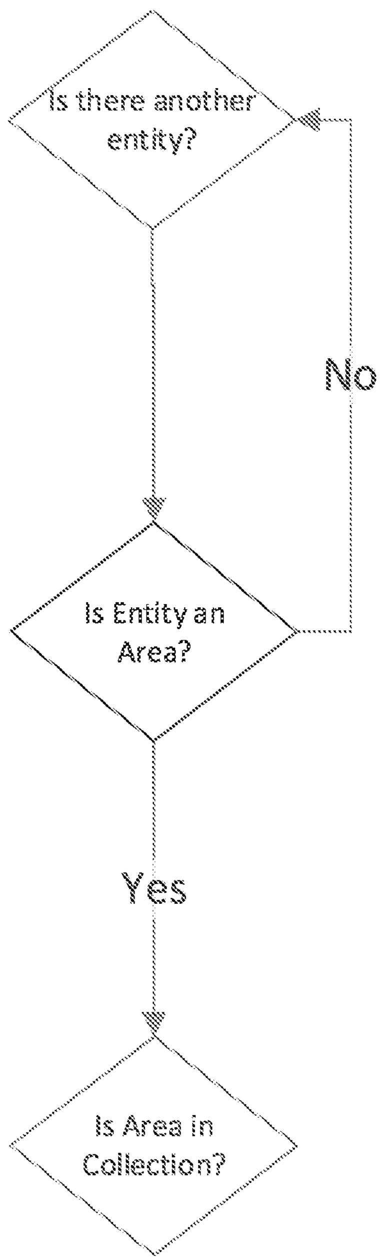
Figure 306:
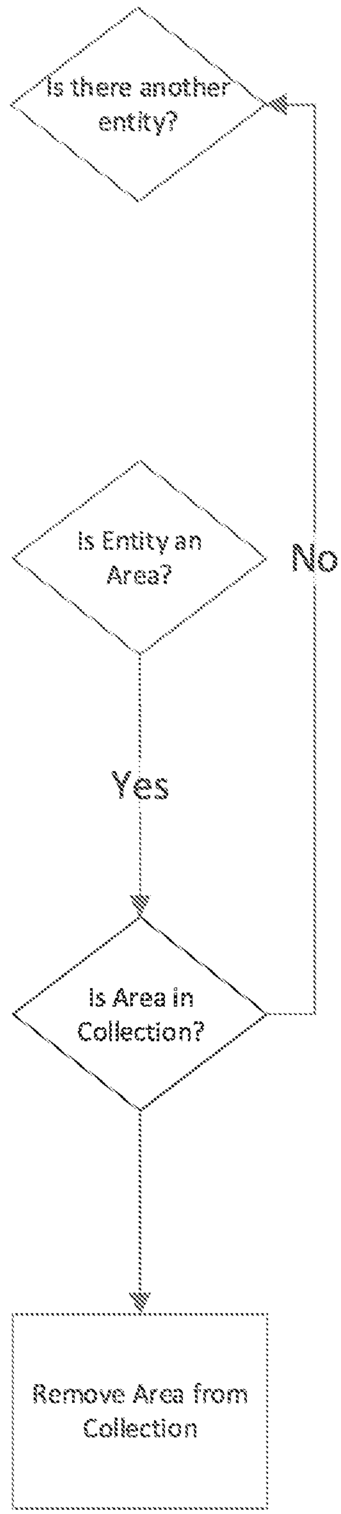
Figure 307:
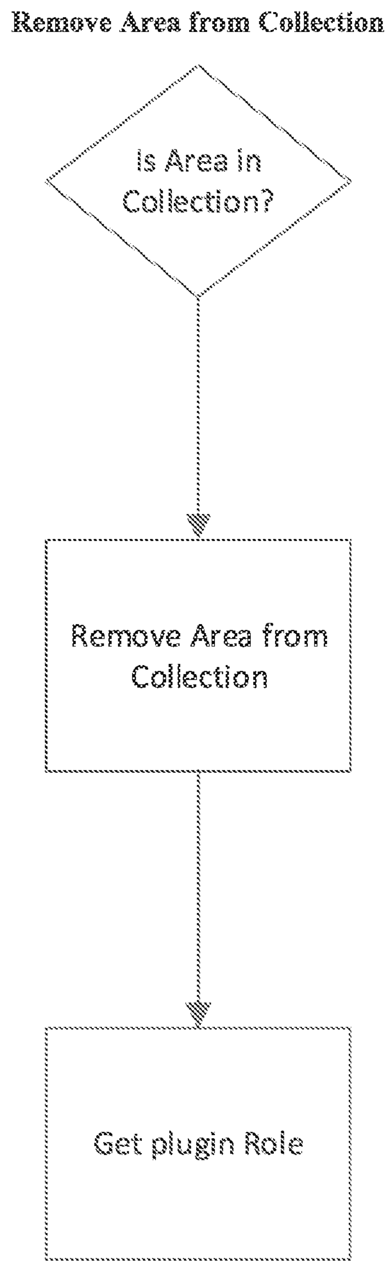
Figure 308:
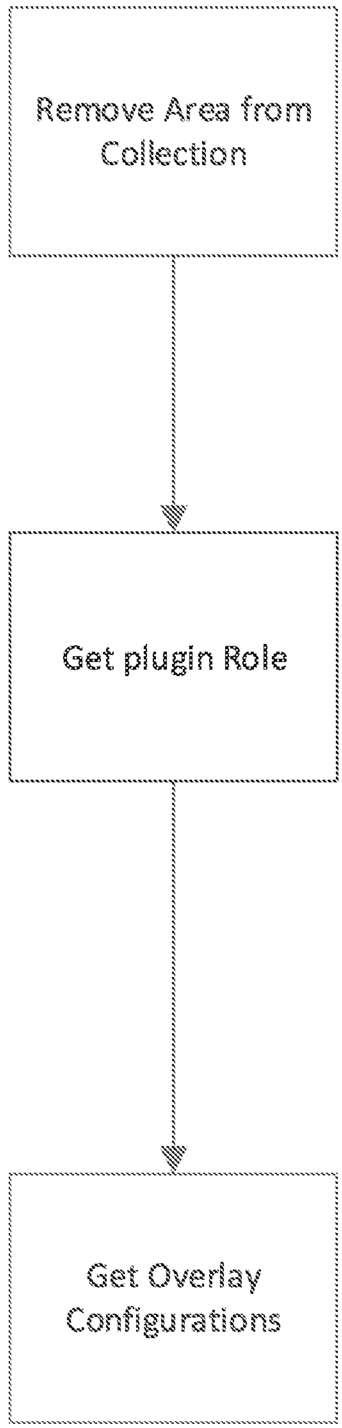
Figure 309:
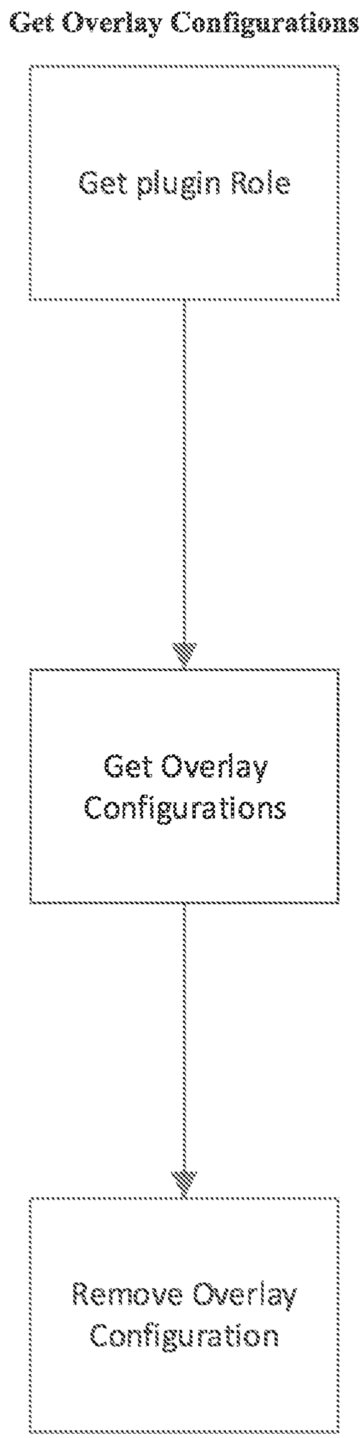
Figure 310:
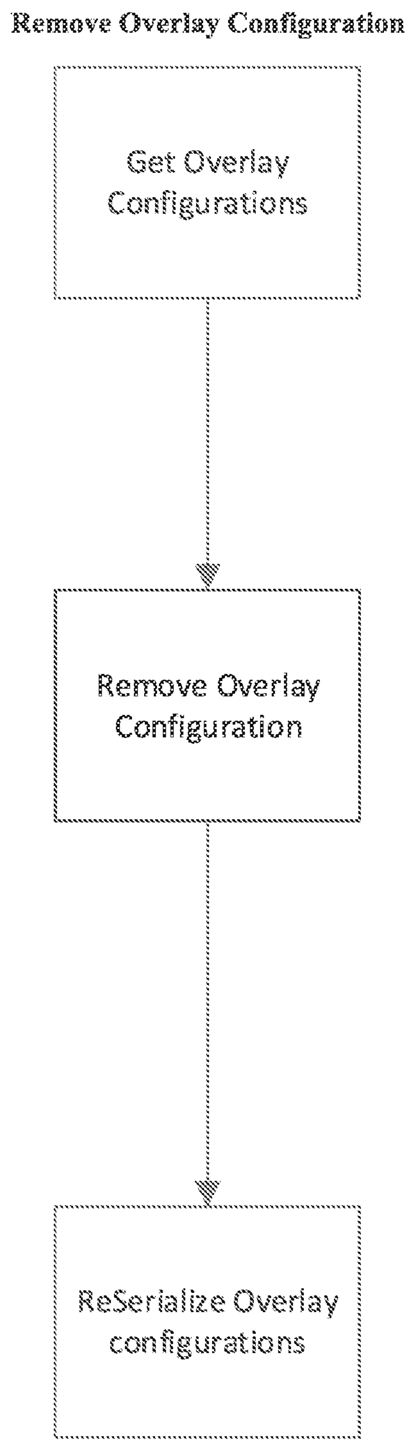
Figure 311:
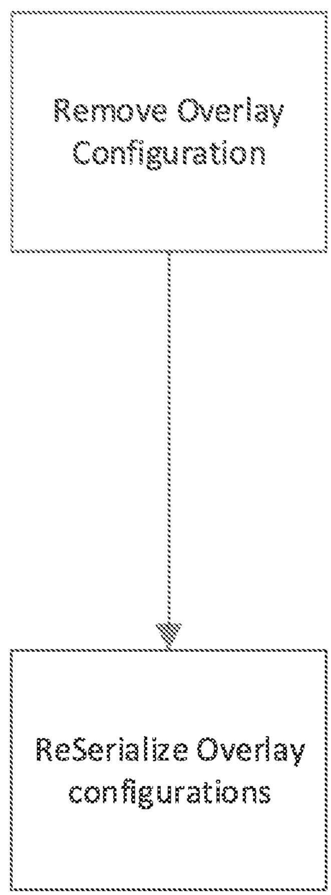
Figure 312:
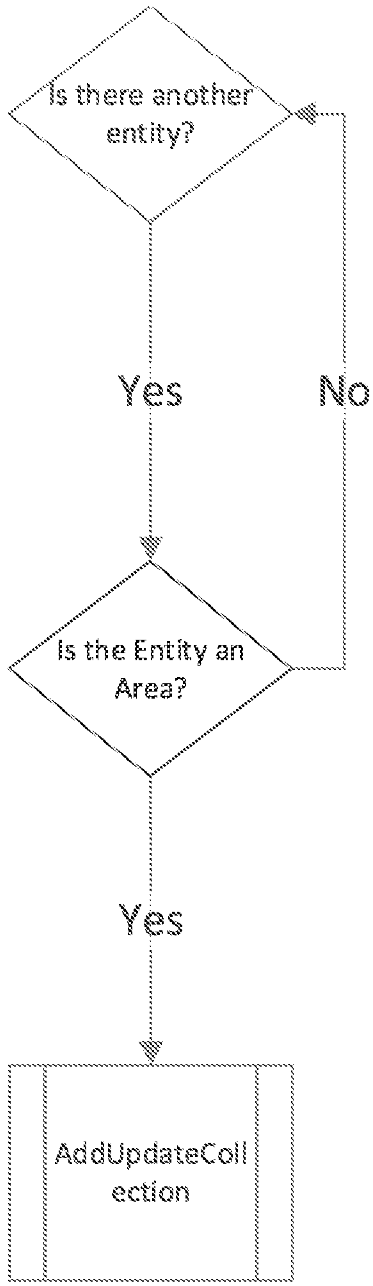

Due to the sizing of letters, some Figures had to be broken up into multiple Figures. In this case, letters were used in the Figure numbering. For example, FIGS. 9A, 9B, 9C, 9D and 9E collectively form FIG. 9. Likewise, FIGS. 39A through 39O collectively form FIG. 39, and so on.

FIGS. 1-8, collectively, illustrate an overview of the client. As shown in those Figures, when a user opens the Genetec client, the plugin (BCD Vapix Plugin) checks to see if the Client is the Config Tool. If the client is Config Tool, the user is able relay commands and configuration to Axis Cameras' Vapix framework though the Genetec interface.

FIGS. 9A through 9E and FIGS. 10 through 38, collectively, illustrate the overlay configuration of the client. As shown in those Figures, when a user opens the Genetec Client, BCD Vapix checks to see if the client is Config tool. If it is, the plugin initializes the data model and retrieves the Plugin ID from the Genetec server. It also deserializes an object model from the Genetec server. When a user attempts to upload a file, a Dialog window is presented. The plugin filters the uploaded file by checking its file type. Only .PNG and .BMP are acceptable file formats. The file is the converted to a 24-bit .BMP. The height and width are serialized along with file and stored in the plugin. The image is then displayed. When an image is displayed, the plugin converts the stored serialized image into an image object. The correct overlay configuration is selected. If data is not being loaded, then the user is prompted to save the current configuration. When a user prompts to save a configuration, all data is serialized and stored in the base plugin role. The UI is reset to default values. When a user prompts to delete an overlay, the image is no longer rendered, deleted from the configuration, and the configuration is serialized into the plugin role.

FIGS. 39A-1, 39A-2, 39B, 39C, 39D, 39E, 39F-1, 39F-2, 39F-3, 39G-1, 39G-2, 39G-3, 39H-1, 39H-2, 39I-1, 39I-2, 39I-3, 39J-1, 39J-2, 39J-3, 39K-1, 39K-2, 39L-1, 39L-2, 39M, 39N, 39O, 40-139 and 140 through 160, collectively, illustrate helpers of the security camera management system. These Figures display the process and functions of the BCD Vapix Helper class. As shown, an image file gets converted into a string that can be serialized and a string is converted to a byte array that can be consumed as an image. When an Update Overlay function is invoked, the old overlay is removed. If the request is to delete an overlay, return. The Overlay is enabled if needed and then the API version is determined.

Old Firmware:

1. Upload file to camera
2. If successful, Save and convert the overlay
3. If successful, Set the overlay
4. Restart the camera New Firmware:

1. Upload file to camera using new vapix call
2. Translate the position of the image
3. Restart the camera Dynamic Overlays:

1. Upload file to camera using new vapix call
2. Add the Dynamic IMage
3. Restart the camera The Remove Overlay Function determines the API version.

Old Firmware:

1. Delete Overlay

New Firmware:

1. New Delete Overlay Vapix function
2. If not successful, call old Delete Overlay Function Dynamic Overlays:

1. Get Listed dynamic overlays
2. Remove the BCD overlay

Check Firmware Version determines which version of the Vapix API to use. If the firmware is older than version 7, use the old API. If the firmware is version 8 or newer, use Dynamic overlays. If the firmware is newer than 7.10 but older than version 8, use the newer Vapix API. Otherwise default to the old API.

Use Dynamic overlays looks at the processor chip of the Camera. If the chip type is of "Artpec-7" use Dynamic Overlays when making API calls.

Enable Overlay also looks at the processor chip of the Camera. If the chip type is of "Artpec" enable Overlays when making API calls.

Is Amberella Chip looks that the processor chip of the Camera if the chip type is of "Amberella".

Is Camera Valid determines if the camera is in the correct state to accept Vapix call. The camera must be manufactured by Axis and be online.

Determine API version is an inclusive function that utilizes several of the ones listed above to determine the API version to use. It first checks for the Amberella chip, then if to use Dynamic overlays, and finally calls Check Firmware Version.

Vapix Helper sends the following Vapix commands

1. Delete Overlay
2. Restart Camera
3. Upload File to new Camera
4. Translate Overlay on new Camera
5. Check Processor Chip
6. Add Dynamic Image
7. Set Dynamic Image FIGS. 161-169, collectively, illustrate an overview of the plugin. A shown in these Figures, the BCD Vapix Plugin server component initializes with the Genetec service. When loaded, the Vapix Manager Class is created and instantiated. As shown, the manager is also responsible for handling any commands or requests initiated by users from the Security Desk client.

FIGS. 170A through 170F, and FIGS. 171 through 199, collectively, illustrate request handlers of the plugin. As shown in these Figures, the plugin creates and registers request handlers for communication and user interaction The request handlers handle the following requests commands from the client application. Update Overlay gets the plugin role and its configuration. All configured overlays are iterated over to see if there is a change requested. If so, the function Update Cameras is invoked. Update Cameras iterates through the cameras found in the overlay configuration. Each camera is sent to the Async Add Handler function. Async Add Handler gets the camera and its corresponding video unit. If the camera is valid, the appropriate API version is called from Vapix Helper followed by the Update Overlay function.

FIGS. 200A through 200P, FIG. 200Q-1, FIG. 200Q-2, FIGS. 200R through 200Z and FIGS. 201 through 312, collectively, illustrate the security video management system manager. In effect, these Figures review the Vapix Manager class. As shown in these Figures, on Initialization, subscribes to Genetec's Entity Added, Invalidated, and removed events. It then creates a collection of all Genetec Areas that have had a Vapix overlay configured. The Add Overlay function gets a configured overlay and the list of cameras it applies to. If the overlay has an image configured, invoke Delete Overlay Override, otherwise invoke Async Add.

Async Add identifies if the function requires a chip check and performs one if needed. It then checks if the camera is valid and its required API version. Update Overlay is invoked followed by a reboot.

Delete Overlay Override gets a list of cameras and invokes Async Delete on each camera.

Async Delete gets the camera and the corresponding video unit. If the camera is valid, the processor chip and API version are determined. Remove Any Overlay is invoked followed by a reboot.

Get Plugin Config gets the role and its configuration.

Get Vapix Role gets the plugin role.

Prefetch Areas Async gets all areas and updates a collection of Area IDs

Add Update Collection gets an Area using the supplied ID. If it is not already cached in the collection, store the area ID and corresponding camera IDs.

Get Configured Overlay gets the plugin role and its configuration followed by retrieving the requested Overlay Configuration.

Get Alternate IP gets the plugin role and creates a Genetec System Configuration object. Next a Genetec custom field is identified, and its value retrieved on the specified video unit. If the value of the custom field is null, return the video unit's IP address otherwise return the value of the custom field.

Engine Entities Added is the method subscribed to the Genetec Entity Added Event. Iterate through the collection of Entities that were added. Any Entities of type Area are passed to the Add Update Collection.

Engine Entities Invalidated is the method subscribed to the Genetec Entity Invalidated Event. Iterate through the collection of Entities that were modified. With a Configured Overlay, if there were cameras added invoke Add Overlay. If a camera was removed, invoke Remove Overlay. The collection is then updated.

Engine Entities Removed is the method subscribed to the Genetec Entity Removed Event. Iterate through the collection of Entities that were removed. If the Entity is of type Area, Check if it is the collection. If so, the plugin role and overlay configuration are retrieved. The overlay configuration is deleted and then the collection is reserialzed into the plugin role.

A plugin in accordance with an embodiment of the invention allows for users to brand their edge devices (i.e., video cameras) without having to interface with the devices directly. The plugin presents the ability to upload and position custom image overlays on network cameras while never having to enter the camera's own interface or be within physical proximity of the device. Typically, a user must have knowledge of a video camera's network address and authentication credentials in order to interact with the camera's direct interface. This interaction would require the user to leave prior engagements in order to facilitate this interaction. The plugin in accordance with an embodiment of the invention provides a solution by automating this and providing commands that the VMS invokes to create an environment that reduces this burden to the operator.

Figure 313:
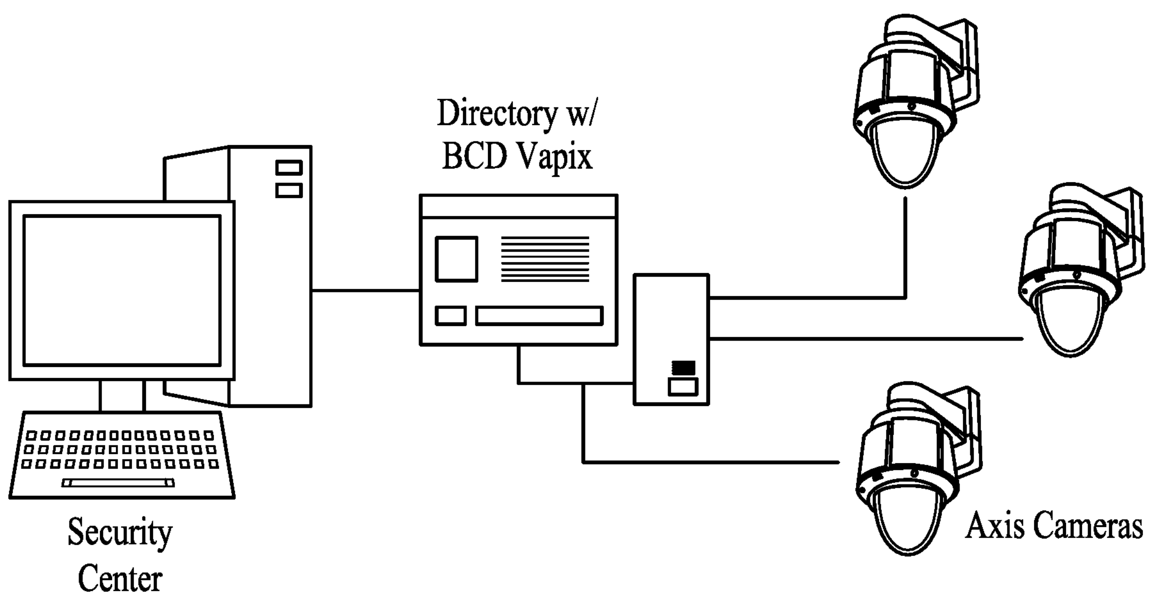
FIG. 313 illustrates, generally, the architecture of the resulting system.

FIG. 313 illustrates, generally, the architecture of the resulting system. The plugin enhances the Video Management system by further evolving its "Management" capabilities. A plugin in accordance with an embodiment of the invention introduces the ability to modify the incoming video streams as opposed to merely bringing them into the VMS.

While the foregoing description was specific to the integration of Axis Vapix and Genetec's Security Center, an embodiment of the present invention can be configured to effectively merge the functionality of two other systems while still staying within the scope of the present invention.

While a specific embodiment of the invention has been shown and described, it is envisioned that those skilled in the art may devise various modifications without departing from the spirit and scope of the present invention.

What is claimed is:

1. A security management system comprising at least one video camera; and a user interface that is configured to provide that a user can use the user interface to upload and position a custom image overlay comprising an image on the at least one video camera while never having to enter the at least one video camera's own interface, wherein the security management system is configured to convert a stored serialized image into the image, display the image, and wherein when a user uses the user interface to save a configuration, the security management system displays a list of video cameras to which the image will be applied, applies the image to the video cameras in the list, and reboots the video cameras in the list.

2. A security management system as recited in claim 1, further comprising a plugin that integrates a dedicated security video camera management system with a comprehensive security system management system.

3. A security management system as recited in claim 1, wherein the security management system is configured to provide the creation of entities, Event-to Actions, and role fail-over.

4. A security management system as recited in claim 2, wherein the plugin initializes a data model and retrieves a Plugin ID from a server of the security system management system, wherein when the user attempts to upload a file, a Dialog window is presented, and the plugin filters the uploaded file by checking its file type.

5. A security management system as recited in claim 4, wherein the plugin converts the file, serializes the height and width of an image contained in the file, and then displays the image.

6. A security management system as recited in claim 1, wherein when the user prompts to delete an overlay, the image is no longer rendered, is deleted from the configuration, and the configuration is serialized into a plugin role.

7. A security management system as recited in claim 6, wherein an image file gets converted into a string that can be serialized and a string is converted to a byte array that can be consumed as an image.

8. A security management system as recited in claim 7, wherein when an Update Overlay function is invoked, an old overlay is removed.

9. A security management system as recited in claim 8, wherein the plugin creates and registers request handlers for communication and user interaction.

10. A security management system as recited in claim 9, wherein the request handlers handle request commands.

11. A security management system as recited in claim 10, wherein the request commands comprise a request to update an image displayed relating to the at least one video camera.

12. A plugin that integrates a dedicated security video camera management system with a comprehensive security system management system, wherein there is a user interface that is configured to provide that a user can use the user interface to upload and position a custom image overlay comprising an image on the at least one video camera while never having to enter the at least one video camera's own interface, wherein the plugin converts a stored serialized image into the image, displays the image, and wherein when a user uses the user interface to save a configuration, the plugin displays a list of video cameras to which the image will be applied, applies the image to the video cameras in the list, and reboots the video cameras in the list.

13. A plugin as recited in claim 12, wherein the plugin initializes a data model and retrieves a Plugin ID from a server of the security system management system, wherein when the user attempts to upload a file, a Dialog window is presented, and the plugin filters the uploaded file by checking its file type.

14. A plugin as recited in claim 13, wherein the plugin converts the file, serializes the height and width of an image contained in the file, and then displays the image.

15. A plugin as recited in claim 14, wherein when the user prompts to delete an overlay, the image is no longer rendered, is deleted from the configuration, and the configuration is serialized into a plugin role.

16. A plugin as recited in claim 15, wherein an image file gets converted into a string that can be serialized and a string is converted to a byte array that can be consumed as an image.

17. A plugin as recited in claim 16, wherein when an Update Overlay function is invoked, an old overlay is removed.

18. A plugin as recited in claim 17, wherein the plugin creates and registers request handlers for communication and user interaction, wherein the request handlers handle request commands, wherein the request commands comprise a request to update an image displayed relating to the at least one video camera.

* * * * *